US009344171B2

(12) United States Patent
Murakami et al.

(10) Patent No.: US 9,344,171 B2
(45) Date of Patent: *May 17, 2016

(54) TRANSMISSION METHOD, TRANSMISSION DEVICE, RECEPTION METHOD, AND RECEPTION DEVICE

(71) Applicant: Panasonic Intellectual Property Corporation of America, Torrance, CA (US)

(72) Inventors: Yutaka Murakami, Kanagawa (JP); Tomohiro Kimura, Osaka (JP); Mikihiro Ouchi, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/804,733

(22) Filed: Jul. 21, 2015

(65) Prior Publication Data
US 2015/0326294 A1 Nov. 12, 2015

Related U.S. Application Data

(60) Continuation of application No. 14/644,834, filed on Mar. 11, 2015, which is a continuation of application No. 14/447,027, filed on Jul. 30, 2014, now Pat. No. 9,048,985, which is a division of application No. 13/811,021, filed as application No. PCT/JP2011/005801 on Oct. 17, 2011, now Pat. No. 8,831,134.

(30) Foreign Application Priority Data

Oct. 18, 2010 (JP) ................................. 2010-234061
Dec. 9, 2010 (JP) ................................. 2010-275164

(51) Int. Cl.
*H04B 7/04* (2006.01)
*H04L 1/00* (2006.01)
(Continued)

(52) U.S. Cl.
CPC ............ *H04B 7/0478* (2013.01); *H04B 7/0417* (2013.01); *H04L 1/007* (2013.01);
(Continued)

(58) Field of Classification Search
CPC ...... H04L 1/007; H04L 1/0007; H04L 1/0009; H04L 27/2601; H04L 25/4906; H04L 25/03942; H04L 5/0023; H04L 5/0046; H04L 5/0048; H04L 5/0053; H04L 1/0042; H04L 27/2032; H04L 27/22; H04L 25/0391; H04B 7/0478; H04B 7/0417; H04B 7/0482; H04B 7/0613; H04B 7/0615
USPC ................. 375/260, 267, 285, 295–296, 299; 370/328, 332–334; 455/562.1, 114.2, 455/63.1
See application file for complete search history.

(56) References Cited

U.S. PATENT DOCUMENTS 6,859,503 B2   2/2005   Pautler et al.
7,139,324 B1   11/2006   Ylitalo et al.
(Continued)

FOREIGN PATENT DOCUMENTS

CN   1653768 A   8/2005
CN   1969522 A   5/2007
(Continued)

OTHER PUBLICATIONS

International Search Report issued Dec. 6, 2011 in corresponding International Application No. PCT/JP2011/005801.
(Continued)

*Primary Examiner* — Khanh C Tran
(74) *Attorney, Agent, or Firm* — Wenderoth, Lind & Ponack, L.L.P.

(57) ABSTRACT

Provided is a precoding method for generating, from a plurality of baseband signals, a plurality of precoded signals to be transmitted over the same frequency bandwidth at the same time, including the steps of selecting a matrix F[i] from among N matrices, which define precoding performed on the plurality of baseband signals, while switching between the N matrices, i being an integer from 0 to N−1, and N being an integer at least two, generating a first precoded signal z1 and a second precoded signal z2, generating a first encoded block and a second encoded block using a predetermined error correction block encoding method, generating a baseband signal with M symbols from the first encoded block and a baseband signal with M symbols the second encoded block, and precoding a combination of the generated baseband signals to generate a precoded signal having M slots.

4 Claims, 88 Drawing Sheets

(51) Int. Cl.
  *H04L 25/49* (2006.01)
  *H04L 25/03* (2006.01)
  *H04L 27/20* (2006.01)
  *H04L 27/22* (2006.01)
  *H04L 5/00* (2006.01)
  *H04L 27/26* (2006.01)

(52) U.S. Cl.
  CPC ......... *H04L 1/0042* (2013.01); *H04L 25/0391* (2013.01); *H04L 25/03942* (2013.01); *H04L 25/4906* (2013.01); *H04L 27/2032* (2013.01); *H04L 27/22* (2013.01); *H04L 5/0007* (2013.01); *H04L 5/0023* (2013.01); *H04L 5/0046* (2013.01); *H04L 5/0048* (2013.01); *H04L 5/0053* (2013.01); *H04L 27/2601* (2013.01)

(56) References Cited

U.S. PATENT DOCUMENTS

| | | | |
|---|---|---|---|
| 7,561,632 | B1 | 7/2009 | van Zelst et al. |
| 7,653,415 | B2 | 1/2010 | van Rooyen |
| 7,881,247 | B2 | 2/2011 | Pan et al. |
| 7,991,090 | B2 | 8/2011 | Kim et al. |
| 8,027,704 | B2 | 9/2011 | van Rooyen |
| 8,179,955 | B2 | 5/2012 | Taylor et al. |
| 8,184,726 | B2 | 5/2012 | Hsiao et al. |
| 8,194,778 | B2 | 6/2012 | Ko et al. |
| 8,351,524 | B2 | 1/2013 | Zhou |
| 8,494,033 | B2 | 7/2013 | Jongren et al. |
| 8,638,879 | B2 | 1/2014 | Murakami et al. |
| 8,644,289 | B2 | 2/2014 | Zhu et al. |
| 2003/0185310 | A1 | 10/2003 | Ketchum et al. |
| 2005/0111347 | A1* | 5/2005 | Breiling ............... H04B 7/0669 370/206 |
| 2005/0157683 | A1 | 7/2005 | Ylitalo et al. |
| 2005/0157684 | A1 | 7/2005 | Ylitalo et al. |
| 2005/0281350 | A1 | 12/2005 | Chae et al. |
| 2006/0013327 | A1 | 1/2006 | Sugar et al. |
| 2007/0098092 | A1* | 5/2007 | Mitran ................ H04L 25/0206 375/260 |
| 2007/0140377 | A1 | 6/2007 | Murakami et al. |
| 2009/0285325 | A1* | 11/2009 | Zhou .................... H04B 7/0854 375/267 |
| 2010/0046658 | A1 | 2/2010 | Yosoku et al. |
| 2010/0322337 | A1 | 12/2010 | Ylitalo et al. |
| 2010/0322349 | A1* | 12/2010 | Lee .................... H04L 27/2602 375/299 |
| 2011/0044412 | A1 | 2/2011 | Murakami et al. |
| 2011/0058632 | A1* | 3/2011 | Siti .......................... H04L 1/06 375/340 |
| 2011/0158219 | A1 | 6/2011 | Ko et al. |
| 2011/0211628 | A1 | 9/2011 | Hammarwall et al. |

FOREIGN PATENT DOCUMENTS

| | | |
|---|---|---|
| JP | 2004-502376 | 1/2004 |
| JP | 2008-199599 | 8/2008 |
| JP | 2008-543215 | 11/2008 |
| WO | 02/082689 | 10/2002 |
| WO | 2005/050885 | 6/2005 |
| WO | 2006/129958 | 12/2006 |
| WO | 2010/016183 | 2/2010 |

OTHER PUBLICATIONS

Yasuyuki Hatakawa et al., "Field Experiments on Open-Loop Precoding MIMO Using Testbed Targeted at IMT-Advanced System", Wireless Communications and Networking Conference, 2009, IEEE, Apr. 8, 2009.

Tareq Y. Al-Naffouri et al., "Opportunistic Beamforming with Precoding for Spatially Correlated Channels", Information Theory, 2009, CWIT 2009, 11th Canadian Workshop on May 15, 2009.

Bertrand M. Hochwald et al., "Achieving Near-Capacity on a Multiple-Antenna Channel", IEEE Transactions on Communications, vol. 51, No. 3, pp. 389-399, Mar. 2003.

Ben Lu et al., "Performance Analysis and Design Optimization of LDPC-Coded MIMO OFDM Systems", IEEE Transactions on Signal Processing, vol. 52, No. 2, pp. 348-361, Feb. 2004.

Yutaka Murakami et al., "BER Performance Evaluation in 2×2 MIMO Spatial Multiplexing Systems under Rician Fading Channels", IEICE Trans. Fundamentals, vol. E91-A, No. 10, pp. 2798-2807, Oct. 2008.

Hangjun Chen et al., "Turbo Space-Time Codes with Time Varying Linear Transformations", IEEE Transactions on Wireless Communications, vol. 6, No. 2, pp. 486-493, Feb. 2007.

Hiroyuki Kawai et al., "Likelihood Function for QRM-MLD Suitable for Soft-Decision Turbo Decoding and Its Performance for OFCDM MIMO Multiplexing in Multipath Fading Channel", IEICE Trans. Commun., vol. E88-B, No. 1, pp. 47-57, Jan. 2005.

Motohiko Isaka et al., "A tutorial on 'parallel concatenated (Turbo) coding', 'Turbo (iterative) decoding' and related topics", The Institute of Electronics, Information, and Communication Engineers, Technical Report IT 98-51 pp. 1-18, Dec. 1998 (with English abstract).

S. Galli et al., "Advanced Signal Processing for PLCs: Wavelet-OFDM", Proc. of IEEE International symposium on ISPLC 2008, pp. 187-192, 2008.

David J. Love et al., "Limited Feedback Unitary Precoding for Spatial Multiplexing Systems", IEEE Transactions on Information Theory, vol. 51, No. 8, pp. 2967-2976, Aug. 2005.

"Frame structure channel coding and modulation for a second generation digital terrestrial television broadcasting system (DVB-T2)", DVB Document A122, pp. 1-158, Jun. 2008.

Lorenzo Vangelista et al., "Key Technologies for Next-Generation Terrestrial Digital Television Standard DVB-T2", IEEE Communications Magazine, vol. 47, No. 10, pp. 146-153, Oct. 2009.

Takeo Ohgane et al., "Applications of Space Division Multiplexing and Those Performance in a MIMO Channel", IEICE Trans. Commun., vol. E88-B, No. 5, pp. 1843-1851, May 2005.

R. G. Gallager, "Low-Density Parity-Check Codes", IRE Transactions on Information Theory, IT-8, pp. 21-28, 1962.

David J. C. MacKay, "Good Error-Correcting Codes Based on Very Sparse Matrices", IEEE Transactions on Information Theory, vol. 45, No. 2, pp. 399-431, Mar. 1999.

ETSI EN 302 307, "Digital Video Broadcasting (DVB); Second generation framing structure, channel coding and modulation systems for Broadcasting, Interactive Services, News Gathering and other broadband satellite applications", v.1.1.2, Jun. 2006.

Yeong-Luh Ueng et al., "A Fast-Convergence Decoding Method and Memory-Efficient VLSI Decoder Architecture for Irregular LDPC Codes in the IEEE 802.16e Standards", IEEE VTC-2007, pp. 1255-1259, Aug. 2007.

Substantive Examination Report issued Feb. 17, 2015 in corresponding Philippines Patent Application No. 1/2013/500213.

Office Action issued May 21, 2015 in corresponding Chinese Application No. 201180035360.X (with English translation of Search Report).

* cited by examiner

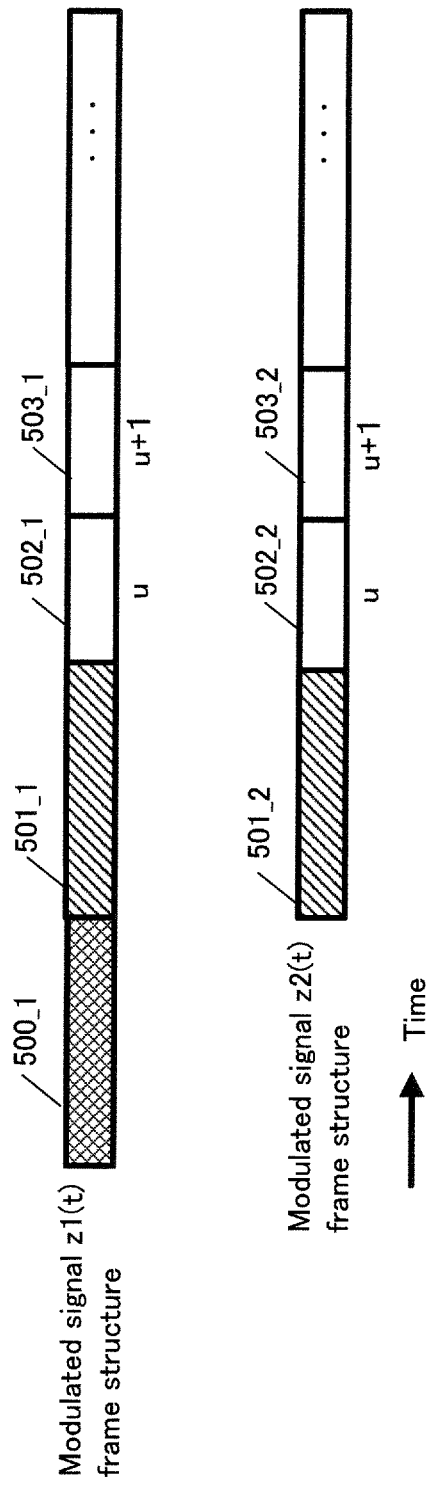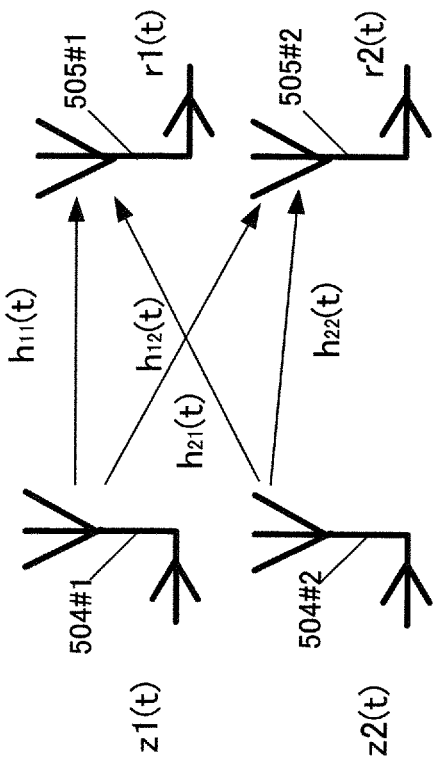
FIG. 5

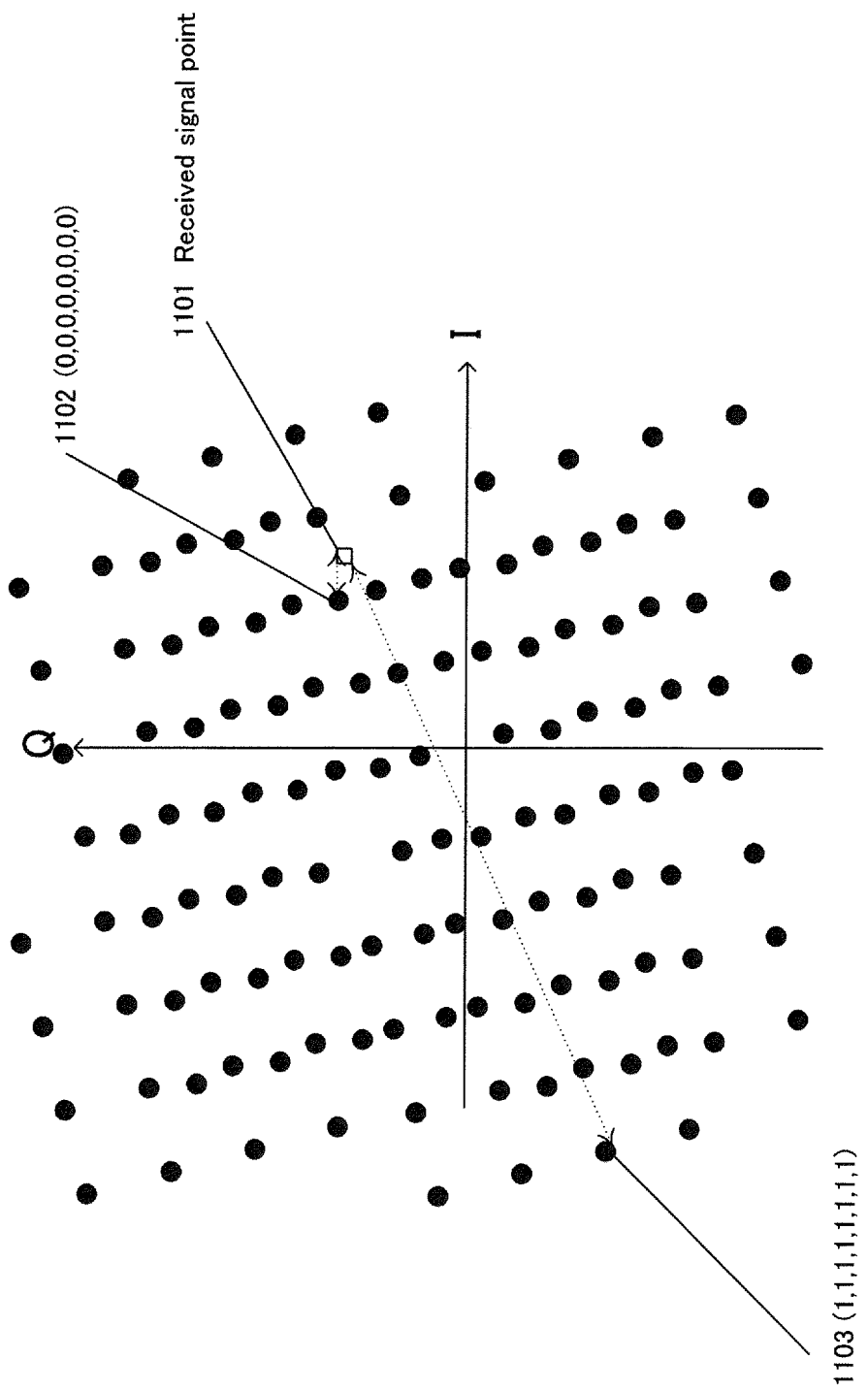

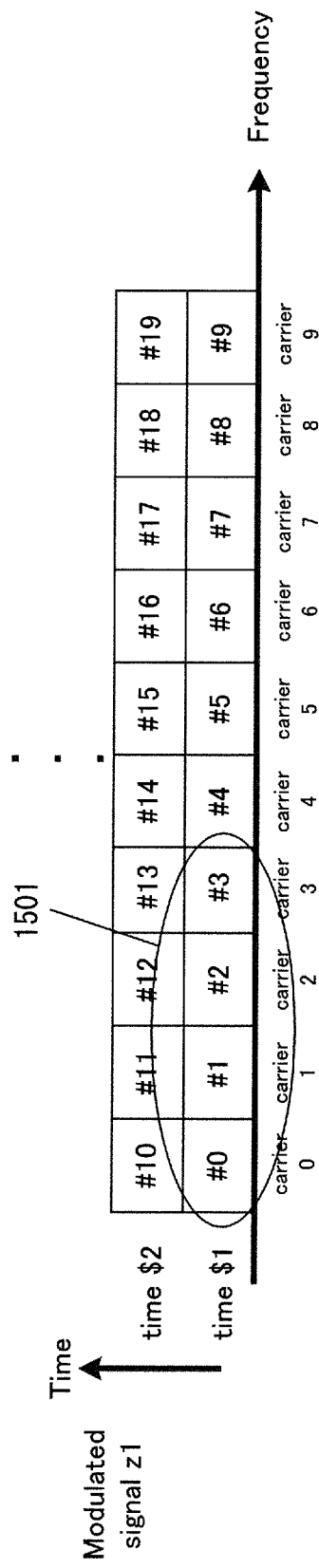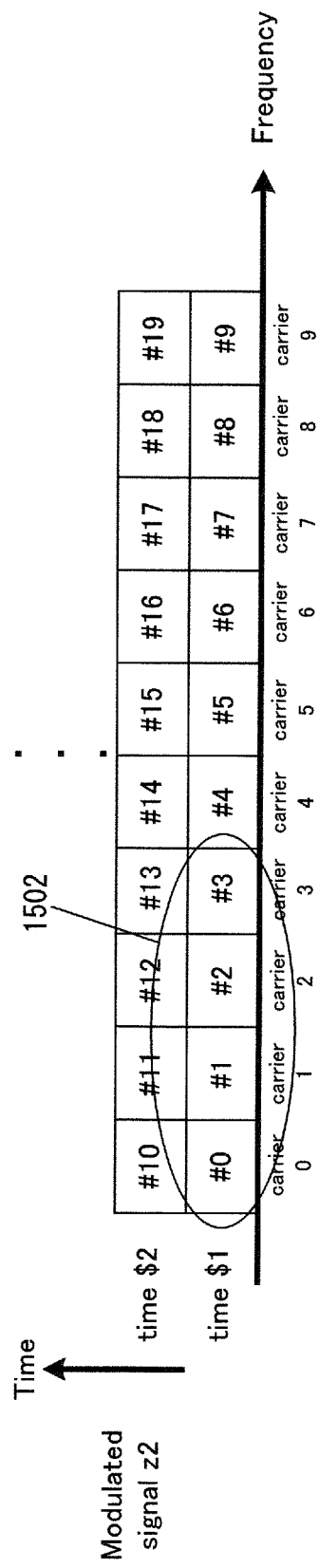

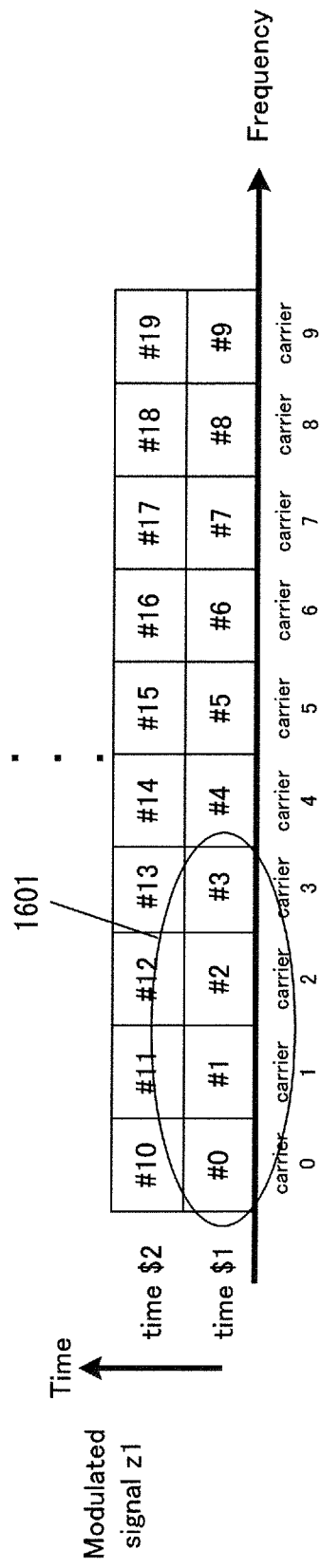
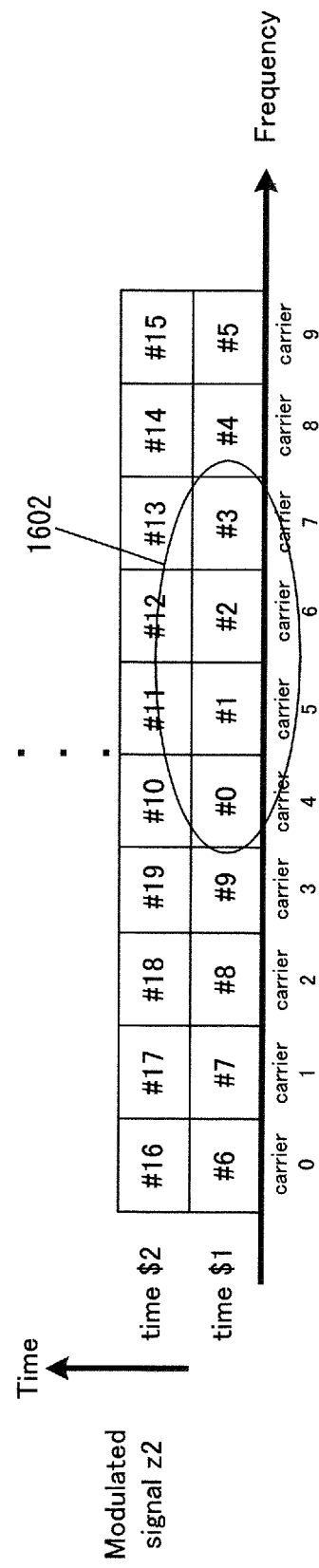
FIG. 16A
FIG. 16B

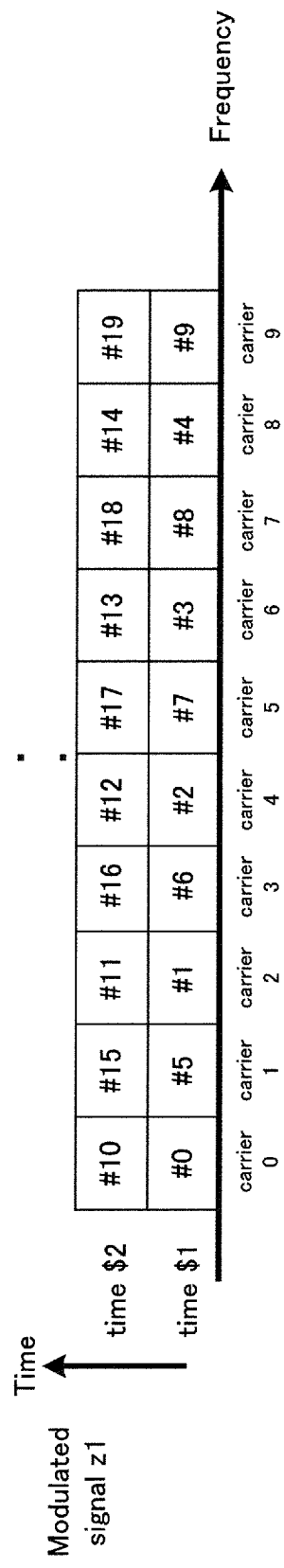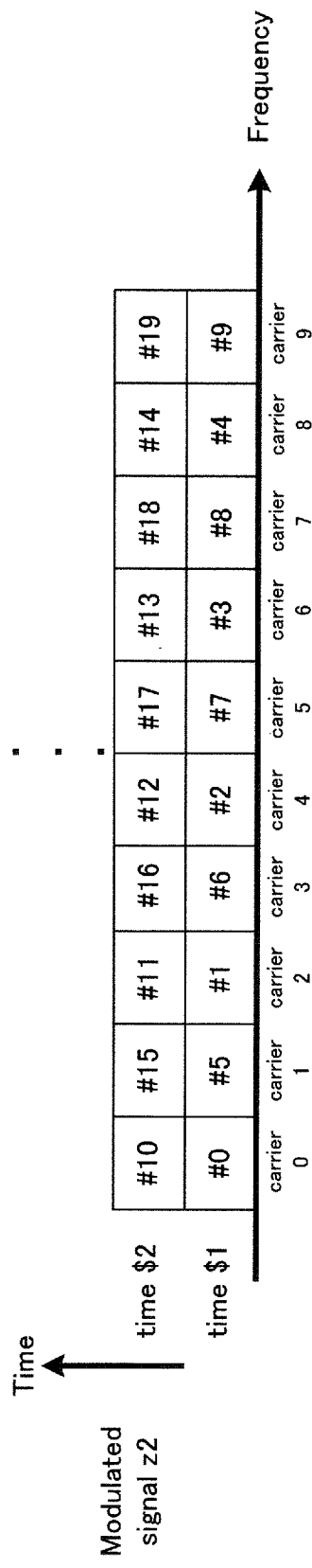

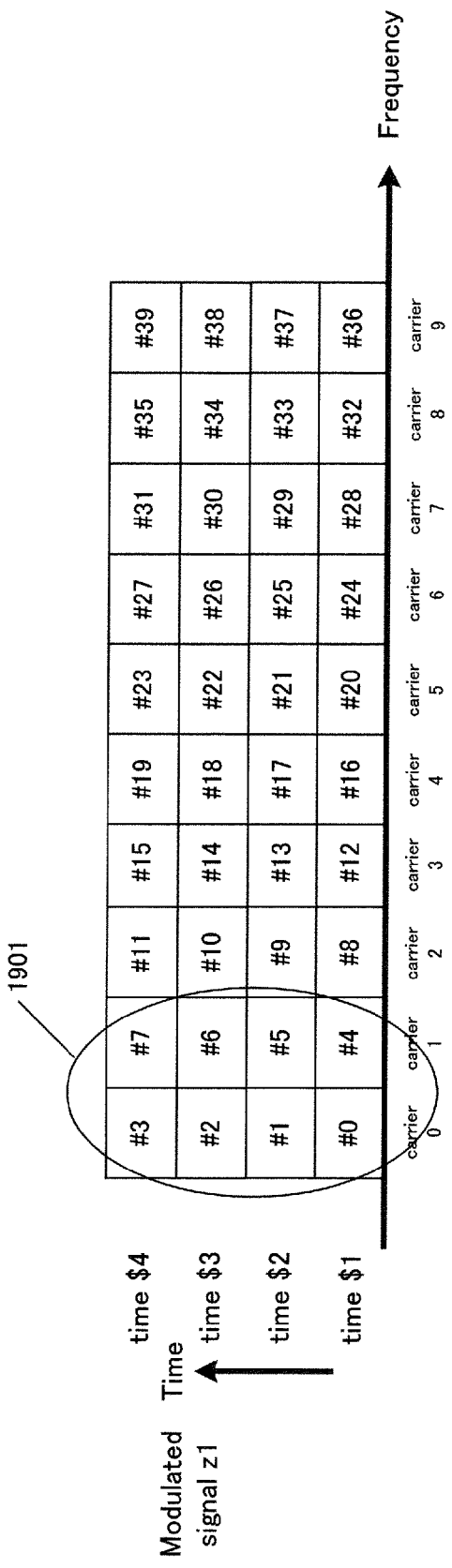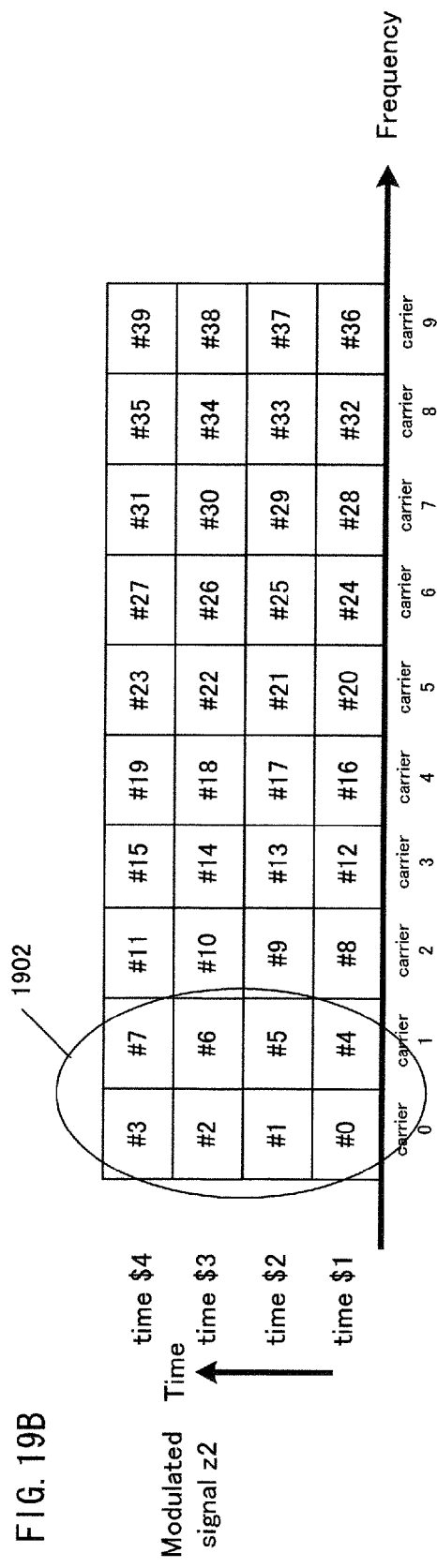

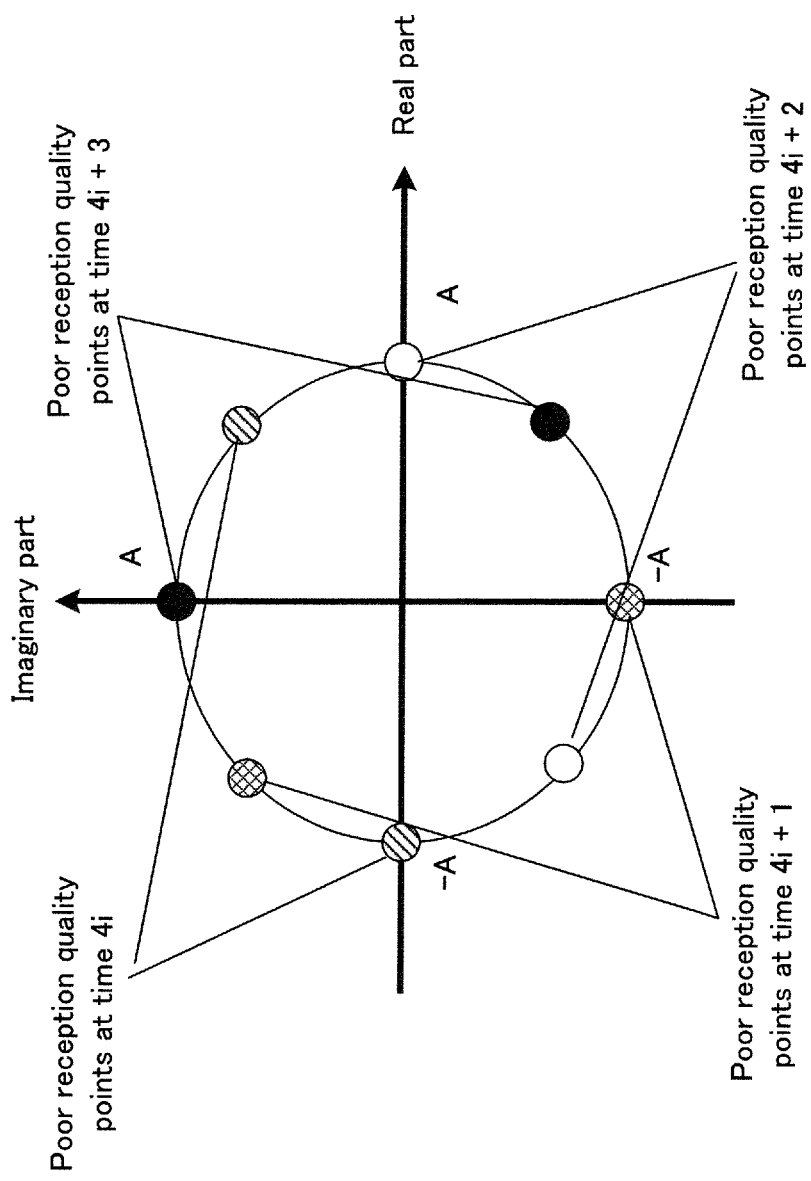

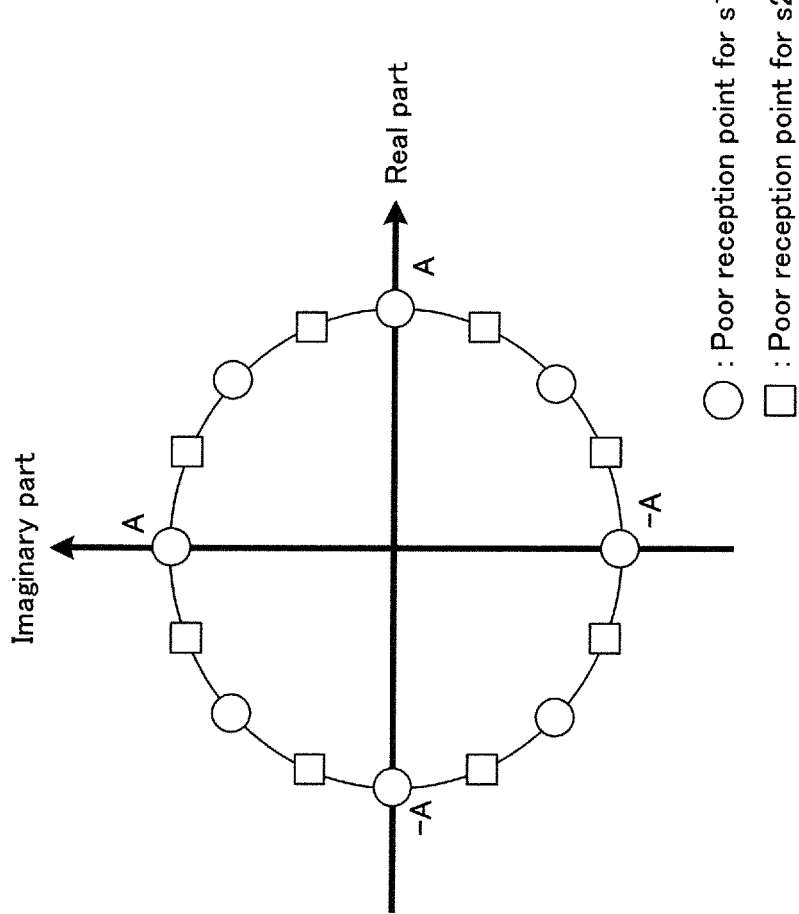

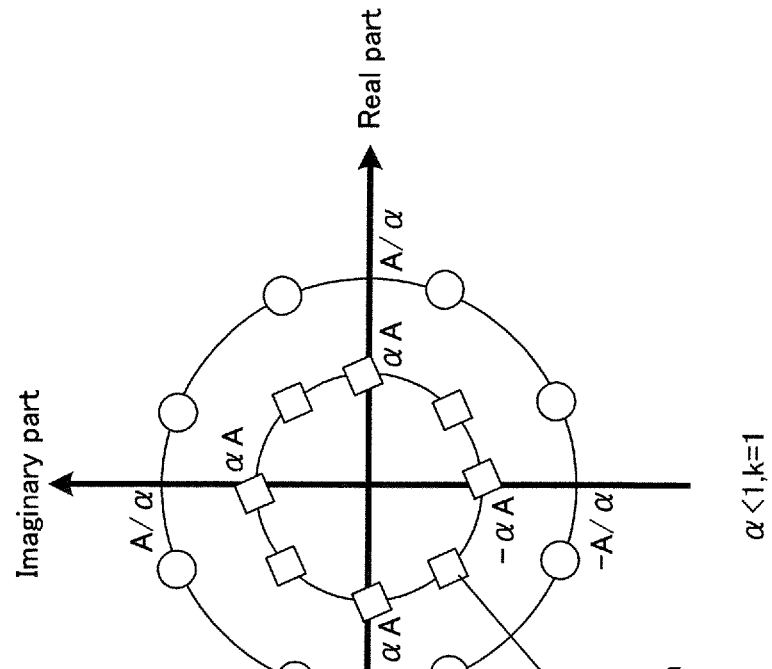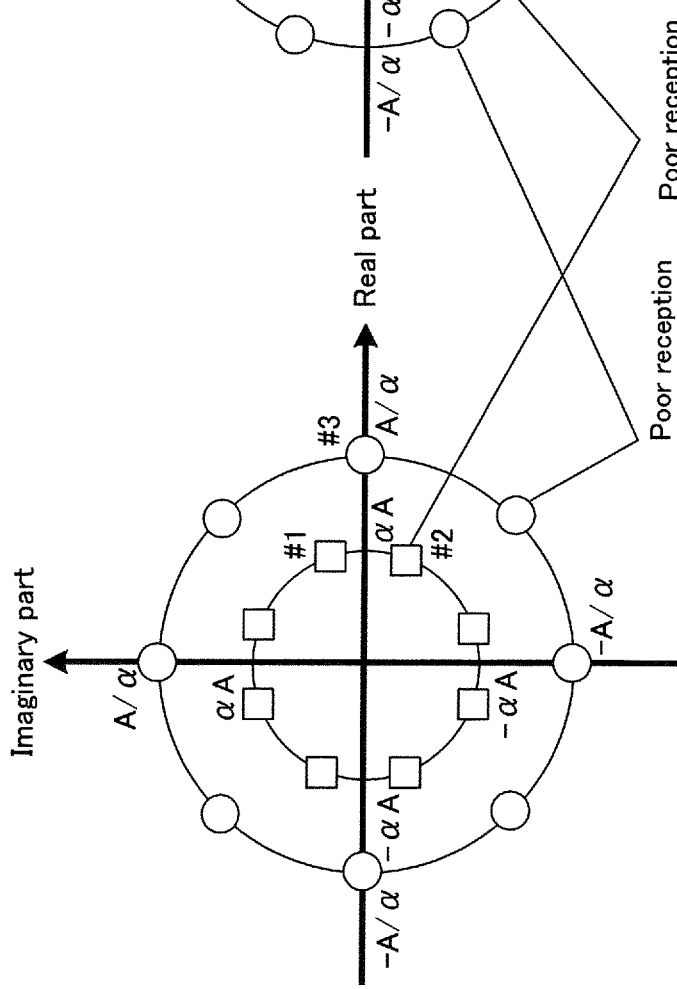
FIG. 42B
FIG. 42A

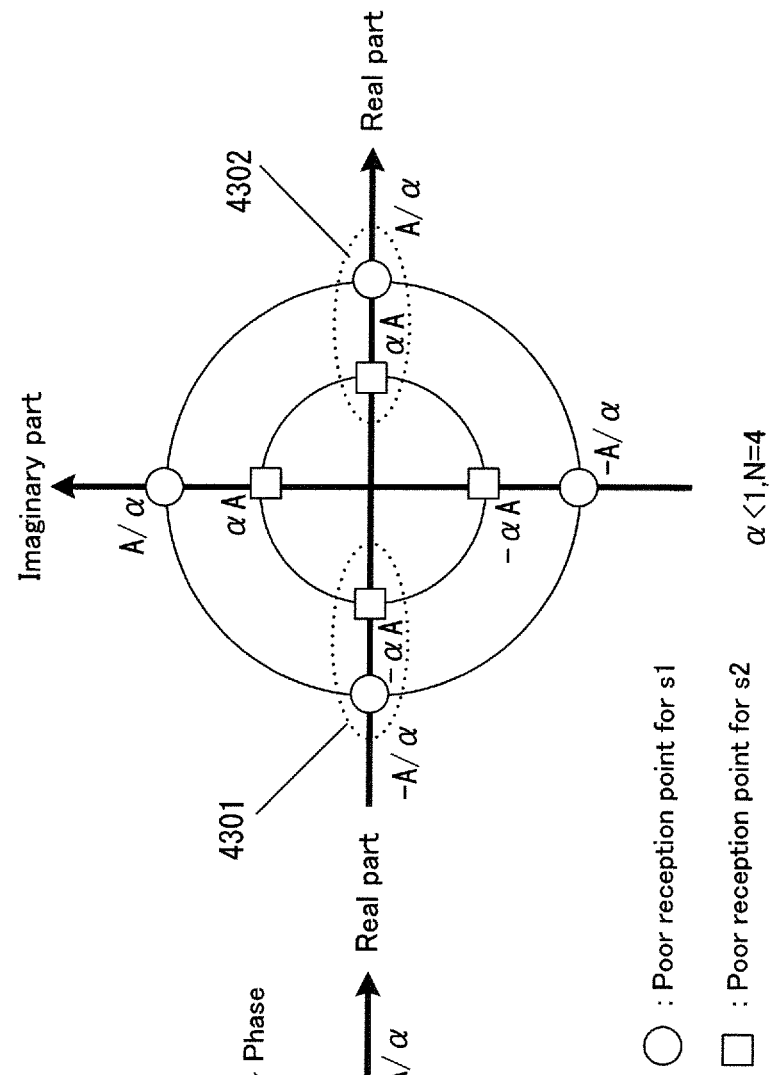
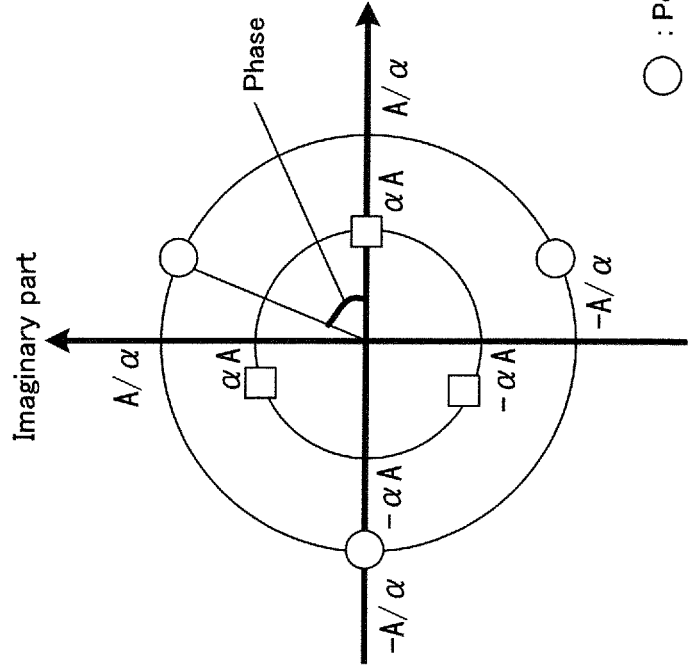
FIG. 43A
FIG. 43B

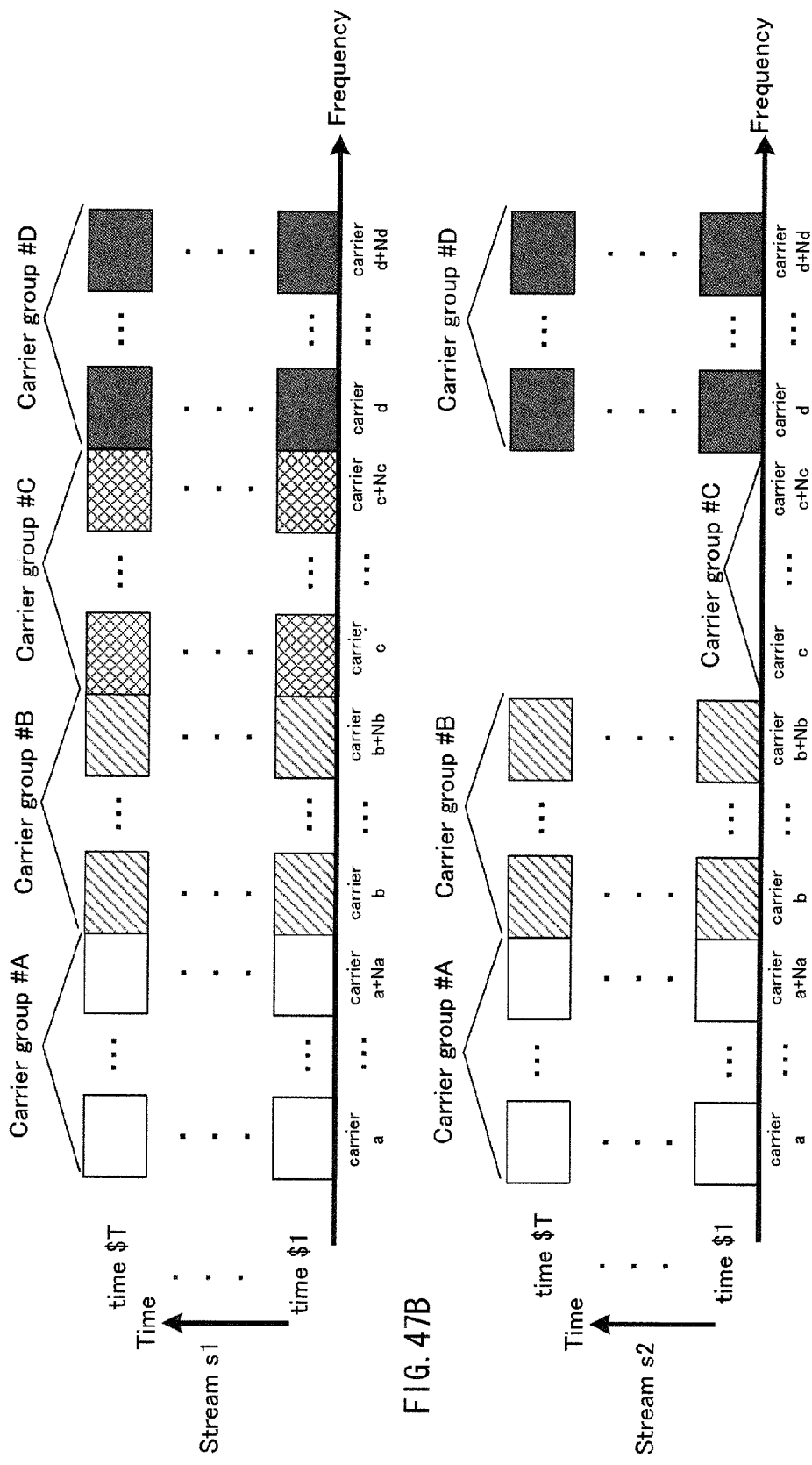

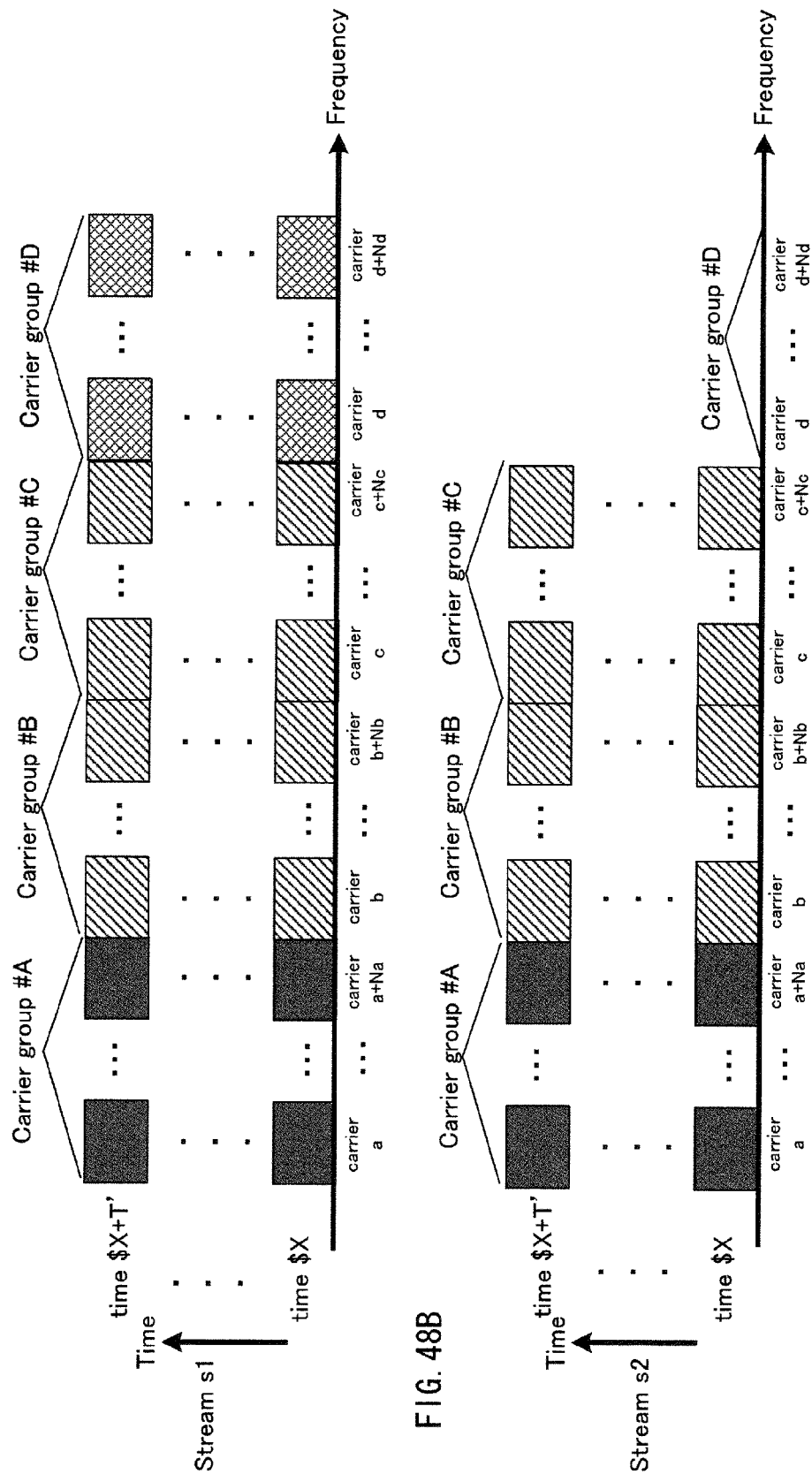

FIG. 49

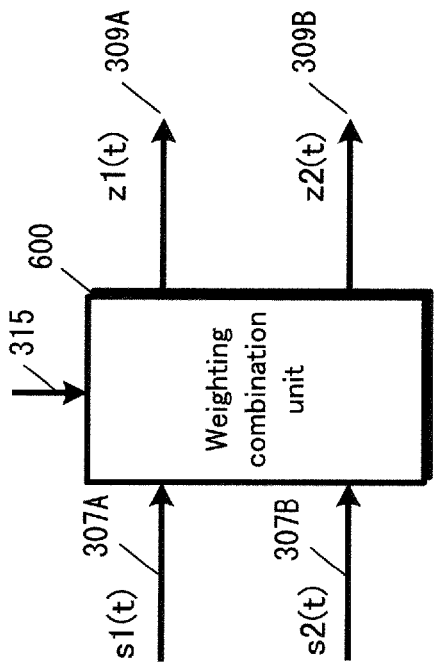

Method #1:
$$\begin{pmatrix} z1(t) \\ z2(t) \end{pmatrix} = \begin{pmatrix} e^{j0} & 0 \\ 0 & e^{j0} \end{pmatrix} \begin{pmatrix} s1(t) \\ s2(t) \end{pmatrix}$$
$$= \begin{pmatrix} 1 & 0 \\ 0 & 1 \end{pmatrix} \begin{pmatrix} s1(t) \\ s2(t) \end{pmatrix}$$

Different expression
$$\begin{pmatrix} z1(t) \\ z2(t) \end{pmatrix} = \frac{1}{\sqrt{2}} \begin{pmatrix} e^{j0} & 0 \\ 0 & e^{j0} \end{pmatrix} \begin{pmatrix} s1(t) \\ s2(t) \end{pmatrix}$$
$$= \frac{1}{\sqrt{2}} \begin{pmatrix} 1 & 0 \\ 0 & 1 \end{pmatrix} \begin{pmatrix} s1(t) \\ s2(t) \end{pmatrix}$$

Method #2:
$$\begin{pmatrix} z1(t) \\ z2(t) \end{pmatrix} = \frac{1}{\sqrt{\alpha^2+1}} \begin{pmatrix} e^{j\theta_{11}(i)} & \alpha \times e^{j(\theta_{11}(i)+\lambda)} \\ \alpha \times e^{j\theta_{21}(i)} & e^{j(\theta_{21}(i)+\lambda+\delta)} \end{pmatrix} \begin{pmatrix} s1(t) \\ s2(t) \end{pmatrix}$$

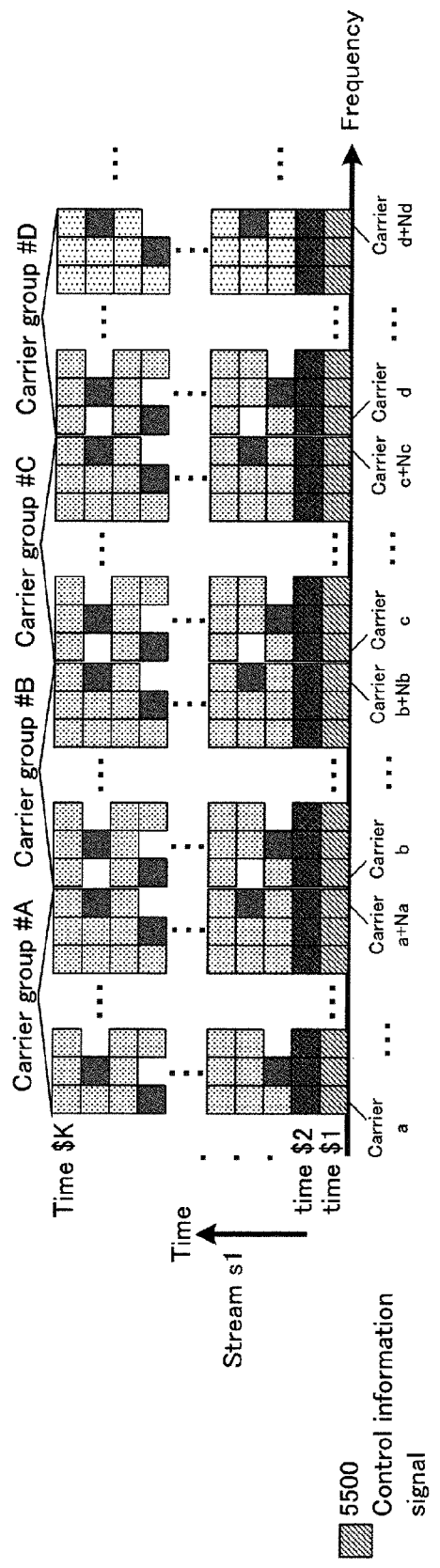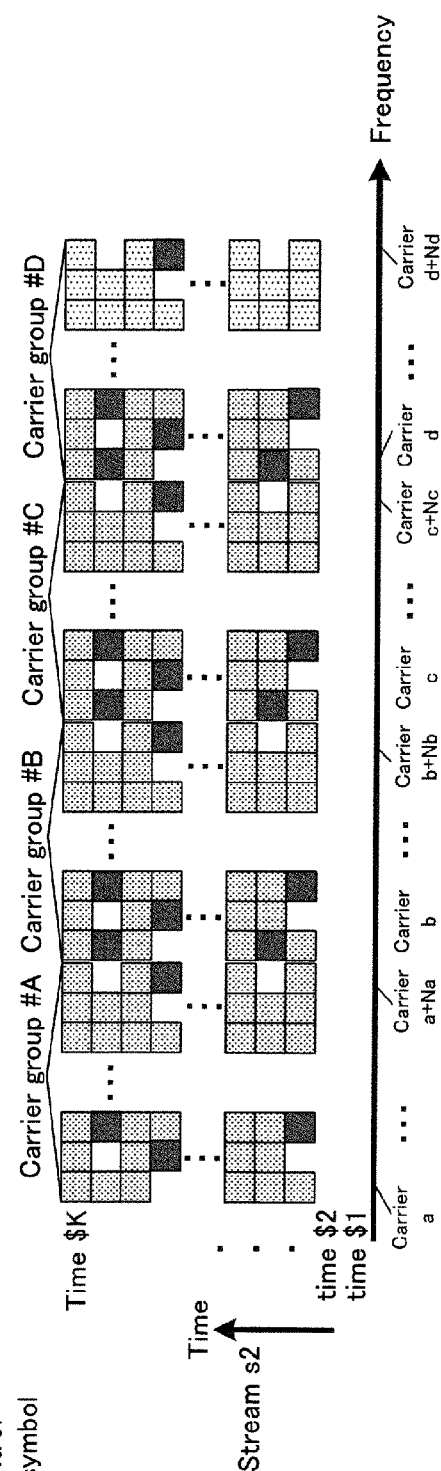
FIG. 55A
FIG. 55B

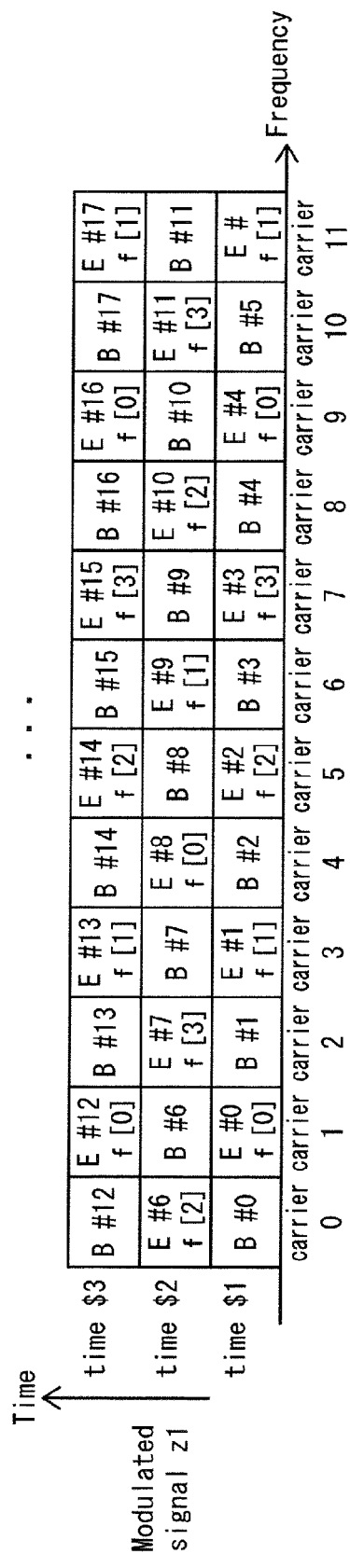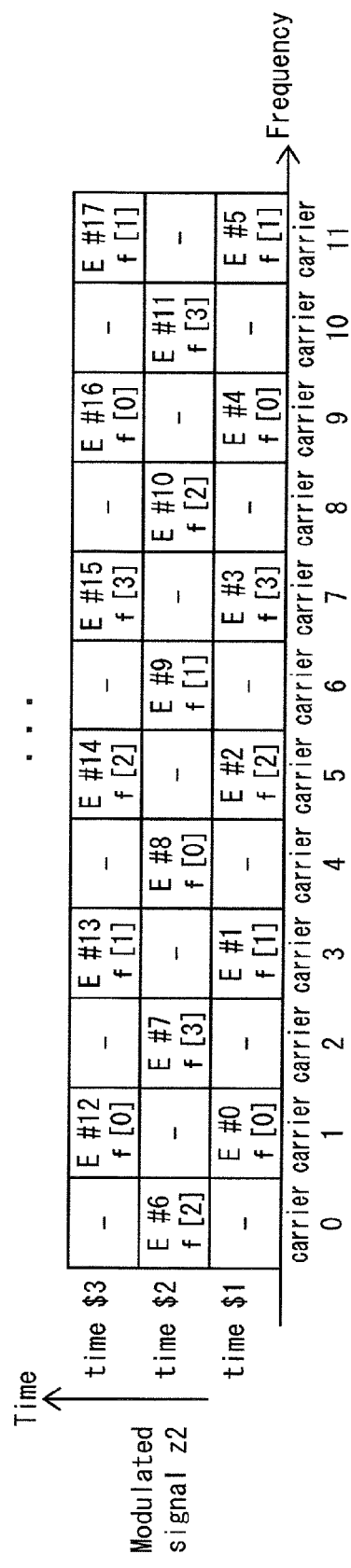

FIG. 73 for z1 (t): | B #0 s1 | B #1 -s2* | B #2 s3 | B #3 -s4* | B #4 s5 | B #5 -s6* | B #6 s7 | B #7 -s8* | B #8 s9 | B #9 -s10* | B #10 s11 | B #11 -s12* | ... 7302

7301 for z2 (t): | B #0 s2 | B #1 s1* | B #2 s4 | B #3 s3* | B #4 s6 | B #5 s5* | B #6 s8 | B #7 s7* | B #8 s10 | B #9 s9* | B #10 s12 | B #11 s11* | ...

*: complex conjugate

TRANSMISSION METHOD, TRANSMISSION DEVICE, RECEPTION METHOD, AND RECEPTION DEVICE

CROSS-REFERENCE TO RELATED APPLICATIONS

This application is a continuation of U.S. application Ser. No. 14/644,834, filed Mar. 11, 2015, which is a continuation of U.S. application Ser. No. 14/447,027, filed Jul. 30, 2014, now U.S. Pat. No. 9,048,985, which is a divisional of U.S. application Ser. No. 13/811,021, now U.S. Pat. No. 8,831,134, which is the National Stage of International Application No. PCT/JP2011/005801, filed Oct. 17, 2011. The disclosures of Japanese Patent Application No. 2010-234061, filed on Oct. 18, 2010 and No. 2010-275164, filed on Dec. 9, 2010, including the claims, specifications, drawings, and abstracts thereof, are incorporated herein by reference in their entirety.

TECHNICAL FIELD

The present invention relates to a precoding method, a precoding device, a transmission method, a transmission device, a reception method, and a reception device that in particular perform communication using a multi-antenna.

BACKGROUND ART

Multiple-Input Multiple-Output (MIMO) is a conventional example of a communication method using a multi-antenna. In multi-antenna communication, of which MIMO is representative, multiple transmission signals are each modulated, and each modulated signal is transmitted from a different antenna simultaneously in order to increase the transmission speed of data.

FIG. 28 shows an example of the structure of a transmission and reception device when the number of transmit antennas is two, the number of receive antennas is two, and the number of modulated signals for transmission (transmission streams) is two. In the transmission device, encoded data is interleaved, the interleaved data is modulated, and frequency conversion and the like is performed to generate transmission signals, and the transmission signals are transmitted from antennas. In this case, the method for simultaneously transmitting different modulated signals from different transmit antennas at the same time and at the same frequency is spatial multiplexing MIMO.

In this context, it has been suggested in Patent Literature 1 to use a transmission device provided with a different interleave pattern for each transmit antenna. In other words, the transmission device in FIG. 28 would have two different interleave patterns with respective interleaves (πa, πb). As shown in Non-Patent Literature 1 and Non-Patent Literature 2, reception quality is improved in the reception device by iterative performance of a phase detection method that uses soft values (the MIMO detector in FIG. 28).

Models of actual propagation environments in wireless communications include non-line of sight (NLOS), of which a Rayleigh fading environment is representative, and line of sight (LOS), of which a Rician fading environment is representative. When the transmission device transmits a single modulated signal, and the reception device performs maximal ratio combining on the signals received by a plurality of antennas and then demodulates and decodes the signal resulting from maximal ratio combining, excellent reception quality can be achieved in an LOS environment, in particular in an environment where the Rician factor is large, which indicates the ratio of the received power of direct waves versus the received power of scattered waves. However, depending on the transmission system (for example, spatial multiplexing MIMO system), a problem occurs in that the reception quality deteriorates as the Rician factor increases (see Non-Patent Literature 3).

FIGS. 29A and 29B show an example of simulation results of the Bit Error Rate (BER) characteristics (vertical axis: BER, horizontal axis: signal-to-noise power ratio (SNR)) for data encoded with low-density parity-check (LDPC) code and transmitted over a 2×2 (two transmit antennas, two receive antennas) spatial multiplexing MIMO system in a Rayleigh fading environment and in a Rician fading environment with Rician factors of K=3, 10, and 16 dB. FIG. 29A shows the BER characteristics of Max-log A Posteriori Probability (APP) without iterative detection (see Non-Patent Literature 1 and Non-Patent Literature 2), and FIG. 29B shows the BER characteristics of Max-log-APP with iterative detection (see Non-Patent Literature 1 and Non-Patent Literature 2) (number of iterations: five). As is clear from FIGS. 29A and 29B, regardless of whether iterative phase detection is performed, reception quality degrades in the spatial multiplexing MIMO system as the Rician factor increases. It is thus clear that the unique problem of "degradation of reception quality upon stabilization of the propagation environment in the spatial multiplexing MIMO system", which does not exist in a conventional single modulation signal transmission system, occurs in the spatial multiplexing MIMO system.

Broadcast or multicast communication is a service directed towards line-of-sight users. The radio wave propagation environment between the broadcasting station and the reception devices belonging to the users is often an LOS environment. When using a spatial multiplexing MIMO system having the above problem for broadcast or multicast communication, a situation may occur in which the received electric field strength is high at the reception device, but degradation in reception quality makes it impossible to receive the service. In other words, in order to use a spatial multiplexing MIMO system in broadcast or multicast communication in both an NLOS environment and an LOS environment, there is a desire for development of a MIMO system that offers a certain degree of reception quality.

Non-Patent Literature 8 describes a method to select a codebook used in precoding (i.e. a precoding matrix, also referred to as a precoding weight matrix) based on feedback information from a communication partner. Non-Patent Literature 8 does not at all disclose, however, a method for precoding in an environment in which feedback information cannot be acquired from the communication partner, such as in the above broadcast or multicast communication.

On the other hand, Non-Patent Literature 4 discloses a method for switching the precoding matrix over time. This method can be applied even when no feedback information is available. Non-Patent Literature 4 discloses using a unitary matrix as the matrix for precoding and switching the unitary matrix at random but does not at all disclose a method applicable to degradation of reception quality in the above-described LOS environment. Non-Patent Literature 4 simply recites hopping between precoding matrices at random. Obviously, Non-Patent Literature 4 makes no mention whatsoever of a precoding method, or a structure of a precoding matrix, for remedying degradation of reception quality in an LOS environment.

CITATION LIST

Patent Literature

[Patent Literature 1]
WO 2005/050885

Non-Patent Literature

[Non-Patent Literature 1]
"Achieving near-capacity on a multiple-antenna channel", IEEE Transaction on Communications, vol. 51, no. 3, pp. 389-399, March 2003.

[Non-Patent Literature 2]
"Performance analysis and design optimization of LDPC-coded MIMO OFDM systems", IEEE Trans. Signal Processing, vol. 52, no. 2, pp. 348-361, February 2004.

[Non-Patent Literature 3]
"BER performance evaluation in 2×2 MIMO spatial multiplexing systems under Rician fading channels", IEICE Trans. Fundamentals, vol. E91-A, no. 10, pp. 2798-2807, October 2008.

[Non-Patent Literature 4]
"Turbo space-time codes with time varying linear transformations", IEEE Trans. Wireless communications, vol. 6, no. 2, pp. 486-493, February 2007.

[Non-Patent Literature 5]
"Likelihood function for QR-MLD suitable for soft-decision turbo decoding and its performance", IEICE Trans. Commun., vol. E88-B, no. 1, pp. 47-57, January 2004.

[Non-Patent Literature 6]
"A tutorial on 'parallel concatenated (Turbo) coding', 'Turbo (iterative) decoding' and related topics", The Institute of Electronics, Information, and Communication Engineers, Technical Report IT 98-51.

[Non-Patent Literature 7]
"Advanced signal processing for PLCs: Wavelet-OFDM", Proc. of IEEE International symposium on ISPLC 2008, pp. 187-192, 2008.

[Non-Patent Literature 8]
D. J. Love, and R. W. Heath, Jr., "Limited feedback unitary precoding for spatial multiplexing systems", IEEE Trans. Inf. Theory, vol. 51, no. 8, pp. 2967-2976, August 2005.

[Non-Patent Literature 9]
DVB Document A122, Framing structure, channel coding and modulation for a second generation digital terrestrial television broadcasting system, (DVB-T2), June 2008.

[Non-Patent Literature 10]
L. Vangelista, N. Benvenuto, and S. Tomasin, "Key technologies for next-generation terrestrial digital television standard DVB-T2", IEEE Commun. Magazine, vol. 47, no. 10, pp. 146-153, October 2009.

[Non-Patent Literature 11]
T. Ohgane, T. Nishimura, and Y. Ogawa, "Application of space division multiplexing and those performance in a MIMO channel", IEICE Trans. Commun., vol. 88-B, no. 5, pp. 1843-1851, May 2005.

[Non-Patent Literature 12]
R. G. Gallager, "Low-density parity-check codes", IRE Trans. Inform. Theory, IT-8, pp. 21-28, 1962.

[Non-Patent Literature 13]
D. J. C. Mackay, "Good error-correcting codes based on very sparse matrices", IEEE Trans. Inform. Theory, vol. 45, no. 2, pp. 399-431, March 1999.

[Non-Patent Literature 14]
ETSI EN 302 307, "Second generation framing structure, channel coding and modulation systems for broadcasting, interactive services, news gathering and other broadband satellite applications", v. 1.1.2, June 2006.

[Non-Patent Literature 15]
Y.-L. Ueng, and C.-C. Cheng, "A fast-convergence decoding method and memory-efficient VLSI decoder architecture for irregular LDPC codes in the IEEE 802.16e standards", IEEE VTC-2007 Fall, pp. 1255-1259.

SUMMARY OF INVENTION

Technical Problem

It is an object of the present invention to provide a MIMO system that improves reception quality in an LOS environment.

Solution to Problem

In order to solve the above problems, an aspect of the present invention is a precoding method for generating, from a plurality of baseband signals, a plurality of precoded signals to be transmitted over the same frequency bandwidth at the same time, comprising the steps of: selecting a matrix F[i] from among N matrices while switching between the N matrices, the N matrices defining precoding performed on the plurality of baseband signals, i being an integer from 0 to N−1, and N being an integer at least two; and generating a first precoded signal z1 and a second precoded signal z2 by precoding, in accordance with the selected matrix F[i], a first baseband signal s1 generated from a first plurality of bits and a second baseband signal s2 generated from a second plurality of bits, a first encoded block and a second encoded block being generated respectively as the first plurality of bits and the second plurality of bits using a predetermined error correction block encoding method, the first baseband signal s1 and the second baseband signal s2 being generated respectively from the first encoded block and the second encoded block to have M symbols each, the first precoded signal z1 and the second precoded signal z2 being generated to have M slots each by precoding a combination of the first baseband signal s1 and the second baseband signal s2, M being an integer at least two, the first precoded signal z1 and the second precoded signal z2 satisfying the equation $(z1, z2)^T = F[i](s1, s2)^T$.

Another aspect of the present invention is a precoding device for generating, from a plurality of baseband signals, a plurality of precoded signals to be transmitted over the same frequency bandwidth at the same time, comprising: a weighting information generation unit configured to select a matrix F[i] from among N matrices while switching between the N matrices, the N matrices defining precoding performed on the plurality of baseband signals, i being an integer from 0 to N−1, and N being an integer at least two; a weighting unit configured to generate a first precoded signal z1 and a second precoded signal z2 by precoding, in accordance with the selected matrix F[i], a first baseband signal s1 generated from a first plurality of bits and a second baseband signal s2 generated from a second plurality of bits; an error correction coding unit configured to generate a first encoded block as the first plurality of bits and a second encoded block as the second plurality of bits using a predetermined error correction block encoding method; and a mapper configured to generate a baseband signal with M symbols from the first encoded block and a baseband signal with M symbols from the second encoded block, M being an integer at least two, the first precoded signal z1 and the second precoded signal z2 satisfying the equation $(z1, z2)^T = F[i](s1, s2)^T$, and the weighting unit generating precoded signals with M slots by precoding a combination of the baseband signal generated from the first encoded block and the baseband signal generated from the second encoded block.

With the above aspects of the present invention, a modulated signal is generated by performing precoding while hopping between precoding matrices so that among a plurality of precoding matrices, a precoding matrix used for at least one data symbol and precoding matrices that are used for data symbols that are adjacent to the data symbol in either the frequency domain or the time domain all differ. Therefore, reception quality in an LOS environment is improved in response to the design of the plurality of precoding matrices.

Advantageous Effects of Invention

With the above structure, the present invention provides a transmission method, a reception method, a transmission device, and a reception device that remedy degradation of reception quality in an LOS environment, thereby providing high-quality service to LOS users during broadcast or multicast communication.

BRIEF DESCRIPTION OF DRAWINGS

FIG. 5 is an example of a frame structure.
FIG. 11 is an example of reception conditions.
FIGS. 15A and 15B are examples of a frame structure.
FIGS. 16A and 16B are examples of a frame structure.
FIGS. 17A and 17B are examples of a frame structure.
FIGS. 19A and 19B are examples of a frame structure.
FIG. 20 shows positions of poor reception quality points.
FIG. 34 shows positions of poor reception points.
FIGS. 42A and 42B show positions of poor reception points.
FIGS. 43A and 43B show positions of poor reception points.
FIGS. 47A and 47B are examples of a frame structure in the time and frequency domains.
FIGS. 48A and 48B are examples of a frame structure in the time and frequency domains.
FIG. 49 shows a signal processing method.
FIGS. 55A and 55B are detailed examples of a frame structure in the time and frequency domains.

FIGS. 70A and 70B are examples of arrangements of symbols in modulated signals when adopting hierarchical transmission.

FIG. 73 is an example of a structure of symbols in space-time block coded baseband signals.

DESCRIPTION OF EMBODIMENTS

The following describes embodiments of the present invention with reference to the drawings.

Embodiment 1

The following describes the transmission method, transmission device, reception method, and reception device of the present embodiment.

Prior to describing the present embodiment, an overview is provided of a transmission method and decoding method in a conventional spatial multiplexing MIMO system.

Figure 1:
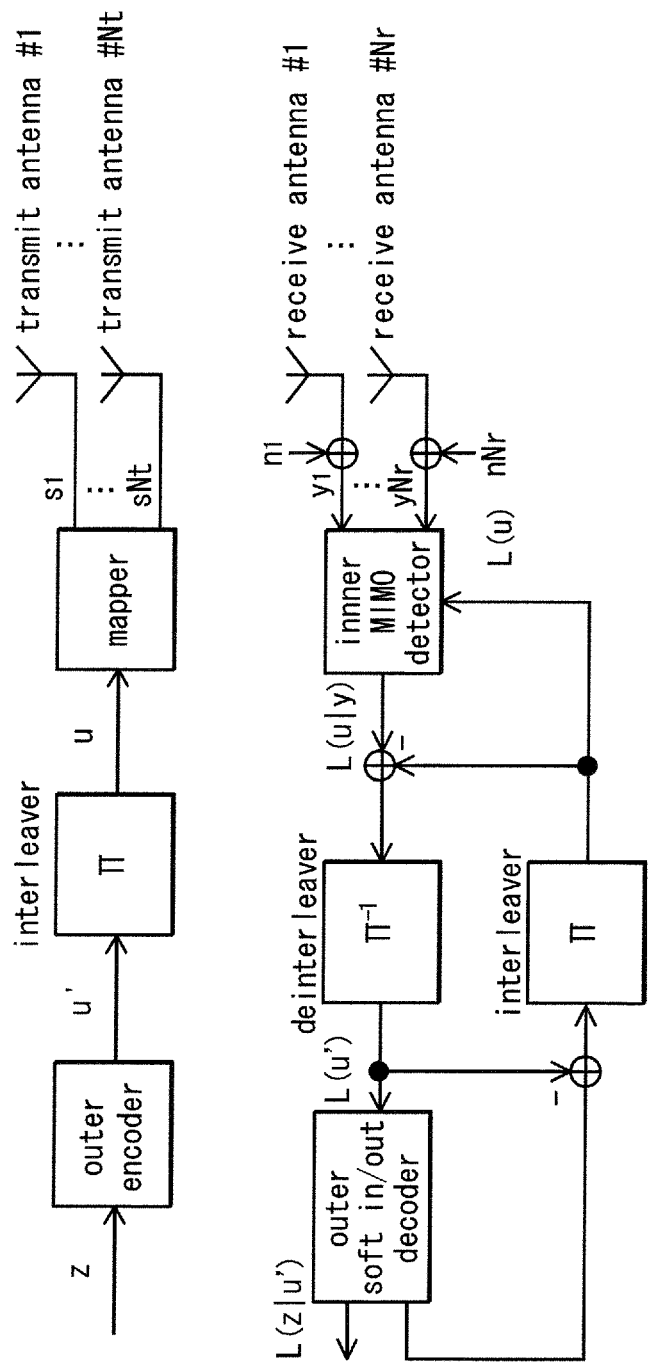
FIG. 1 is an example of the structure of a transmission device and a reception device in a spatial multiplexing MIMO system.

FIG. 1 shows the structure of an $N_t \times N_r$ spatial multiplexing MIMO system. An information vector z is encoded and interleaved. As output of the interleaving, an encoded bit vector $u=(u_1, \ldots, u_{Nt})$ is acquired. Note that $u_i=(u_{i1}, \ldots, u_{iM})$ (where M is the number of transmission bits per symbol). Letting the transmission vector $s=(s_1, \ldots, s_{Nt})^T$ and the transmission signal from transmit antenna #1 be represented as $s_i=\text{map}(u_i)$, the normalized transmission energy is represented as $E\{|s_i|^2\}=E_s/N_t$ ($E_s$ being the total energy per channel). Furthermore, letting the received vector be $y=(y_1, \ldots, y_{Nr})^T$, the received vector is represented as in Equation 1.

Math 1

$$y = (y_1, \ldots, y_{Nr})^T$$
$$= H_{NtNr}s + n \qquad \text{Equation 1}$$

In this Equation, $H_{NtNr}$ is the channel matrix, $n=(n_1, \ldots, n_{Nr})^T$ is the noise vector, and $n_i$ is the i.i.d. complex Gaussian random noise with an average value 0 and variance $\sigma^2$. From the relationship between transmission symbols and reception symbols that is induced at the reception device, the probability for the received vector may be provided as a multi-dimensional Gaussian distribution, as in Equation 2.

Math 2

$$p(y \mid u) = \frac{1}{(2\pi\sigma^2)^{Nr}} \exp\left(-\frac{1}{2\sigma^2} \|y - Hs(u)\|^2\right) \qquad \text{Equation 2}$$

Here, a reception device that performs iterative decoding composed of an outer soft-in/soft-out decoder and a MIMO detector, as in FIG. 1, is considered. The vector of a log-likelihood ratio (L-value) in FIG. 1 is represented as in Equations 3-5.

Math 3

$$L(u)=(L(u_1), \ldots, L(u_{Nt}))^T \qquad \text{Equation 3}$$

Math 4

$$L(u_i)=(L(u_{i1}), \ldots, L(u_{iM})) \qquad \text{Equation 4}$$

Math 5

$$L(u_{ij}) = \ln \frac{P(u_{ij} = +1)}{P(u_{ij} = -1)} \qquad \text{Equation 5}$$

<Iterative Detection Method>

The following describes iterative detection of MIMO signals in the $N_t \times N_r$ spatial multiplexing MIMO system.

The log-likelihood ratio of $u_{mn}$ is defined as in Equation 6.

Math 6

$$L(u_{mn} \mid y) = \ln\frac{P(u_{mn} = +1 \mid y)}{P(u_{mn} = -1 \mid y)} \quad \text{Equation 6}$$

From Bayes' theorem, Equation 6 can be expressed as Equation 7.

Math 7

$$\begin{aligned}L(u_{mn}|y) &= \ln\frac{p(y \mid u_{mn} = +1)P(u_{mn} = +1)/p(y)}{p(y \mid u_{mn} = -1)P(u_{mn} = -1)/p(y)} \\&= \ln\frac{P(u_{mn} = +1)}{P(u_{mn} = -1)} + \ln\frac{p(y \mid u_{mn} = +1)}{p(y \mid u_{mn} = -1)} \\&= \ln\frac{P(u_{mn} = +1)}{P(u_{mn} = -1)} + \\&\quad \ln\frac{\sum_{U_{mn,+1}} p(y \mid u)p(u \mid u_{mn})}{\sum_{U_{mn,-1}} p(y \mid u)p(u \mid u_{mn})}\end{aligned} \quad \text{Equation 7}$$

Let $U_{mn,\pm 1} = \{u|u_{mn}=\pm 1\}$. When approximating $\ln \Sigma a_j \sim \max \ln a_j$, an approximation of Equation 7 can be sought as Equation 8. Note that the above symbol "~" indicates approximation.

Math 8

$$L(u_{mn} \mid y) \approx \ln\frac{P(u_{mn}=+1)}{P(u_{mn}=-1)} + \max_{U_{mn,+1}}\{\ln p(y \mid u) + P(u \mid u_{mn})\} - \max_{U_{mn,-1}}\{\ln p(y \mid u) + P(u \mid u_{mn})\} \quad \text{Equation 8}$$

$P(u|u_{mn})$ and $\ln P(u|u_{mn})$ in Equation 8 are represented as follows.

Math 9

$$\begin{aligned}P(u \mid u_{mn}) &= \prod_{(ij)\neq(mn)} P(u_{ij}) \\&= \prod_{(ij)\neq(mn)} \frac{\exp\left(\frac{u_{ij}L(u_{ij})}{2}\right)}{\exp\left(\frac{L(u_{ij})}{2}\right) + \exp\left(-\frac{L(u_{ij})}{2}\right)}\end{aligned} \quad \text{Equation 9}$$

Math 10

$$\ln P(u \mid u_{mn}) = \left(\sum_{ij} \ln P(u_{ij})\right) - \ln P(u_{mn}) \quad \text{Equation 10}$$

Math 11

$$\begin{aligned}\ln P(u_{ij}) &= \frac{1}{2}u_{ij}P(u_{ij}) - \ln\left(\exp\left(\frac{L(u_{ij})}{2}\right) + \exp\left(-\frac{L(u_{ij})}{2}\right)\right) \\&\approx \frac{1}{2}u_{ij}L(u_{ij}) - \frac{1}{2}|L(u_{ij})| \text{ for } |L(u_{ij})| > 2 \\&= \left|\frac{L(u_{ij})}{2}\right|(u_{ij}\text{sign}(L(u_{ij})) - 1)\end{aligned} \quad \text{Equation 11}$$

Incidentally, the logarithmic probability of the equation defined in Equation 2 is represented in Equation 12.

Math 12

$$\ln P(y \mid u) = -\frac{N_r}{2}\ln(2\pi\sigma^2) - \frac{1}{2\sigma^2}\|y - Hs(u)\|^2 \quad \text{Equation 12}$$

Accordingly, from Equations 7 and 13, in MAP or A Posteriori Probability (APP), the a posteriori L-value is represented as follows.

Math 13

$$L(u_{mn} \mid y) = \ln\frac{\sum_{U_{mn,+1}} \exp\left\{-\frac{1}{2\sigma^2}\|y - Hs(u)\|^2 + \sum_{ij}\ln P(u_{ij})\right\}}{\sum_{U_{mn,-1}} \exp\left\{-\frac{1}{2\sigma^2}\|y - Hs(u)\|^2 + \sum_{ij}\ln P(u_{ij})\right\}} \quad \text{Equation 13}$$

Hereinafter, this is referred to as iterative APP decoding. From Equations 8 and 12, in the log-likelihood ratio utilizing Max-Log approximation (Max-Log APP), the a posteriori L-value is represented as follows.

Math 14

$$L(u_{mn} \mid y) \approx \max_{U_{mn,+1}}\{\Psi(u, y, L(u))\} - \max_{U_{mn,-1}}\{\Psi(u, y, L(u))\} \quad \text{Equation 14}$$

Math 15

$$\Psi(u, y, L(u)) = -\frac{1}{2\sigma^2}\|y - Hs(u)\|^2 + \sum_{ij}\ln P(u_{ij}) \quad \text{Equation 15}$$

Hereinafter, this is referred to as iterative Max-log APP decoding. The extrinsic information required in an iterative decoding system can be sought by subtracting prior inputs from Equations 13 and 14.

<System Model>

Figure 28:
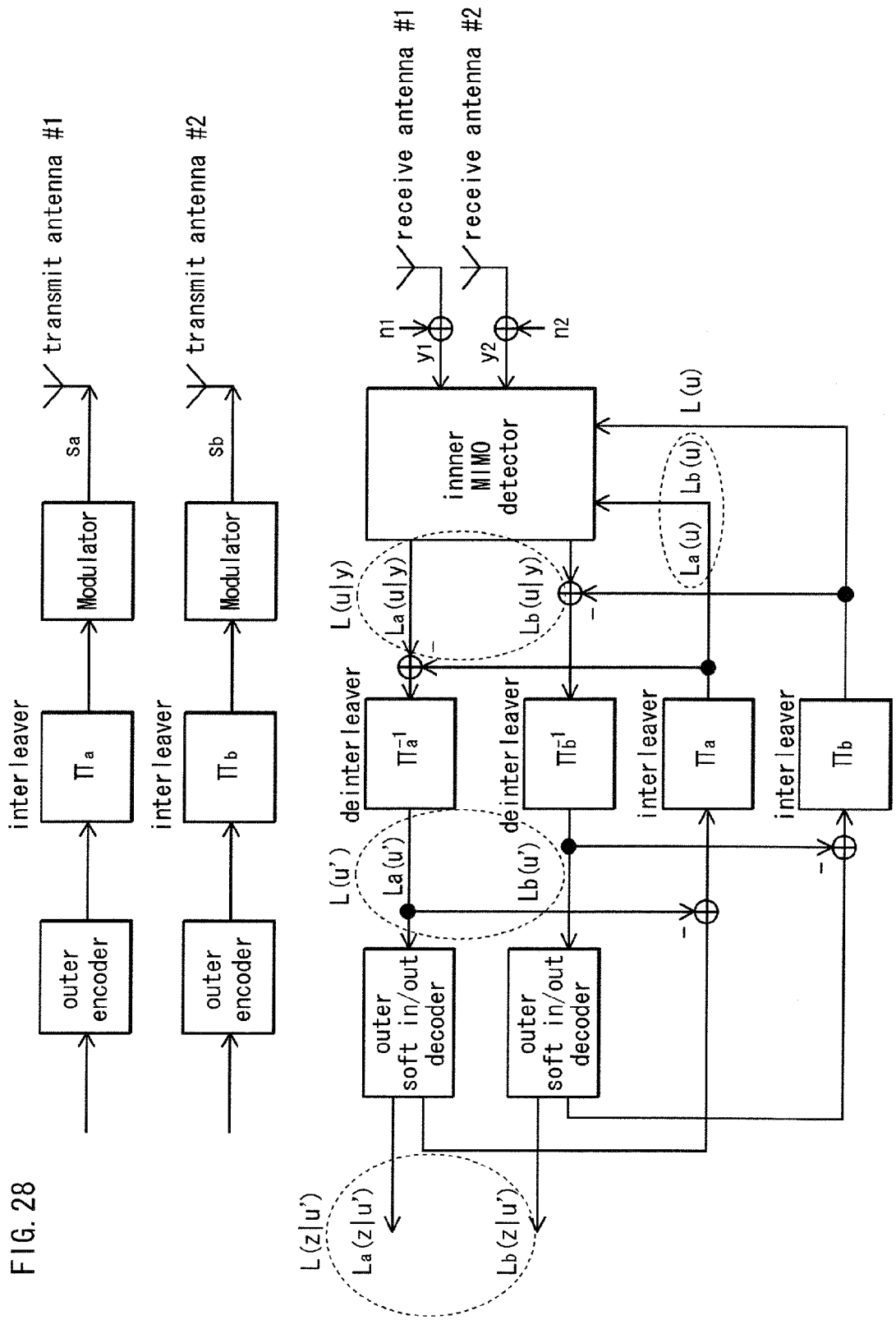
FIG. 28 is an example of the structure of a transmission device and a reception device in a spatial multiplexing MIMO system.

FIG. 28 shows the basic structure of the system that is related to the subsequent description. This system is a 2×2 spatial multiplexing MIMO system. There is an outer encoder for each of streams A and B. The two outer encoders are identical LDPC encoders. (Here, a structure using LDPC encoders as the outer encoders is described as an example, but the error correction coding used by the outer encoder is not limited to LDPC coding. The present invention may similarly be embodied using other error correction coding such as turbo coding, convolutional coding, LDPC convolutional coding, and the like. Furthermore, each outer encoder is described as having a transmit antenna, but the outer encoders are not limited to this structure. A plurality of transmit antennas may be used, and the number of outer encoders may be one. Also, a greater number of outer encoders may be used than the number of transmit antennas.) The streams A and B respectively have interleavers ($\pi_a$, $\pi_b$). Here, the modulation scheme is $2^h$-QAM (with h bits transmitted in one symbol).

The reception device performs iterative detection on the above MIMO signals (iterative APP (or iterative Max-log APP) decoding). Decoding of LDPC codes is performed by, for example, sum-product decoding.

Figure 2:
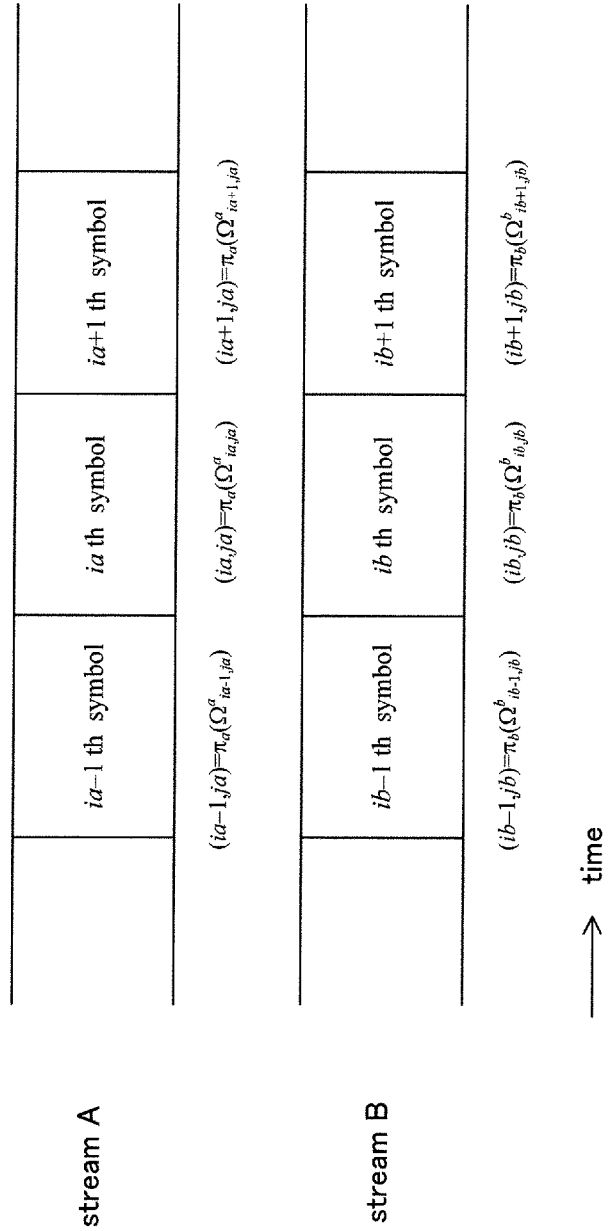
FIG. 2 is an example of a frame structure.

FIG. 2 shows a frame structure and lists the order of symbols after interleaving. In this case, ($i_a$, $j_a$), ($i_b$, $j_b$) are represented by the following Equations.

Math 16

$$(i_a, j_a) = \pi_a(\Omega_{i_a j_a}{}^a) \qquad \text{Equation 16}$$

Math 17

$$(i_b, j_b) = \pi_b(\Omega_{i_b j_b}{}^a) \qquad \text{Equation 17}$$

In this case, $i^a$, $i^b$ indicate the order of symbols after interleaving, $j^a$, $j^b$ indicate the bit positions ($j^a$, $j^b$=1, ..., h) in the modulation scheme, $\pi^a$, $\pi^b$ indicate the interleavers for the streams A and B, and $\Omega_{i_a j_a}{}^a$, $\Omega_{i_b j_b}{}^b$ indicate the order of data in streams A and B before interleaving. Note that FIG. 2 shows the frame structure for $i_a = i_b$.

<Iterative Decoding>

The following is a detailed description of the algorithms for sum-product decoding used in decoding of LDPC codes and for iterative detection of MIMO signals in the reception device.

Sum-Product Decoding

Let a two-dimensional M×N matrix H={$H_{mn}$} be the check matrix for LDPC codes that are targeted for decoding. Subsets A(m), B(n) of the set [1, N]={1, 2, ..., N} are defined by the following Equations.

Math 18

$$A(m) \equiv \{n : H_{mn} = 1\} \qquad \text{Equation 18}$$

Math 19

$$B(n) \equiv \{m : H_{mn} = 1\} \qquad \text{Equation 19}$$

In these Equations, A(m) represents the set of column indices of 1's in the $m^{th}$ column of the check matrix H, and B(n) represents the set of row indices of 1's in the $n^{th}$ row of the check matrix H. The algorithm for sum-product decoding is as follows.

Step A·1 (initialization): let a priori value logarithmic ratio $\beta_{mn}$=0 for all combinations (m, n) satisfying $H_{mn}$=1. Assume that the loop variable (the number of iterations) $l_{sum}$=1 and the maximum number of loops is set to $l_{sum, max}$.

Step A·2 (row processing): the extrinsic value logarithmic ratio $\alpha_{mn}$ is updated for all combinations (m, n) satisfying $H_{mn}$=1 in the order of m=1, 2, ..., M, using the following updating Equations.

Math 20

$$\alpha_{mn} = \left( \prod_{n' \in A(m)\backslash n} \text{sign}(\lambda_{n'} + \beta_{mn'}) \right) \times f\left( \sum_{n' \in A(m)\backslash n} f(\lambda_{n'} + \beta_{mn'}) \right) \qquad \text{Equation 20}$$

Math 21

$$\text{sign}(x) \equiv \begin{cases} 1 & x \geq 0 \\ -1 & x < 0 \end{cases} \qquad \text{Equation 21}$$

Math 22

$$f(x) \equiv \ln \frac{\exp(x) + 1}{\exp(x) - 1} \qquad \text{Equation 22}$$

In these Equations, f represents a Gallager function. Furthermore, the method of seeking $\lambda_n$ is described in detail later.

Step A·3 (column processing): the extrinsic value logarithmic ratio $\beta_{mn}$ is updated for all combinations (m, n) satisfying $H_{mn}$=1 in the order of n=1, 2, ..., N, using the following updating Equation.

Math 23

$$\beta_{mn} = \sum_{m' \in B(n)\backslash m} \alpha_{m'n} \qquad \text{Equation 23}$$

Step A·4 (calculating a log-likelihood ratio): the log-likelihood ratio $L_n$ is sought for n c [1, N] by the following Equation.

Math 24

$$L_n = \sum_{m' \in B(n)\backslash m} \alpha_{m'n} + \lambda_n \qquad \text{Equation 24}$$

Step A·5 (count of the number of iterations): if $l_{sum} < l_{sum, max}$, then $l_{sum}$ is incremented, and processing returns to step A·2. If $l_{sum} = l_{sum, max}$, the sum-product decoding in this round is finished.

The operations in one sum-product decoding have been described. Subsequently, iterative MIMO signal detection is performed. In the variables m, n, $\alpha_{mn}$, $\beta_{mn}$, $\lambda_n$, and $L_n$, used in the above description of the operations of sum-product decoding, the variables in stream A are may $m_a$, $n_a$, $\alpha_{m_a n_a}{}^a$, $\beta_{m_a n_a}{}^a$, $\lambda_{na}$, and $L_{na}$, and the variables in stream B are $m_b$, $n_b$, $\alpha_{m_b n_b}{}^b$, $\beta_{m_b n_b}{}^b$, $\lambda_{nb}$, and $L_{nb}$.

<Iterative MIMO Signal Detection>

The following describes the method of seeking $\lambda_n$ in iterative MIMO signal detection in detail.

The following Equation holds from Equation 1.

Math 25

$$y(t) = (y_1(t), y_2(t))^T \qquad \text{Equation 25}$$
$$= H_{22}(t)s(t) + n(t)$$

The following Equations are defined from the frame structures of FIG. 2 and from Equations 16 and 17.

Math 26

$$n_a = \Omega_{i_a j_a}{}^a \qquad \text{Equation 26}$$

Math 27

$$n_b = \Omega_{ib,jb}^{b} \quad \text{Equation 27}$$

In this case, $n_a, n_b \in [1, N]$. Hereinafter, $\lambda_{na}$, $L_{na}$, $\lambda_{nb}$, and $L_{nb}$, where the number of iterations of iterative MIMO signal detection is k, are represented as $\lambda_{k,na}$, $L_{k,na}$, $\lambda_{k,nb}$, and $L_{k,nb}$.

Step B•1 (initial detection; k=0): $\lambda_{0,na}$ and $\lambda_{0,nb}$ are sought as follows in the case of initial detection.

In iterative APP decoding:

Math 28

$$\lambda_{0,n_X} = \ln \frac{\sum_{U_{0,n_X,+1}} \exp\left\{-\frac{1}{2\sigma^2}\|y(i_X) - H_{22}(i_X)s(u(i_X))\|^2\right\}}{\sum_{U_{0,n_X,-1}} \exp\left\{-\frac{1}{2\sigma^2}\|y(i_X) - H_{22}(i_X)s(u(i_X))\|^2\right\}} \quad \text{Equation 28}$$

In iterative Max-log APP decoding:

Math 29

$$\lambda_{0,n_X} = \max_{U_{0,n_X,+1}}\{\Psi(u(i_X), y(i_X))\} - \max_{U_{0,n_X,-1}}\{\Psi(u(i_X), y(i_X))\} \quad \text{Equation 29}$$

Math 30

$$\Psi(u(i_X), y(i_X)) = -\frac{1}{2\sigma^2}\|y(i_X) - H_{22}(i_X)s(u(i_X))\|^2 \quad \text{Equation 30}$$

Here, let X=a, b. Then, assume that the number of iterations of iterative MIMO signal detection is $l_{mimo}=0$ and the maximum number of iterations is set to $l_{mimo,max}$.

Step B•2 (iterative detection; the number of iterations k): $\lambda_{k,na}$ and $\lambda_{k,nb}$, where the number of iterations is k, are represented as in Equations 31-34, from Equations 11, 13-15, 16, and 17. Let (X, Y)=(a, b)(b, a).

In iterative APP decoding:

Math 31

$$\lambda_{k,n_X} = L_{k-1,\Omega_{iX,jX}^X}\left(u_{Q_{iX,jX}^X}\right) +$$

$$\ln \frac{\sum_{U_{k,n_X,+1}} \exp\left\{-\frac{1}{2\sigma^2}\|y(i_X) - H_{22}(i_X)s(u(i_X))\|^2 + \rho\left(u_{\Omega_{iX,jX}^X}\right)\right\}}{\sum_{U_{k,n_X,-1}} \exp\left\{-\frac{1}{2\sigma^2}\|y(i_X) - H_{22}(i_X)s(u(i_X))\|^2 + \rho\left(u_{\Omega_{iX,jX}^X}\right)\right\}} \quad \text{Equation 31}$$

Math 32

$$\rho\left(u_{\Omega_{iX,jX}^X}\right) = \sum_{\substack{\gamma=1 \\ \gamma \neq jX}}^{h} \left|\frac{L_{k-1,\Omega_{iX,\gamma}^X}\left(u_{\Omega_{iX,\gamma}^X}\right)}{2}\right| \quad \text{Equation 32}$$

$$\left(u_{\Omega_{iX,\gamma}^X} \operatorname{sign}\left(L_{k-1,\Omega_{iX,\gamma}^X}\left(u_{\Omega_{iX,\gamma}^X}\right)\right) - 1\right) +$$

$$\sum_{\gamma=1}^{h} \left|\frac{L_{k-1,\Omega_{iX,\gamma}^Y}\left(u_{\Omega_{iX,\gamma}^Y}\right)}{2}\right|$$

$$\left(u_{\Omega_{iX,\gamma}^Y} \operatorname{sign}\left(L_{k-1,\Omega_{iX,\gamma}^Y}\left(u_{\Omega_{iX,\gamma}^Y}\right)\right) - 1\right)$$

In iterative Max-log APP decoding:

Math 33

$$\lambda_{k,n_X} = L_{k-1,\Omega_{iX,\gamma}^X}\left(u_{Q_{iX,jX}^X}\right) + \max_{U_{k,n_X,+1}}\left\{\Psi(u(i_X), y(i_X), \rho(u_{Q_{iX,jX}^X}))\right\} - \max_{U_{k,n_X,-1}}\left\{\Psi(u(i_X), y(i_X), \rho(u_{Q_{iX,jX}^X}))\right\} \quad \text{Equation 33}$$

Math 34

$$\Psi(u(i_X), y(i_X), \rho(u_{Q_{iX,jX}^X})) = \quad \text{Equation 34}$$

$$-\frac{1}{2\sigma^2}\|y(i_X) - H_{22}(i_X)s(u(i_X))\|^2 + \rho\left(u_{\Omega_{iX,jX}^X}\right)$$

Step B•3 (counting the number of iterations and estimating a codeword): increment $l_{mimo}$ if $l_{mimo} < l_{mimo,max}$, and return to step B•2. Assuming that $l_{mimo} = l_{mimo,max}$, the estimated codeword is sought as in the following Equation.

Math 35

$$\hat{u}_{n_X} = \begin{cases} 1 & L_{l_{mimo},n_X} \geq 0 \\ -1 & L_{l_{mimo},n_X} < 0 \end{cases} \quad \text{Equation 35}$$

Here, let X=a, b.

Figure 3:
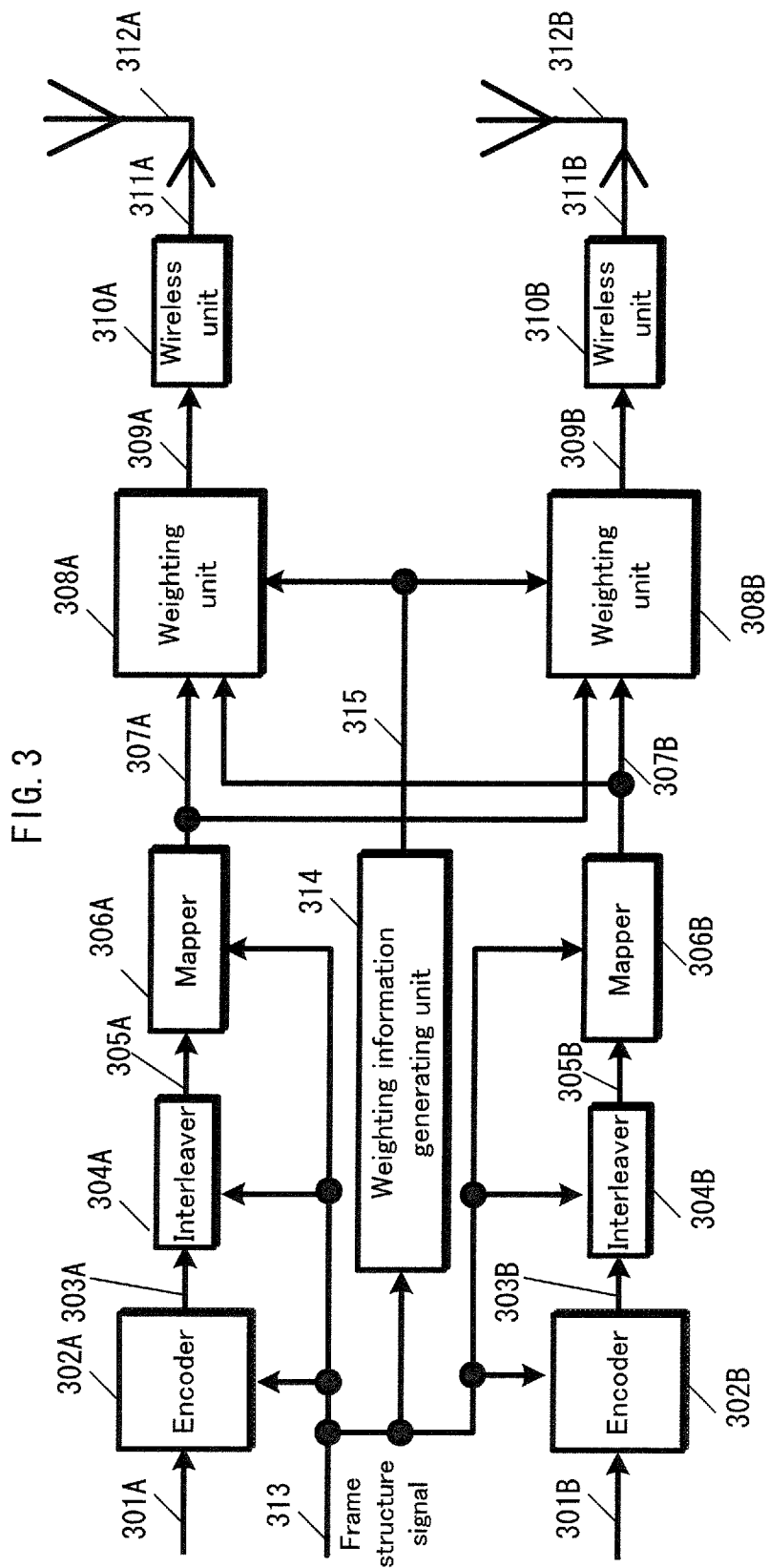
FIG. 3 is an example of the structure of a transmission device when adopting a method of hopping between precoding weights.

FIG. 3 is an example of the structure of a transmission device 300 in the present embodiment. An encoder 302A receives information (data) 301A and a frame structure signal 313 as inputs and, in accordance with the frame structure signal 313, performs error correction coding such as convolutional coding, LDPC coding, turbo coding, or the like, outputting encoded data 303A. (The frame structure signal 313 includes information such as the error correction method used for error correction coding of data, the encoding ratio, the block length, and the like. The encoder 302A uses the error correction method indicated by the frame structure signal 313. Furthermore, the error correction method may be switched.)

An interleaver 304A receives the encoded data 303A and the frame structure signal 313 as inputs and performs interleaving, i.e. changing the order of the data, to output interleaved data 305A. (The method of interleaving may be switched based on the frame structure signal 313.)

A mapper 306A receives the interleaved data 305A and the frame structure signal 313 as inputs, performs modulation such as Quadrature Phase Shift Keying (QPSK), 16 Quadrature Amplitude Modulation (16QAM), 64 Quadrature Amplitude Modulation (64QAM), or the like, and outputs a resulting baseband signal 307A. (The method of modulation may be switched based on the frame structure signal 313.)

Figure 24B:
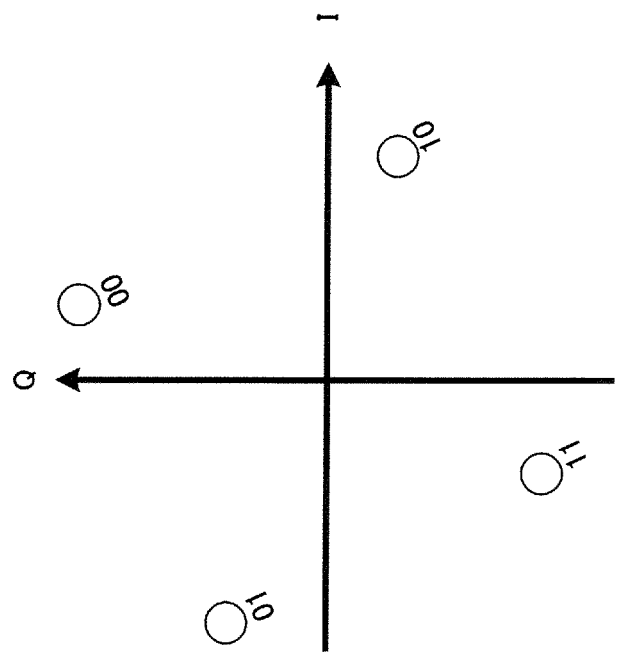
FIGS. 24A and 24B are examples of mapping methods.
Figure 24A:
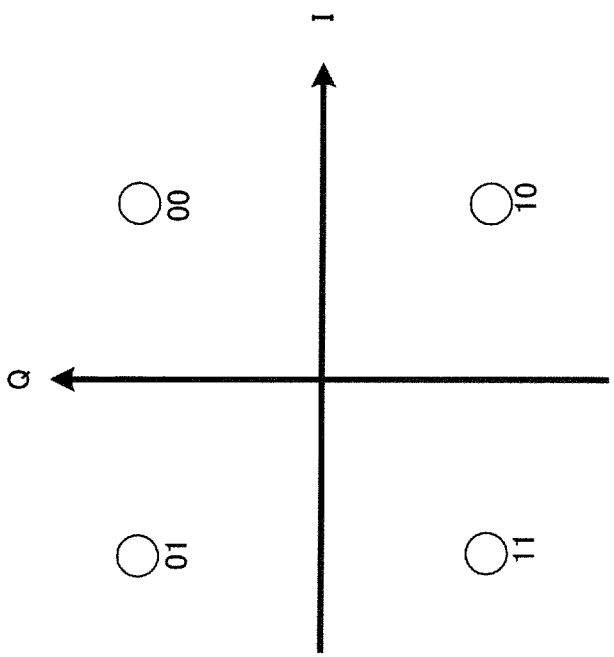
Figure 25B:
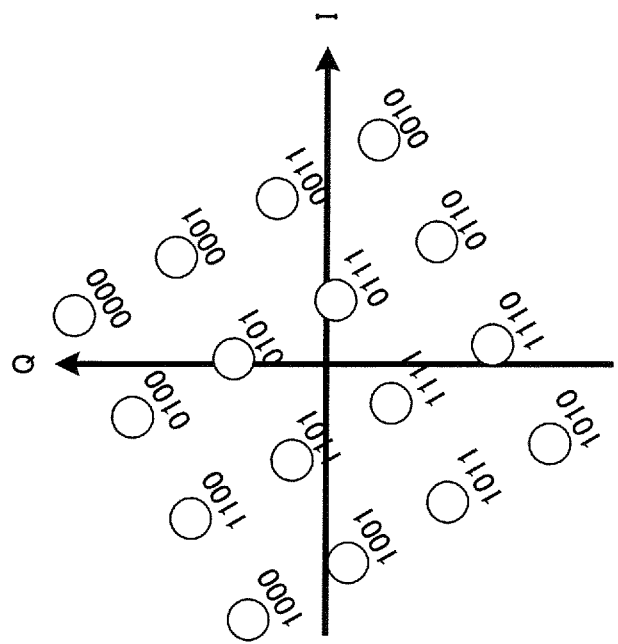
FIGS. 25A and 25B are examples of mapping methods.
Figure 25A:
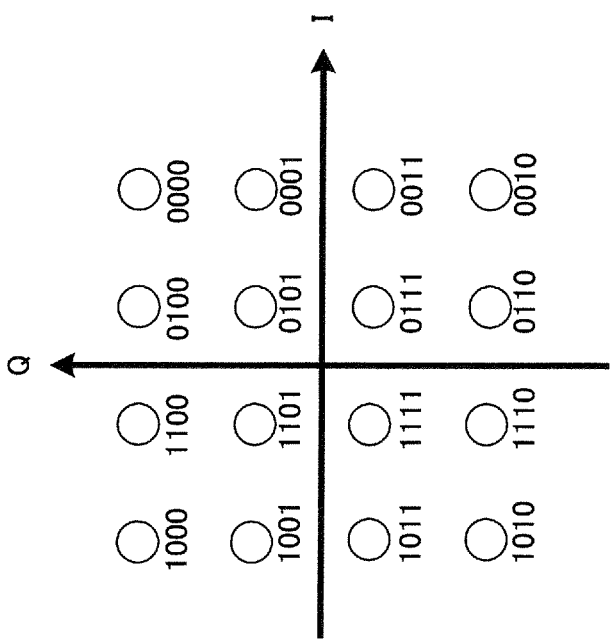

FIGS. 24A and 24B are an example of a mapping method over an IQ plane, having an in-phase component I and a quadrature component Q, to form a baseband signal in QPSK modulation. For example, as shown in FIG. 24A, if the input data is "00", the output is I=1.0, Q=1.0. Similarly, for input data of "01", the output is I=−1.0, Q=1.0, and so forth. FIG. 24B is an example of a different method of mapping in an IQ plane for QPSK modulation than FIG. 24A. The difference between FIG. 24B and FIG. 24A is that the signal points in FIG. 24A have been rotated around the origin to yield the signal points of FIG. 24B. Non-Patent Literature 9 and Non-Patent Literature 10 describe such a constellation rotation method, and the Cyclic Q Delay described in Non-Patent Literature 9 and Non-Patent Literature 10 may also be adopted. As another example apart from FIGS. 24A and 24B, FIGS. 25A and 25B show signal point layout in the IQ plane for 16QAM. The example corresponding to FIG. 24A is shown in FIG. 25A, and the example corresponding to FIG. 24B is shown in FIG. 25B.

An encoder 302B receives information (data) 301B and the frame structure signal 313 as inputs and, in accordance with the frame structure signal 313, performs error correction coding such as convolutional coding, LDPC coding, turbo coding, or the like, outputting encoded data 303B. (The frame structure signal 313 includes information such as the error correction method used, the encoding ratio, the block length, and the like. The error correction method indicated by the frame structure signal 313 is used. Furthermore, the error correction method may be switched.)

An interleaver 304B receives the encoded data 303B and the frame structure signal 313 as inputs and performs interleaving, i.e. changing the order of the data, to output interleaved data 305B. (The method of interleaving may be switched based on the frame structure signal 313.)

A mapper 306B receives the interleaved data 305B and the frame structure signal 313 as inputs, performs modulation such as Quadrature Phase Shift Keying (QPSK), 16 Quadrature Amplitude Modulation (16QAM), 64 Quadrature Amplitude Modulation (64QAM), or the like, and outputs a resulting baseband signal 307B. (The method of modulation may be switched based on the frame structure signal 313.)

A weighting information generating unit 314 receives the frame structure signal 313 as an input and outputs information 315 regarding a weighting method based on the frame structure signal 313. The weighting method is characterized by regular hopping between weights.

A weighting unit 308A receives the baseband signal 307A, the baseband signal 307B, and the information 315 regarding the weighting method, and based on the information 315 regarding the weighting method, performs weighting on the baseband signal 307A and the baseband signal 307B and outputs a signal 309A resulting from the weighting. Details on the weighting method are provided later.

A wireless unit 310A receives the signal 309A resulting from the weighting as an input and performs processing such as orthogonal modulation, band limiting, frequency conversion, amplification, and the like, outputting a transmission signal 311A. A transmission signal 511A is output as a radio wave from an antenna 312A.

A weighting unit 308B receives the baseband signal 307A, the baseband signal 307B, and the information 315 regarding the weighting method, and based on the information 315 regarding the weighting method, performs weighting on the baseband signal 307A and the baseband signal 307B and outputs a signal 309B resulting from the weighting.

Figure 26:
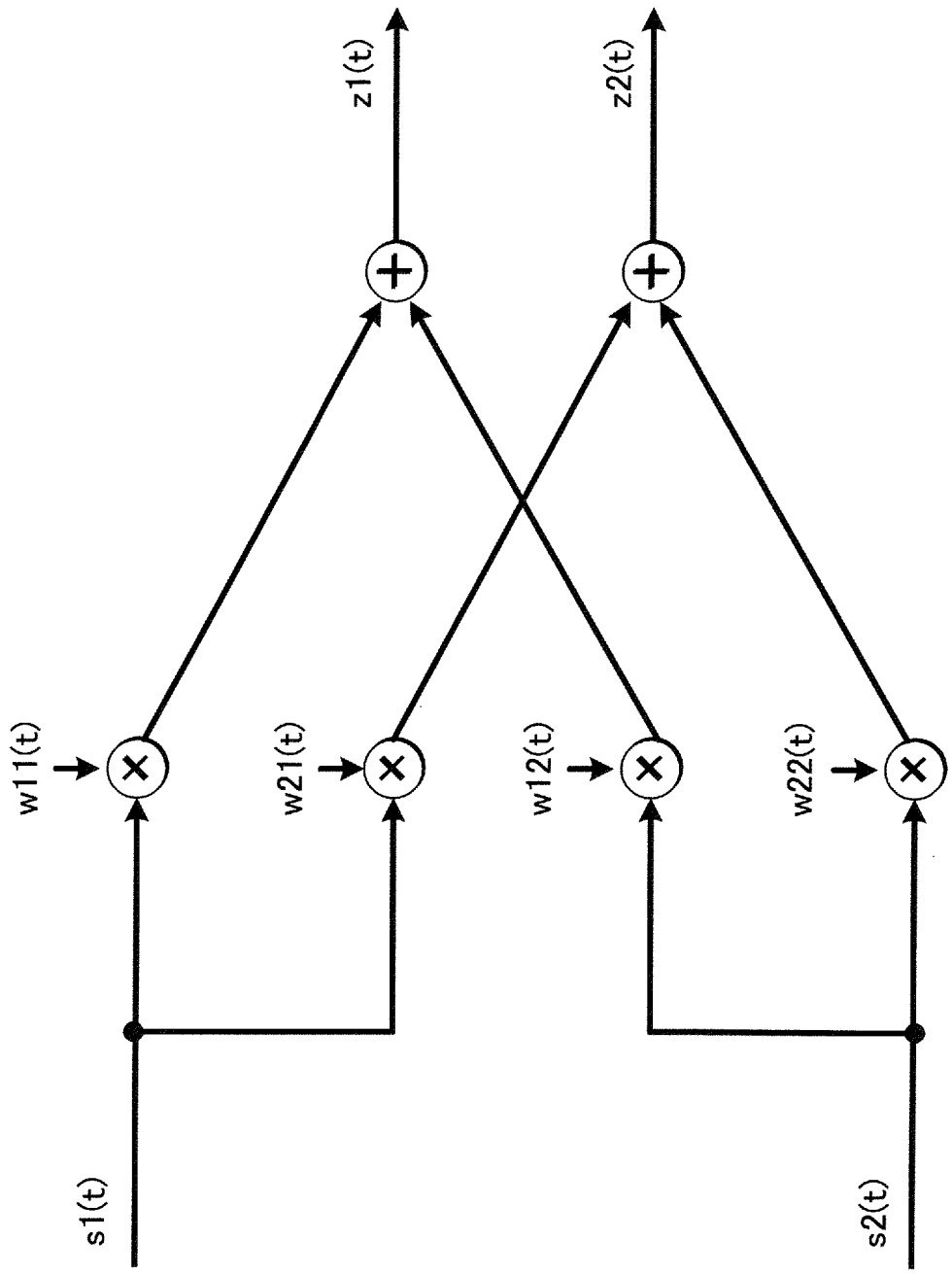
FIG. 26 is an example of the structure of a weighting unit.

FIG. 26 shows the structure of a weighting unit. The baseband signal 307A is multiplied by $w11(t)$, yielding $w11(t)s1(t)$, and is multiplied by $w21(t)$, yielding $w21(t)s1(t)$. Similarly, the baseband signal 307B is multiplied by $w12(t)$ to generate $w12(t)s2(t)$ and is multiplied by $w22(t)$ to generate $w22(t)s2(t)$. Next, $z1(t)=w11(t)s1(t)+w12(t)s2(t)$ and $z2(t)=w21(t)s1(t)+w22(t)s2(t)$ are obtained.

Details on the weighting method are provided later.

A wireless unit 310B receives the signal 309B resulting from the weighting as an input and performs processing such as orthogonal modulation, band limiting, frequency conversion, amplification, and the like, outputting a transmission signal 311B. A transmission signal 511B is output as a radio wave from an antenna 312B.

Figure 4:
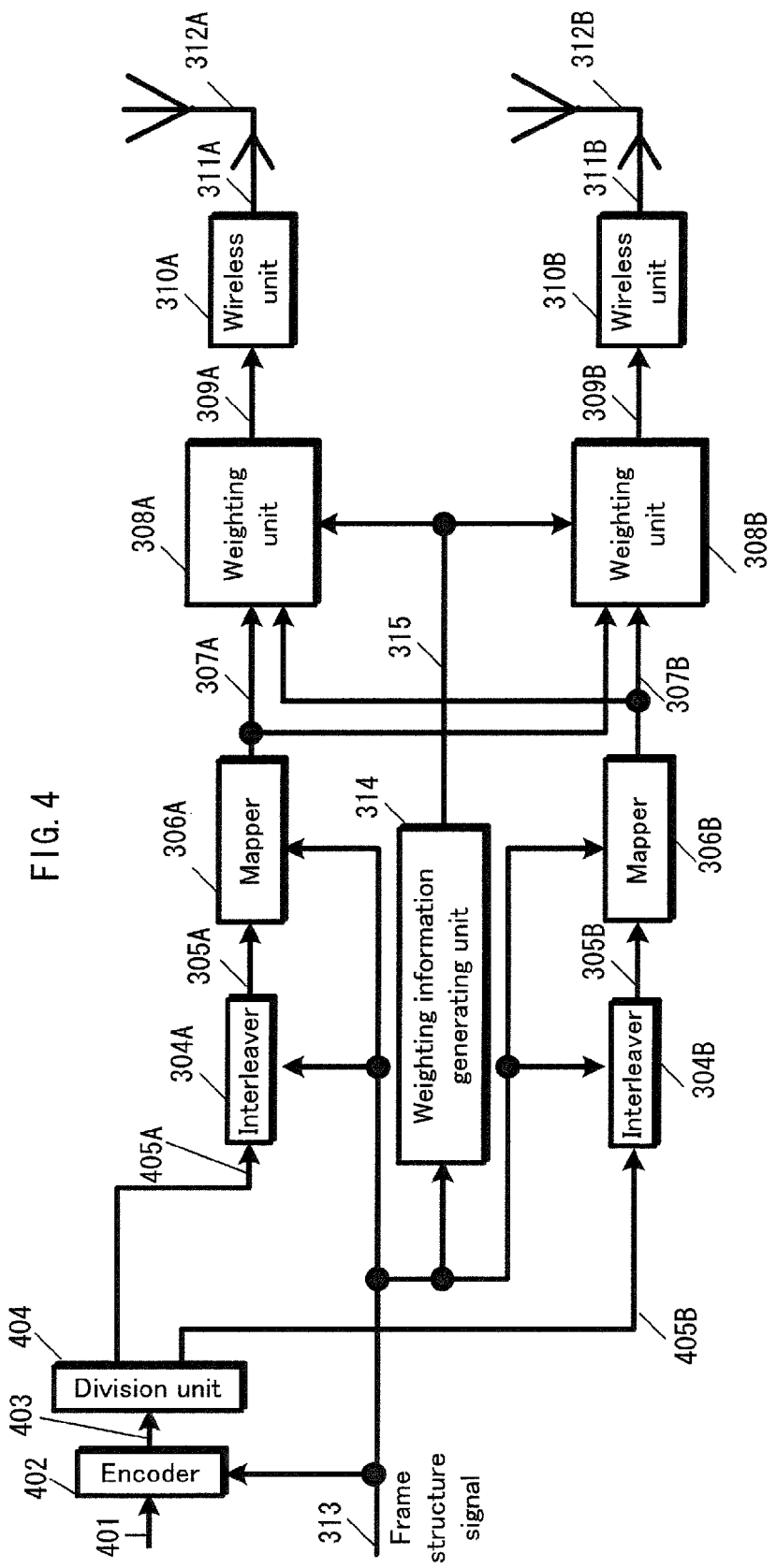
FIG. 4 is an example of the structure of a transmission device when adopting a method of hopping between precoding weights.

FIG. 4 shows an example of the structure of a transmission device 400 that differs from FIG. 3. The differences in FIG. 4 from FIG. 3 are described.

An encoder 402 receives information (data) 401 and the frame structure signal 313 as inputs and, in accordance with the frame structure signal 313, performs error correction coding and outputs encoded data 402.

A distribution unit 404 receives the encoded data 403 as an input, distributes the data 403, and outputs data 405A and data 405B. Note that in FIG. 4, one encoder is shown, but the number of encoders is not limited in this way. The present invention may similarly be embodied when the number of encoders is m (where m is an integer greater than or equal to one) and the distribution unit divides encoded data generated by each encoder into two parts and outputs the divided data.

FIG. 5 shows an example of a frame structure in the time domain for a transmission device according to the present embodiment. A symbol 500_1 is a symbol for notifying the reception device of the transmission method. For example, the symbol 500_1 conveys information such as the error correction method used for transmitting data symbols, the encoding ratio, and the modulation method used for transmitting data symbols.

The symbol 501_1 is for estimating channel fluctuation for the modulated signal $z1(t)$ (where t is time) transmitted by the transmission device. The symbol 502_1 is the data symbol transmitted as symbol number u (in the time domain) by the modulated signal $z1(t)$, and the symbol 503_1 is the data symbol transmitted as symbol number u+1 by the modulated signal $z1(t)$.

The symbol 501_2 is for estimating channel fluctuation for the modulated signal $z2(t)$ (where t is time) transmitted by the transmission device. The symbol 502_2 is the data symbol transmitted as symbol number u by the modulated signal $z2(t)$, and the symbol 503_2 is the data symbol transmitted as symbol number u+1 by the modulated signal $z2(t)$.

The following describes the relationships between the modulated signals $z1(t)$ and $z2(t)$ transmitted by the transmission device and the received signals $r1(t)$ and $r2(t)$ received by the reception device.

In FIGS. 5, 504#1 and 504#2 indicate transmit antennas in the transmission device, and 505#1 and 505#2 indicate receive antennas in the reception device. The transmission device transmits the modulated signal $z1(t)$ from transmit antenna 504#1 and transmits the modulated signal z2(t) from transmit antenna 504#2. In this case, the modulated signal z1(t) and the modulated signal z2(t) are assumed to occupy the same (a shared/common) frequency (bandwidth). Letting the channel fluctuation for the transmit antennas of the transmission device and the antennas of the reception device be $h_{11}(t)$, $h_{12}(t)$, $h_{21}(t)$, and $h_{22}(t)$, the signal received by the receive antenna 505#1 of the reception device be r1(t), and the signal received by the receive antenna 505#2 of the reception device be r2(t), the following relationship holds.

Math 36

$$\begin{pmatrix} r1(t) \\ r2(t) \end{pmatrix} = \begin{pmatrix} h_{11}(t) & h_{12}(t) \\ h_{21}(t) & h_{22}(t) \end{pmatrix} \begin{pmatrix} z1(t) \\ z2(t) \end{pmatrix} \quad \text{Equation 36}$$

Figure 6:
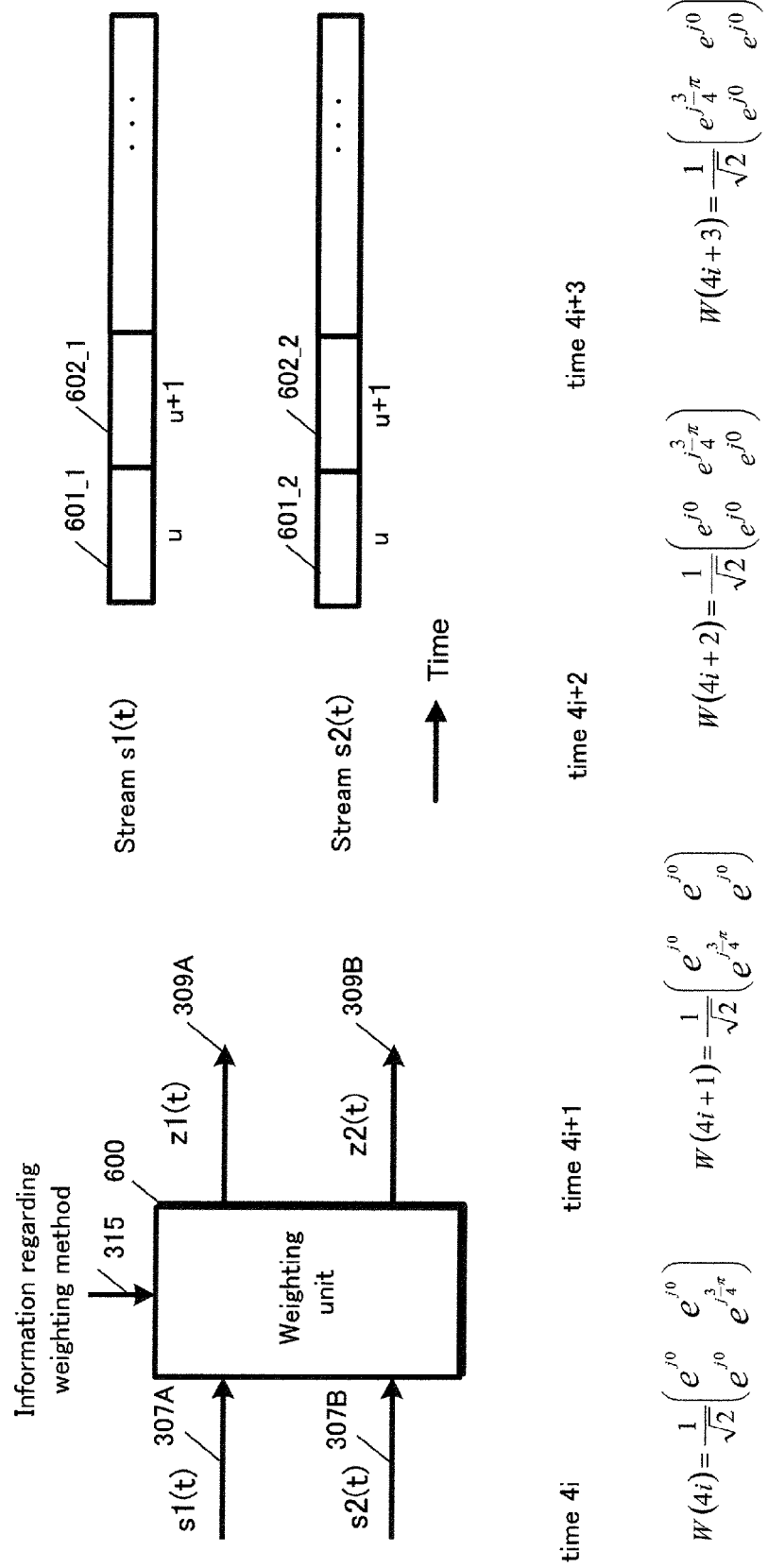
FIG. 6 is an example of a method of hopping between precoding weights.

FIG. 6 relates to the weighting method (precoding method) in the present embodiment. A weighting unit 600 integrates the weighting units 308A and 308B in FIG. 3. As shown in FIG. 6, a stream s1(t) and a stream s2(t) correspond to the baseband signals 307A and 307B in FIG. 3. In other words, the streams s1(t) and s2(t) are the baseband signal in-phase components I and quadrature components Q when mapped according to a modulation scheme such as QPSK, 16QAM, 64QAM, or the like. As indicated by the frame structure of FIG. 6, the stream s1(t) is represented as s1(u) at symbol number u, as s1(u+1) at symbol number u+1, and so forth. Similarly, the stream s2(t) is represented as s2(u) at symbol number u, as s2(u+1) at symbol number u+1, and so forth. The weighting unit 600 receives the baseband signals 307A (s1(t)) and 307B (s2(t)) and the information 315 regarding weighting information in FIG. 3 as inputs, performs weighting in accordance with the information 315 regarding weighting, and outputs the signals 309A (z1(t)) and 309B (z2(t)) after weighting in FIG. 3. In this case, z1(t) and z2(t) are represented as follows.

For symbol number 4i (where i is an integer greater than or equal to zero):

Math 37

$$\begin{pmatrix} z1(4i) \\ z2(4i) \end{pmatrix} = \frac{1}{\sqrt{2}} \begin{pmatrix} e^{j0} & e^{j0} \\ e^{j0} & e^{j\frac{3}{4}\pi} \end{pmatrix} \begin{pmatrix} s1(4i) \\ s2(4i) \end{pmatrix} \quad \text{Equation 37}$$

Here, j is an imaginary unit.
For symbol number 4i+1:

Math 38

$$\begin{pmatrix} z1(4i+1) \\ z2(4i+1) \end{pmatrix} = \frac{1}{\sqrt{2}} \begin{pmatrix} e^{j0} & e^{j0} \\ e^{j\frac{3}{4}\pi} & e^{j0} \end{pmatrix} \begin{pmatrix} s1(4i+1) \\ s2(4i+1) \end{pmatrix} \quad \text{Equation 38}$$

For symbol number 4i+2:

Math 39

$$\begin{pmatrix} z1(4i+2) \\ z2(4i+2) \end{pmatrix} = \frac{1}{\sqrt{2}} \begin{pmatrix} e^{j0} & e^{j\frac{3}{4}\pi} \\ e^{j0} & e^{j0} \end{pmatrix} \begin{pmatrix} s1(4i+2) \\ s2(4i+2) \end{pmatrix} \quad \text{Equation 39}$$

For symbol number 4i+3:

Math 40

$$\begin{pmatrix} z1(4i+3) \\ z2(4i+3) \end{pmatrix} = \frac{1}{\sqrt{2}} \begin{pmatrix} e^{j\frac{3}{4}\pi} & e^{j0} \\ e^{j0} & e^{j0} \end{pmatrix} \begin{pmatrix} s1(4i+3) \\ s2(4i+3) \end{pmatrix} \quad \text{Equation 40}$$

In this way, the weighting unit in FIG. 6 regularly hops between precoding weights over a four-slot period (cycle). (While precoding weights have been described as being hopped between regularly over four slots, the number of slots for regular hopping is not limited to four.)

Incidentally, Non-Patent Literature 4 describes switching the precoding weights for each slot. This switching of precoding weights is characterized by being random. On the other hand, in the present embodiment, a certain period (cycle) is provided, and the precoding weights are hopped between regularly. Furthermore, in each 2×2 precoding weight matrix composed of four precoding weights, the absolute value of each of the four precoding weights is equivalent to (1/sqrt(2)), and hopping is regularly performed between precoding weight matrices having this characteristic.

In an LOS environment, if a special precoding matrix is used, reception quality may greatly improve, yet the special precoding matrix differs depending on the conditions of direct waves. In an LOS environment, however, a certain tendency exists, and if precoding matrices are hopped between regularly in accordance with this tendency, the reception quality of data greatly improves. On the other hand, when precoding matrices are hopped between at random, a precoding matrix other than the above-described special precoding matrix may exist, and the possibility of performing precoding only with biased precoding matrices that are not suitable for the LOS environment also exists. Therefore, in an LOS environment, excellent reception quality may not always be obtained. Accordingly, there is a need for a precoding hopping method suitable for an LOS environment. The present invention proposes such a precoding method.

Figure 7:
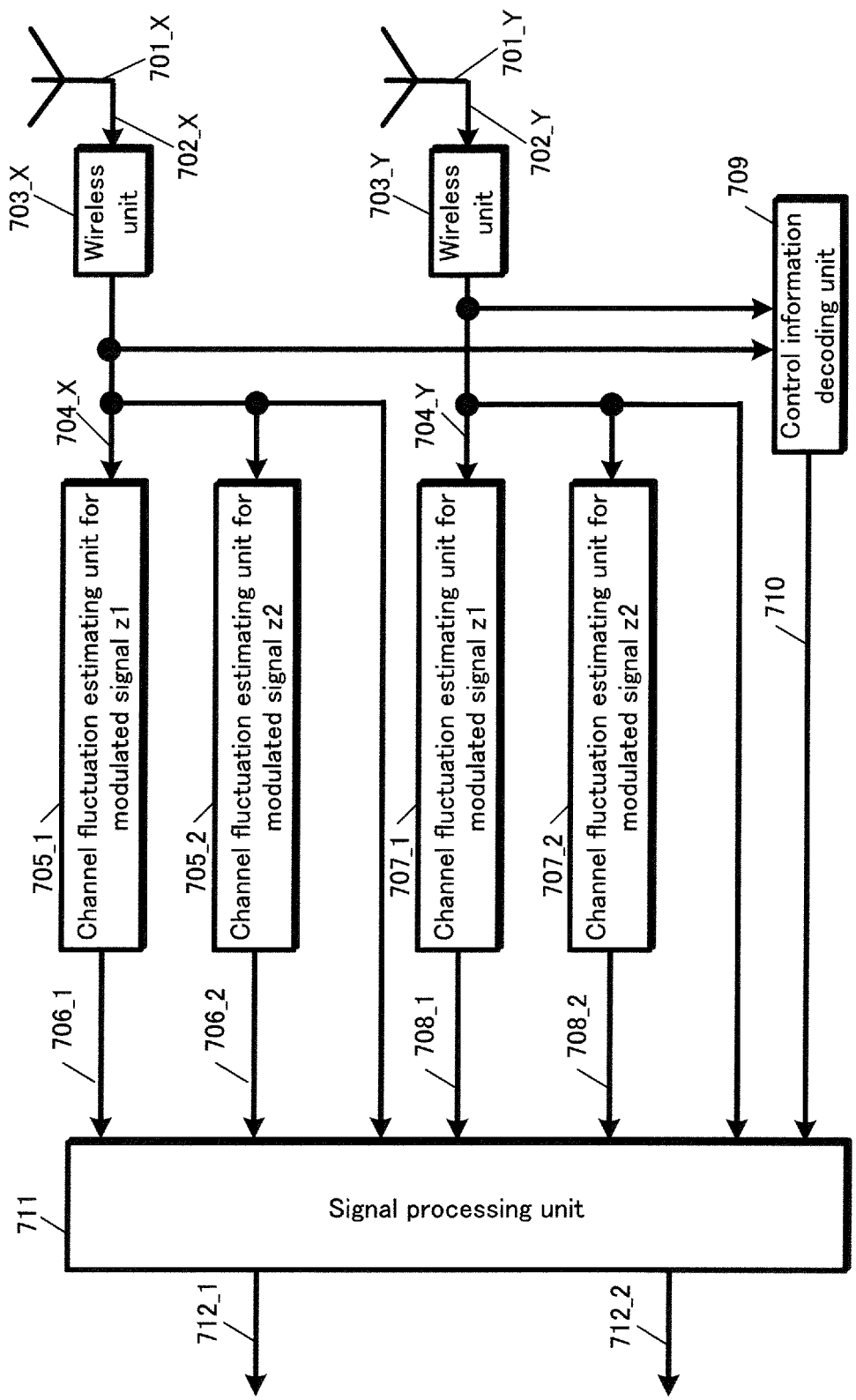
FIG. 7 is an example of the structure of a reception device.

FIG. 7 is an example of the structure of a reception device 700 in the present embodiment. A wireless unit 703_X receives, as an input, a received signal 702_X received by an antenna 701_X, performs processing such as frequency conversion, quadrature demodulation, and the like, and outputs a baseband signal 704_X.

A channel fluctuation estimating unit 705_1 for the modulated signal z1 transmitted by the transmission device receives the baseband signal 704_X as an input, extracts a reference symbol 501_1 for channel estimation as in FIG. 5, estimates a value corresponding to $h_{11}$ in Equation 36, and outputs a channel estimation signal 706_1.

A channel fluctuation estimating unit 705_2 for the modulated signal z2 transmitted by the transmission device receives the baseband signal 704_X as an input, extracts a reference symbol 501_2 for channel estimation as in FIG. 5, estimates a value corresponding to $h_{12}$ in Equation 36, and outputs a channel estimation signal 706_2.

A wireless unit 703_Y receives, as input, a received signal 702_Y received by an antenna 701_Y, performs processing such as frequency conversion, quadrature demodulation, and the like, and outputs a baseband signal 704_Y.

A channel fluctuation estimating unit 707_1 for the modulated signal z1 transmitted by the transmission device receives the baseband signal 704_Y as an input, extracts a reference symbol 501_1 for channel estimation as in FIG. 5, estimates a value corresponding to $h_{21}$ in Equation 36, and outputs a channel estimation signal 708_1.

A channel fluctuation estimating unit 707_2 for the modulated signal z2 transmitted by the transmission device receives the baseband signal 704_Y as an input, extracts a reference symbol 501_2 for channel estimation as in FIG. 5, estimates a value corresponding to $h_{22}$ in Equation 36, and outputs a channel estimation signal 708_2.

A control information decoding unit 709 receives the baseband signal 704_X and the baseband signal 704_Y as inputs, detects the symbol 500_1 that indicates the transmission method as in FIG. 5, and outputs a signal 710 regarding information on the transmission method indicated by the transmission device.

A signal processing unit 711 receives, as inputs, the baseband signals 704_X and 704_Y, the channel estimation signals 706_1, 706_2, 708_1, and 708_2, and the signal 710 regarding information on the transmission method indicated by the transmission device, performs detection and decoding, and outputs received data 712_1 and 712_2.

Figure 8:
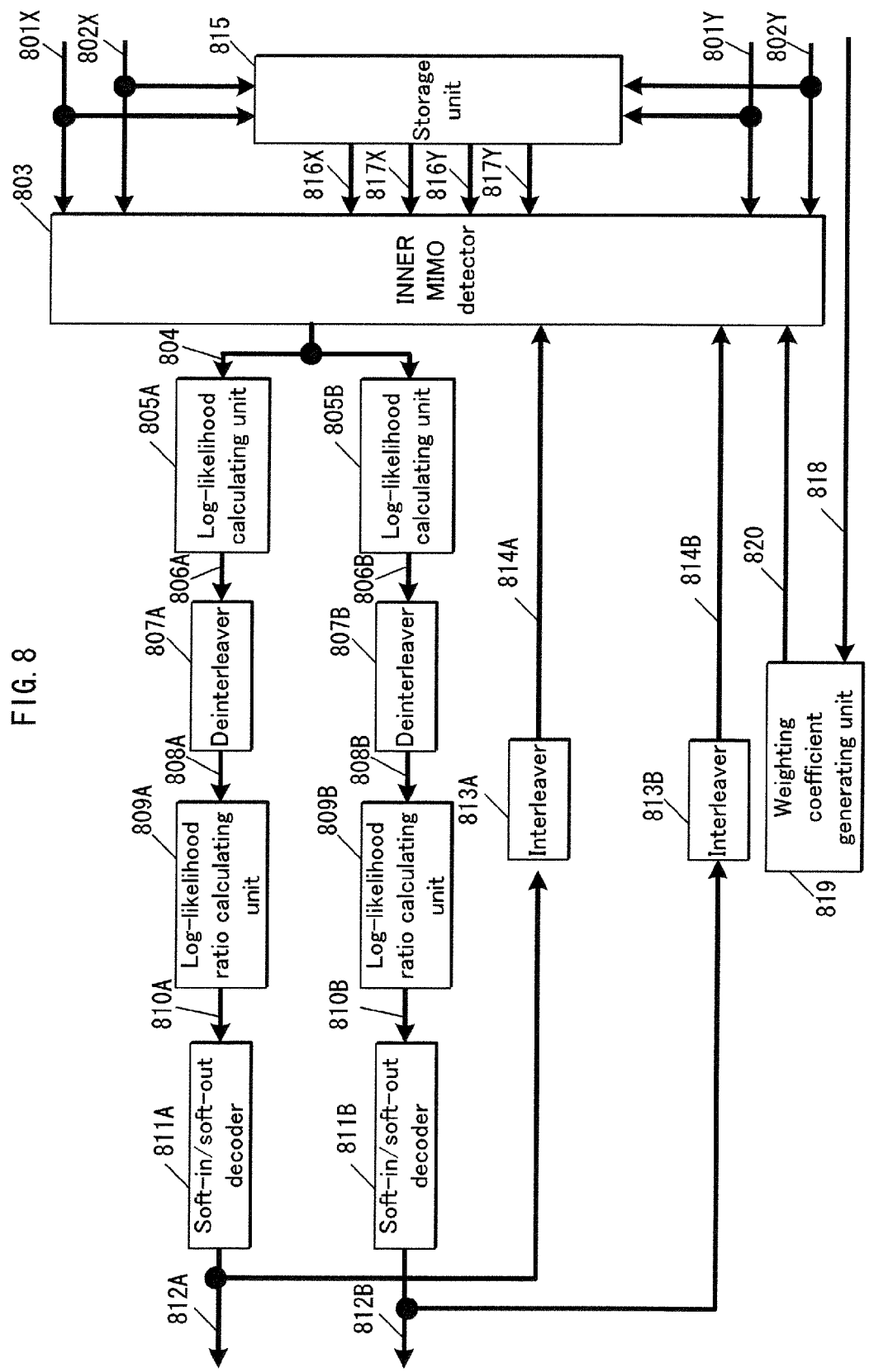
FIG. 8 is an example of the structure of a signal processing unit in a reception device.

Next, operations by the signal processing unit 711 in FIG. 7 are described in detail. FIG. 8 is an example of the structure of the signal processing unit 711 in the present embodiment. FIG. 8 shows an INNER MIMO detector, a soft-in/soft-out decoder, and a weighting coefficient generating unit as the main elements. Non-Patent Literature 2 and Non-Patent Literature 3 describe the method of iterative decoding with this structure. The MIMO system described in Non-Patent Literature 2 and Non-Patent Literature 3 is a spatial multiplexing MIMO system, whereas the present embodiment differs from Non-Patent Literature 2 and Non-Patent Literature 3 by describing a MIMO system that changes precoding weights with time. Letting the (channel) matrix in Equation 36 be H(t), the precoding weight matrix in FIG. 6 be W(t) (where the precoding weight matrix changes over t), the received vector be $R(t)=(r1(t),r2(t))^T$, and the stream vector be $S(t)=(s1(t),s2(t))^T$, the following Equation holds.

Math 41

$$R(t)=H(t)W(t)S(t) \qquad \text{Equation 41}$$

In this case, the reception device can apply the decoding method in Non-Patent Literature 2 and Non-Patent Literature 3 to the received vector R(t) by considering H(t)W(t) as the channel matrix.

Therefore, a weighting coefficient generating unit 819 in FIG. 8 receives, as input, a signal 818 regarding information on the transmission method indicated by the transmission device (corresponding to 710 in FIG. 7) and outputs a signal 820 regarding information on weighting coefficients.

An INNER MIMO detector 803 receives the signal 820 regarding information on weighting coefficients as input and, using the signal 820, performs the calculation in Equation 41. Iterative detection and decoding is thus performed. The following describes operations thereof.

Figure 10:
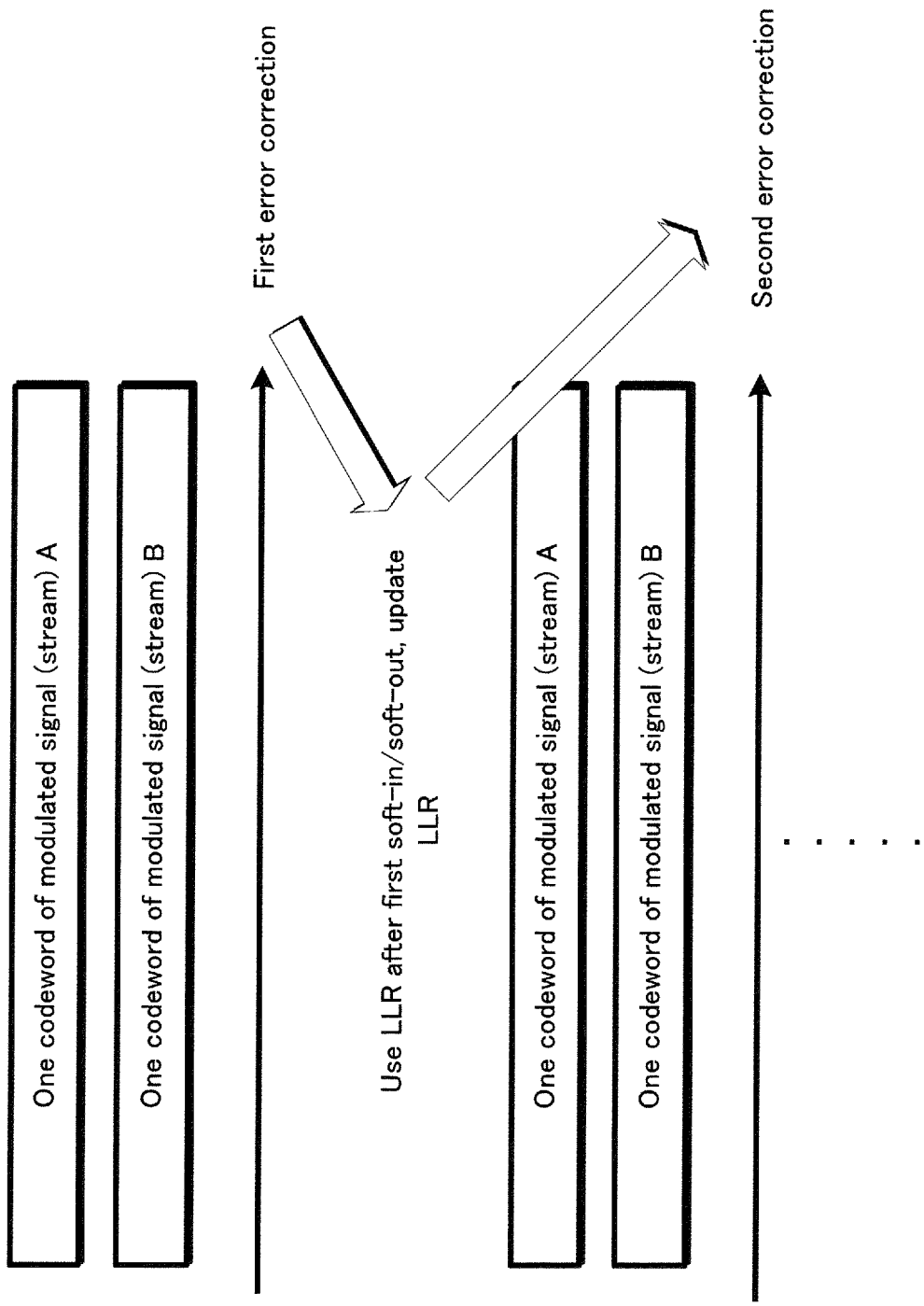
FIG. 10 shows a decoding processing method.

In the signal processing unit in FIG. 8, a processing method such as that shown in FIG. 10 is necessary for iterative decoding (iterative detection). First, one codeword (or one frame) of the modulated signal (stream) s1 and one codeword (or one frame) of the modulated signal (stream) s2 are decoded. As a result, the Log-Likelihood Ratio (LLR) of each bit of the one codeword (or one frame) of the modulated signal (stream) s1 and of the one codeword (or one frame) of the modulated signal (stream) s2 is obtained from the soft-in/soft-out decoder. Detection and decoding is performed again using the LLR. These operations are performed multiple times (these operations being referred to as iterative decoding (iterative detection)). Hereinafter, description focuses on the method of generating the log-likelihood ratio (LLR) of a symbol at a particular time in one frame.

In FIG. 8, a storage unit 815 receives, as inputs, a baseband signal 801X (corresponding to the baseband signal 704_X in FIG. 7), a channel estimation signal group 802X (corresponding to the channel estimation signals 706_1 and 706_2 in FIG. 7), a baseband signal 801Y (corresponding to the baseband signal 704_Y in FIG. 7), and a channel estimation signal group 802Y (corresponding to the channel estimation signals 708_1 and 708_2 in FIG. 7). In order to achieve iterative decoding (iterative detection), the storage unit 815 calculates H(t)W(t) in Equation 41 and stores the calculated matrix as a transformed channel signal group. The storage unit 815 outputs the above signals when necessary as a baseband signal 816X, a transformed channel estimation signal group 817X, a baseband signal 816Y, and a transformed channel estimation signal group 817Y.

Subsequent operations are described separately for initial detection and for iterative decoding (iterative detection).

<Initial Detection>

The INNER MIMO detector 803 receives, as inputs, the baseband signal 801X, the channel estimation signal group 802X, the baseband signal 801Y, and the channel estimation signal group 802Y. Here, the modulation method for the modulated signal (stream) s1 and the modulated signal (stream) s2 is described as 16QAM.

The INNER MIMO detector 803 first calculates H(t)W(t) from the channel estimation signal group 802X and the channel estimation signal group 802Y to seek candidate signal points corresponding to the baseband signal 801X. FIG. 11 shows such calculation. In FIG. 11, each black dot (•) is a candidate signal point in the IQ plane. Since the modulation method is 16QAM, there are 256 candidate signal points. (Since FIG. 11 is only for illustration, not all 256 candidate signal points are shown.) Here, letting the four bits transferred by modulated signal s1 be b0, b1, b2, and b3, and the four bits transferred by modulated signal s2 be b4, b5, b6, and b7, candidate signal points corresponding to (b0, b1, b2, b3, b4, b5, b6, b7) in FIG. 11 exist. The squared Euclidian distance is sought between a received signal point 1101 (corresponding to the baseband signal 801X) and each candidate signal point. Each squared Euclidian distance is divided by the noise variance $\sigma^2$. Accordingly, $E_X$(b0, b1, b2, b3, b4, b5, b6, b7), i.e. the value of the squared Euclidian distance between a candidate signal point corresponding to (b0, b1, b2, b3, b4, b5, b6, b7) and a received signal point, divided by the noise variance, is sought. Note that the baseband signals and the modulated signals s1 and s2 are each complex signals.

Similarly, H(t)W(t) is calculated from the channel estimation signal group 802X and the channel estimation signal group 802Y, candidate signal points corresponding to the baseband signal 801Y are sought, the squared Euclidian distance for the received signal point (corresponding to the baseband signal 801Y) is sought, and the squared Euclidian distance is divided by the noise variance $\sigma^2$. Accordingly, $E_Y$(b0, b1, b2, b3, b4, b5, b6, b7), i.e. the value of the squared Euclidian distance between a candidate signal point corresponding to (b0, b1, b2, b3, b4, b5, b6, b7) and a received signal point, divided by the noise variance, is sought.

Then $E_X(b0, b1, b2, b3, b4, b5, b6, b7)+E_Y(b0, b1, b2, b3, b4, b5, b6, b7)=E(b0, b1, b2, b3, b4, b5, b6, b7)$ is sought.

The INNER MIMO detector 803 outputs $E(b0, b1, b2, b3, b4, b5, b6, b7)$ as a signal 804.

A log-likelihood calculating unit 805A receives the signal 804 as input, calculates the log likelihood for bits b0, b1, b2, and b3, and outputs a log-likelihood signal 806A. Note that during calculation of the log likelihood, the log likelihood for "1" and the log likelihood for "0" are calculated. The calculation method is as shown in Equations 28, 29, and 30. Details can be found in Non-Patent Literature 2 and Non-Patent Literature 3.

Similarly, a log-likelihood calculating unit 805B receives the signal 804 as input, calculates the log likelihood for bits b4, b5, b6, and b7, and outputs a log-likelihood signal 806B.

A deinterleaver (807A) receives the log-likelihood signal 806A as an input, performs deinterleaving corresponding to the interleaver (the interleaver (304A) in FIG. 3), and outputs a deinterleaved log-likelihood signal 808A.

Similarly, a deinterleaver (807B) receives the log-likelihood signal 806B as an input, performs deinterleaving corresponding to the interleaver (the interleaver (304B) in FIG. 3), and outputs a deinterleaved log-likelihood signal 808B.

A log-likelihood ratio calculating unit 809A receives the interleaved log-likelihood signal 808A as an input, calculates the log-likelihood ratio (LLR) of the bits encoded by the encoder 302A in FIG. 3, and outputs a log-likelihood ratio signal 810A.

Similarly, a log-likelihood ratio calculating unit 809B receives the interleaved log-likelihood signal 808B as an input, calculates the log-likelihood ratio (LLR) of the bits encoded by the encoder 302B in FIG. 3, and outputs a log-likelihood ratio signal 810B.

A soft-in/soft-out decoder 811A receives the log-likelihood ratio signal 810A as an input, performs decoding, and outputs a decoded log-likelihood ratio 812A.

Similarly, a soft-in/soft-out decoder 811B receives the log-likelihood ratio signal 810B as an input, performs decoding, and outputs a decoded log-likelihood ratio 812B.

<Iterative Decoding (Iterative Detection), Number of Iterations k>

An interleaver (813A) receives the log-likelihood ratio 812A decoded by the soft-in/soft-out decoder in the $(k-1)^{th}$ iteration as an input, performs interleaving, and outputs an interleaved log-likelihood ratio 814A. The interleaving pattern in the interleaver (813A) is similar to the interleaving pattern in the interleaver (304A) in FIG. 3.

An interleaver (813B) receives the log-likelihood ratio 812B decoded by the soft-in/soft-out decoder in the $(k-1)^{th}$ iteration as an input, performs interleaving, and outputs an interleaved log-likelihood ratio 814B. The interleaving pattern in the interleaver (813B) is similar to the interleaving pattern in the interleaver (304B) in FIG. 3.

The INNER MIMO detector 803 receives, as inputs, the baseband signal 816X, the transformed channel estimation signal group 817X, the baseband signal 816Y, the transformed channel estimation signal group 817Y, the interleaved log-likelihood ratio 814A, and the interleaved log-likelihood ratio 814B. The reason for using the baseband signal 816X, the transformed channel estimation signal group 817X, the baseband signal 816Y, and the transformed channel estimation signal group 817Y instead of the baseband signal 801X, the channel estimation signal group 802X, the baseband signal 801Y, and the channel estimation signal group 802Y is because a delay occurs due to iterative decoding.

The difference between operations by the INNER MIMO detector 803 for iterative decoding and for initial detection is the use of the interleaved log-likelihood ratio 814A and the interleaved log-likelihood ratio 814B during signal processing. The INNER MIMO detector 803 first seeks $E(b0, b1, b2, b3, b4, b5, b6, b7)$, as during initial detection. Additionally, coefficients corresponding to Equations 11 and 32 are sought from the interleaved log-likelihood ratio 814A and the interleaved log-likelihood ratio 914B. The value $E(b0, b1, b2, b3, b4, b5, b6, b7)$ is adjusted using the sought coefficients, and the resulting value $E'(b0, b1, b2, b3, b4, b5, b6, b7)$ is output as the signal 804.

The log-likelihood calculating unit 805A receives the signal 804 as input, calculates the log likelihood for bits b0, b1, b2, and b3, and outputs the log-likelihood signal 806A. Note that during calculation of the log likelihood, the log likelihood for "1" and the log likelihood for "0" are calculated. The calculation method is as shown in Equations 31, 32, 33, 34, and 35. Details can be found in Non-Patent Literature 2 and Non-Patent Literature 3.

Similarly, the log-likelihood calculating unit 805B receives the signal 804 as input, calculates the log likelihood for bits b4, b5, b6, and b7, and outputs the log-likelihood signal 806B. Operations by the deinterleaver onwards are similar to initial detection.

Note that while FIG. 8 shows the structure of the signal processing unit when performing iterative detection, iterative detection is not always essential for obtaining excellent reception quality, and a structure not including the interleavers 813A and 813B, which are necessary only for iterative detection, is possible. In such a case, the INNER MIMO detector 803 does not perform iterative detection.

The main part of the present embodiment is calculation of H(t)W(t). Note that as shown in Non-Patent Literature 5 and the like, QR decomposition may be used to perform initial detection and iterative detection.

Furthermore, as shown in Non-Patent Literature 11, based on H(t)W(t), linear operation of the Minimum Mean Squared Error (MMSE) and Zero Forcing (ZF) may be performed in order to perform initial detection.

Figure 9:
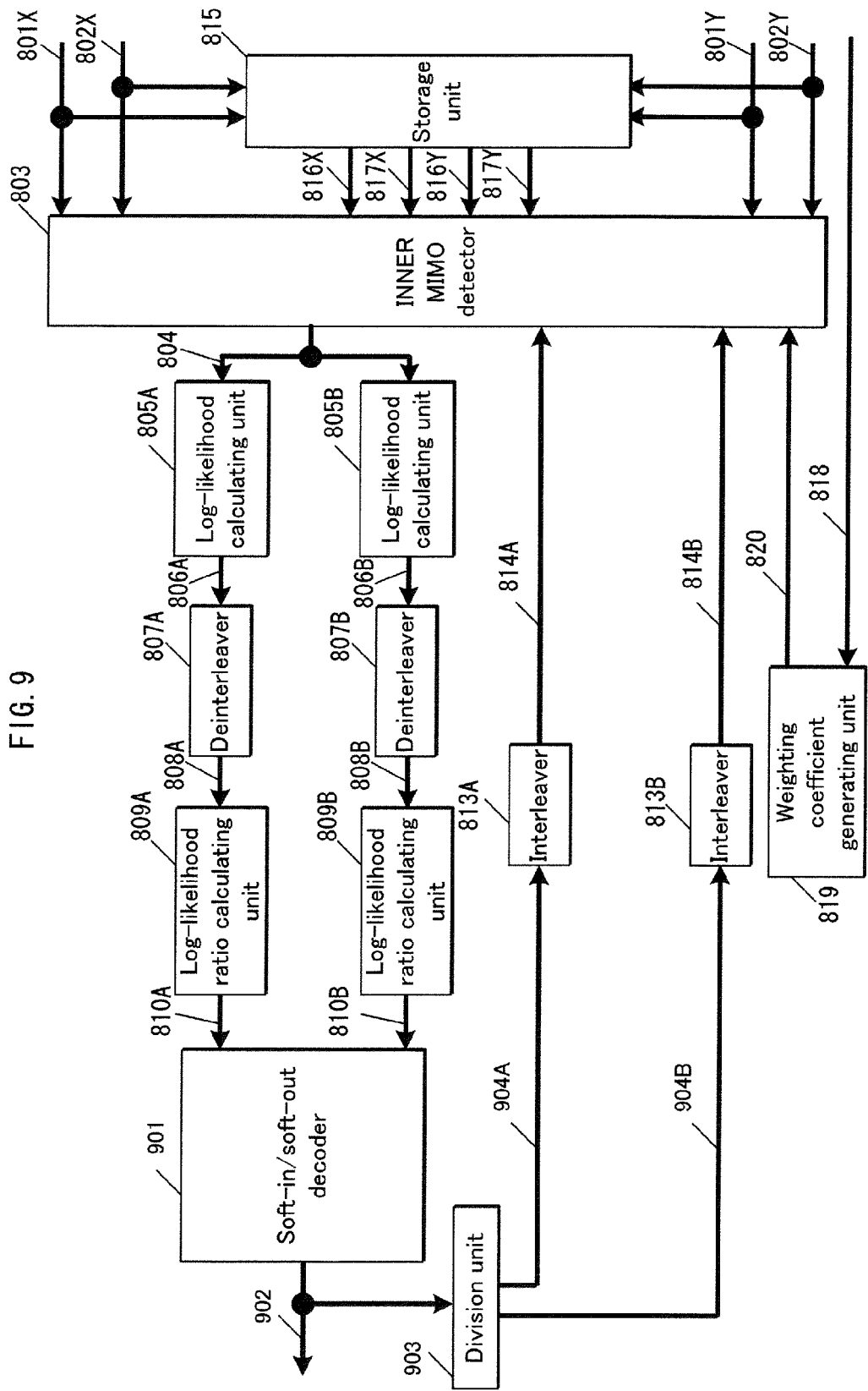
FIG. 9 is an example of the structure of a signal processing unit in a reception device.

FIG. 9 is the structure of a different signal processing unit than FIG. 8 and is for the modulated signal transmitted by the transmission device in FIG. 4. The difference with FIG. 8 is the number of soft-in/soft-out decoders. A soft-in/soft-out decoder 901 receives, as inputs, the log-likelihood ratio signals 810A and 810B, performs decoding, and outputs a decoded log-likelihood ratio 902. A distribution unit 903 receives the decoded log-likelihood ratio 902 as an input and distributes the log-likelihood ratio 902. Other operations are similar to FIG. 8.

Figure 12A:
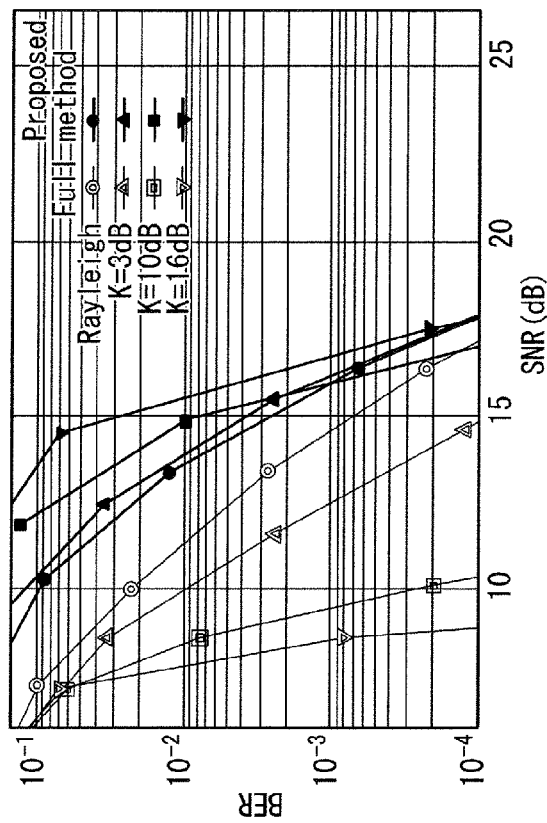
FIGS. 12A and 12B are examples of BER characteristics.
Figure 12B:
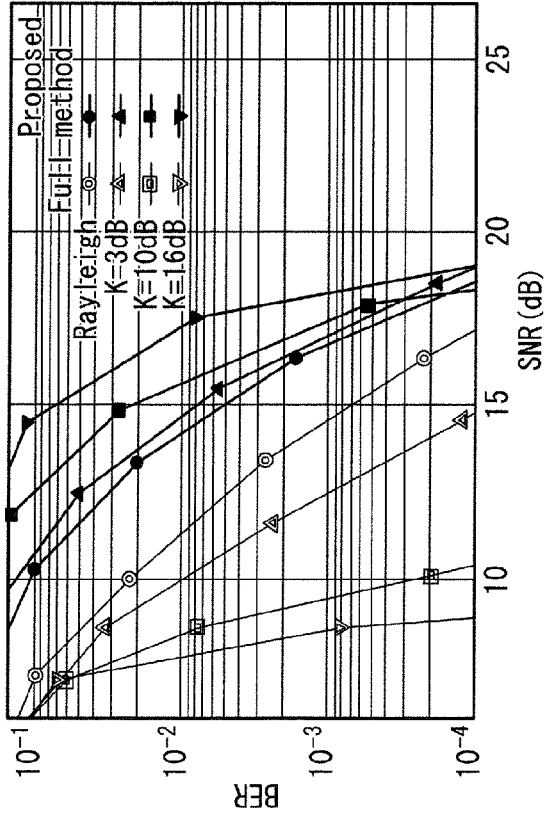
Figure 29B:
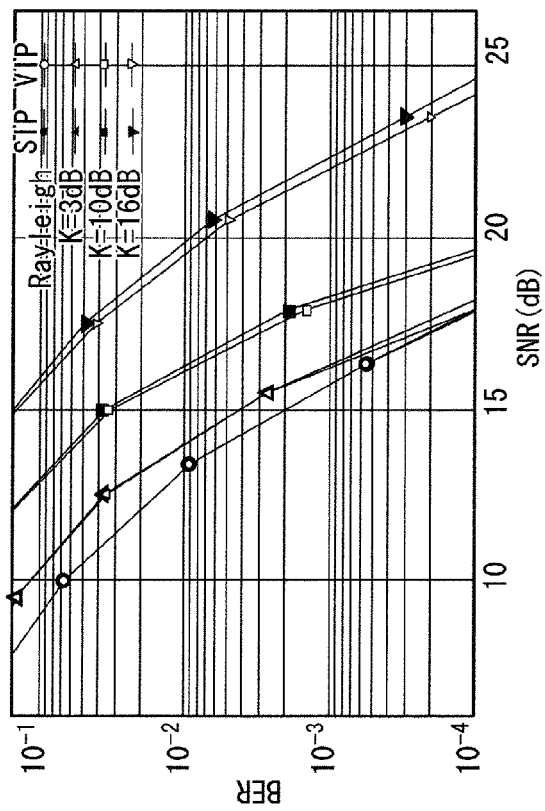
FIGS. 29A and 29B are examples of BER characteristics.
Figure 29A:
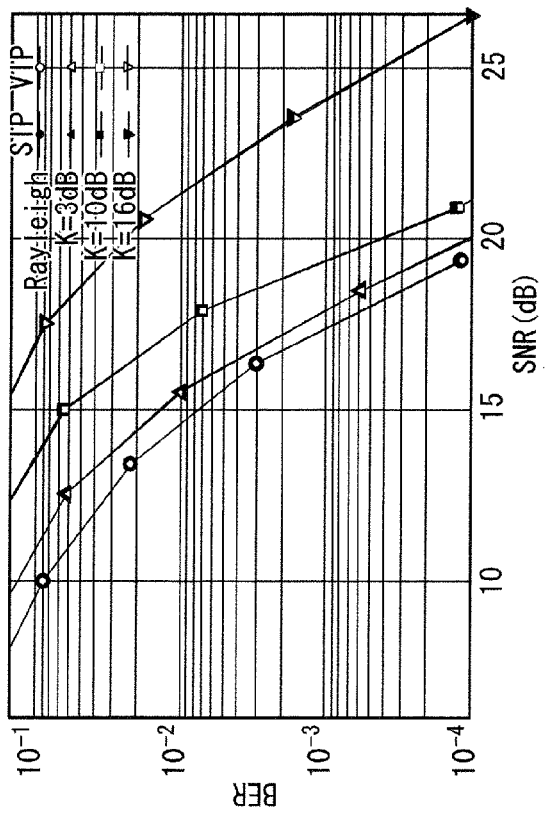

FIGS. 12A and 12B show BER characteristics for a transmission method using the precoding weights of the present embodiment under similar conditions to FIGS. 29A and 29B. FIG. 12A shows the BER characteristics of Max-log A Posteriori Probability (APP) without iterative detection (see Non-Patent Literature 1 and Non-Patent Literature 2), and FIG. 12B shows the BER characteristics of Max-log-APP with iterative detection (see Non-Patent Literature 1 and Non-Patent Literature 2) (number of iterations: five). Comparing FIGS. 12A, 12B, 29A, and 29B shows how if the transmission method of the present embodiment is used, the BER characteristics when the Rician factor is large greatly improve over the BER characteristics when using spatial multiplexing MIMO system, thereby confirming the usefulness of the method in the present embodiment.

As described above, when a transmission device transmits a plurality of modulated signals from a plurality of antennas in a MIMO system, the advantageous effect of improved transmission quality, as compared to conventional spatial multiplexing MIMO system, is achieved in an LOS environment in which direct waves dominate by hopping between precoding weights regularly over time, as in the present embodiment.

In the present embodiment, and in particular with regards to the structure of the reception device, operations have been described for a limited number of antennas, but the present invention may be embodied in the same way even if the number of antennas increases. In other words, the number of antennas in the reception device does not affect the operations or advantageous effects of the present embodiment. Furthermore, in the present embodiment, the example of LDPC coding has particularly been explained, but the present invention is not limited to LDPC coding. Furthermore, with regards to the decoding method, the soft-in/soft-out decoders are not limited to the example of sum-product decoding. Another soft-in/soft-out decoding method may be used, such as a BCJR algorithm, a SOYA algorithm, a Max-log-MAP algorithm, and the like. Details are provided in Non-Patent Literature 6.

Additionally, in the present embodiment, the example of a single carrier method has been described, but the present invention is not limited in this way and may be similarly embodied for multi-carrier transmission. Accordingly, when using a method such as spread spectrum communication, Orthogonal Frequency-Division Multiplexing (OFDM), Single Carrier Frequency Division Multiple Access (SC-FDMA), Single Carrier Orthogonal Frequency-Division Multiplexing (SC-OFDM), or wavelet OFDM as described in Non-Patent Literature 7 and the like, for example, the present invention may be similarly embodied. Furthermore, in the present embodiment, symbols other than data symbols, such as pilot symbols (preamble, unique word, and the like), symbols for transmission of control information, and the like, may be arranged in the frame in any way.

The following describes an example of using OFDM as an example of a multi-carrier method.

Figure 13:
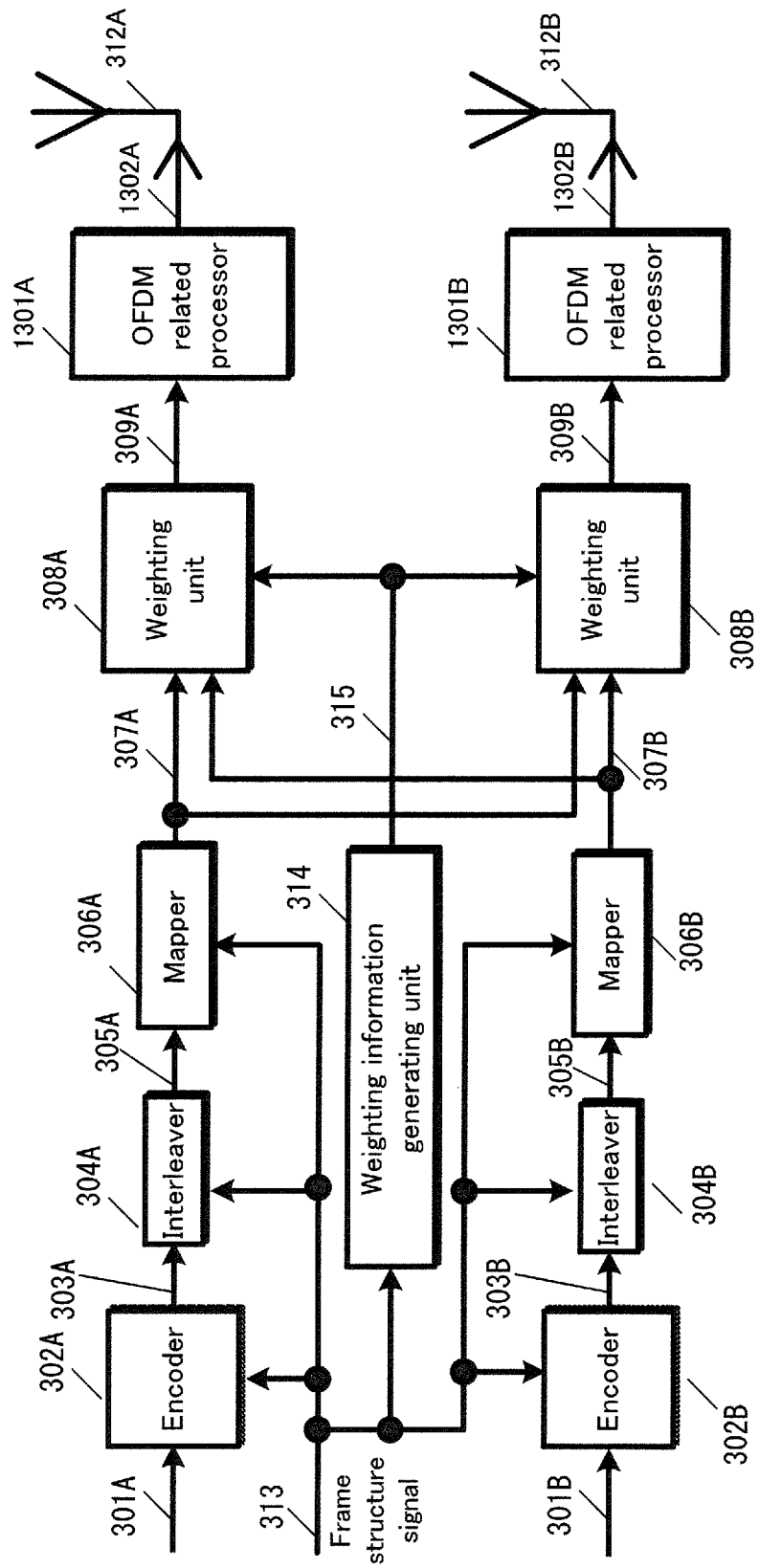
FIG. 13 is an example of the structure of a transmission device when adopting a method of hopping between precoding weights.

FIG. 13 shows the structure of a transmission device when using OFDM. In FIG. 13, elements that operate in a similar way to FIG. 3 bear the same reference signs.

An OFDM related processor 1301A receives, as input, the weighted signal 309A, performs processing related to OFDM, and outputs a transmission signal 1302A. Similarly, an OFDM related processor 1301B receives, as input, the weighted signal 309B, performs processing related to OFDM, and outputs a transmission signal 1302B.

Figure 14:
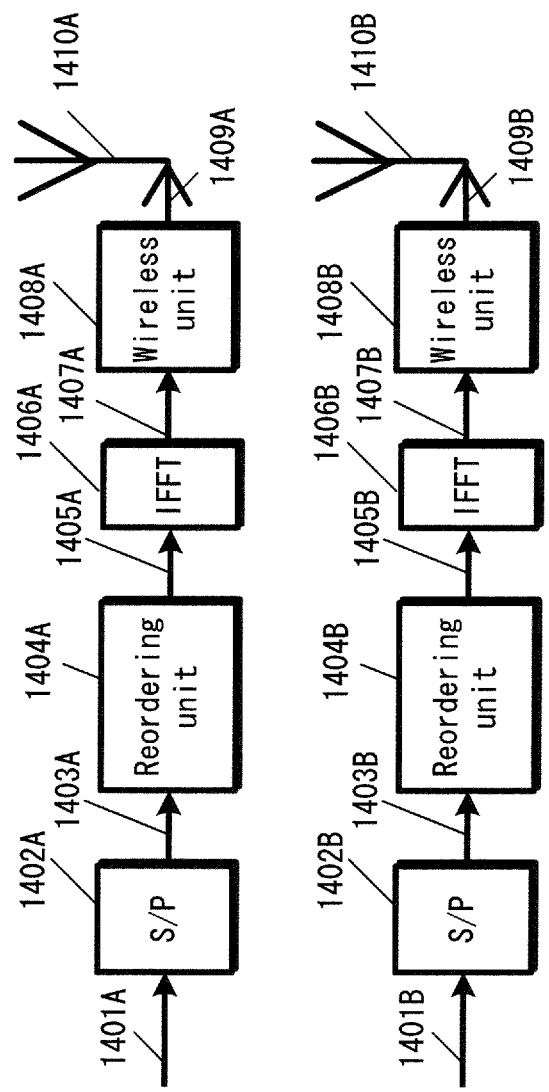
FIG. 14 is an example of the structure of a transmission device when adopting a method of hopping between precoding weights.

FIG. 14 shows an example of a structure from the OFDM related processors 1301A and 1301B in FIG. 13 onwards. The part from 1401A to 1410A is related to the part from 1301A to 312A in FIG. 13, and the part from 1401B to 1410B is related to the part from 1301B to 312B in FIG. 13.

A serial/parallel converter 1402A performs serial/parallel conversion on a weighted signal 1401A (corresponding to the weighted signal 309A in FIG. 13) and outputs a parallel signal 1403A.

A reordering unit 1404A receives a parallel signal 1403A as input, performs reordering, and outputs a reordered signal 1405A. Reordering is described in detail later.

An inverse fast Fourier transformer 1406A receives the reordered signal 1405A as an input, performs a fast Fourier transform, and outputs a fast Fourier transformed signal 1407A.

A wireless unit 1408A receives the fast Fourier transformed signal 1407A as an input, performs processing such as frequency conversion, amplification, and the like, and outputs a modulated signal 1409A. The modulated signal 1409A is output as a radio wave from an antenna 1410A.

A serial/parallel converter 1402B performs serial/parallel conversion on a weighted signal 1401B (corresponding to the weighted signal 309B in FIG. 13) and outputs a parallel signal 1403B.

A reordering unit 1404B receives a parallel signal 1403B as input, performs reordering, and outputs a reordered signal 1405B. Reordering is described in detail later.

An inverse fast Fourier transformer 1406B receives the reordered signal 1405B as an input, performs a fast Fourier transform, and outputs a fast Fourier transformed signal 1407B.

A wireless unit 1408B receives the fast Fourier transformed signal 1407B as an input, performs processing such as frequency conversion, amplification, and the like, and outputs a modulated signal 1409B. The modulated signal 1409B is output as a radio wave from an antenna 1410B.

In the transmission device of FIG. 3, since the transmission method does not use multi-carrier, precoding hops to form a four-slot period (cycle), as shown in FIG. 6, and the precoded symbols are arranged in the time domain. When using a multi-carrier transmission method as in the OFDM method shown in FIG. 13, it is of course possible to arrange the precoded symbols in the time domain as in FIG. 3 for each (sub)carrier. In the case of a multi-carrier transmission method, however, it is possible to arrange symbols in the frequency domain, or in both the frequency and time domains. The following describes these arrangements.

FIGS. 15A and 15B show an example of a method of reordering symbols by reordering units 1401A and 1401B in FIG. 14, the horizontal axis representing frequency, and the vertical axis representing time. The frequency domain runs from (sub)carrier 0 through (sub)carrier 9. The modulated signals z1 and z2 use the same frequency bandwidth at the same time. FIG. 15A shows the reordering method for symbols of the modulated signal z1, and FIG. 15B shows the reordering method for symbols of the modulated signal z2. Numbers #1, #2, #3, #4, . . . are assigned to in order to the symbols of the weighted signal 1401A which is input into the serial/parallel converter 1402A. At this point, symbols are assigned regularly, as shown in FIG. 15A. The symbols #1, #2, #3, #4, . . . are arranged in order starting from carrier 0. The symbols #1 through #9 are assigned to time $1, and subsequently, the symbols #10 through #19 are assigned to time $2.

Similarly, numbers #1, #2, #3, #4, . . . are assigned in order to the symbols of the weighted signal 1401B which is input into the serial/parallel converter 1402B. At this point, symbols are assigned regularly, as shown in FIG. 15B. The symbols #1, #2, #3, #4, . . . are arranged in order starting from carrier 0. The symbols #1 through #9 are assigned to time $1, and subsequently, the symbols #10 through #19 are assigned to time $2. Note that the modulated signals z1 and z2 are complex signals.

The symbol group 1501 and the symbol group 1502 shown in FIGS. 15A and 15B are the symbols for one period (cycle) when using the precoding weight hopping method shown in FIG. 6. Symbol #0 is the symbol when using the precoding weight of slot $4i$ in FIG. 6. Symbol #1 is the symbol when using the precoding weight of slot $4i+1$ in FIG. 6. Symbol #2 is the symbol when using the precoding weight of slot $4i+2$ in FIG. 6. Symbol #3 is the symbol when using the precoding weight of slot $4i+3$ in FIG. 6. Accordingly, symbol #x is as follows. When x mod 4 is 0, the symbol #x is the symbol when using the precoding weight of slot $4i$ in FIG. 6. When x mod 4 is 1, the symbol #x is the symbol when using the precoding weight of slot $4i+1$ in FIG. 6. When x mod 4 is 2, the symbol #x is the symbol when using the precoding weight of slot $4i+2$ in FIG. 6. When x mod 4 is 3, the symbol #x is the symbol when using the precoding weight of slot $4i+3$ in FIG. 6.

In this way, when using a multi-carrier transmission method such as OFDM, unlike during single carrier transmission, symbols can be arranged in the frequency domain. Furthermore, the ordering of symbols is not limited to the ordering shown in FIGS. 15A and 15B. Other examples are described with reference to FIGS. 16A, 16B, 17A, and 17B.

FIGS. 16A and 16B show an example of a method of reordering symbols by the reordering units 1404A and 1404B in FIG. 14, the horizontal axis representing frequency, and the vertical axis representing time, that differs from FIGS. 15A and 15B. FIG. 16A shows the reordering method for symbols of the modulated signal z1, and FIG. 16B shows the reordering method for symbols of the modulated signal z2. The difference in FIGS. 16A and 16B as compared to FIGS. 15A and 15B is that the reordering method of the symbols of the modulated signal z1 differs from the reordering method of the symbols of the modulated signal z2. In FIG. 16B, symbols #0 through #5 are assigned to carriers 4 through 9, and symbols #6 through #9 are assigned to carriers 0 through 3. Subsequently, symbols #10 through #19 are assigned regularly in the same way. At this point, as in FIGS. 15A and 15B, the symbol group 1601 and the symbol group 1602 shown in FIGS. 16A and 16B are the symbols for one period (cycle) when using the precoding weight hopping method shown in FIG. 6.

FIGS. 17A and 17B show an example of a method of reordering symbols by the reordering units 1404A and 1404B in FIG. 14, the horizontal axis representing frequency, and the vertical axis representing time, that differs from FIGS. 15A and 15B. FIG. 17A shows the reordering method for symbols of the modulated signal z1, and FIG. 17B shows the reordering method for symbols of the modulated signal z2. The difference in FIGS. 17A and 17B as compared to FIGS. 15A and 15B is that whereas the symbols are arranged in order by carrier in FIGS. 15A and 15B, the symbols are not arranged in order by carrier in FIGS. 17A and 17B. It is obvious that, in FIGS. 17A and 17B, the reordering method of the symbols of the modulated signal z1 may differ from the reordering method of the symbols of the modulated signal z2, as in FIGS. 16A and 16B.

Figure 18A:
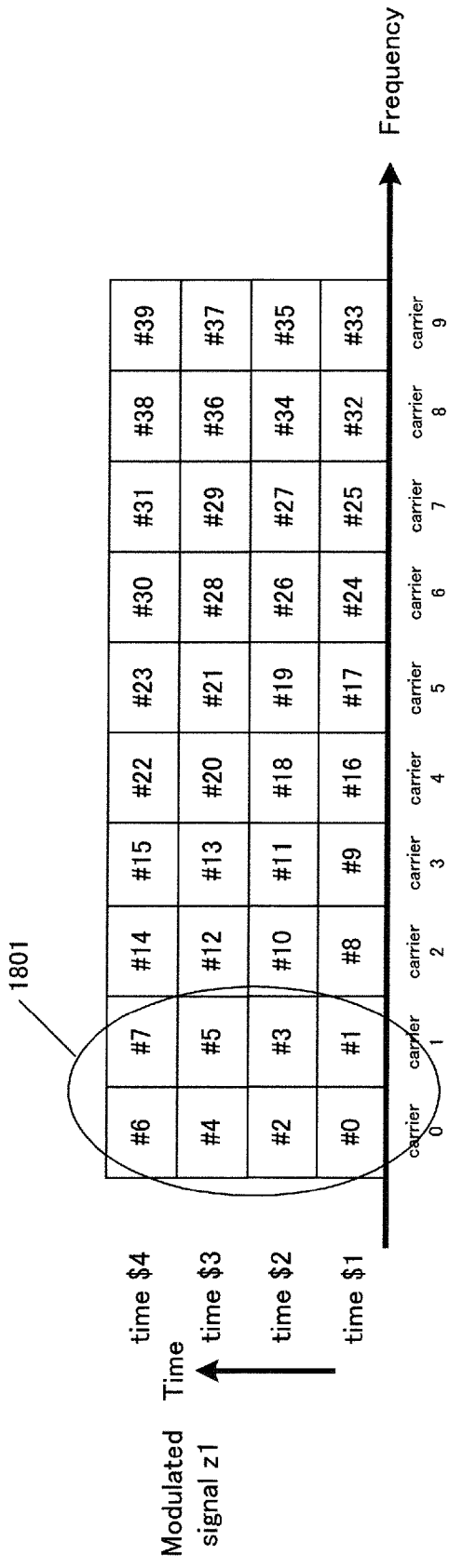
FIGS. 18A and 18B are examples of a frame structure.
Figure 18B:
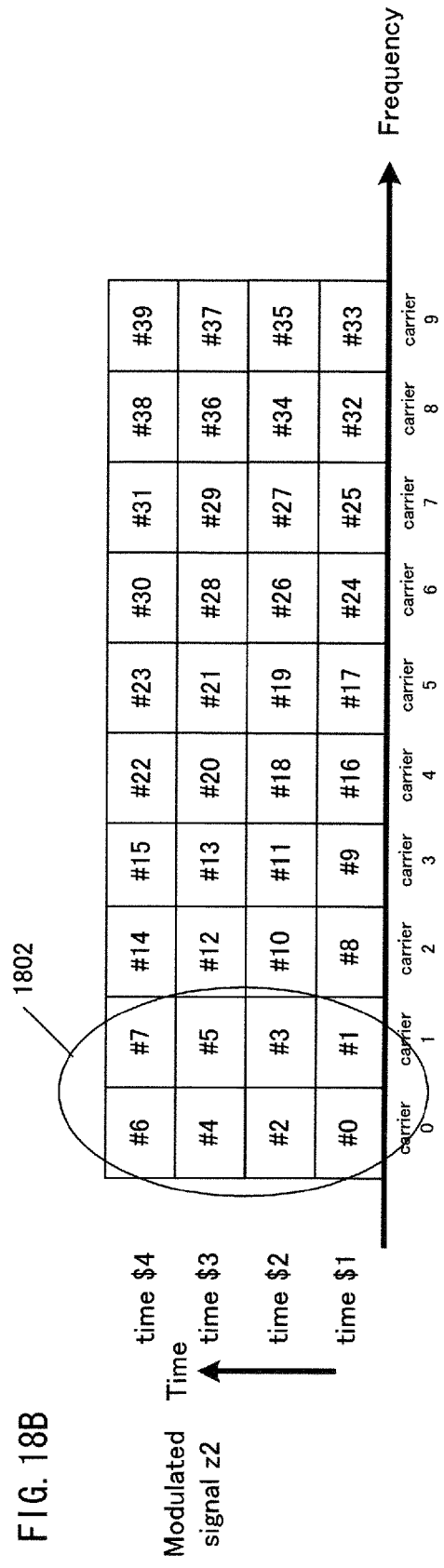

FIGS. 18A and 18B show an example of a method of reordering symbols by the reordering units 1404A and 1404B in FIG. 14, the horizontal axis representing frequency, and the vertical axis representing time, that differs from FIGS. 15A through 17B. FIG. 18A shows the reordering method for symbols of the modulated signal z1, and FIG. 18B shows the reordering method for symbols of the modulated signal z2. In FIGS. 15A through 17B, symbols are arranged in the frequency domain, whereas in FIGS. 18A and 18B, symbols are arranged in both the frequency and time domains.

In FIG. 6, an example has been described of hopping between precoding weights over four slots. Here, however, an example of hopping over eight slots is described. The symbol groups 1801 and 1802 shown in FIGS. 18A and 18B are the symbols for one period (cycle) when using the precoding weight hopping method (and are therefore eight-symbol groups). Symbol #0 is the symbol when using the precoding weight of slot $8i$. Symbol #1 is the symbol when using the precoding weight of slot $8i+1$. Symbol #2 is the symbol when using the precoding weight of slot $8i+2$. Symbol #3 is the symbol when using the precoding weight of slot $8i+3$. Symbol #4 is the symbol when using the precoding weight of slot $8i+4$. Symbol #5 is the symbol when using the precoding weight of slot $8i+5$. Symbol #6 is the symbol when using the precoding weight of slot $8i+6$. Symbol #7 is the symbol when using the precoding weight of slot $8i+7$. Accordingly, symbol #x is as follows. When x mod 8 is 0, the symbol #x is the symbol when using the precoding weight of slot $8i$. When x mod 8 is 1, the symbol #x is the symbol when using the precoding weight of slot $8i+1$. When x mod 8 is 2, the symbol #x is the symbol when using the precoding weight of slot $8i+2$. When x mod 8 is 3, the symbol #x is the symbol when using the precoding weight of slot $8i+3$. When x mod 8 is 4, the symbol #x is the symbol when using the precoding weight of slot $8i+4$. When x mod 8 is 5, the symbol #x is the symbol when using the precoding weight of slot $8i+5$. When x mod 8 is 6, the symbol #x is the symbol when using the precoding weight of slot $8i+6$. When x mod 8 is 7, the symbol #x is the symbol when using the precoding weight of slot $8i+7$. In the symbol ordering in FIGS. 18A and 18B, four slots in the time domain and two slots in the frequency domain for a total of 4×2=8 slots are used to arrange symbols for one period (cycle). In this case, letting the number of symbols in one period (cycle) be m×n symbols (in other words, m×n precoding weights exist), the number of slots (the number of carriers) in the frequency domain used to arrange symbols in one period (cycle) be n, and the number of slots used in the time domain be m, m should be greater than n. This is because the phase of direct waves fluctuates more slowly in the time domain than in the frequency domain. Therefore, since the precoding weights are changed in the present embodiment to minimize the influence of steady direct waves, it is preferable to reduce the fluctuation in direct waves in the period (cycle) for changing the precoding weights. Accordingly, m should be greater than n. Furthermore, considering the above points, rather than reordering symbols only in the frequency domain or only in the time domain, direct waves are more likely to become stable when symbols are reordered in both the frequency and the time domains as in FIGS. 18A and 18B, thereby making it easier to achieve the advantageous effects of the present invention. When symbols are ordered in the frequency domain, however, fluctuations in the frequency domain are abrupt, leading to the possibility of yielding diversity gain. Therefore, reordering in both the frequency and the time domains is not necessarily always the best method.

FIGS. 19A and 19B show an example of a method of reordering symbols by the reordering units 1404A and 1404B in FIG. 14, the horizontal axis representing frequency, and the vertical axis representing time, that differs from FIGS. 18A and 18B. FIG. 19A shows the reordering method for symbols of the modulated signal z1, and FIG. 19B shows the reordering method for symbols of the modulated signal z2. As in FIGS. 18A and 18B, FIGS. 19A and 19B show arrangement of symbols using both the frequency and the time axes. The difference as compared to FIGS. 18A and 18B is that, whereas symbols are arranged first in the frequency domain and then in the time domain in FIGS. 18A and 18B, symbols are arranged first in the time domain and then in the frequency domain in FIGS. 19A and 19B. In FIGS. 19A and 19B, the symbol group 1901 and the symbol group 1902 are the symbols for one period (cycle) when using the precoding hopping method.

Note that in FIGS. 18A, 18B, 19A, and 19B, as in FIGS. 16A and 16B, the present invention may be similarly embodied, and the advantageous effect of high reception quality achieved, with the symbol arranging method of the modulated signal z1 differing from the symbol arranging method of the modulated signal z2. Furthermore, in FIGS. 18A, 18B, 19A, and 19B, as in FIGS. 17A and 17B, the present invention may be similarly embodied, and the advantageous effect of high reception quality achieved, without arranging the symbols in order.

Figure 27:
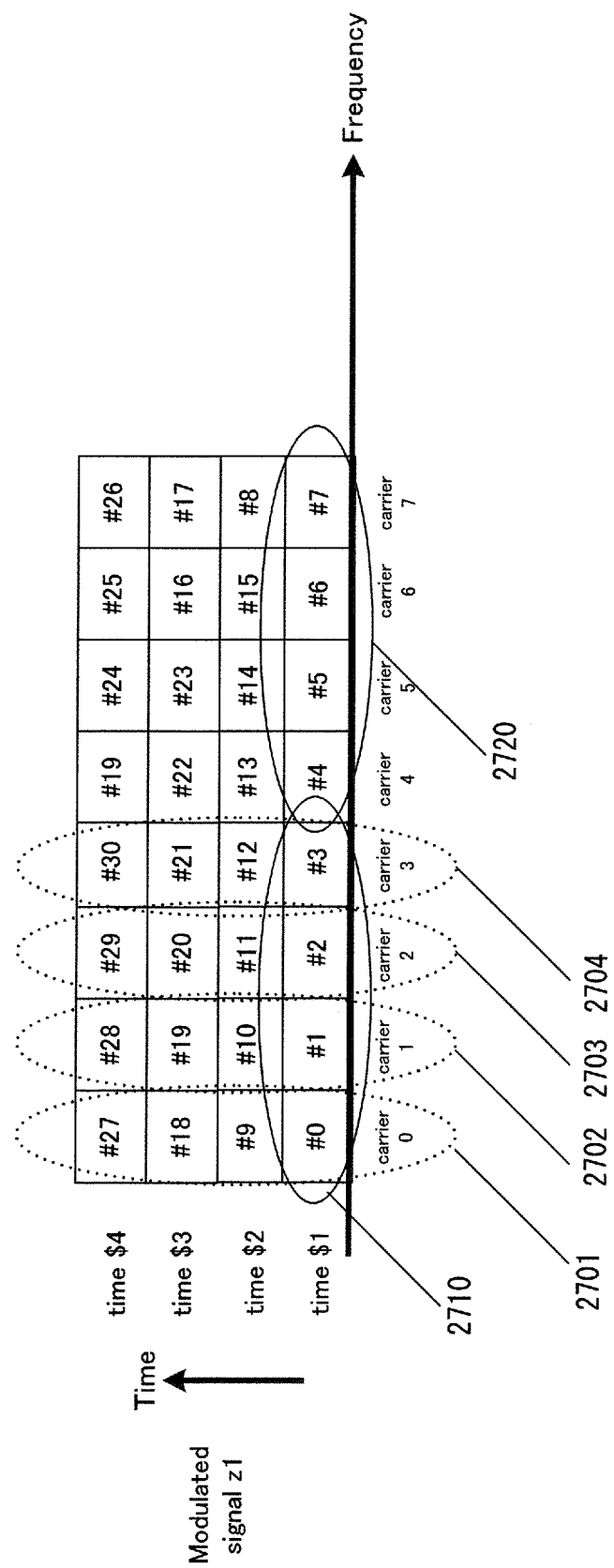
FIG. 27 is an example of a method for reordering symbols.

FIG. 27 shows an example of a method of reordering symbols by the reordering units 1404A and 1404B in FIG. 14, the horizontal axis representing frequency, and the vertical axis representing time, that differs from the above examples. The case of hopping between precoding matrix regularly over four slots, as in Equations 37-40, is considered. The characteristic feature of FIG. 27 is that symbols are arranged in order in the frequency domain, but when progressing in the time domain, symbols are cyclically shifted by n symbols (in the example in FIG. 27, n=1). In the four symbols shown in the symbol group 2710 in the frequency domain in FIG. 27, precoding hops between the precoding matrices of Equations 37-40.

In this case, symbol #0 is precoded using the precoding matrix in Equation 37, symbol #1 is precoded using the precoding matrix in Equation 38, symbol #2 is precoded using the precoding matrix in Equation 39, and symbol #3 is precoded using the precoding matrix in Equation 40.

Similarly, for the symbol group 2720 in the frequency domain, symbol #4 is precoded using the precoding matrix in Equation 37, symbol #5 is precoded using the precoding matrix in Equation 38, symbol #6 is precoded using the precoding matrix in Equation 39, and symbol #7 is precoded using the precoding matrix in Equation 40.

For the symbols at time $1, precoding hops between the above precoding matrices, but in the time domain, symbols are cyclically shifted. Therefore, precoding hops between precoding matrices for the symbol groups 2701, 2702, 2703, and 2704 as follows.

In the symbol group 2701 in the time domain, symbol #0 is precoded using the precoding matrix in Equation 37, symbol #9 is precoded using the precoding matrix in Equation 38, symbol #18 is precoded using the precoding matrix in Equation 39, and symbol #27 is precoded using the precoding matrix in Equation 40.

In the symbol group 2702 in the time domain, symbol #28 is precoded using the precoding matrix in Equation 37, symbol #1 is precoded using the precoding matrix in Equation 38, symbol #10 is precoded using the precoding matrix in Equation 39, and symbol #19 is precoded using the precoding matrix in Equation 40.

In the symbol group 2703 in the time domain, symbol #20 is precoded using the precoding matrix in Equation 37, symbol #29 is precoded using the precoding matrix in Equation 38, symbol #2 is precoded using the precoding matrix in Equation 39, and symbol #11 is precoded using the precoding matrix in Equation 40.

In the symbol group 2704 in the time domain, symbol #12 is precoded using the precoding matrix in Equation 37, symbol #21 is precoded using the precoding matrix in Equation 38, symbol #30 is precoded using the precoding matrix in Equation 39, and symbol #3 is precoded using the precoding matrix in Equation 40.

The characteristic of FIG. 27 is that, for example focusing on symbol #11, the symbols on either side in the frequency domain at the same time (symbols #10 and #12) are both precoded with a different precoding matrix than symbol #11, and the symbols on either side in the time domain in the same carrier (symbols #2 and #20) are both precoded with a different precoding matrix than symbol #11. This is true not only for symbol #11. Any symbol having symbols on either side in the frequency domain and the time domain is characterized in the same way as symbol #11. As a result, precoding matrices are effectively hopped between, and since the influence on stable conditions of direct waves is reduced, the possibility of improved reception quality of data increases.

In FIG. 27, the case of n=1 has been described, but n is not limited in this way. The present invention may be similarly embodied with n=3. Furthermore, in FIG. 27, when symbols are arranged in the frequency domain and time progresses in the time domain, the above characteristic is achieved by cyclically shifting the number of the arranged symbol, but the above characteristic may also be achieved by randomly (or regularly) arranging the symbols.

Embodiment 2

In Embodiment 1, regular hopping of the precoding weights as shown in FIG. 6 has been described. In the present embodiment, a method for designing specific precoding weights that differ from the precoding weights in FIG. 6 is described.

In FIG. 6, the method for hopping between the precoding weights in Equations 37-40 has been described. By generalizing this method, the precoding weights may be changed as follows. (The hopping period (cycle) for the precoding weights has four slots, and Equations are listed similarly to Equations 37-40.) For symbol number 4i (where i is an integer greater than or equal to zero):

Math 42

$$\begin{pmatrix} z1(4i) \\ z2(4i) \end{pmatrix} = \frac{1}{\sqrt{2}} \begin{pmatrix} e^{j\theta_{11}(4i)} & e^{j(\theta_{11}(4i)+\lambda)} \\ e^{j\theta_{21}(4i)} & e^{j(\theta_{21}(4i)+\lambda+\delta)} \end{pmatrix} \begin{pmatrix} s1(4i) \\ s2(4i) \end{pmatrix} \quad \text{Equation 42}$$

Here, j is an imaginary unit.
For symbol number 4i+1:

Math 43

$$\begin{pmatrix} z1(4i+1) \\ z2(4i+1) \end{pmatrix} = \\ \frac{1}{\sqrt{2}} \begin{pmatrix} e^{j\theta_{11}(4i+1)} & e^{j(\theta_{11}(4i+1)+\lambda)} \\ e^{j\theta_{21}(4i+1)} & e^{j(\theta_{21}(4i+1)+\lambda+\delta)} \end{pmatrix} \begin{pmatrix} s1(4i+1) \\ s2(4i+1) \end{pmatrix} \quad \text{Equation 43}$$

For symbol number 4i+2:

Math 44

$$\begin{pmatrix} z1(4i+2) \\ z2(4i+2) \end{pmatrix} = \\ \frac{1}{\sqrt{2}} \begin{pmatrix} e^{j\theta_{11}(4i+2)} & e^{j(\theta_{11}(4i+2)+\lambda)} \\ e^{j\theta_{21}(4i+2)} & e^{j(\theta_{21}(4i+2)+\lambda+\delta)} \end{pmatrix} \begin{pmatrix} s1(4i+2) \\ s2(4i+2) \end{pmatrix} \quad \text{Equation 44}$$

For symbol number 4i+3:

Math 45

$$\begin{pmatrix} z1(4i+3) \\ z2(4i+3) \end{pmatrix} = \\ \frac{1}{\sqrt{2}} \begin{pmatrix} e^{j\theta_{11}(4i+3)} & e^{j(\theta_{11}(4i+3)+\lambda)} \\ e^{j\theta_{21}(4i+3)} & e^{j(\theta_{21}(4i+3)+\lambda+\delta)} \end{pmatrix} \begin{pmatrix} s1(4i+3) \\ s2(4i+3) \end{pmatrix} \quad \text{Equation 45}$$

From Equations 36 and 41, the received vector R(t)=(r1(t), r2(t))$^T$ can be represented as follows.

For symbol number 4i:

Math 46

$$\begin{pmatrix} r1(4i) \\ r2(4i) \end{pmatrix} = \frac{1}{\sqrt{2}} \begin{pmatrix} h_{11}(4i) & h_{12}(4i) \\ h_{21}(4i) & h_{22}(4i) \end{pmatrix} \begin{pmatrix} e^{j\theta_{11}(4i)} & e^{j(\theta_{11}(4i)+\lambda)} \\ e^{j\theta_{21}(4i)} & e^{j(\theta_{21}(4i)+\lambda+\delta)} \end{pmatrix} \begin{pmatrix} s1(4i) \\ s2(4i) \end{pmatrix}$$

Equation 46

For symbol number 4i+1:

Math 47

$$\begin{pmatrix} r1(4i+1) \\ r2(4i+1) \end{pmatrix} = \frac{1}{\sqrt{2}} \begin{pmatrix} h_{11}(4i+1) & h_{12}(4i+1) \\ h_{21}(4i+1) & h_{22}(4i+1) \end{pmatrix} \begin{pmatrix} e^{j\theta_{11}(4i+1)} & e^{j(\theta_{11}(4i+1)+\lambda)} \\ e^{j\theta_{21}(4i+1)} & e^{j(\theta_{21}(4i+1)+\lambda+\delta)} \end{pmatrix} \begin{pmatrix} s1(4i+1) \\ s2(4i+1) \end{pmatrix}$$

Equation 47

For symbol number 4i+2:

Math 48

$$\begin{pmatrix} r1(4i+2) \\ r2(4i+2) \end{pmatrix} = \frac{1}{\sqrt{2}} \begin{pmatrix} h_{11}(4i+2) & h_{12}(4i+2) \\ h_{21}(4i+2) & h_{22}(4i+2) \end{pmatrix} \begin{pmatrix} e^{j\theta_{11}(4i+2)} & e^{j(\theta_{11}(4i+2)+\lambda)} \\ e^{j\theta_{21}(4i+2)} & e^{j(\theta_{21}(4i+2)+\lambda+\delta)} \end{pmatrix} \begin{pmatrix} s1(4i+2) \\ s2(4i+2) \end{pmatrix}$$

Equation 48

For symbol number 4i+3:

Math 49

$$\begin{pmatrix} r1(4i+3) \\ r2(4i+3) \end{pmatrix} = \frac{1}{\sqrt{2}} \begin{pmatrix} h_{11}(4i+3) & h_{12}(4i+3) \\ h_{21}(4i+3) & h_{22}(4i+3) \end{pmatrix} \begin{pmatrix} e^{j\theta_{11}(4i+3)} & e^{j(\theta_{11}(4i+3)+\lambda)} \\ e^{j\theta_{21}(4i+3)} & e^{j(\theta_{21}(4i+3)+\lambda+\delta)} \end{pmatrix} \begin{pmatrix} s1(4i+3) \\ s2(4i+3) \end{pmatrix}$$

Equation 49

In this case, it is assumed that only components of direct waves exist in the channel elements $h_{11}(t)$, $h_{12}(t)$, $h_{21}(t)$, and $h_{22}(t)$, that the amplitude components of the direct waves are all equal, and that fluctuations do not occur over time. With these assumptions, Equations 46-49 can be represented as follows.

For symbol number 4i:

Math 50

$$\begin{pmatrix} r1(4i) \\ r2(4i) \end{pmatrix} = \frac{1}{\sqrt{2}} \begin{pmatrix} Ae^{j0} & q \\ Ae^{j0} & q \end{pmatrix} \begin{pmatrix} e^{j\theta_{11}(4i)} & e^{j(\theta_{11}(4i)+\lambda)} \\ e^{j\theta_{21}(4i)} & e^{j(\theta_{21}(4i)+\lambda+\delta)} \end{pmatrix} \begin{pmatrix} s1(4i) \\ s2(4i) \end{pmatrix}$$

Equation 50

For symbol number 4i+1:

Math 51

$$\begin{pmatrix} r1(4i+1) \\ r2(4i+1) \end{pmatrix} = \frac{1}{\sqrt{2}} \begin{pmatrix} Ae^{j0} & q \\ Ae^{j0} & q \end{pmatrix} \begin{pmatrix} e^{j\theta_{11}(4i+1)} & e^{j(\theta_{11}(4i+1)+\lambda)} \\ e^{j\theta_{21}(4i+1)} & e^{j(\theta_{21}(4i+1)+\lambda+\delta)} \end{pmatrix} \begin{pmatrix} s1(4i+1) \\ s2(4i+1) \end{pmatrix}$$

Equation 51

For symbol number 4i+2:

Math 52

$$\begin{pmatrix} r1(4i+2) \\ r2(4i+2) \end{pmatrix} = \frac{1}{\sqrt{2}} \begin{pmatrix} Ae^{j0} & q \\ Ae^{j0} & q \end{pmatrix} \begin{pmatrix} e^{j\theta_{11}(4i+2)} & e^{j(\theta_{11}(4i+2)+\lambda)} \\ e^{j\theta_{21}(4i+2)} & e^{j(\theta_{21}(4i+2)+\lambda+\delta)} \end{pmatrix} \begin{pmatrix} s1(4i+2) \\ s2(4i+2) \end{pmatrix}$$

Equation 52

For symbol number 4i+3:

Math 53

$$\begin{pmatrix} r1(4i+3) \\ r2(4i+3) \end{pmatrix} = \frac{1}{\sqrt{2}} \begin{pmatrix} Ae^{j0} & q \\ Ae^{j0} & q \end{pmatrix} \begin{pmatrix} e^{j\theta_{11}(4i+3)} & e^{j(\theta_{11}(4i+3)+\lambda)} \\ e^{j\theta_{21}(4i+3)} & e^{j(\theta_{21}(4i+3)+\lambda+\delta)} \end{pmatrix} \begin{pmatrix} s1(4i+3) \\ s2(4i+3) \end{pmatrix}$$

Equation 53

In Equations 50-53, let A be a positive real number and q be a complex number. The values of A and q are determined in accordance with the positional relationship between the transmission device and the reception device. Equations 50-53 can be represented as follows.

For symbol number 4i:

Math 54

$$\begin{pmatrix} r1(4i) \\ r2(4i) \end{pmatrix} = \frac{1}{\sqrt{2}} \begin{pmatrix} e^{j0} \\ e^{j0} \end{pmatrix} (Ae^{j0} \quad q) \begin{pmatrix} e^{j\theta_{11}(4i)} & e^{j(\theta_{11}(4i)+\lambda)} \\ e^{j\theta_{21}(4i)} & e^{j(\theta_{21}(4i)+\lambda+\delta)} \end{pmatrix} \begin{pmatrix} s1(4i) \\ s2(4i) \end{pmatrix}$$

Equation 54

For symbol number 4i+1:

Math 55

$$\begin{pmatrix} r1(4i+1) \\ r2(4i+1) \end{pmatrix} = \frac{1}{\sqrt{2}} \begin{pmatrix} e^{j0} \\ e^{j0} \end{pmatrix} (Ae^{j0} \quad q) \begin{pmatrix} e^{j\theta_{11}(4i+1)} & e^{j(\theta_{11}(4i+1)+\lambda)} \\ e^{j\theta_{21}(4i+1)} & e^{j(\theta_{21}(4i+1)+\lambda+\delta)} \end{pmatrix} \begin{pmatrix} s1(4i+1) \\ s2(4i+1) \end{pmatrix}$$

Equation 55

For symbol number 4i+2:

Math 56

$$\begin{pmatrix} r1(4i+2) \\ r2(4i+2) \end{pmatrix} = \frac{1}{\sqrt{2}} \begin{pmatrix} e^{j0} \\ e^{j0} \end{pmatrix} (Ae^{j0} \quad q) \begin{pmatrix} e^{j\theta_{11}(4i+2)} & e^{j(\theta_{11}(4i+2)+\lambda)} \\ e^{j\theta_{21}(4i+2)} & e^{j(\theta_{21}(4i+2)+\lambda+\delta)} \end{pmatrix} \begin{pmatrix} s1(4i+2) \\ s2(4i+2) \end{pmatrix}$$

Equation 56

For symbol number 4i+3:

Math 57

$$\begin{pmatrix} r1(4i+3) \\ r2(4i+3) \end{pmatrix} = \frac{1}{\sqrt{2}} \begin{pmatrix} e^{j0} \\ e^{j0} \end{pmatrix} (Ae^{j0} \quad q) \begin{pmatrix} e^{j\theta_{11}(4i+3)} & e^{j(\theta_{11}(4i+3)+\lambda)} \\ e^{j\theta_{21}(4i+3)} & e^{j(\theta_{21}(4i+3)+\lambda+\delta)} \end{pmatrix} \begin{pmatrix} s1(4i+3) \\ s2(4i+3) \end{pmatrix}$$

Equation 57

As a result, when q is represented as follows, a signal component based on one of s1 and s2 is no longer included in r1 and r2, and therefore one of the signals s1 and s2 can no longer be obtained.

For symbol number 4i:

Math 58

$$q = -A_e^{j(\theta_{11}(4i)-\theta_{21}(4i))}, -A_e^{j(\theta_{11}(4i)-\theta_{21}(4i)-\delta)}$$

Equation 58

For symbol number 4i+1:

Math 59

$$q = -A_e^{j(\theta_{11}(4i+1)-\theta_{21}(4i+1))}, -A_e^{j(\theta_{11}(4i+1)-\theta_{21}(4i+1)-\delta)}$$

Equation 59

For symbol number 4i+2:

Math 60

$$q = -A_e^{j(\theta_{11}(4i+2)-\theta_{21}(4i+2))}, -A_e^{j(\theta_{11}(4i+2)-\theta_{21}(4i+2)-\delta)}$$

Equation 60

For symbol number 4i+3:

Math 61

$$q = -A_e^{j(\theta_{11}(4i+3)-\theta_{21}(4i+3))}, -A_e^{j(\theta_{11}(4i+3)-\theta_{21}(4i+3)-\delta)}$$

Equation 61

In this case, if q has the same solution in symbol numbers 4i, 4i+1, 4i+2, and 4i+3, then the channel elements of the direct waves do not greatly fluctuate. Therefore, a reception device having channel elements in which the value of q is equivalent to the same solution can no longer obtain excellent reception quality for any of the symbol numbers. Therefore, it is difficult to achieve the ability to correct errors, even if error correction codes are introduced. Accordingly, for q not to have the same solution, the following condition is necessary from Equations 58-61 when focusing on one of two solutions of q which does not include δ.

Math 62

Condition #1

$$e^{j(\theta_{11}(4i+x)-\theta_{21}(4i+x))} \neq e^{j(\theta_{11}(4i+y)-\theta_{21}(4i+y))} \text{ for } \forall x, \forall y$$
$$(x \neq y; x, y = 0,1,2,3)$$

(x is 0, 1, 2, 3; y is 0, 1, 2, 3; and x≠y.)

In an example fulfilling Condition #1, values are set as follows:

Example #1

(1) $\theta_{11}(4i) = \theta_{11}(4i+1) = \theta_{11}(4i+2) = \theta_{11}(4i+3) = 0$ radians,
(2) $\theta_{21}(4i) = 0$ radians,
(3) $\theta_{21}(4i+1) = \pi/2$ radians,
(4) $\theta_{21}(4i+2) = \pi$ radians, and
(5) $\theta_{21}(4i+3) = 3\pi/2$ radians.
(The above is an example. It suffices for one each of zero radians, π/2 radians, π radians, and 37π/2 radians to exist for the set $(\theta_{21}(4i), \theta_{21}(4i+1), \theta_{21}(4i+2), \theta_{21}(4i+3))$.) In this case, in particular under condition (1), there is no need to perform signal processing (rotation processing) on the baseband signal S1($t$), which therefore offers the advantage of a reduction in circuit size. Another example is to set values as follows.

Example #2

(6) $\theta_{11}(4i) = 0$ radians,
(7) $\theta_{11}(4i+1) = \pi/2$ radians,
(8) $\theta_{11}(4i+2) = \pi$ radians,
(9) $\theta_{11}(4i+3) = 37\pi/2$ radians, and
(10) $\theta_{21}(4i) = \theta_{21}(4i+1) = \theta_{21}(4i+2) = \theta_{21}(4i+3) = 0$ radians.
(The above is an example. It suffices for one each of zero radians, π/2 radians, π radians, and 3π/2 radians to exist for the set $(\theta_{11}(4i), \theta_{11}(4i+1), \theta_{11}(4i+2), \theta_{11}(4i+3))$.) In this case, in particular under condition (6), there is no need to perform signal processing (rotation processing) on the baseband signal S2($t$), which therefore offers the advantage of a reduction in circuit size. Yet another example is as follows.

Example #3

(11) $\theta_{11}(4i) = \theta_{11}(4i+1) = \theta_{11}(4i+2) = \theta_{11}(4i+3) = 0$ radians,
(12) $\theta_{21}(4i) = 0$ radians,
(13) $\theta_{21}(4i+1) = \pi/4$ radians,
(14) $\theta_{21}(4i+2) = \pi/2$ radians, and
(15) $\theta_{21}(4i+3) = 3\pi/4$ radians.
(The above is an example. It suffices for one each of zero radians, π/4 radians, π/2 radians, and 3π/4 radians to exist for the set $(\theta_{21}(4i), \theta_{21}(4i+1), \theta_{21}(4i+2), \theta_{21}(4i+3))$.)

Example #4

(16) $\theta_{11}(4i) = 0$ radians,
(17) $\theta_{11}(4i+1) = \pi/4$ radians,
(18) $\theta_{11}(4i+2) = \pi/2$ radians,
(19) $\theta_{11}(4i+3) = 3\pi/4$ radians, and
(20) $\theta_{21}(4i) = \theta_{21}(4i+1) = \theta_{21}(4i+2) = \theta_{21}(4i+3) = 0$ radians.
(The above is an example. It suffices for one each of zero radians, π/4 radians, π/2 radians, and 3π/4 radians to exist for the set $(\theta_{11}(4i), \theta_{11}(4i+1), \theta_{11}(4i+2), \theta_{11}(4i+3))$.)

While four examples have been shown, the method of satisfying Condition #1 is not limited to these examples.

Next, design requirements for not only $\theta_{11}$ and $\theta_{12}$, but also for λ and δ are described. It suffices to set λ to a certain value; it is then necessary to establish requirements for δ. The following describes the design method for δ when λ is set to zero radians.

In this case, by defining δ so that π/2 radians≤|δ|≤π radians, excellent reception quality is achieved, particularly in an LOS environment.

Incidentally, for each of the symbol numbers 4i, 4i+1, 4i+2, and 4i+3, two points q exist where reception quality becomes poor. Therefore, a total of 2×4=8 such points exist. In an LOS environment, in order to prevent reception quality from degrading in a specific reception terminal, these eight points should each have a different solution. In this case, in addition to Condition #1, Condition #2 is necessary.

Math 63

$$e^{j(\theta_{11}(4i+x)-\theta_{21}(4i+x))} \neq e^{j(\theta_{11}(4i+y)-\theta_{21}(4i+y)-\delta)} \text{ for } \forall x, \forall y (x, y=0,1,2,3)$$

and $$e^{j(\theta_{11}(4i+x)-\theta_{21}(4i+x)-\delta)} \neq e^{j(\theta_{11}(4i+y)-\theta_{21}(4i+y)-\delta)} \text{ for } \forall x, \forall y$$
$(x \neq y; x, y=0,1,2,3)$  Condition #2

Additionally, the phase of these eight points should be evenly distributed (since the phase of a direct wave is considered to have a high probability of even distribution). The following describes the design method for δ to satisfy this requirement.

Figure 21:
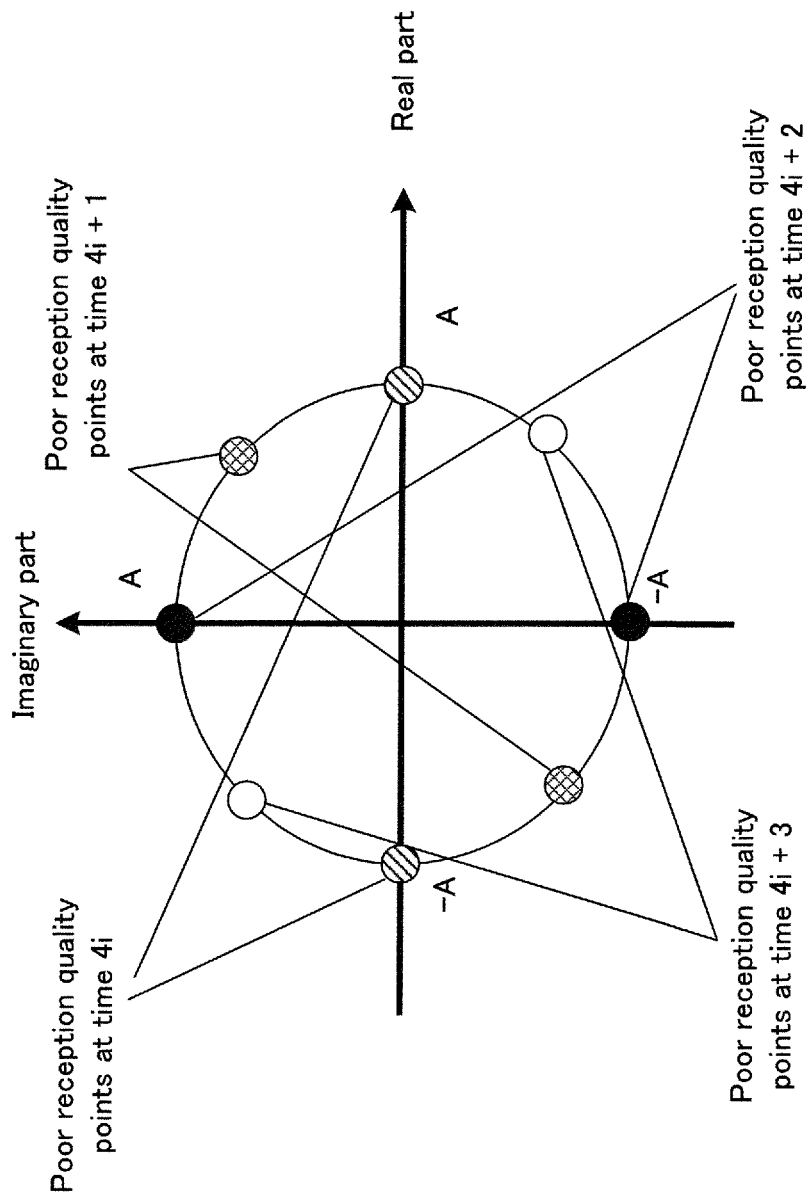
FIG. 21 shows positions of poor reception quality points.

In the case of example #1 and example #2, the phase becomes even at the points at which reception quality is poor by setting δ to ±3π/4 radians. For example, letting δ be 3π/4 radians in example #1 (and letting A be a positive real number), then each of the four slots, points at which reception quality becomes poor exist once, as shown in FIG. 20. In the case of example #3 and example #4, the phase becomes even at the points at which reception quality is poor by setting δ to ±π radians. For example, letting δ be π radians in example #3, then in each of the four slots, points at which reception quality becomes poor exist once, as shown in FIG. 21. (If the element q in the channel matrix H exists at the points shown in FIGS. 20 and 21, reception quality degrades.)

With the above structure, excellent reception quality is achieved in an LOS environment. Above, an example of changing precoding weights in a four-slot period (cycle) is described, but below, changing precoding weights in an N-slot period (cycle) is described. Making the same considerations as in Embodiment 1 and in the above description, processing represented as below is performed on each symbol number.

For symbol number Ni (where i is an integer greater than or equal to zero):

Math 64

$$\begin{pmatrix} z1(Ni) \\ z2(Ni) \end{pmatrix} = \frac{1}{\sqrt{2}} \begin{pmatrix} e^{j\theta_{11}(Ni)} & e^{j(\theta_{11}(Ni)+\lambda)} \\ e^{j\theta_{21}(Ni)} & e^{j(\theta_{21}(Ni)+\lambda+\delta)} \end{pmatrix} \begin{pmatrix} s1(Ni) \\ s2(Ni) \end{pmatrix} \quad \text{Equation 62}$$

Here, j is an imaginary unit.
For symbol number Ni+1:

$$\begin{pmatrix} z1(Ni+1) \\ z2(Ni+1) \end{pmatrix} = \quad \text{Equation 63}$$

$$\frac{1}{\sqrt{2}} \begin{pmatrix} e^{j\theta_{11}(Ni+1)} & e^{j(\theta_{11}(Ni+1)+\lambda)} \\ e^{j\theta_{21}(Ni+1)} & e^{j(\theta_{21}(Ni+1)+\lambda+\delta)} \end{pmatrix} \begin{pmatrix} s1(Ni+1) \\ s2(Ni+1) \end{pmatrix}$$

When generalized, this equation is as follows.
For symbol number Ni+k (k=0, 1, ..., N−1):

Math 66

$$\begin{pmatrix} z1(Ni+k) \\ z2(Ni+k) \end{pmatrix} = \quad \text{Equation 64}$$

$$\frac{1}{\sqrt{2}} \begin{pmatrix} e^{j\theta_{11}(Ni+k)} & e^{j(\theta_{11}(Ni+k)+\lambda)} \\ e^{j\theta_{21}(Ni+k)} & e^{j(\theta_{21}(Ni+k)+\lambda+\delta)} \end{pmatrix} \begin{pmatrix} s1(Ni+k) \\ s2(Ni+k) \end{pmatrix}$$

Furthermore, for symbol number Ni+N−1:

Math 67

$$\begin{pmatrix} z1(Ni+N-1) \\ z2(Ni+N-1) \end{pmatrix} = \quad \text{Equation 65}$$

$$\frac{1}{\sqrt{2}} \begin{pmatrix} e^{j\theta_{11}(Ni+N-1)} & e^{j(\theta_{11}(Ni+N-1)+\lambda)} \\ e^{j\theta_{21}(Ni+N-1)} & e^{j(\theta_{21}(Ni+N-1)+\lambda+\delta)} \end{pmatrix} \begin{pmatrix} s1(Ni+N-1) \\ s2(Ni+N-1) \end{pmatrix}$$

Accordingly, r1 and r2 are represented as follows.
For symbol number Ni (where i is an integer greater than or equal to zero):

Math 68

$$\begin{pmatrix} r1(Ni) \\ r2(Ni) \end{pmatrix} = \quad \text{Equation 66}$$

$$\frac{1}{\sqrt{2}} \begin{pmatrix} h_{11}(Ni) & h_{12}(Ni) \\ h_{21}(Ni) & h_{22}(Ni) \end{pmatrix} \begin{pmatrix} e^{j\theta_{11}(Ni)} & e^{j(\theta_{11}(Ni)+\lambda)} \\ e^{j\theta_{21}(Ni)} & e^{j(\theta_{21}(Ni)+\lambda+\delta)} \end{pmatrix} \begin{pmatrix} s1(Ni) \\ s2(Ni) \end{pmatrix}$$

Here, j is an imaginary unit.
For symbol number Ni+1:

Math 69

$$\begin{pmatrix} r1(Ni+1) \\ r2(Ni+1) \end{pmatrix} = \frac{1}{\sqrt{2}} \begin{pmatrix} h_{11}(Ni+1) & h_{12}(Ni+1) \\ h_{21}(Ni+1) & h_{22}(Ni+1) \end{pmatrix} \quad \text{Equation 67}$$

$$\begin{pmatrix} e^{j\theta_{11}(Ni+1)} & e^{j(\theta_{11}(Ni+1)+\lambda)} \\ e^{j\theta_{21}(Ni+1)} & e^{j(\theta_{21}(Ni+1)+\lambda+\delta)} \end{pmatrix} \begin{pmatrix} s1(Ni+1) \\ s2(Ni+1) \end{pmatrix}$$

When generalized, this equation is as follows.
For symbol number Ni+k (k=0, 1, ..., N−1):

Math 70

$$\begin{pmatrix} r1(Ni+k) \\ r2(Ni+k) \end{pmatrix} = \frac{1}{\sqrt{2}} \begin{pmatrix} h_{11}(Ni+k) & h_{12}(Ni+k) \\ h_{21}(Ni+k) & h_{22}(Ni+k) \end{pmatrix} \quad \text{Equation 68}$$

$$\begin{pmatrix} e^{j\theta_{11}(Ni+k)} & e^{j(\theta_{11}(Ni+k)+\lambda)} \\ e^{j\theta_{21}(Ni+k)} & e^{j(\theta_{21}(Ni+k)+\lambda+\delta)} \end{pmatrix} \begin{pmatrix} s1(Ni+k) \\ s2(Ni+k) \end{pmatrix}$$

Furthermore, for symbol number Ni+N−1:

$$\begin{pmatrix} r1(Ni+N-1) \\ r2(Ni+N-1) \end{pmatrix} = \frac{1}{\sqrt{2}} \begin{pmatrix} h_{11}(Ni+N-1) & h_{12}(Ni+N-1) \\ h_{21}(Ni+N-1) & h_{22}(Ni+N-1) \end{pmatrix} \quad \text{Equation 69}$$

$$\begin{pmatrix} e^{j\theta_{11}(Ni+N-1)} & e^{j(\theta_{11}(Ni+N-1)+\lambda)} \\ e^{j\theta_{21}(Ni+N-1)} & e^{j(\theta_{21}(Ni+N-1)+\lambda+\delta)} \end{pmatrix} \begin{pmatrix} s1(Ni+N-1) \\ s2(Ni+N-1) \end{pmatrix}$$

In this case, it is assumed that only components of direct waves exist in the channel elements $h_{11}(t)$, $h_{12}(t)$, $h_{21}(t)$, and $h_{22}(t)$, that the amplitude components of the direct waves are all equal, and that fluctuations do not occur over time. With these assumptions, Equations 66-69 can be represented as follows.

For symbol number Ni (where i is an integer greater than or equal to zero):

Math 72

$$\begin{pmatrix} r1(Ni) \\ r2(Ni) \end{pmatrix} = \frac{1}{\sqrt{2}} \begin{pmatrix} Ae^{j0} & q \\ Ae^{j0} & q \end{pmatrix} \begin{pmatrix} e^{j\theta_{11}(Ni)} & e^{j(\theta_{11}(Ni)+\lambda)} \\ e^{j\theta_{21}(Ni)} & e^{j(\theta_{21}(Ni)+\lambda+\delta)} \end{pmatrix} \begin{pmatrix} s1(Ni) \\ s2(Ni) \end{pmatrix}$$

Equation 70

Here, j is an imaginary unit.
For symbol number Ni+1:

Math 73

$$\begin{pmatrix} r1(Ni+1) \\ r2(Ni+1) \end{pmatrix} = \frac{1}{\sqrt{2}} \begin{pmatrix} Ae^{j0} & q \\ Ae^{j0} & q \end{pmatrix} \begin{pmatrix} e^{j\theta_{11}(Ni+1)} & e^{j(\theta_{11}(Ni+1)+\lambda)} \\ e^{j\theta_{21}(Ni+1)} & e^{j(\theta_{21}(Ni+1)+\lambda+\delta)} \end{pmatrix} \begin{pmatrix} s1(Ni+1) \\ s2(Ni+1) \end{pmatrix}$$

Equation 71

When generalized, this equation is as follows.
For symbol number Ni+k (k=0, 1, . . . , N−1):

Math 74

$$\begin{pmatrix} r1(Ni+k) \\ r2(Ni+k) \end{pmatrix} = \frac{1}{\sqrt{2}} \begin{pmatrix} Ae^{j0} & q \\ Ae^{j0} & q \end{pmatrix} \begin{pmatrix} e^{j\theta_{11}(Ni+k)} & e^{j(\theta_{11}(Ni+k)+\lambda)} \\ e^{j\theta_{21}(Ni+k)} & e^{j(\theta_{21}(Ni+k)+\lambda+\delta)} \end{pmatrix} \begin{pmatrix} s1(Ni+k) \\ s2(Ni+k) \end{pmatrix}$$

Equation 72

Furthermore, for symbol number Ni+N−1:

Math 75

$$\begin{pmatrix} r1(Ni+N-1) \\ r2(Ni+N-1) \end{pmatrix} = \frac{1}{\sqrt{2}} \begin{pmatrix} Ae^{j0} & q \\ Ae^{j0} & q \end{pmatrix} \begin{pmatrix} e^{j\theta_{11}(Ni+N-1)} & e^{j(\theta_{11}(Ni+N-1)+\lambda)} \\ e^{j\theta_{21}(Ni+N-1)} & e^{j(\theta_{21}(Ni+N-1)+\lambda+\delta)} \end{pmatrix} \begin{pmatrix} s1(Ni+N-1) \\ s2(Ni+N-1) \end{pmatrix}$$

Equation 73

In Equations 70-73, let A be a real number and q be a complex number. The values of A and q are determined in accordance with the positional relationship between the transmission device and the reception device. Equations 70-73 can be represented as follows.

For symbol number Ni (where i is an integer greater than or equal to zero):

Math 76

$$\begin{pmatrix} r1(Ni) \\ r2(Ni) \end{pmatrix} = \frac{1}{\sqrt{2}} \begin{pmatrix} e^{j0} \\ e^{j0} \end{pmatrix} \begin{pmatrix} Ae^{j0} & q \end{pmatrix} \begin{pmatrix} e^{j\theta_{11}(Ni)} & e^{j(\theta_{11}(Ni)+\lambda)} \\ e^{j\theta_{21}(Ni)} & e^{j(\theta_{21}(Ni)+\lambda+\delta)} \end{pmatrix} \begin{pmatrix} s1(Ni) \\ s2(Ni) \end{pmatrix}$$

Equation 74

Here, j is an imaginary unit.
For symbol number Ni+1:

Math 77

$$\begin{pmatrix} r1(Ni+1) \\ r2(Ni+1) \end{pmatrix} = \frac{1}{\sqrt{2}} \begin{pmatrix} e^{j0} \\ e^{j0} \end{pmatrix} \begin{pmatrix} Ae^{j0} & q \end{pmatrix}$$
$$\begin{pmatrix} e^{j\theta_{11}(Ni+1)} & e^{j(\theta_{11}(Ni+1)+\lambda)} \\ e^{j\theta_{21}(Ni+1)} & e^{j(\theta_{21}(Ni+1)+\lambda+\delta)} \end{pmatrix} \begin{pmatrix} s1(Ni+1) \\ s2(Ni+1) \end{pmatrix}$$

Equation 75

When generalized, this equation is as follows.
For symbol number Ni+k (k=0, 1, . . . , N−1):

Math 78

$$\begin{pmatrix} r1(Ni+k) \\ r2(Ni+k) \end{pmatrix} = \frac{1}{\sqrt{2}} \begin{pmatrix} e^{j0} \\ e^{j0} \end{pmatrix} \begin{pmatrix} Ae^{j0} & q \end{pmatrix}$$
$$\begin{pmatrix} e^{j\theta_{11}(Ni+k)} & e^{j(\theta_{11}(Ni+k)+\lambda)} \\ e^{j\theta_{21}(Ni+k)} & e^{j(\theta_{21}(Ni+k)+\lambda+\delta)} \end{pmatrix} \begin{pmatrix} s1(Ni+k) \\ s2(Ni+k) \end{pmatrix}$$

Equation 76

Furthermore, for symbol number Ni+N−1:

Math 79

$$\begin{pmatrix} r1(Ni+N-1) \\ r2(Ni+N-1) \end{pmatrix} = \frac{1}{\sqrt{2}} \begin{pmatrix} e^{j0} \\ e^{j0} \end{pmatrix} \begin{pmatrix} Ae^{j0} & q \end{pmatrix}$$
$$\begin{pmatrix} e^{j\theta_{11}(Ni+N-1)} & e^{j(\theta_{11}(Ni+N-1)+\lambda)} \\ e^{j\theta_{21}(Ni+N-1)} & e^{j(\theta_{21}(Ni+N-1)+\lambda+\delta)} \end{pmatrix} \begin{pmatrix} s1(Ni+N-1) \\ s2(Ni+N-1) \end{pmatrix}$$

Equation 77

As a result, when q is represented as follows, a signal component based on one of s1 and s2 is no longer included in r1 and r2, and therefore one of the signals s1 and s2 can no longer be obtained.

For symbol number Ni (where i is an integer greater than or equal to zero):

Math 80

$$q = -A e^{j(\theta_{11}(Ni) - \theta_{21}(Ni))}, -A e^{j(\theta_{11}(Ni) - \theta_{21}(Ni) - \delta)}$$

Equation 78

For symbol number Ni+1:

Math 81

$$q = -A e^{j(\theta_{11}(Ni+1) - \theta_{21}(Ni+1))}, -A e^{j(\theta_{11}(Ni+1) - \theta_{21}(Ni+1) - \delta)}$$

Equation 79

When generalized, this equation is as follows.
For symbol number Ni+k (k=0, 1, . . . , N−1):

Math 82

$$q = -A e^{j(\theta_{11}(Ni+k) - \theta_{21}(Ni+k))}, -A e^{j(\theta_{11}(Ni+k) - \theta_{21}(Ni+k) - \delta)}$$

Equation 80

Furthermore, for symbol number Ni+N−1:

Math 83

$$q = -A_e^{j(\theta_{11}(Ni+N-1)-\theta_{21}(Ni+N-1))} - A_e^{j(\theta_{11}(Ni+N-1)-\theta_{21}(Ni+N-1)-\delta)} \quad \text{Equation 81}$$

In this case, if q has the same solution in symbol numbers Ni through Ni+N−1, then since the channel elements of the direct waves do not greatly fluctuate, a reception device having channel elements in which the value of q is equivalent to this same solution can no longer obtain excellent reception quality for any of the symbol numbers. Therefore, it is difficult to achieve the ability to correct errors, even if error correction codes are introduced. Accordingly, for q not to have the same solution, the following condition is necessary from Equations 78-81 when focusing on one of two solutions of q which does not include δ.

Math 84

$$e^{j(\theta_{11}(Ni+x)-\theta_{21}(Ni+x))} \neq e^{j(\theta_{11}(Ni+y)-\theta_{21}(Ni+y))} \text{ for } \forall x, \forall y$$
$$(x \neq y; x, y = 0, 1, 2, \ldots, N-2, N-1) \quad \text{Condition \#3}$$

(x is 0, 1, 2, ..., N−2, N−1; y is 0, 1, 2, ..., N−2, N−1; and x≠y.)

Next, design requirements for not only $\theta_{11}$ and $\theta_{12}$, but also for λ and δ are described. It suffices to set λ to a certain value; it is then necessary to establish requirements for δ. The following describes the design method for δ when λ is set to zero radians.

In this case, similar to the method of changing the precoding weights in a four-slot period (cycle), by defining δ so that π/2 radians≤|δ|≤π radians, excellent reception quality is achieved, particularly in an LOS environment.

In each symbol number Ni through Ni+N−1, two points labeled q exist where reception quality becomes poor, and therefore 2N such points exist. In an LOS environment, in order to achieve excellent characteristics, these 2N points should each have a different solution. In this case, in addition to Condition #3, Condition #4 is necessary.

Math 85

Condition #4

$$e^{j(\theta_{11}(Ni+x)-\theta_{21}(Ni+x))} \neq e^{j(\theta_{11}(Ni+y)-\theta_{21}(Ni+y)-\delta)} \text{ for } \forall x, \forall y$$
$$(x, y = 0, 1, 2, \ldots, N-2, N-1)$$

and $$e^{j(\theta_{11}(Ni+x)-\theta_{21}(Ni+x)-\delta)} \neq e^{j(\theta_{11}(Ni+y)-\theta_{21}(Ni+y)-\delta)} \text{ for }$$
$$\forall x, \forall y (x \neq y; x, y = 0, 1, 2, \ldots, N-2, N-1)$$

Additionally, the phase of these 2N points should be evenly distributed (since the phase of a direct wave at each reception device is considered to have a high probability of even distribution).

As described above, when a transmission device transmits a plurality of modulated signals from a plurality of antennas in a MIMO system, the advantageous effect of improved transmission quality, as compared to conventional spatial multiplexing MIMO, is achieved in an LOS environment in which direct waves dominate by hopping between precoding weights regularly over time.

In the present embodiment, the structure of the reception device is as described in Embodiment 1, and in particular with regards to the structure of the reception device, operations have been described for a limited number of antennas, but the present invention may be embodied in the same way even if the number of antennas increases. In other words, the number of antennas in the reception device does not affect the operations or advantageous effects of the present embodiment. Furthermore, in the present embodiment, similar to Embodiment 1, the error correction codes are not limited.

In the present embodiment, in contrast with Embodiment 1, the method of changing the precoding weights in the time domain has been described. As described in Embodiment 1, however, the present invention may be similarly embodied by changing the precoding weights by using a multi-carrier transmission method and arranging symbols in the frequency domain and the frequency-time domain. Furthermore, in the present embodiment, symbols other than data symbols, such as pilot symbols (preamble, unique word, and the like), symbols for control information, and the like, may be arranged in the frame in any way.

Embodiment 3

In Embodiment 1 and Embodiment 2, the method of regularly hopping between precoding weights has been described for the case where the amplitude of each element in the precoding weight matrix is equivalent. In the present embodiment, however, an example that does not satisfy this condition is described.

For the sake of contrast with Embodiment 2, the case of changing precoding weights over an N-slot period (cycle) is described. Making the same considerations as in Embodiment 1 and Embodiment 2, processing represented as below is performed on each symbol number. Let β be a positive real number, and β≠1. For symbol number Ni (where i is an integer greater than or equal to zero):

Math 86

$$\begin{pmatrix} z1(Ni) \\ z2(Ni) \end{pmatrix} = \frac{1}{\sqrt{\beta^2+1}} \begin{pmatrix} e^{j\theta_{11}(Ni)} & \beta \times e^{j(\theta_{11}(Ni)+\lambda)} \\ \beta \times e^{j\theta_{21}(Ni)} & e^{j(\theta_{21}(Ni)+\lambda+\delta)} \end{pmatrix} \begin{pmatrix} s1(Ni) \\ s2(Ni) \end{pmatrix} \quad \text{Equation 82}$$

Here, j is an imaginary unit.
For symbol number Ni+1:

Math 87

$$\begin{pmatrix} z1(Ni+1) \\ z2(Ni+1) \end{pmatrix} = \frac{1}{\sqrt{\beta^2+1}} \begin{pmatrix} e^{j\theta_{11}(Ni+1)} & \beta \times e^{j(\theta_{11}(Ni+1)+\lambda)} \\ \beta \times e^{j\theta_{21}(Ni+1)} & e^{j(\theta_{21}(Ni+1)+\lambda+\delta)} \end{pmatrix} \begin{pmatrix} s1(Ni+1) \\ s2(Ni+1) \end{pmatrix} \quad \text{Equation 83}$$

When generalized, this equation is as follows.
For symbol number Ni+k (k=0, 1, ..., N−1):

Math 88

$$\begin{pmatrix} z1(Ni+k) \\ z2(Ni+k) \end{pmatrix} = \frac{1}{\sqrt{\beta^2+1}} \begin{pmatrix} e^{j\theta_{11}(Ni+k)} & \beta \times e^{j(\theta_{11}(Ni+k)+\lambda)} \\ \beta \times e^{j\theta_{21}(Ni+k)} & e^{j(\theta_{21}(Ni+k)+\lambda+\delta)} \end{pmatrix} \begin{pmatrix} s1(Ni+k) \\ s2(Ni+k) \end{pmatrix} \quad \text{Equation 84}$$

Furthermore, for symbol number Ni+N−1:

Math 89

$$\begin{pmatrix} z1(Ni+N-1) \\ z2(Ni+N-1) \end{pmatrix} = \qquad \text{Equation 85}$$

$$\frac{1}{\sqrt{\beta^2+1}} \begin{pmatrix} e^{j\theta_{11}(Ni+N-1)} & \beta \times e^{j(\theta_{11}(Ni+N-1)+\lambda)} \\ \beta \times e^{j\theta_{21}(Ni+N-1)} & e^{j(\theta_{21}(Ni+N-1)+\lambda+\delta)} \end{pmatrix}$$

$$\begin{pmatrix} s1(Ni+N-1) \\ s2(Ni+N-1) \end{pmatrix}$$

Accordingly, r1 and r2 are represented as follows.
For symbol number Ni (where i is an integer greater than or equal to zero):

Math 90

$$\begin{pmatrix} r1(Ni) \\ r2(Ni) \end{pmatrix} = \frac{1}{\sqrt{\beta^2+1}} \begin{pmatrix} h_{11}(Ni) & h_{12}(Ni) \\ h_{21}(Ni) & h_{22}(Ni) \end{pmatrix} \qquad \text{Equation 86}$$

$$\begin{pmatrix} e^{j\theta_{11}(Ni)} & \beta \times e^{j(\theta_{11}(Ni)+\lambda)} \\ \beta \times e^{j\theta_{21}(Ni)} & e^{j(\theta_{21}(Ni)+\lambda+\delta)} \end{pmatrix} \begin{pmatrix} s1(Ni) \\ s2(Ni) \end{pmatrix}$$

Here, j is an imaginary unit.
For symbol number Ni+1:

$$\begin{pmatrix} r1(Ni+1) \\ r2(Ni+1) \end{pmatrix} = \frac{1}{\sqrt{\beta^2+1}} \begin{pmatrix} h_{11}(Ni+1) & h_{12}(Ni+1) \\ h_{21}(Ni+1) & h_{22}(Ni+1) \end{pmatrix} \qquad \text{Equation 87}$$

$$\begin{pmatrix} e^{j\theta_{11}(Ni+1)} & \beta \times e^{j(\theta_{11}(Ni+1)+\lambda)} \\ \beta \times e^{j\theta_{21}(Ni+1)} & e^{j(\theta_{21}(Ni+1)+\lambda+\delta)} \end{pmatrix} \begin{pmatrix} s1(Ni+1) \\ s2(Ni+1) \end{pmatrix}$$

When generalized, this equation is as follows.
For symbol number Ni+k (k=0, 1, . . . , N−1):

Math 92

$$\begin{pmatrix} r1(Ni+k) \\ r2(Ni+k) \end{pmatrix} = \frac{1}{\sqrt{\beta^2+1}} \begin{pmatrix} h_{11}(Ni+k) & h_{12}(Ni+k) \\ h_{21}(Ni+k) & h_{22}(Ni+k) \end{pmatrix} \qquad \text{Equation 88}$$

$$\begin{pmatrix} e^{j\theta_{11}(Ni+k)} & \beta \times e^{j(\theta_{11}(Ni+k)+\lambda)} \\ \beta \times e^{j\theta_{21}(Ni+k)} & e^{j(\theta_{21}(Ni+k)+\lambda+\delta)} \end{pmatrix} \begin{pmatrix} s1(Ni+k) \\ s2(Ni+k) \end{pmatrix}$$

When generalized, this equation is as follows.
For symbol number Ni+N−1:

Math 93

$$\begin{pmatrix} r1(Ni+N-1) \\ r2(Ni+N-1) \end{pmatrix} = \qquad \text{Equation 89}$$

$$\frac{1}{\sqrt{\beta^2+1}} \begin{pmatrix} h_{11}(Ni+N-1) & h_{12}(Ni+N-1) \\ h_{21}(Ni+N-1) & h_{22}(Ni+N-1) \end{pmatrix}$$

$$\begin{pmatrix} e^{j\theta_{11}(Ni+N-1)} & \beta \times e^{j(\theta_{11}(Ni+N-1)+\lambda)} \\ \beta \times e^{j\theta_{21}(Ni+N-1)} & e^{j(\theta_{21}(Ni+N-1)+\lambda+\delta)} \end{pmatrix}$$

$$\begin{pmatrix} s1(Ni+N-1) \\ s2(Ni+N-1) \end{pmatrix}$$

In this case, it is assumed that only components of direct waves exist in the channel elements $h_{11}(t)$, $h_{12}(t)$, $h_{21}(t)$, and $h_{22}(t)$, that the amplitude components of the direct waves are all equal, and that fluctuations do not occur over time. With these assumptions, Equations 86-89 can be represented as follows.

For symbol number Ni (where i is an integer greater than or equal to zero):

Math 94

$$\begin{pmatrix} r1(Ni) \\ r2(Ni) \end{pmatrix} = \frac{1}{\sqrt{\beta^2+1}} \begin{pmatrix} Ae^{j0} & q \\ Ae^{j0} & q \end{pmatrix} \qquad \text{Equation 90}$$

$$\begin{pmatrix} e^{j\theta_{11}(Ni)} & \beta \times e^{j(\theta_{11}(Ni)+\lambda)} \\ \beta \times e^{j\theta_{21}(Ni)} & e^{j(\theta_{21}(Ni)+\lambda+\delta)} \end{pmatrix} \begin{pmatrix} s1(Ni) \\ s2(Ni) \end{pmatrix}$$

Here, j is an imaginary unit.
For symbol number Ni+1:

Math 95

$$\begin{pmatrix} r1(Ni+1) \\ r2(Ni+1) \end{pmatrix} = \frac{1}{\sqrt{\beta^2+1}} \begin{pmatrix} Ae^{j0} & q \\ Ae^{j0} & q \end{pmatrix} \qquad \text{Equation 91}$$

$$\begin{pmatrix} e^{j\theta_{11}(Ni+1)} & \beta \times e^{j(\theta_{11}(Ni+1)+\lambda)} \\ \beta \times e^{j\theta_{21}(Ni+1)} & e^{j(\theta_{21}(Ni+1)+\lambda+\delta)} \end{pmatrix} \begin{pmatrix} s1(Ni+1) \\ s2(Ni+1) \end{pmatrix}$$

When generalized, this equation is as follows.
For symbol number Ni+k (k=0, 1, . . . , N−1):

Math 96

$$\begin{pmatrix} r1(Ni+k) \\ r2(Ni+k) \end{pmatrix} = \frac{1}{\sqrt{\beta^2+1}} \begin{pmatrix} Ae^{j0} & q \\ Ae^{j0} & q \end{pmatrix} \qquad \text{Equation 92}$$

$$\begin{pmatrix} e^{j\theta_{11}(Ni+k)} & \beta \times e^{j(\theta_{11}(Ni+k)+\lambda)} \\ \beta \times e^{j\theta_{21}(Ni+k)} & e^{j(\theta_{21}(Ni+k)+\lambda+\delta)} \end{pmatrix} \begin{pmatrix} s1(Ni+k) \\ s2(Ni+k) \end{pmatrix}$$

Furthermore, for symbol number Ni+N−1:

Math 97

$$\begin{pmatrix} r1(Ni+N-1) \\ r2(Ni+N-1) \end{pmatrix} = \frac{1}{\sqrt{\beta^2+1}} \begin{pmatrix} Ae^{j0} & q \\ Ae^{j0} & q \end{pmatrix} \qquad \text{Equation 93}$$

$$\begin{pmatrix} e^{j\theta_{11}(Ni+N-1)} & \beta \times e^{j(\theta_{11}(Ni+N-1)+\lambda)} \\ \beta \times e^{j\theta_{21}(Ni+N-1)} & e^{j(\theta_{21}(Ni+N-1)+\lambda+\delta)} \end{pmatrix}$$

$$\begin{pmatrix} s1(Ni+N-1) \\ s2(Ni+N-1) \end{pmatrix}$$

In Equations 90-93, let A be a real number and q be a complex number. Equations 90-93 can be represented as follows.

For symbol number Ni (where i is an integer greater than or equal to zero):

Math 98

$$\begin{pmatrix} r1(Ni) \\ r2(Ni) \end{pmatrix} = \frac{1}{\sqrt{\beta^2+1}} \begin{pmatrix} e^{j0} \\ e^{j0} \end{pmatrix} (Ae^{j0} \quad q)$$
$$\begin{pmatrix} e^{j\theta_{11}(Ni)} & \beta \times e^{j(\theta_{11}(Ni)+\lambda)} \\ \beta \times e^{j\theta_{21}(Ni)} & e^{j(\theta_{21}(Ni)+\lambda+\delta)} \end{pmatrix} \begin{pmatrix} s1(Ni) \\ s2(Ni) \end{pmatrix}$$

Equation 94

Here, j is an imaginary unit.
For symbol number Ni+1:

Math 99

$$\begin{pmatrix} r1(Ni+1) \\ r2(Ni+1) \end{pmatrix} = \frac{1}{\sqrt{\beta^2+1}} \begin{pmatrix} e^{j0} \\ e^{j0} \end{pmatrix} (Ae^{j0} \quad q)$$
$$\begin{pmatrix} e^{j\theta_{11}(Ni+1)} & \beta \times e^{j(\theta_{11}(Ni+1)+\lambda)} \\ \beta \times e^{j\theta_{21}(Ni+1)} & e^{j(\theta_{21}(Ni+1)+\lambda+\delta)} \end{pmatrix} \begin{pmatrix} s1(Ni+1) \\ s2(Ni+1) \end{pmatrix}$$

Equation 95

When generalized, this equation is as follows.
For symbol number Ni+k (k=0, 1, ..., N−1):

Math 100

$$\begin{pmatrix} r1(Ni+k) \\ r2(Ni+k) \end{pmatrix} = \frac{1}{\sqrt{\beta^2+1}} \begin{pmatrix} e^{j0} \\ e^{j0} \end{pmatrix} (Ae^{j0} \quad q)$$
$$\begin{pmatrix} e^{j\theta_{11}(Ni+k)} & \beta \times e^{j(\theta_{11}(Ni+k)+\lambda)} \\ \beta \times e^{j\theta_{21}(Ni+k)} & e^{j(\theta_{21}(Ni+k)+\lambda+\delta)} \end{pmatrix} \begin{pmatrix} s1(Ni+k) \\ s2(Ni+k) \end{pmatrix}$$

Equation 96

Furthermore, for symbol number Ni+N−1:

Math 101

$$\begin{pmatrix} r1(Ni+N-1) \\ r2(Ni+N-1) \end{pmatrix} = \frac{1}{\sqrt{\beta^2+1}} \begin{pmatrix} e^{j0} \\ e^{j0} \end{pmatrix} (Ae^{j0} \quad q)$$
$$\begin{pmatrix} e^{j\theta_{11}(Ni+N-1)} & \beta \times e^{j(\theta_{11}(Ni+N-1)+\lambda)} \\ \beta \times e^{j\theta_{21}(Ni+N-1)} & e^{j(\theta_{21}(Ni+N-1)+\lambda+\delta)} \end{pmatrix}$$
$$\begin{pmatrix} s1(Ni+N-1) \\ s2(Ni+N-1) \end{pmatrix}$$

Equation 97

As a result, when q is represented as follows, one of the signals s1 and s2 can no longer be obtained.
For symbol number Ni (where i is an integer greater than or equal to zero):

Math 102

$$q = -\frac{A}{\beta} e^{j(\theta_{11}(Ni)-\theta_{21}(Ni))}, \quad -A\beta e^{j(\theta_{11}(Ni)-\theta_{21}(Ni)-\delta)}$$

Equation 98

For symbol number Ni+1:

Math 103

$$q = -\frac{A}{\beta} e^{j(\theta_{11}(Ni+1)-\theta_{21}(Ni+1))},$$
$$-A\beta e^{j(\theta_{11}(Ni+1)-\theta_{21}(Ni+1)-\delta)}$$

Equation 99

When generalized, this equation is as follows.
For symbol number Ni+k (k=0, 1, ..., N−1):

Math 104

$$q = -\frac{A}{\beta} e^{j(\theta_{11}(Ni+k)-\theta_{21}(Ni+k))},$$
$$-A\beta e^{j(\theta_{11}(Ni+k)-\theta_{21}(Ni+k)-\delta)}$$

Equation 100

Furthermore, for symbol number Ni+N−1:

Math 105

$$q = -\frac{A}{\beta} e^{j(\theta_{11}(Ni+N-1)-\theta_{21}(Ni+N-1))},$$
$$-A\beta e^{j(\theta_{11}(Ni+N-1)-\theta_{21}(Ni+N-1)-\delta)}$$

Equation 101

In this case, if q has the same solution in symbol numbers Ni through Ni+N−1, then since the channel elements of the direct waves do not greatly fluctuate, excellent reception quality can no longer be obtained for any of the symbol numbers. Therefore, it is difficult to achieve the ability to correct errors, even if error correction codes are introduced. Accordingly, for q not to have the same solution, the following condition is necessary from Equations 98-101 when focusing on one of two solutions of q which does not include δ.

Math 106

$$e^{j(\theta_{11}(Ni+x)-\theta_{21}(Ni+x))} \neq e^{j(\theta_{11}(Ni+y)-\theta_{21}(Ni+y))} \text{ for } \forall x, \forall y$$
$$(x \neq y; x, y = 0, 1, 2, \ldots, N-2, N-1)$$

Condition #5

(x is 0, 1, 2, ..., N−2, N−1; y is 0, 1, 2, ..., N−2, N−1; and x≠y.)

Next, design requirements for not only $\theta_{11}$ and $\theta_{12}$, but also for λ and δ are described. It suffices to set λ to a certain value; it is then necessary to establish requirements for δ. The following describes the design method for δ when λ is set to zero radians.

In this case, similar to the method of changing the precoding weights in a four-slot period (cycle), by defining δ so that π/2 radians≤|δ|≤π radians, excellent reception quality is achieved, particularly in an LOS environment.

In each of symbol numbers Ni through Ni+N−1, two points q exist where reception quality becomes poor, and therefore 2N such points exist. In an LOS environment, in order to achieve excellent characteristics, these 2N points should each have a different solution. In this case, in addition to Condition #5, considering that β is a positive real number, and β≠1, Condition #6 is necessary.

Math 107

Condition #6

$$e^{j(\theta_{11}(Ni+x)-\theta_{21}(Ni+x)-\delta)} \neq e^{j(\theta_{11}(Ni+y)-\theta_{21}(Ni+y)-\delta)} \text{ for}$$
$$\forall x, \forall y (x \neq y; x, y = 0, 1, 2, \ldots, N-2, N-1)$$

As described above, when a transmission device transmits a plurality of modulated signals from a plurality of antennas in a MIMO system, the advantageous effect of improved transmission quality, as compared to conventional spatial multiplexing MIMO system, is achieved in an LOS environment in which direct waves dominate by hopping between precoding weights regularly over time.

In the present embodiment, the structure of the reception device is as described in Embodiment 1, and in particular with regards to the structure of the reception device, operations have been described for a limited number of antennas, but the present invention may be embodied in the same way even if the number of antennas increases. In other words, the number of antennas in the reception device does not affect the operations or advantageous effects of the present embodiment. Furthermore, in the present embodiment, similar to Embodiment 1, the error correction codes are not limited.

In the present embodiment, in contrast with Embodiment 1, the method of changing the precoding weights in the time domain has been described. As described in Embodiment 1, however, the present invention may be similarly embodied by changing the precoding weights by using a multi-carrier transmission method and arranging symbols in the frequency domain and the frequency-time domain. Furthermore, in the present embodiment, symbols other than data symbols, such as pilot symbols (preamble, unique word, and the like), symbols for control information, and the like, may be arranged in the frame in any way.

Embodiment 4

In Embodiment 3, the method of regularly hopping between precoding weights has been described for the example of two types of amplitudes for each element in the precoding weight matrix, 1 and $\beta$.

In this case, the following $$\frac{1}{\sqrt{\beta^2+1}}$$

is ignored.

Next, the example of changing the value of $\beta$ by slot is described. For the sake of contrast with Embodiment 3, the case of changing precoding weights over a 2×N-slot period (cycle) is described.

Making the same considerations as in Embodiment 1, Embodiment 2, and Embodiment 3, processing represented as below is performed on symbol numbers. Let $\beta$ be a positive real number, and $\beta \neq 1$. Furthermore, let $\alpha$ be a positive real number, and $\alpha \neq \beta$.

For symbol number 2Ni (where i is an integer greater than or equal to zero):

Math 109

$$\begin{pmatrix} z1(2Ni) \\ z2(2Ni) \end{pmatrix} = \quad \text{Equation 102}$$

$$\frac{1}{\sqrt{\beta^2+1}} \begin{pmatrix} e^{j\theta_{11}(2Ni)} & \beta \times e^{j(\theta_{11}(2Ni)+\lambda)} \\ \beta \times e^{j\theta_{21}(2Ni)} & e^{j(\theta_{21}(2Ni)+\lambda+\delta)} \end{pmatrix} \begin{pmatrix} s1(2Ni) \\ s2(2Ni) \end{pmatrix}$$

Here, j is an imaginary unit.

For symbol number 2Ni+1:

Math 110

$$\begin{pmatrix} z1(2Ni+1) \\ z2(2Ni+1) \end{pmatrix} = \frac{1}{\sqrt{\beta^2+1}} \quad \text{Equation 103}$$

$$\begin{pmatrix} e^{j\theta_{11}(2Ni+1)} & \beta \times e^{j(\theta_{11}(2Ni+1)+\lambda)} \\ \beta \times e^{j\theta_{21}(2Ni+1)} & e^{j(\theta_{21}(2Ni+1)+\lambda+\delta)} \end{pmatrix} \begin{pmatrix} s1(2Ni+1) \\ s2(2Ni+1) \end{pmatrix}$$

When generalized, this equation is as follows.
For symbol number 2Ni+k (k=0, 1, . . . , N−1):

Math 111

$$\begin{pmatrix} z1(2Ni+k) \\ z2(2Ni+k) \end{pmatrix} = \frac{1}{\sqrt{\beta^2+1}} \quad \text{Equation 104}$$

$$\begin{pmatrix} e^{j\theta_{11}(2Ni+k)} & \beta \times e^{j(\theta_{11}(2Ni+k)+\lambda)} \\ \beta \times e^{j\theta_{21}(2Ni+k)} & e^{j(\theta_{21}(2Ni+k)+\lambda+\delta)} \end{pmatrix} \begin{pmatrix} s1(2Ni+k) \\ s2(2Ni+k) \end{pmatrix}$$

Furthermore, for symbol number 2Ni+N−1:

$$\begin{pmatrix} z1(2Ni+N-1) \\ z2(2Ni+N-1) \end{pmatrix} = \quad \text{Equation 105}$$

$$\frac{1}{\sqrt{\beta^2+1}} \begin{pmatrix} e^{j\theta_{11}(2Ni+N-1)} & \beta \times e^{j(\theta_{11}(2Ni+N-1)+\lambda)} \\ \beta \times e^{j\theta_{21}(2Ni+N-1)} & e^{j(\theta_{21}(2Ni+N-1)+\lambda+\delta)} \end{pmatrix}$$

$$\begin{pmatrix} s1(2Ni+N-1) \\ s2(2Ni+N-1) \end{pmatrix}$$

For symbol number 2Ni+N (where i is an integer greater than or equal to zero):

Math 113

$$\begin{pmatrix} z1(2Ni+N) \\ z2(2Ni+N) \end{pmatrix} = \frac{1}{\sqrt{\alpha^2+1}} \quad \text{Equation 106}$$

$$\begin{pmatrix} e^{j\theta_{11}(2Ni+N)} & \alpha \times e^{j(\theta_{11}(2Ni+N)+\lambda)} \\ \alpha \times e^{j\theta_{21}(2Ni+N)} & e^{j(\theta_{21}(2Ni+N)+\lambda+\delta)} \end{pmatrix} \begin{pmatrix} s1(2Ni+N) \\ s2(2Ni+N) \end{pmatrix}$$

Here, j is an imaginary unit.
For symbol number 2Ni+N+1:

Math 114

$$\begin{pmatrix} z1(2Ni+N+1) \\ z2(2Ni+N+1) \end{pmatrix} = \quad \text{Equation 107}$$

$$\frac{1}{\sqrt{\alpha^2+1}} \begin{pmatrix} e^{j\theta_{11}(2Ni+N+1)} & \alpha \times e^{j(\theta_{11}(2Ni+N+1)+\lambda)} \\ \alpha \times e^{j\theta_{21}(2Ni+N+1)} & e^{j(\theta_{21}(2Ni+N+1)+\lambda+\delta)} \end{pmatrix}$$

$$\begin{pmatrix} s1(2Ni+N+1) \\ s2(2Ni+N+1) \end{pmatrix}$$

When generalized, this equation is as follows.
For symbol number 2Ni+N+k (k=0, 1, . . . , N−1):

$$\begin{pmatrix} z1(2Ni+N+k) \\ z2(2Ni+N+k) \end{pmatrix} = \quad \text{Equation 108}$$

-continued $$\frac{1}{\sqrt{\alpha^2+1}}\begin{pmatrix} e^{j\theta_{11}(2Ni+N+k)} & \alpha \times e^{j(\theta_{11}(2Ni+N+k)+\lambda)} \\ \alpha \times e^{j\theta_{21}(2Ni+N+k)} & e^{j(\theta_{21}(2Ni+N+k)+\lambda+\delta)} \end{pmatrix}$$

$$\begin{pmatrix} s1(2Ni+N+k) \\ s2(2Ni+N+k) \end{pmatrix}$$

Furthermore, for symbol number 2Ni+2N−1:

Math 116

$$\begin{pmatrix} z1(2Ni+2N-1) \\ z2(2Ni+2N-1) \end{pmatrix} = \quad \text{Equation 109}$$

$$\frac{1}{\sqrt{\alpha^2+1}}\begin{pmatrix} e^{j\theta_{11}(2Ni+N-1)} & \alpha \times e^{j(\theta_{11}(2Ni+N-1)+\lambda)} \\ \alpha \times e^{j\theta_{21}(2Ni+N-1)} & e^{j(\theta_{21}(2Ni+N-1)+\lambda+\delta)} \end{pmatrix}$$

$$\begin{pmatrix} s1(2Ni+2N-1) \\ s2(2Ni+2N-1) \end{pmatrix}$$

Accordingly, r1 and r2 are represented as follows.

For symbol number 2Ni (where i is an integer greater than or equal to zero):

Math 117

$$\begin{pmatrix} r1(2Ni) \\ r2(2Ni) \end{pmatrix} = \frac{1}{\sqrt{\beta^2+1}}\begin{pmatrix} h_{11}(2Ni) & h_{12}(2Ni) \\ h_{21}(2Ni) & h_{22}(2Ni) \end{pmatrix} \quad \text{Equation 110}$$

$$\begin{pmatrix} e^{j\theta_{11}(2Ni)} & \beta \times e^{j(\theta_{11}(2Ni)+\lambda)} \\ \beta \times e^{j\theta_{21}(2Ni)} & e^{j(\theta_{21}(2Ni)+\lambda+\delta)} \end{pmatrix}\begin{pmatrix} s1(2Ni) \\ s2(2Ni) \end{pmatrix}$$

Here, j is an imaginary unit.

For symbol number 2Ni+1:

Math 118

$$\begin{pmatrix} r1(2Ni+1) \\ r2(2Ni+1) \end{pmatrix} = \frac{1}{\sqrt{\beta^2+1}}\begin{pmatrix} h_{11}(2Ni+1) & h_{12}(2Ni+1) \\ h_{21}(2Ni+1) & h_{22}(2Ni+1) \end{pmatrix} \quad \text{Equation 111}$$

$$\begin{pmatrix} e^{j\theta_{11}(2Ni+1)} & \beta \times e^{j(\theta_{11}(2Ni+1)+\lambda)} \\ \beta \times e^{j\theta_{21}(2Ni+1)} & e^{j(\theta_{21}(2Ni+1)+\lambda+\delta)} \end{pmatrix}\begin{pmatrix} s1(2Ni+1) \\ s2(2Ni+1) \end{pmatrix}$$

When generalized, this equation is as follows.

For symbol number 2Ni+k (k=0, 1, . . . , N−1):

Math 119

$$\begin{pmatrix} r1(2Ni+k) \\ r2(2Ni+k) \end{pmatrix} = \frac{1}{\sqrt{\beta^2+1}}\begin{pmatrix} h_{11}(2Ni+k) & h_{12}(2Ni+k) \\ h_{21}(2Ni+k) & h_{22}(2Ni+k) \end{pmatrix} \quad \text{Equation 112}$$

$$\begin{pmatrix} e^{j\theta_{11}(2Ni+k)} & \beta \times e^{j(\theta_{11}(2Ni+k)+\lambda)} \\ \beta \times e^{j\theta_{21}(2Ni+k)} & e^{j(\theta_{21}(2Ni+k)+\lambda+\delta)} \end{pmatrix}\begin{pmatrix} s1(2Ni+k) \\ s2(2Ni+k) \end{pmatrix}$$

Furthermore, for symbol number 2Ni+N−1:

Math 120

$$\begin{pmatrix} r1(2Ni+N-1) \\ r2(2Ni+N-1) \end{pmatrix} = \quad \text{Equation 113}$$

$$\frac{1}{\sqrt{\beta^2+1}}\begin{pmatrix} h_{11}(2Ni+N-1) & h_{12}(2Ni+N-1) \\ h_{21}(2Ni+N-1) & h_{22}(2Ni+N-1) \end{pmatrix}$$

$$\begin{pmatrix} e^{j\theta_{11}(2Ni+N-1)} & \beta \times e^{j(\theta_{11}(2Ni+N-1)+\lambda)} \\ \beta \times e^{j\theta_{21}(2Ni+N-1)} & e^{j(\theta_{21}(2Ni+N-1)+\lambda+\delta)} \end{pmatrix}$$

$$\begin{pmatrix} s1(2Ni+N-1) \\ s2(2Ni+N-1) \end{pmatrix}$$

For symbol number 2Ni+N (where i is an integer greater than or equal to zero):

Math 121

$$\begin{pmatrix} r1(2Ni+N) \\ r2(2Ni+N) \end{pmatrix} = \frac{1}{\sqrt{\alpha^2+1}}\begin{pmatrix} h_{11}(2Ni+N) & h_{12}(2Ni+N) \\ h_{21}(2Ni+N) & h_{22}(2Ni+N) \end{pmatrix} \quad \text{Equation 114}$$

$$\begin{pmatrix} e^{j\theta_{11}(2Ni+N)} & \alpha \times e^{j(\theta_{11}(2Ni+N)+\lambda)} \\ \alpha \times e^{j\theta_{21}(2Ni+N)} & e^{j(\theta_{21}(2Ni+N)+\lambda+\delta)} \end{pmatrix}\begin{pmatrix} s1(2Ni+N) \\ s2(2Ni+N) \end{pmatrix}$$

Here, j is an imaginary unit.

For symbol number 2Ni+N+1:

Math 122

$$\begin{pmatrix} r1(2Ni+N+1) \\ r2(2Ni+N+1) \end{pmatrix} = \quad \text{Equation 115}$$

$$\frac{1}{\sqrt{\alpha^2+1}}\begin{pmatrix} h_{11}(2Ni+N+1) & h_{12}(2Ni+N+1) \\ h_{21}(2Ni+N+1) & h_{22}(2Ni+N+1) \end{pmatrix}$$

$$\begin{pmatrix} e^{j\theta_{11}(2Ni+N+1)} & \alpha \times e^{j(\theta_{11}(2Ni+N+1)+\lambda)} \\ \alpha \times e^{j\theta_{21}(2Ni+N+1)} & e^{j(\theta_{21}(2Ni+N+1)+\lambda+\delta)} \end{pmatrix}$$

$$\begin{pmatrix} s1(2Ni+N+1) \\ s2(2Ni+N+1) \end{pmatrix}$$

When generalized, this equation is as follows.

For symbol number 2Ni+N+k (k=0, 1, . . . , N−1):

Math 123

$$\begin{pmatrix} r1(2Ni+N+k) \\ r2(2Ni+N+k) \end{pmatrix} = \quad \text{Equation 116}$$

$$\frac{1}{\sqrt{\alpha^2+1}}\begin{pmatrix} h_{11}(2Ni+N+k) & h_{12}(2Ni+N+k) \\ h_{21}(2Ni+N+k) & h_{22}(2Ni+N+k) \end{pmatrix}$$

$$\begin{pmatrix} e^{j\theta_{11}(2Ni+N+k)} & \alpha \times e^{j(\theta_{11}(2Ni+N+k)+\lambda)} \\ \alpha \times e^{j\theta_{21}(2Ni+N+k)} & e^{j(\theta_{21}(2Ni+N+k)+\lambda+\delta)} \end{pmatrix}$$

$$\begin{pmatrix} s1(2Ni+N+k) \\ s2(2Ni+N+k) \end{pmatrix}$$

For symbol number 2Ni+2N−1:

Math 124

$$\begin{pmatrix} r1(2Ni+2N-1) \\ r2(2Ni+2N-1) \end{pmatrix} = \quad \text{Equation 117}$$

$$\frac{1}{\sqrt{\alpha^2+1}} \begin{pmatrix} h_{11}(2Ni+2N-1) & h_{12}(2Ni+2N-1) \\ h_{21}(2Ni+2N-1) & h_{22}(2Ni+2N-1) \end{pmatrix}$$

$$\begin{pmatrix} e^{j\theta_{11}(2Ni+2N-1)} & \alpha \times e^{j(\theta_{11}(2Ni+2N-1)+\lambda)} \\ \alpha \times e^{j\theta_{21}(2Ni+2N-1)} & e^{j(\theta_{21}(2Ni+2N-1)+\lambda+\delta)} \end{pmatrix}$$

$$\begin{pmatrix} s1(2Ni+2N-1) \\ s2(2Ni+2N-1) \end{pmatrix}$$

In this case, it is assumed that only components of direct waves exist in the channel elements $h_{11}(t)$, $h_{12}(t)$, $h_{21}(t)$, and $h_{22}(t)$, that the amplitude components of the direct waves are all equal, and that fluctuations do not occur over time. With these assumptions, Equations 110-117 can be represented as follows.

For symbol number 2Ni (where i is an integer greater than or equal to zero):

Math 125

$$\begin{pmatrix} r1(2Ni) \\ r2(2Ni) \end{pmatrix} = \frac{1}{\sqrt{\beta^2+1}} \begin{pmatrix} Ae^{j0} & q \\ Ae^{j0} & q \end{pmatrix} \quad \text{Equation 118}$$

$$\begin{pmatrix} e^{j\theta_{11}(2Ni)} & \beta \times e^{j(\theta_{11}(2Ni)+\lambda)} \\ \beta \times e^{j\theta_{21}(2Ni)} & e^{j(\theta_{21}(2Ni)+\lambda+\delta)} \end{pmatrix} \begin{pmatrix} s1(2Ni) \\ s2(2Ni) \end{pmatrix}$$

Here, j is an imaginary unit.
For symbol number 2Ni+1:

Math 126

$$\begin{pmatrix} r1(2Ni+1) \\ r2(2Ni+1) \end{pmatrix} = \frac{1}{\sqrt{\beta^2+1}} \begin{pmatrix} Ae^{j0} & q \\ Ae^{j0} & q \end{pmatrix} \quad \text{Equation 119}$$

$$\begin{pmatrix} e^{j\theta_{11}(2Ni+1)} & \beta \times e^{j(\theta_{11}(2Ni+1)+\lambda)} \\ \beta \times e^{j\theta_{21}(2Ni+1)} & e^{j(\theta_{21}(2Ni+1)+\lambda+\delta)} \end{pmatrix} \begin{pmatrix} s1(2Ni+1) \\ s2(2Ni+1) \end{pmatrix}$$

When generalized, this equation is as follows.
For symbol number 2Ni+k (k=0, 1, ..., N−1):

Math 127

$$\begin{pmatrix} r1(2Ni+k) \\ r2(2Ni+k) \end{pmatrix} = \frac{1}{\sqrt{\beta^2+1}} \begin{pmatrix} Ae^{j0} & q \\ Ae^{j0} & q \end{pmatrix} \quad \text{Equation 120}$$

$$\begin{pmatrix} e^{j\theta_{11}(2Ni+k)} & \beta \times e^{j(\theta_{11}(2Ni+k)+\lambda)} \\ \beta \times e^{j\theta_{21}(2Ni+k)} & e^{j(\theta_{21}(2Ni+k)+\lambda+\delta)} \end{pmatrix} \begin{pmatrix} s1(2Ni+k) \\ s2(2Ni+k) \end{pmatrix}$$

Furthermore, for symbol number 2Ni+N−1:

Math 128

$$\begin{pmatrix} r1(2Ni+N-1) \\ r2(2Ni+N-1) \end{pmatrix} = \frac{1}{\sqrt{\beta^2+1}} \begin{pmatrix} Ae^{j0} & q \\ Ae^{j0} & q \end{pmatrix} \quad \text{Equation 121}$$

$$\begin{pmatrix} e^{j\theta_{11}(2Ni+N-1)} & \beta \times e^{j(\theta_{11}(2Ni+N-1)+\lambda)} \\ \beta \times e^{j\theta_{21}(2Ni+N-1)} & e^{j(\theta_{21}(2Ni+N-1)+\lambda+\delta)} \end{pmatrix}$$

$$\begin{pmatrix} s1(2Ni+N-1) \\ s2(2Ni+N-1) \end{pmatrix}$$

For symbol number 2Ni+N (where i is an integer greater than or equal to zero):

Math 129

$$\begin{pmatrix} r1(2Ni+N) \\ r2(2Ni+N) \end{pmatrix} = \frac{1}{\sqrt{\alpha^2+1}} \begin{pmatrix} Ae^{j0} & q \\ Ae^{j0} & q \end{pmatrix} \quad \text{Equation 122}$$

$$\begin{pmatrix} e^{j\theta_{11}(2Ni+N)} & \alpha \times e^{j(\theta_{11}(2Ni+N)+\lambda)} \\ \alpha \times e^{j\theta_{21}(2Ni+N)} & e^{j(\theta_{21}(2Ni+N)+\lambda+\delta)} \end{pmatrix} \begin{pmatrix} s1(2Ni+N) \\ s2(2Ni+N) \end{pmatrix}$$

Here, j is an imaginary unit.
For symbol number 2Ni+N+1:

Math 130

$$\begin{pmatrix} r1(2Ni+N+1) \\ r2(2Ni+N+1) \end{pmatrix} = \frac{1}{\sqrt{\alpha^2+1}} \begin{pmatrix} Ae^{j0} & q \\ Ae^{j0} & q \end{pmatrix} \quad \text{Equation 123}$$

$$\begin{pmatrix} e^{j\theta_{11}(2Ni+N+1)} & \alpha \times e^{j(\theta_{11}(2Ni+N+1)+\lambda)} \\ \alpha \times e^{j\theta_{21}(2Ni+N+1)} & e^{j(\theta_{21}(2Ni+N+1)+\lambda+\delta)} \end{pmatrix}$$

$$\begin{pmatrix} s1(2Ni+N+1) \\ s2(2Ni+N+1) \end{pmatrix}$$

When generalized, this equation is as follows.
For symbol number 2Ni+N+k (k=0, 1, ..., N−1):

Math 131

$$\begin{pmatrix} r1(2Ni+N+k) \\ r2(2Ni+N+k) \end{pmatrix} = \frac{1}{\sqrt{\alpha^2+1}} \begin{pmatrix} Ae^{j0} & q \\ Ae^{j0} & q \end{pmatrix} \quad \text{Equation 124}$$

$$\begin{pmatrix} e^{j\theta_{11}(2Ni+N+k)} & \alpha \times e^{j(\theta_{11}(2Ni+N+k)+\lambda)} \\ \alpha \times e^{j\theta_{21}(2Ni+N+k)} & e^{j(\theta_{21}(2Ni+N+k)+\lambda+\delta)} \end{pmatrix}$$

$$\begin{pmatrix} s1(2Ni+N+k) \\ s2(2Ni+N+k) \end{pmatrix}$$

Furthermore, for symbol number 2Ni+2N−1:

Math 132

$$\begin{pmatrix} r1(2Ni+2N-1) \\ r2(2Ni+2N-1) \end{pmatrix} = \frac{1}{\sqrt{\alpha^2+1}} \begin{pmatrix} Ae^{j0} & q \\ Ae^{j0} & q \end{pmatrix} \quad \text{Equation 125}$$

$$\begin{pmatrix} e^{j\theta_{11}(2Ni+2N-1)} & \alpha \times e^{j(\theta_{11}(2Ni+2N-1)+\lambda)} \\ \alpha \times e^{j\theta_{21}(2Ni+2N-1)} & e^{j(\theta_{21}(2Ni+2N-1)+\lambda+\delta)} \end{pmatrix}$$

$$\begin{pmatrix} s1(2Ni+2N-1) \\ s2(2Ni+2N-1) \end{pmatrix}$$

In Equations 118-125, let A be a real number and q be a complex number. Equations 118-125 can be represented as follows.

For symbol number 2Ni (where i is an integer greater than or equal to zero):

Math 133

$$\begin{pmatrix} r1(2Ni) \\ r2(2Ni) \end{pmatrix} = \frac{1}{\sqrt{\beta^2+1}} \begin{pmatrix} e^{j0} \\ e^{j0} \end{pmatrix} (Ae^{j0} \quad q)$$

$$\begin{pmatrix} e^{j\theta_{11}(2Ni)} & \beta \times e^{j(\theta_{11}(2Ni)+\lambda)} \\ \beta \times e^{j\theta_{21}(2Ni)} & e^{j(\theta_{21}(2Ni)+\lambda+\delta)} \end{pmatrix} \begin{pmatrix} s1(2Ni) \\ s2(2Ni) \end{pmatrix}$$

Equation 126

Here, j is an imaginary unit.
For symbol number 2Ni+1:

Math 134

$$\begin{pmatrix} r1(2Ni+1) \\ r2(2Ni+1) \end{pmatrix} = \frac{1}{\sqrt{\beta^2+1}} \begin{pmatrix} e^{j0} \\ e^{j0} \end{pmatrix} (Ae^{j0} \quad q)$$

$$\begin{pmatrix} e^{j\theta_{11}(2Ni+1)} & \beta \times e^{j(\theta_{11}(2Ni+1)+\lambda)} \\ \beta \times e^{j\theta_{21}(2Ni+1)} & e^{j(\theta_{21}(2Ni+1)+\lambda+\delta)} \end{pmatrix} \begin{pmatrix} s1(2Ni+1) \\ s2(2Ni+1) \end{pmatrix}$$

Equation 127

When generalized, this equation is as follows.
For symbol number 2Ni+k (k=0, 1, ..., N−1):

Math 135

$$\begin{pmatrix} r1(2Ni+k) \\ r2(2Ni+k) \end{pmatrix} = \frac{1}{\sqrt{\beta^2+1}} \begin{pmatrix} e^{j0} \\ e^{j0} \end{pmatrix} (Ae^{j0} \quad q)$$

$$\begin{pmatrix} e^{j\theta_{11}(2Ni+k)} & \beta \times e^{j(\theta_{11}(2Ni+k)+\lambda)} \\ \beta \times e^{j\theta_{21}(2Ni+k)} & e^{j(\theta_{21}(2Ni+k)+\lambda+\delta)} \end{pmatrix} \begin{pmatrix} s1(2Ni+k) \\ s2(2Ni+k) \end{pmatrix}$$

Equation 128

Furthermore, for symbol number 2Ni+N−1:

Math 136

$$\begin{pmatrix} r1(2Ni+N-1) \\ r2(2Ni+N-1) \end{pmatrix} = \frac{1}{\sqrt{\beta^2+1}} \begin{pmatrix} e^{j0} \\ e^{j0} \end{pmatrix} (Ae^{j0} \quad q)$$

$$\begin{pmatrix} e^{j\theta_{11}(2Ni+N-1)} & \beta \times e^{j(\theta_{11}(2Ni+N-1)+\lambda)} \\ \beta \times e^{j\theta_{21}(2Ni+N-1)} & e^{j(\theta_{21}(2Ni+N-1)+\lambda+\delta)} \end{pmatrix}$$

$$\begin{pmatrix} s1(2Ni+N-1) \\ s2(2Ni+N-1) \end{pmatrix}$$

Equation 129

For symbol number 2Ni+N (where i is an integer greater than or equal to zero):

Math 137

$$\begin{pmatrix} r1(2Ni+N) \\ r2(2Ni+N) \end{pmatrix} = \frac{1}{\sqrt{\alpha^2+1}} \begin{pmatrix} e^{j0} \\ e^{j0} \end{pmatrix} (Ae^{j0} \quad q)$$

$$\begin{pmatrix} e^{j\theta_{11}(2Ni+N)} & \alpha \times e^{j(\theta_{11}(2Ni+N)+\lambda)} \\ \alpha \times e^{j\theta_{21}(2Ni+N)} & e^{j(\theta_{21}(2Ni+N)+\lambda+\delta)} \end{pmatrix} \begin{pmatrix} s1(2Ni+N) \\ s2(2Ni+N) \end{pmatrix}$$

Equation 130

Here, j is an imaginary unit.
For symbol number 2Ni+N+1:

Math 138

$$\begin{pmatrix} r1(2Ni+N+1) \\ r2(2Ni+N+1) \end{pmatrix} = \frac{1}{\sqrt{\alpha^2+1}} \begin{pmatrix} e^{j0} \\ e^{j0} \end{pmatrix} (Ae^{j0} \quad q)$$

$$\begin{pmatrix} e^{j\theta_{11}(2Ni+N+1)} & \alpha \times e^{j(\theta_{11}(2Ni+N+1)+\lambda)} \\ \alpha \times e^{j\theta_{21}(2Ni+N+1)} & e^{j(\theta_{21}(2Ni+N+1)+\lambda+\delta)} \end{pmatrix}$$

$$\begin{pmatrix} s1(2Ni+N+1) \\ s2(2Ni+N+1) \end{pmatrix}$$

Equation 131

When generalized, this equation is as follows.
For symbol number 2Ni+N+k (k=0, 1, ..., N−1):

Math 139

$$\begin{pmatrix} r1(2Ni+N+k) \\ r2(2Ni+N+k) \end{pmatrix} = \frac{1}{\sqrt{\alpha^2+1}} \begin{pmatrix} e^{j0} \\ e^{j0} \end{pmatrix} (Ae^{j0} \quad q)$$

$$\begin{pmatrix} e^{j\theta_{11}(2Ni+N+k)} & \alpha \times e^{j(\theta_{11}(2Ni+N+k)+\lambda)} \\ \alpha \times e^{j\theta_{21}(2Ni+N+k)} & e^{j(\theta_{21}(2Ni+N+k)+\lambda+\delta)} \end{pmatrix}$$

$$\begin{pmatrix} s1(2Ni+N+k) \\ s2(2Ni+N+k) \end{pmatrix}$$

Equation 132

Furthermore, for symbol number 2Ni+2N−1:

Math 140

$$\begin{pmatrix} r1(2Ni+2N-1) \\ r2(2Ni+2N-1) \end{pmatrix} = \frac{1}{\sqrt{\alpha^2+1}} \begin{pmatrix} e^{j0} \\ e^{j0} \end{pmatrix} (Ae^{j0} \quad q)$$

$$\begin{pmatrix} e^{j\theta_{11}(2Ni+2N-1)} & \alpha \times e^{j(\theta_{11}(2Ni+2N-1)+\lambda)} \\ \alpha \times e^{j\theta_{21}(2Ni+2N-1)} & e^{j(\theta_{21}(2Ni+2N-1)+\lambda+\delta)} \end{pmatrix}$$

$$\begin{pmatrix} s1(2Ni+2N-1) \\ s2(2Ni+2N-1) \end{pmatrix}$$

Equation 133

As a result, when q is represented as follows, one of the signals s1 and s2 can no longer be obtained.
For symbol number 2Ni (where i is an integer greater than or equal to zero):

Math 141

$$q = -\frac{A}{\beta} e^{j(\theta_{11}(2Ni)-\theta_{21}(2Ni))}, -A\beta e^{j(\theta_{11}(2Ni)-\theta_{21}(2Ni)-\delta)}$$

Eqaution 134

For symbol number 2Ni+1:

Math 142

$$q = -\frac{A}{\beta}e^{j(\theta_{11}(2Ni+1)-\theta_{21}(2Ni+1))},$$
$$-A\beta e^{j(\theta_{11}(2Ni+1)-\theta_{21}(2Ni+1)-\delta)}$$

Equation 135

When generalized, this equation is as follows.
For symbol number 2Ni+k (k=0, 1, ..., N−1):

Math 143

$$q = -\frac{A}{\beta}e^{j(\theta_{11}(2Ni+k)-\theta_{21}(2Ni+k))},$$
$$-A\beta e^{j(\theta_{11}(2Ni+k)-\theta_{21}(2Ni+k)-\delta)}$$

Equation 136

Furthermore, for symbol number 2Ni+N−1:

Math 144

$$q = -\frac{A}{\beta}e^{j(\theta_{11}(2Ni+N-1)-\theta_{21}(2Ni+N-1))},$$
$$-A\beta e^{j(\theta_{11}(2Ni+N-1)-\theta_{21}(2Ni+N-1)-\delta)}$$

Equation 137

For symbol number 2Ni+N (where i is an integer greater than or equal to zero):

Math 145

$$q = -\frac{A}{\alpha}e^{j(\theta_{11}(2Ni+N)-\theta_{21}(2Ni+N))},$$
$$-A\alpha e^{j(\theta_{11}(2Ni+N)-\theta_{21}(2Ni+N)-\delta)}$$

Equation 138

For symbol number 2Ni+N+1:

Math 146

$$q = -\frac{A}{\alpha}e^{j(\theta_{11}(2Ni+N+1)-\theta_{21}(2Ni+N+1))},$$
$$-A\alpha e^{j(\theta_{11}(2Ni+N+1)-\theta_{21}(2Ni+N+1)-\delta)}$$

Equation 139

When generalized, this equation is as follows.
For symbol number 2Ni+N+k (k=0, 1, ..., N−1):

Math 147

$$q = -\frac{A}{\alpha}e^{j(\theta_{11}(2Ni+N+k)-\theta_{21}(2Ni+N+k))},$$
$$-A\alpha e^{j(\theta_{11}(2Ni+N+k)-\theta_{21}(2Ni+N+k)-\delta)}$$

Equation 140

Furthermore, for symbol number 2Ni+2N−1:

Math 148

$$q = -\frac{A}{\alpha}e^{j(\theta_{11}(2Ni+2N-1)-\theta_{21}(2Ni+2N-1))},$$
$$-A\alpha e^{j(\theta_{11}(2Ni+2N-1)-\theta_{21}(2Ni+2N-1)-\delta)}$$

Equation 141

In this case, if q has the same solution in symbol numbers 2Ni through 2Ni+N−1, then since the channel elements of the direct waves do not greatly fluctuate, excellent reception quality can no longer be obtained for any of the symbol numbers. Therefore, it is difficult to achieve the ability to correct errors, even if error correction codes are introduced. Accordingly, for q not to have the same solution, Condition #7 or Condition #8 becomes necessary from Equations 134-141 and from the fact that $\alpha \neq \beta$ when focusing on one of two solutions of q which does not include $\delta$.

Math 149

Condition #7

$$e^{j(\theta_{11}(2Ni+x)-\theta_{21}(2Ni+x))} \neq e^{j(\theta_{11}(2Ni+y)-\theta_{21}(2Ni+y))} \text{ for}$$
$$\forall x, \forall y (x \neq y; x,y=0,1,2,\ldots,N-2,N-1)$$

(x is 0, 1, 2, ..., N−2, N−1; y is 0, 1, 2, ..., N−2, N−1; and x≠y.)
and $$e^{j(\theta_{11}(2Ni+N+x)-\theta_{21}(2Ni+N+x))} \neq e^{j(\theta_{11}(2Ni+N+y)-\theta_{21}(2Ni+N+y))}$$
$$\text{for } \forall x, \forall y (x \neq y; x,y=0,1,2,\ldots,N-2,N-1)$$

(x is 0, 1, 2, ..., N−2, N−1; y is 0, 1, 2, ..., N−2, N−1; and x≠y.)

Math 150

Condition #8

$$e^{j(\theta_{11}(2Ni+x)-\theta_{21}(2Ni+x))} \neq e^{j(\theta_{11}(2Ni+y)-\theta_{21}(2Ni+y))} \text{ for}$$
$$\forall x, \forall y (x \neq y; x,y=0,1,2,\ldots,N-2,N-1)$$

In this case, Condition #8 is similar to the conditions described in Embodiment 1 through Embodiment 3. However, with regards to Condition #7, since $\alpha \neq \beta$, the solution not including $\delta$ among the two solutions of q is a different solution.

Next, design requirements for not only $\theta_{11}$ and $\theta_{12}$, but also for $\lambda$ and $\delta$ are described. It suffices to set $\lambda$ to a certain value; it is then necessary to establish requirements for $\delta$. The following describes the design method for $\delta$ when $\lambda$ is set to zero radians.

In this case, similar to the method of changing the precoding weights in a four-slot period (cycle), by defining $\delta$ so that $\pi/2$ radians$\leq |\delta| \leq \pi$ radians, excellent reception quality is achieved, particularly in an LOS environment.

In symbol numbers 2Ni through 2Ni+2N−1, two points q exist where reception quality becomes poor, and therefore 4N such points exist. In an LOS environment, in order to achieve excellent characteristics, these 4N points should each have a different solution. In this case, focusing on amplitude, the following condition is necessary for Condition #7 or Condition #8, since $\alpha \neq \beta$.

Math 151

$$\alpha \neq \frac{1}{\beta}$$

Condition #9

As described above, when a transmission device transmits a plurality of modulated signals from a plurality of antennas in a MIMO system, the advantageous effect of improved transmission quality, as compared to conventional spatial multiplexing MIMO system, is achieved in an LOS environment in which direct waves dominate by hopping between precoding weights regularly over time.

In the present embodiment, the structure of the reception device is as described in Embodiment 1, and in particular with regards to the structure of the reception device, operations have been described for a limited number of antennas, but the present invention may be embodied in the same way even if the number of antennas increases. In other words, the number of antennas in the reception device does not affect the operations or advantageous effects of the present embodiment. Furthermore, in the present embodiment, similar to Embodiment 1, the error correction codes are not limited.

In the present embodiment, in contrast with Embodiment 1, the method of changing the precoding weights in the time domain has been described. As described in Embodiment 1, however, the present invention may be similarly embodied by changing the precoding weights by using a multi-carrier transmission method and arranging symbols in the frequency domain and the frequency-time domain. Furthermore, in the present embodiment, symbols other than data symbols, such as pilot symbols (preamble, unique word, and the like), symbols for control information, and the like, may be arranged in the frame in any way.

Embodiment 5

In Embodiment 1 through Embodiment 4, the method of regularly hopping between precoding weights has been described. In the present embodiment, a modification of this method is described.

In Embodiment 1 through Embodiment 4, the method of regularly hopping between precoding weights as in FIG. 6 has been described. In the present embodiment, a method of regularly hopping between precoding weights that differs from FIG. 6 is described.

Figure 22:
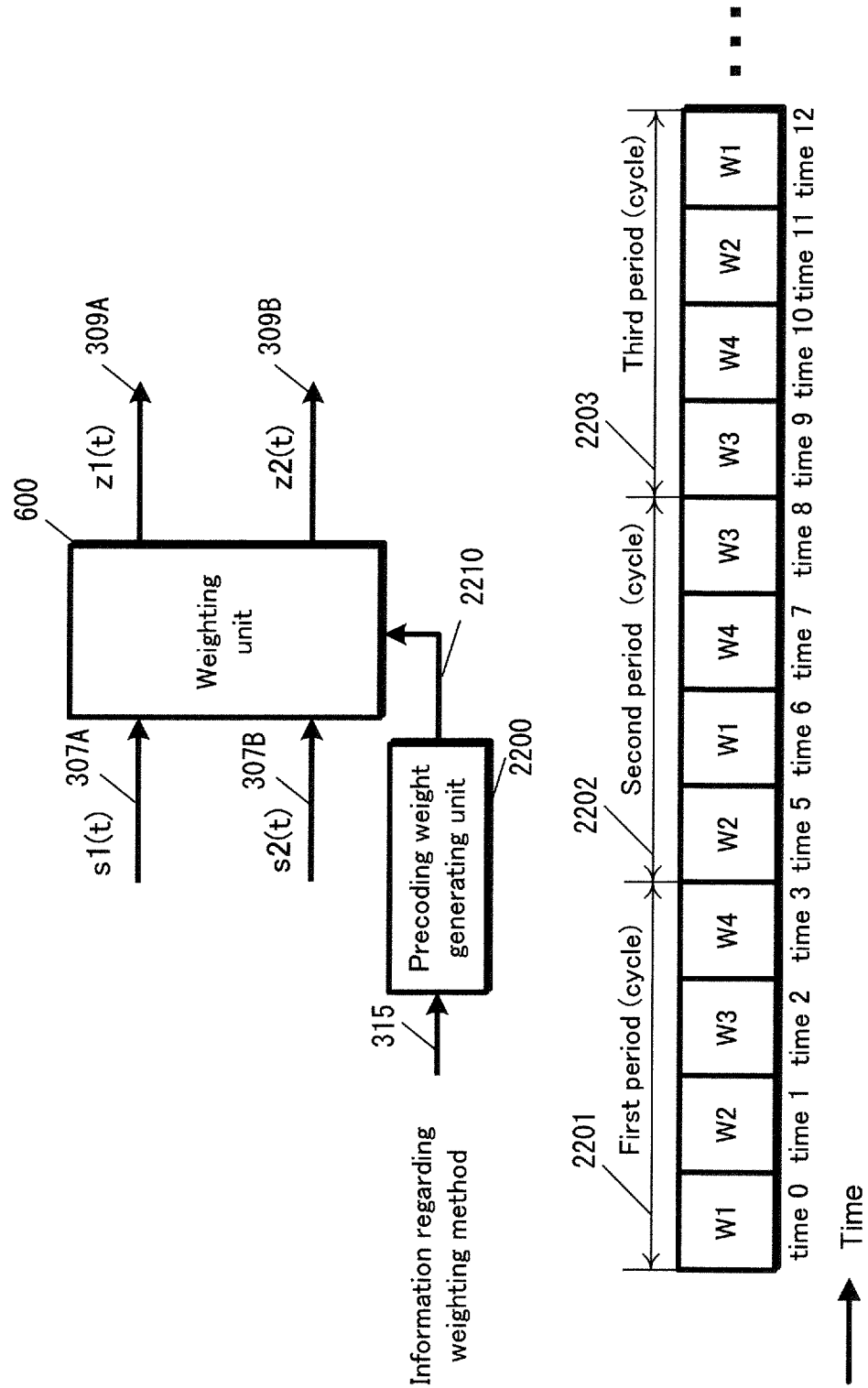
FIG. 22 is an example of a frame structure.

As in FIG. 6, this method hops between four different precoding weights (matrices). FIG. 22 shows the hopping method that differs from FIG. 6. In FIG. 22, four different precoding weights (matrices) are represented as W1, W2, W3, and W4. (For example, W1 is the precoding weight (matrix) in Equation 37, W2 is the precoding weight (matrix) in Equation 38, W3 is the precoding weight (matrix) in Equation 39, and W4 is the precoding weight (matrix) in Equation 40.) In FIG. 3, elements that operate in a similar way to FIG. 3 and FIG. 6 bear the same reference signs.

The parts unique to FIG. 22 are as follows.

The first period (cycle) 2201, the second period (cycle) 2202, the third period (cycle) 2203, . . . are all four-slot periods (cycles).

A different precoding weight matrix is used in each of the four slots, i.e. W1, W2, W3, and W4 are each used once.

It is not necessary for W1, W2, W3, and W4 to be in the same order in the first period (cycle) 2201, the second period (cycle) 2202, the third period (cycle) 2203, . . . .

In order to implement this method, a precoding weight generating unit 2200 receives, as an input, a signal regarding a weighting method and outputs information 2210 regarding precoding weights in order for each period (cycle). The weighting unit 600 receives, as inputs, this information, $s1(t)$, and $s2(t)$, performs weighting, and outputs $z1(t)$ and $z2(t)$.

Figure 23:
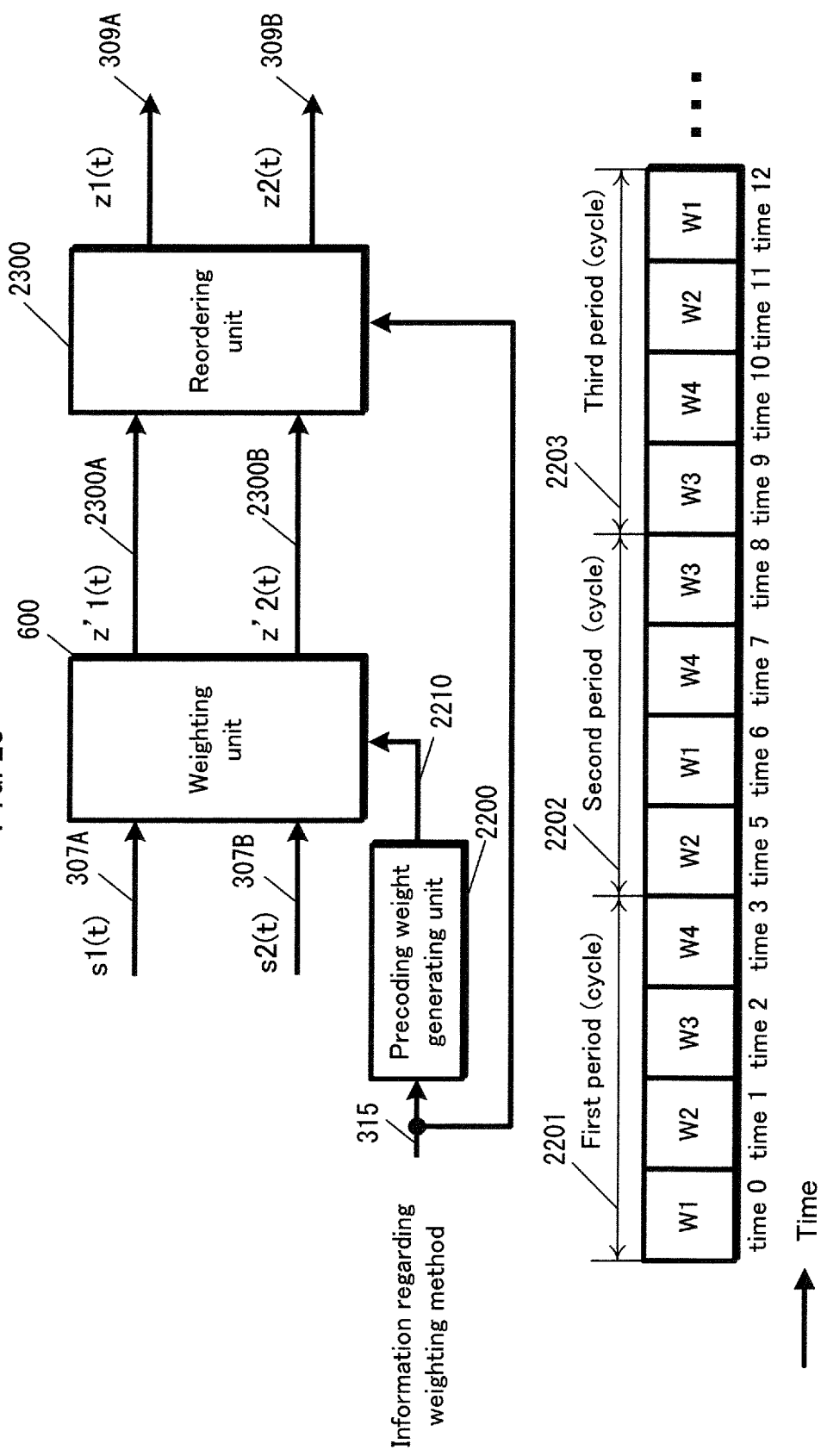
FIG. 23 is an example of a frame structure.

FIG. 23 shows a different weighting method than FIG. 22 for the above precoding method. In FIG. 23, the difference from FIG. 22 is that a similar method to FIG. 22 is achieved by providing a reordering unit after the weighting unit and by reordering signals.

In FIG. 23, the precoding weight generating unit 2200 receives, as an input, information 315 regarding a weighting method and outputs information 2210 on precoding weights in the order of precoding weights W1, W2, W3, W4, W1, W2, W3, W4, . . . . Accordingly, the weighting unit 600 uses the precoding weights in the order of precoding weights W1, W2, W3, W4, W1, W2, W3, W4, . . . and outputs precoded signals 2300A and 2300B.

A reordering unit 2300 receives, as inputs, the precoded signals 2300A and 2300B, reorders the precoded signals 2300A and 2300B in the order of the first period (cycle) 2201, the second period (cycle) 2202, and the third period (cycle) 2203 in FIG. 23, and outputs $z1(t)$ and $z2(t)$.

Note that in the above description, the period (cycle) for hopping between precoding weights has been described as having four slots for the sake of comparison with FIG. 6. As in Embodiment 1 through Embodiment 4, however, the present invention may be similarly embodied with a period (cycle) having other than four slots.

Furthermore, in Embodiment 1 through Embodiment 4, and in the above precoding method, within the period (cycle), the value of $\delta$ and $\beta$ has been described as being the same for each slot, but the value of $\delta$ and $\beta$ may change in each slot.

As described above, when a transmission device transmits a plurality of modulated signals from a plurality of antennas in a MIMO system, the advantageous effect of improved transmission quality, as compared to conventional spatial multiplexing MIMO system, is achieved in an LOS environment in which direct waves dominate by hopping between precoding weights regularly over time.

In the present embodiment, the structure of the reception device is as described in Embodiment 1, and in particular with regards to the structure of the reception device, operations have been described for a limited number of antennas, but the present invention may be embodied in the same way even if the number of antennas increases. In other words, the number of antennas in the reception device does not affect the operations or advantageous effects of the present embodiment. Furthermore, in the present embodiment, similar to Embodiment 1, the error correction codes are not limited.

In the present embodiment, in contrast with Embodiment 1, the method of changing the precoding weights in the time domain has been described. As described in Embodiment 1, however, the present invention may be similarly embodied by changing the precoding weights by using a multi-carrier transmission method and arranging symbols in the frequency domain and the frequency-time domain. Furthermore, in the present embodiment, symbols other than data symbols, such as pilot symbols (preamble, unique word, and the like), symbols for control information, and the like, may be arranged in the frame in any way.

Embodiment 6

In Embodiments 1-4, a method for regularly hopping between precoding weights has been described. In the present embodiment, a method for regularly hopping between precoding weights is again described, including the content that has been described in Embodiments 1-4.

First, out of consideration of an LOS environment, a method of designing a precoding matrix is described for a 2×2 spatial multiplexing MIMO system that adopts precoding in which feedback from a communication partner is not available.

Figure 30:
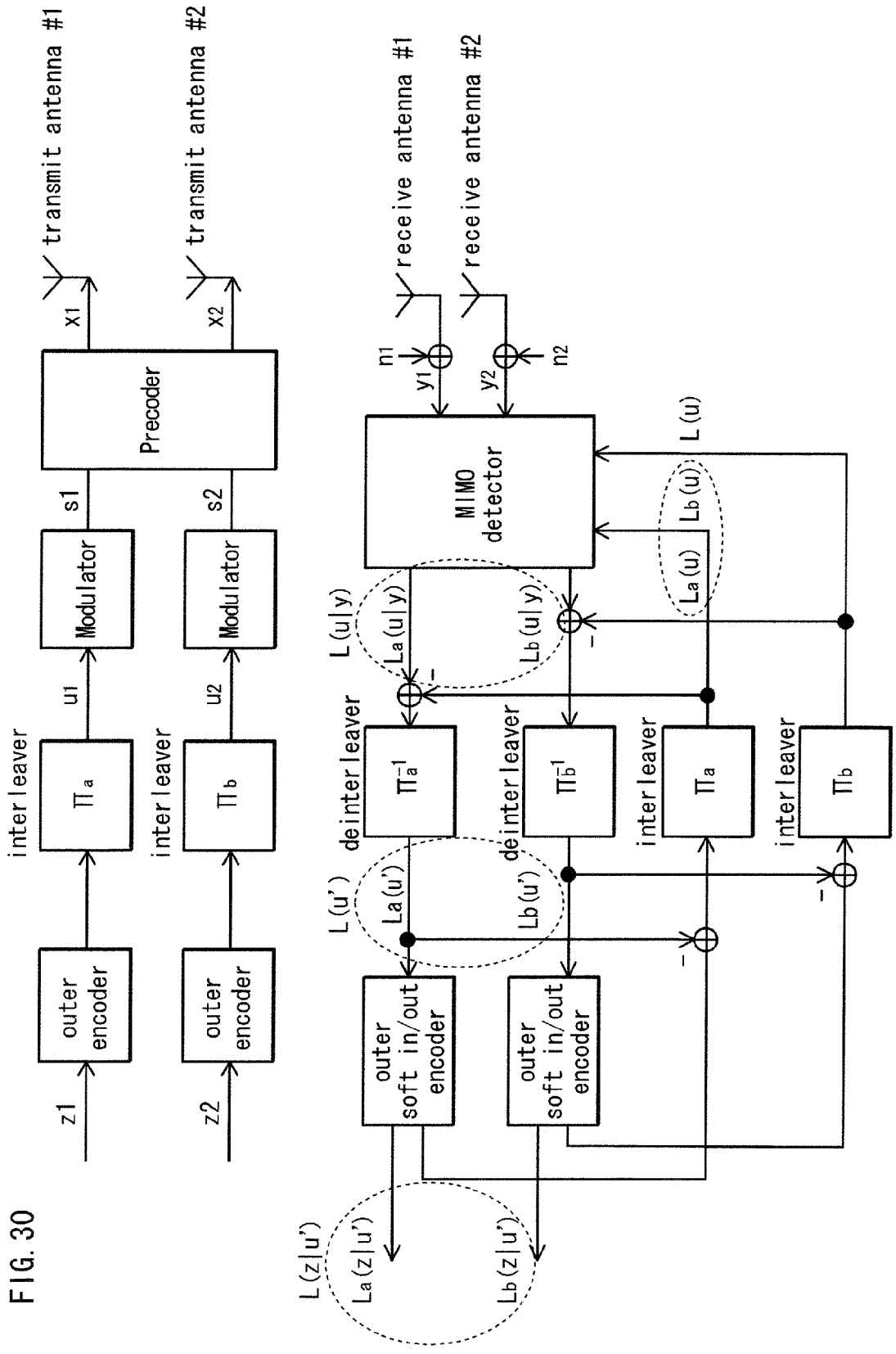
FIG. 30 is an example of a 2×2 MIMO spatial multiplexing MIMO system.

FIG. 30 shows a model of a 2×2 spatial multiplexing MIMO system that adopts precoding in which feedback from a communication partner is not available. An information vector z is encoded and interleaved. As output of the interleaving, an encoded bit vector u(p)=(u₁(p), u₂(p)) is acquired (where p is the slot time). Let $u_i(p)=(u_{i1}(p), \ldots, u_{ih}(p))$ (where h is the number of transmission bits per symbol). Letting a signal after modulation (mapping) be $s(p)=(s1(p), s2(p))^T$ and a precoding matrix be F(p), a precoded symbol $x(p)=(x_1(p), x_2(p))^T$ is represented by the following equation.

Math 152

$$x(p) = (x_1(p), x_2(p))^T \quad \text{Equation 142}$$
$$= F(p)s(p)$$

Accordingly, letting a received vector be $y(p)=(y_1(p), y_2(p))^T$, the received vector y(p) is represented by the following equation.

Math 153

$$y(p) = (y_1(p), y_2(p))^T \quad \text{Equation 143}$$
$$= H(p)F(p)s(p) + n(p)$$

In this Equation, H(p) is the channel matrix, $n(p)=(n_1(p), n_2(p))^T$ is the noise vector, and $n_i(p)$ is the i.i.d. complex Gaussian random noise with an average value 0 and variance $\sigma^2$. Letting the Rician factor be K, the above equation can be represented as follows.

Math 154

$$y(p) = (y_1(p), y_2(p))^T \quad \text{Equation 144}$$
$$= \left( \sqrt{\frac{K}{K+1}} H_d(p) + \sqrt{\frac{1}{K+1}} H_s(p) \right) F(p)s(p) + n(p)$$

In this equation, $H_d(p)$ is the channel matrix for the direct wave components, and $H_s(p)$ is the channel matrix for the scattered wave components. Accordingly, the channel matrix H(p) is represented as follows.

Math 155

$$H(p) = \sqrt{\frac{K}{K+1}} H_d(p) + \sqrt{\frac{1}{K+1}} H_s(p) \quad \text{Equation 145}$$
$$= \sqrt{\frac{K}{K+1}} \begin{pmatrix} h_{11,d} & h_{12,d} \\ h_{21,d} & h_{22,d} \end{pmatrix} +$$
$$\sqrt{\frac{1}{K+1}} \begin{pmatrix} h_{11,s}(p) & h_{12,s}(p) \\ h_{21,s}(p) & h_{22,s}(p) \end{pmatrix}$$

In Equation 145, it is assumed that the direct wave environment is uniquely determined by the positional relationship between transmitters, and that the channel matrix $H_d(p)$ for the direct wave components does not fluctuate with time. Furthermore, in the channel matrix $H_d(p)$ for the direct wave components, it is assumed that as compared to the interval between transmitting antennas, the probability of an environment with a sufficiently long distance between transmission and reception devices is high, and therefore that the channel matrix for the direct wave components can be treated as a non-singular matrix. Accordingly, the channel matrix $H_d(p)$ is represented as follows.

Math 156

$$H_d(p) = \begin{pmatrix} h_{11,d} & h_{12,d} \\ h_{21,d} & h_{22,d} \end{pmatrix} \quad \text{Equation 146}$$
$$= \begin{pmatrix} Ae^{j\psi} & q \\ Ae^{j\psi} & q \end{pmatrix}$$

In this equation, let A be a positive real number and q be a complex number. Subsequently, out of consideration of an LOS environment, a method of designing a precoding matrix is described for a 2×2 spatial multiplexing MIMO system that adopts precoding in which feedback from a communication partner is not available.

From Equations 144 and 145, it is difficult to seek a precoding matrix without appropriate feedback in conditions including scattered waves, since it is difficult to perform analysis under conditions including scattered waves. Additionally, in a NLOS environment, little degradation in reception quality of data occurs as compared to an LOS environment. Therefore, the following describes a method of designing precoding matrices without appropriate feedback in an LOS environment (precoding matrices for a precoding method that hops between precoding matrices over time).

As described above, since it is difficult to perform analysis under conditions including scattered waves, an appropriate precoding matrix for a channel matrix including components of only direct waves is sought from Equations 144 and 145. Therefore, in Equation 144, the case when the channel matrix includes components of only direct waves is considered. It follows that from Equation 146, Equation 144 can be represented as follows.

Math 157

$$\begin{pmatrix} y_1(p) \\ y_2(p) \end{pmatrix} = H_d(p)F(p)s(p) + n(p) \quad \text{Equation 147}$$
$$= \begin{pmatrix} Ae^{j\psi} & q \\ Ae^{j\psi} & q \end{pmatrix} F(p)s(p) + n(p)$$

In this equation, a unitary matrix is used as the precoding matrix. Accordingly, the precoding matrix is represented as follows.

Math 158

$$F(p) = \frac{1}{\sqrt{\alpha^2+1}} \begin{pmatrix} e^{j\theta_{11}(p)} & \alpha \times e^{j(\theta_{11}(p)+\lambda)} \\ \alpha \times e^{j\theta_{21}(p)} & e^{j(\theta_{21}(p)+\lambda+\pi)} \end{pmatrix} \quad \text{Equation 148}$$

In this equation, λ is a fixed value. Therefore, Equation 147 can be represented as follows.

Math 159

$$\begin{pmatrix} y_1(p) \\ y_2(p) \end{pmatrix} = \frac{1}{\sqrt{\alpha^2+1}} \begin{pmatrix} Ae^{j\psi} & q \\ Ae^{j\psi} & q \end{pmatrix} \begin{pmatrix} e^{j\theta_{11}(p)} & \alpha \times e^{j(\theta_{11}(p)+\lambda)} \\ \alpha \times e^{j\theta_{21}(p)} & e^{j(\theta_{21}(p)+\lambda+\pi)} \end{pmatrix} \begin{pmatrix} s1(p) \\ s2(p) \end{pmatrix} + n(p)$$

Equation 149

As is clear from Equation 149, when the reception device performs linear operation of Zero Forcing (ZF) or the Minimum Mean Squared Error (MMSE), the transmitted bit cannot be determined by s1(p), s2(p). Therefore, the iterative APP (or iterative Max-log APP) or APP (or Max-log APP) described in Embodiment 1 is performed (hereafter referred to as Maximum Likelihood (ML) calculation), the log-likelihood ratio of each bit transmitted in s1(p), s2(p) is sought, and decoding with error correction codes is performed. Accordingly, the following describes a method of designing a precoding matrix without appropriate feedback in an LOS environment for a reception device that performs ML calculation.

The precoding in Equation 149 is considered. The right-hand side and left-hand side of the first line are multiplied by $e^{-j\Psi}$, and similarly the right-hand side and left-hand side of the second line are multiplied by $e^{-j\Psi}$. The following equation represents the result.

Math 160

$$\begin{pmatrix} e^{-j\psi} y_1(p) \\ e^{-j\psi} y_2(p) \end{pmatrix} = e^{-j\psi}\left\{ \frac{1}{\sqrt{\alpha^2+1}} \begin{pmatrix} Ae^{j\psi} & q \\ Ae^{j\psi} & q \end{pmatrix} \begin{pmatrix} e^{j\theta_{11}(p)} & \alpha \times e^{j(\theta_{11}(p)+\lambda)} \\ \alpha \times e^{j\theta_{21}(p)} & e^{j(\theta_{21}(p)+\lambda+\pi)} \end{pmatrix} \begin{pmatrix} s1(p) \\ s2(p) \end{pmatrix} + n(p) \right\}$$

$$= \frac{1}{\sqrt{\alpha^2+1}} \begin{pmatrix} Ae^{j0} & e^{-j\psi}q \\ Ae^{j0} & e^{-j\psi}q \end{pmatrix} \begin{pmatrix} e^{j\theta_{11}(p)} & \alpha \times e^{j(\theta_{11}(p)+\lambda)} \\ \alpha \times e^{j\theta_{21}(p)} & e^{j(\theta_{21}(p)+\lambda+\pi)} \end{pmatrix} \begin{pmatrix} s1(p) \\ s2(p) \end{pmatrix} + e^{-j\psi} n(p)$$

Equation 150

$e^{-j\Psi}y_1(p)$, $e^{-j\Psi}y_2(p)$, and $e^{-j\Psi}q$ are respectively redefined as $y_1(p)$, $y_2(p)$, and $q$. Furthermore, since $e^{-j\Psi}n(p) = (e^{-j\Psi}n_1(p), e^{-j\Psi}n_2(p))^T$, and $e^{-j\Psi}n_1(p)$, $e^{-j\Psi}n_2(p)$ are the independent identically distributed (i.i.d.) complex Gaussian random noise with an average value 0 and variance $\sigma^2$, $e^{-j\Psi}n(p)$ is redefined as n(p). As a result, generality is not lost by restating Equation 150 as Equation 151.

Math 161

$$\begin{pmatrix} y_1(p) \\ y_2(p) \end{pmatrix} = \frac{1}{\sqrt{\alpha^2+1}} \begin{pmatrix} Ae^{j0} & q \\ Ae^{j0} & q \end{pmatrix} \begin{pmatrix} e^{j\theta_{11}(p)} & \alpha \times e^{j(\theta_{11}(p)+\lambda)} \\ \alpha \times e^{j\theta_{21}(p)} & e^{j(\theta_{21}(p)+\lambda+\pi)} \end{pmatrix} \begin{pmatrix} s1(p) \\ s2(p) \end{pmatrix} + n(p)$$

Equation 151

Next, Equation 151 is transformed into Equation 152 for the sake of clarity.

Math 162

$$\begin{pmatrix} y_1(p) \\ y_2(p) \end{pmatrix} = \frac{1}{\sqrt{\alpha^2+1}} \begin{pmatrix} e^{j0} \\ e^{j0} \end{pmatrix} (Ae^{j0} \quad q) \begin{pmatrix} e^{j\theta_{11}(p)} & \alpha \times e^{j(\theta_{11}(p)+\lambda)} \\ \alpha \times e^{j\theta_{21}(p)} & e^{j(\theta_{21}(p)+\lambda+\pi)} \end{pmatrix} \begin{pmatrix} s1(p) \\ s2(p) \end{pmatrix} + n(p)$$

Equation 152

In this case, letting the minimum Euclidian distance between a received signal point and a received candidate signal point be $d_{min}^2$, then a poor point has a minimum value of zero for $d_{min}^2$, and two values of q exist at which conditions are poor in that all of the bits transmitted by s1(p) and all of the bits transmitted by s2(p) being eliminated.

In Equation 152, when s1(p) does not exist.

Math 163

$$q = -\frac{A}{\alpha} e^{j(\theta_{11}(p) - \theta_{21}(p))}$$

Equation 153

In Equation 152, when s2(p) does not exist.

Math 164

$$q = -A\alpha e^{j(\theta_{11}(p) - \theta_{21}(p) - \pi)}$$

Equation 154

(Hereinafter, the values of q satisfying Equations 153 and 154 are respectively referred to as "poor reception points for s1 and s2").

When Equation 153 is satisfied, since all of the bits transmitted by s1(p) are eliminated, the received log-likelihood ratio cannot be sought for any of the bits transmitted by s1(p). When Equation 154 is satisfied, since all of the bits transmitted by s2(p) are eliminated, the received log-likelihood ratio cannot be sought for any of the bits transmitted by s2(p).

A broadcast/multicast transmission system that does not change the precoding matrix is now considered. In this case, a system model is considered in which a base station transmits modulated signals using a precoding method that does not hop between precoding matrices, and a plurality of terminals (Γ terminals) receive the modulated signals transmitted by the base station.

It is considered that the conditions of direct waves between the base station and the terminals change little over time. Therefore, from Equations 153 and 154, for a terminal that is in a position fitting the conditions of Equation 155 or Equation 156 and that is in an LOS environment where the Rician factor is large, the possibility of degradation in the reception quality of data exists. Accordingly, to resolve this problem, it is necessary to change the precoding matrix over time.

Math 165

$$q \approx -\frac{A}{\alpha} e^{j(\theta_{11}(p) - \theta_{21}(p))}$$

Equation 155

Math 166

$$q \approx -A\alpha e^{j(\theta_{11}(p) - \theta_{21}(p) - \pi)}$$

Equation 156

A method of regularly hopping between precoding matrices over a time period (cycle) with N slots (hereinafter referred to as a precoding hopping method) is considered.

Since there are N slots in the time period (cycle), N varieties of precoding matrices F[i] based on Equation 148 are prepared (i=0, 1, ..., N−1). In this case, the precoding matrices F[i] are represented as follows.

Math 167

$$F[i] = \frac{1}{\sqrt{\alpha^2+1}}\begin{pmatrix} e^{j\theta_{11}[i]} & \alpha \times e^{j(\theta_{11}[i]+\lambda)} \\ \alpha \times e^{j\theta_{21}[i]} & e^{j(\theta_{21}[i]+\lambda+\pi)} \end{pmatrix}$$

Equation 157

In this equation, let α not change over time, and let λ also not change over time (though change over time may be allowed).

As in Embodiment 1, F[i] is the precoding matrix used to obtain a precoded signal x (p=N×k+i) in Equation 142 for time N×k+i (where k is an integer equal to or greater than 0, and i=0, 1, N−1). The same is true below as well.

At this point, based on Equations 153 and 154, design conditions such as the following are important for the precoding matrices for precoding hopping.

Math 168

Condition #10

$$e^{j(\theta_{11}[x]-\theta_{21}[x])} \neq e^{j(\theta_{11}[y]-\theta_{21}[y])}$$

Equation 158 for ∀x, ∀y (x≠y; x, y=0, 1, ..., N−1)

Math 169

Condition #11

$$e^{j(\theta_{11}[x]-\theta_{21}[x]-\pi)} \neq e^{j(\theta_{11}[y]-\theta_{21}[y]-\pi)}$$

Equation 159 for ∀x, ∀y (x≠y; x, y=0, 1, ..., N−1)

From Condition #10, in all of the Γ terminals, there is one slot or less having poor reception points for s1 among the N slots in a time period (cycle). Accordingly, the log-likelihood ratio for bits transmitted by s1(p) can be obtained for at least N−1 slots. Similarly, from Condition #11, in all of the Γ terminals, there is one slot or less having poor reception points for s2 among the N slots in a time period (cycle). Accordingly, the log-likelihood ratio for bits transmitted by s2(p) can be obtained for at least N−1 slots.

In this way, by providing the precoding matrix design model of Condition #10 and Condition #11, the number of bits for which the log-likelihood ratio is obtained among the bits transmitted by s1(p), and the number of bits for which the log-likelihood ratio is obtained among the bits transmitted by s2(p) is guaranteed to be equal to or greater than a fixed number in all of the Γ terminals. Therefore, in all of the Γ terminals, it is considered that degradation of data reception quality is moderated in an LOS environment where the Rician factor is large.

The following shows an example of a precoding matrix in the precoding hopping method.

The probability density distribution of the phase of a direct wave can be considered to be evenly distributed over [0 2π]. Therefore, the probability density distribution of the phase of q in Equations 151 and 152 can also be considered to be evenly distributed over [0 2π]. Accordingly, the following is established as a condition for providing fair data reception quality insofar as possible for Γ terminals in the same LOS environment in which only the phase of q differs.

Condition #12

When using a precoding hopping method with an N-slot time period (cycle), among the N slots in the time period (cycle), the poor reception points for s1 are arranged to have an even distribution in terms of phase, and the poor reception points for s2 are arranged to have an even distribution in terms of phase.

The following describes an example of a precoding matrix in the precoding hopping method based on Condition #10 through Condition #12. Let α=1.0 in the precoding matrix in Equation 157.

Example #5

Let the number of slots N in the time period (cycle) be 8. In order to satisfy Condition #10 through Condition #12, precoding matrices for a precoding hopping method with an N=8 time period (cycle) are provided as in the following equation.

Math 170

$$F[i] = \frac{1}{\sqrt{2}}\begin{pmatrix} e^{j0} & e^{j0} \\ e^{j\frac{i\pi}{4}} & e^{j(\frac{i\pi}{4}+\pi)} \end{pmatrix}$$

Equation 160

Here, j is an imaginary unit, and i=0, 1, ..., 7. Instead of Equation 160, Equation 161 may be provided (where λ and θ$_{11}$[i] do not change over time (though change may be allowed)).

Math 171

$$F[i] = \frac{1}{\sqrt{2}}\begin{pmatrix} e^{j\theta_{11}[i]} & e^{j(\theta_{11}[i]+\lambda)} \\ e^{j(\theta_{11}[i]+\frac{i\pi}{4})} & e^{j(\theta_{11}[i]+\frac{i\pi}{4}+\lambda+\pi)} \end{pmatrix}$$

Equation 161

Figure 31B:
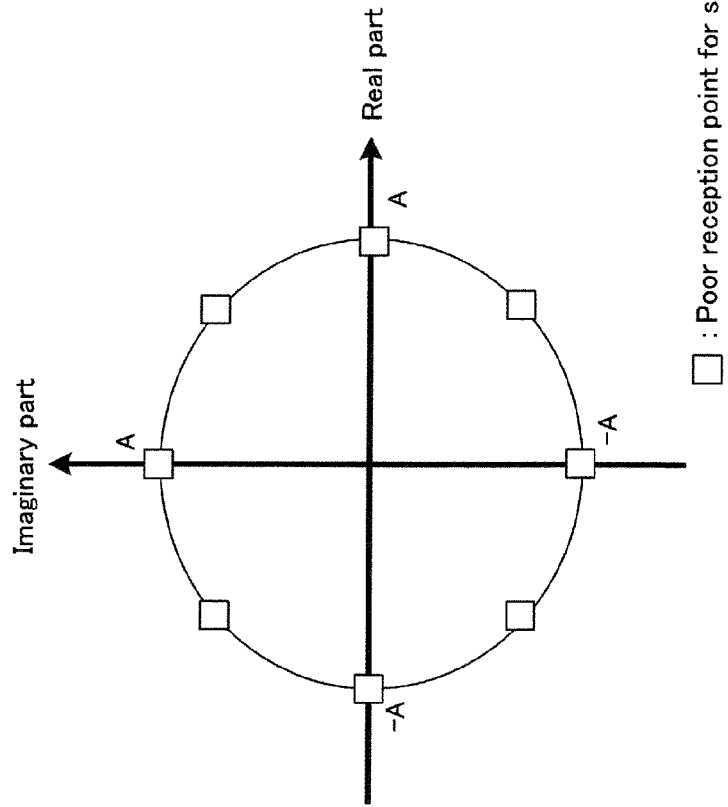
FIGS. 31A and 31B show positions of poor reception points.
Figure 31A:
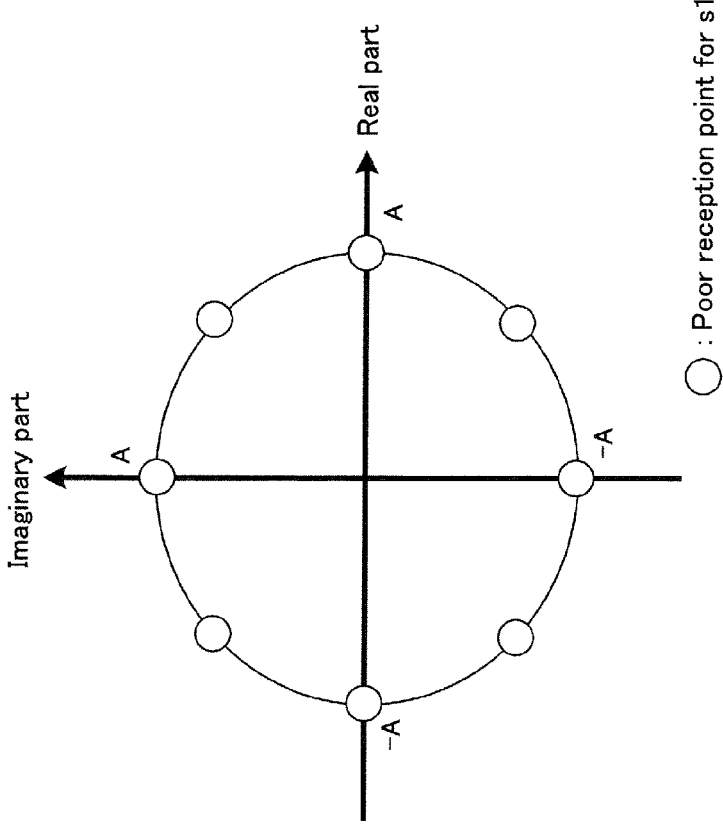

Accordingly, the poor reception points for s1 and s2 become as in FIGS. 31A and 31B. (In FIGS. 31A and 31B, the horizontal axis is the real axis, and the vertical axis is the imaginary axis.) Instead of Equations 160 and 161, Equations 162 and 163 may be provided (where i=0, 1, ..., 7, and where λ and θ$_{11}$[i] do not change over time (though change may be allowed)).

Math 172

$$F[i] = \frac{1}{\sqrt{2}}\begin{pmatrix} e^{j0} & e^{j0} \\ e^{j(-\frac{i\pi}{4})} & e^{j(-\frac{i\pi}{4}+\pi)} \end{pmatrix}$$

Equation 162

Math 173

$$F[i] = \frac{1}{\sqrt{2}}\begin{pmatrix} e^{j\theta_{11}[i]} & e^{j(\theta_{11}[i]+\lambda)} \\ e^{j(\theta_{11}[i]-\frac{i\pi}{4})} & e^{j(\theta_{11}[i]-\frac{i\pi}{4}+\lambda+\pi)} \end{pmatrix}$$

Equation 163

Next, the following is established as a condition, different from Condition #12, for providing fair data reception quality insofar as possible for Γ terminals in the same LOS environment in which only the phase of q differs.

Condition #13

When using a precoding hopping method with an N-slot time period (cycle), in addition to the condition $e^{j(\theta_{11}[x]-\theta_{21}[x])} \neq e^{j(\theta_{11}[y]-\theta_{21}[y]-\pi)}$ for $\forall x, \forall y (x,y=0, 1,\ldots,N-1)$  Equation 164 the poor reception points for s1 and the poor reception points for s2 are arranged to be in an even distribution with respect to phase in the N slots in the time period (cycle).

The following describes an example of a precoding matrix in the precoding hopping method based on Condition #10, Condition #11, and Condition #13. Let $\alpha=1.0$ in the precoding matrix in Equation 157.

Example #6

Let the number of slots N in the time period (cycle) be 4. Precoding matrices for a precoding hopping method with an N=4 time period (cycle) are provided as in the following equation.

Math 175

$$F[i] = \frac{1}{\sqrt{2}} \begin{pmatrix} e^{j0} & e^{j0} \\ e^{j\frac{i\pi}{4}} & e^{j\left(\frac{i\pi}{4}+\pi\right)} \end{pmatrix}$$  Equation 165

Here, j is an imaginary unit, and i=0, 1, 2, 3. Instead of Equation 165, Equation 166 may be provided (where λ and $\theta_{11}[i]$ do not change over time (though change may be allowed)).

Math 176

$$F[i] = \frac{1}{\sqrt{2}} \begin{pmatrix} e^{j\theta_{11}[i]} & e^{j(\theta_{11}[i]+\lambda)} \\ e^{j\left(\theta_{11}[i]+\frac{i\pi}{4}\right)} & e^{j\left(\theta_{11}[i]+\frac{i\pi}{4}+\lambda+\pi\right)} \end{pmatrix}$$  Equation 166

Figure 32:
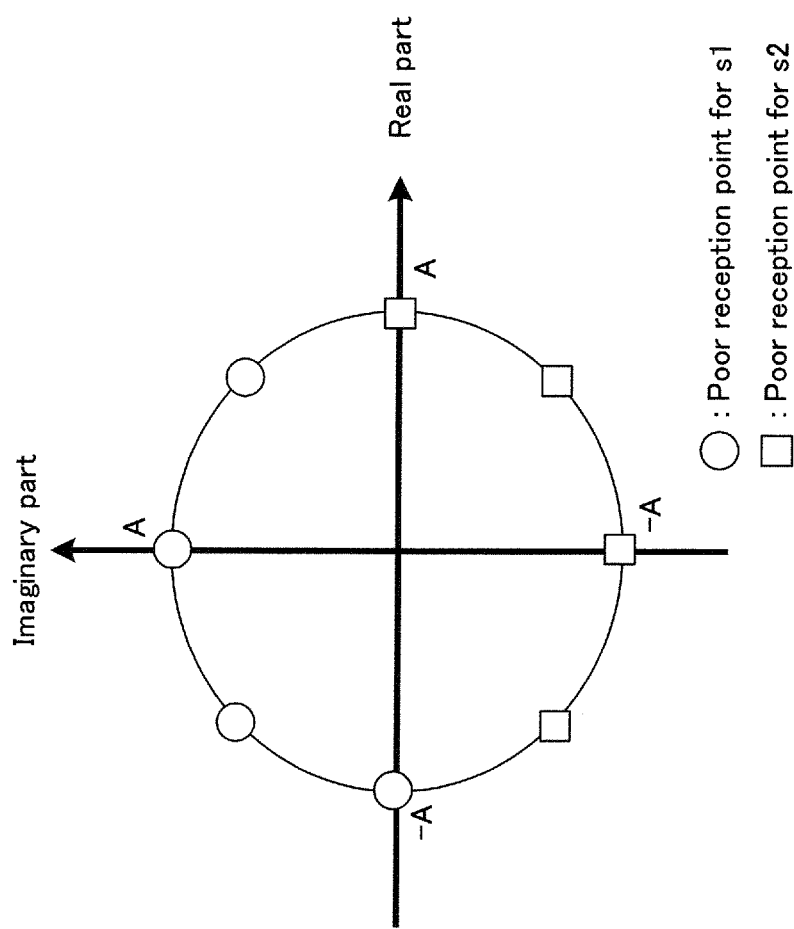
FIG. 32 shows positions of poor reception points.

Accordingly, the poor reception points for s1 and s2 become as in FIG. 32. (In FIG. 32, the horizontal axis is the real axis, and the vertical axis is the imaginary axis.) Instead of Equations 165 and 166, Equations 167 and 168 may be provided (where i=0, 1, 2, 3, and where λ and $\theta_{11}[i]$ do not change over time (though change may be allowed)).

Math 177

$$F[i] = \frac{1}{\sqrt{2}} \begin{pmatrix} e^{j0} & e^{j0} \\ e^{j\left(-\frac{i\pi}{4}\right)} & e^{j\left(-\frac{i\pi}{4}+\pi\right)} \end{pmatrix}$$  Equation 167

Math 178

$$F[i] = \frac{1}{\sqrt{2}} \begin{pmatrix} e^{j\theta_{11}[i]} & e^{j(\theta_{11}[i]+\lambda)} \\ e^{j\left(\theta_{11}[i]-\frac{i\pi}{4}\right)} & e^{j\left(\theta_{11}[i]-\frac{i\pi}{4}+\lambda+\pi\right)} \end{pmatrix}$$  Equation 168

Next, a precoding hopping method using a non-unitary matrix is described.

Based on Equation 148, the precoding matrices presently under consideration are represented as follows.

Math 179

$$F(p) = \frac{1}{\sqrt{\alpha^2+1}} \begin{pmatrix} e^{j\theta_{11}(p)} & \alpha \times e^{j(\theta_{11}(p)+\lambda)} \\ \alpha \times e^{j\theta_{21}(p)} & e^{j(\theta_{21}(p)+\lambda+\delta)} \end{pmatrix}$$  Equation 169

Equations corresponding to Equations 151 and 152 are represented as follows.

Math 180

$$\begin{pmatrix} y_1(p) \\ y_2(p) \end{pmatrix} = \frac{1}{\sqrt{\alpha^2+1}} \begin{pmatrix} Ae^{j0} & q \\ Ae^{j0} & q \end{pmatrix}$$  Equation 170

$$\begin{pmatrix} e^{j\theta_{11}(p)} & \alpha \times e^{j(\theta_{11}(p)+\lambda)} \\ \alpha \times e^{j\theta_{21}(p)} & e^{j(\theta_{21}(p)+\lambda+\pi)} \end{pmatrix} \begin{pmatrix} s1(p) \\ s2(p) \end{pmatrix} + n(p)$$

Math 181

$$\begin{pmatrix} y_1(p) \\ y_2(p) \end{pmatrix} = \frac{1}{\sqrt{\alpha^2+1}} \begin{pmatrix} e^{j0} \\ e^{j0} \end{pmatrix}(Ae^{j0}\ q)$$  Equation 17

$$\begin{pmatrix} e^{j\theta_{11}(p)} & \alpha \times e^{j(\theta_{11}(p)+\lambda)} \\ \alpha \times e^{j\theta_{21}(p)} & e^{j(\theta_{21}(p)+\lambda+\delta)} \end{pmatrix} \begin{pmatrix} s1(p) \\ s2(p) \end{pmatrix} + n(p)$$

In this case, there are two q at which the minimum value $d_{min}^2$ of the Euclidian distance between a received signal point and a received candidate signal point is zero.

In Equation 171, when s1(p) does not exist:

Math 182

$$q = -\frac{A}{\alpha} e^{j(\theta_{11}(p)-\theta_{21}(p))}$$  Equation 172

In Equation 171, when s2(p) does not exist:

Math 183

$$q = -A\alpha e^{j(\theta_{11}(p)-\theta_{21}(p)-\delta)}$$  Equation 173

In the precoding hopping method for an N-slot time period (cycle), by referring to Equation 169, N varieties of the precoding matrix F[i] are represented as follows.

Math 184

$$F[i] = \frac{1}{\sqrt{\alpha^2+1}} \begin{pmatrix} e^{j\theta_{11}[i]} & \alpha \times e^{j(\theta_{11}[i]+\lambda)} \\ \alpha \times e^{j\theta_{21}[i]} & e^{j(\theta_{21}[i]+\lambda+\delta)} \end{pmatrix}$$  Equation 174

In this equation, let α and δ not change over time. At this point, based on Equations 34 and 35, design conditions such as the following are provided for the precoding matrices for precoding hopping.

Math 185

Condition #14

$$e^{j(\theta_{11}[x]-\theta_{21}[x])} \neq e^{j(\theta_{11}[y]-\theta_{21}[y])} \quad \text{Equation 175}$$

for $\forall x, \forall y \ (x \neq y; x, y = 0, 1, \ldots, N-1)$

Math 186

Condition #15

$$e^{j(\theta_{11}[x]-\theta_{21}[x]-\delta)} \neq e^{j(\theta_{11}[y]-\theta_{21}[y]-\delta)} \quad \text{Equation 176}$$

for $\forall x, \forall y \ (x \neq y; x, y = 0, 1, \ldots, N-1)$

Example #7

Let $\alpha=1.0$ in the precoding matrix in Equation 174. Let the number of slots N in the time period (cycle) be 16. In order to satisfy Condition #12, Condition #14, and Condition #15, precoding matrices for a precoding hopping method with an N=16 time period (cycle) are provided as in the following equations.

For i=0, 1, . . . , 7:

Math 187

$$F[i] = \frac{1}{\sqrt{2}} \begin{pmatrix} e^{j0} & e^{j0} \\ e^{j\frac{i\pi}{4}} & e^{j(\frac{i\pi}{4}+\frac{7\pi}{8})} \end{pmatrix} \quad \text{Equation 177}$$

For i=8, 9, . . . , 15:

Math 188

$$F[i] = \frac{1}{\sqrt{2}} \begin{pmatrix} e^{j\frac{i\pi}{4}} & e^{j(\frac{i\pi}{4}+\frac{7\pi}{8})} \\ e^{j0} & e^{j0} \end{pmatrix} \quad \text{Equation 178}$$

Furthermore, a precoding matrix that differs from Equations 177 and 178 can be provided as follows.

For i=0, 1, . . . , 7:

Math 189

$$F[i] = \frac{1}{\sqrt{2}} \begin{pmatrix} e^{j\theta_{11}[i]} & e^{j(\theta_{11}[i]+\lambda)} \\ e^{j(\theta_{11}[i]+\frac{i\pi}{4})} & e^{j(\theta_{11}[i]+\frac{i\pi}{4}+\lambda+\frac{7\pi}{8})} \end{pmatrix} \quad \text{Equation 179}$$

For i=8, 9, . . . , 15:

Math 190

$$F[i] = \frac{1}{\sqrt{2}} \begin{pmatrix} e^{j(\theta_{11}[i]+\frac{i\pi}{4})} & e^{j(\theta_{11}[i]+\frac{i\pi}{4}+\lambda+\frac{7\pi}{8})} \\ e^{j\theta_{11}[i]} & e^{j(\theta_{11}[i]+\lambda)} \end{pmatrix} \quad \text{Equation 180}$$

Figure 33B:
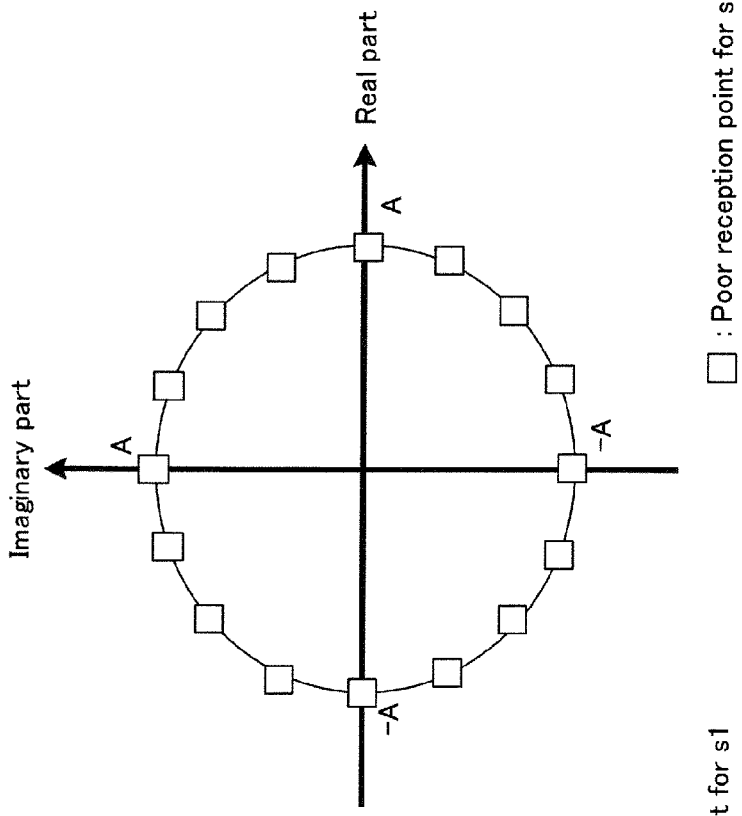
FIGS. 33A and 33B show positions of poor reception points.
Figure 33A:
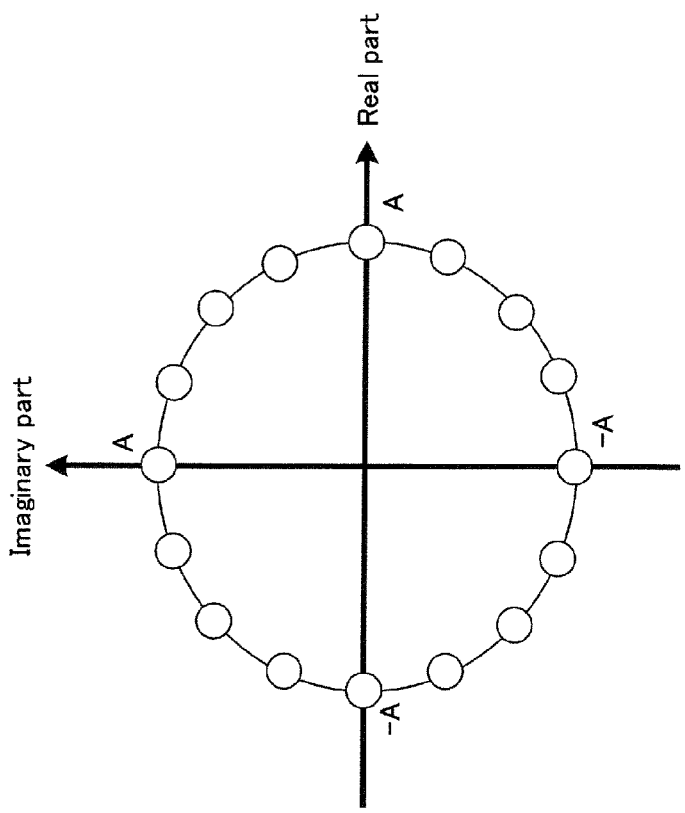

Accordingly, the poor reception points for s1 and s2 become as in FIGS. 33A and 33B.

(In FIGS. 33A and 33B, the horizontal axis is the real axis, and the vertical axis is the imaginary axis.) Instead of Equations 177 and 178, and Equations 179 and 180, precoding matrices may be provided as below.

For i=0, 1, . . . , 7:

Math 191

$$F[i] = \frac{1}{\sqrt{2}} \begin{pmatrix} e^{j0} & e^{j0} \\ e^{j(-\frac{i\pi}{4})} & e^{j(-\frac{i\pi}{4}+\frac{7\pi}{8})} \end{pmatrix} \quad \text{Equation 181}$$

For i=8, 9, . . . , 15:

Math 192

$$F[i] = \frac{1}{\sqrt{2}} \begin{pmatrix} e^{j(-\frac{i\pi}{4})} & e^{j(-\frac{i\pi}{4}+\frac{7\pi}{8})} \\ e^{j0} & e^{j0} \end{pmatrix} \quad \text{Equation 182}$$

or
For i=0, 1, . . . , 7:

Math 193

$$F[i] = \frac{1}{\sqrt{2}} \begin{pmatrix} e^{j\theta_{11}[i]} & e^{j(\theta_{11}[i]+\lambda)} \\ e^{j(\theta_{11}[i]-\frac{i\pi}{4})} & e^{j(\theta_{11}[i]-\frac{i\pi}{4}+\lambda+\frac{7\pi}{8})} \end{pmatrix} \quad \text{Equation 183}$$

For i=8, 9, . . . , 15:

Math 194

$$F[i] = \frac{1}{\sqrt{2}} \begin{pmatrix} e^{j(\theta_{11}[i]-\frac{i\pi}{4})} & e^{j(\theta_{11}[i]-\frac{i\pi}{4}+\lambda+\frac{7\pi}{8})} \\ e^{j\theta_{11}[i]} & e^{j(\theta_{11}[i]+\lambda)} \end{pmatrix} \quad \text{Equation 184}$$

(In Equations 177-184, $7\pi/8$ may be changed to $-7\pi/8$.)

Next, the following is established as a condition, different from Condition #12, for providing fair data reception quality insofar as possible for $\Gamma$ terminals in the same LOS environment in which only the phase of q differs.

Condition #16

When using a precoding hopping method with an N-slot time period (cycle), the following condition is set:

Math 195

$$e^{j(\theta_{11}[x]-\theta_{21}[x])} \neq e^{j(\theta_{11}[y]-\theta_{21}[y]-\delta)} \text{ for } \forall x, \forall y (x,y=0, 1,\ldots,N-1) \quad \text{Equation 185}$$

and the poor reception points for s1 and the poor reception points for s2 are arranged to be in an even distribution with respect to phase in the N slots in the time period (cycle).

The following describes an example of a precoding matrix in the precoding hopping method based on Condition #14, Condition #15, and Condition #16. Let $\alpha=1.0$ in the precoding matrix in Equation 174.

Example #8

Let the number of slots N in the time period (cycle) be 8. Precoding matrices for a precoding hopping method with an N=8 time period (cycle) are provided as in the following equation.

Math 196

$$F[i] = \frac{1}{\sqrt{2}} \begin{pmatrix} e^{j0} & e^{j0} \\ e^{j\frac{i\pi}{4}} & e^{j\left(\frac{i\pi}{4}+\frac{7\pi}{8}\right)} \end{pmatrix} \quad \text{Equation 186}$$

Here, i=0, 1, . . . , 7.

Furthermore, a precoding matrix that differs from Equation 186 can be provided as follows (where i=0, 1, . . . , 7, and where λ and θ$_{11}$[i] do not change over time (though change may be allowed)).

Math 197

$$F[i] = \frac{1}{\sqrt{2}} \begin{pmatrix} e^{j\theta_{11}[i]} & e^{j(\theta_{11}[i]+\lambda)} \\ e^{j\left(\theta_{11}[i]+\frac{i\pi}{4}\right)} & e^{j\left(\theta_{11}[i]+\frac{i\pi}{4}+\lambda+\frac{7\pi}{8}\right)} \end{pmatrix} \quad \text{Equation 187}$$

Accordingly, the poor reception points for s1 and s2 become as in FIG. 34. Instead of Equations 186 and 187, precoding matrices may be provided as follows (where i=0, 1, . . . , 7, and where λ and θ$_{11}$[i] do not change over time (though change may be allowed)).

Math 198

$$F[i] = \frac{1}{\sqrt{2}} \begin{pmatrix} e^{j0} & e^{j0} \\ e^{j\left(-\frac{i\pi}{4}\right)} & e^{j\left(-\frac{i\pi}{4}+\frac{7\pi}{8}\right)} \end{pmatrix} \quad \text{Equation 188}$$

or

Math 199

$$F[i] = \frac{1}{\sqrt{2}} \begin{pmatrix} e^{j\theta_{11}[i]} & e^{j(\theta_{11}[i]+\lambda)} \\ e^{j\left(\theta_{11}[i]-\frac{i\pi}{4}\right)} & e^{j\left(\theta_{11}[i]-\frac{i\pi}{4}+\lambda+\frac{7\pi}{8}\right)} \end{pmatrix} \quad \text{Equation 189}$$

(In Equations 186-189, 7π/8 may be changed to −7π/8.)

Next, in the precoding matrix of Equation 174, a precoding hopping method that differs from Example #7 and Example #8 by letting α≠1, and by taking into consideration the distance in the complex plane between poor reception points, is examined.

In this case, the precoding hopping method for an N-slot time period (cycle) of Equation 174 is used, and from Condition #14, in all of the Γ terminals, there is one slot or less having poor reception points for s1 among the N slots in a time period (cycle). Accordingly, the log-likelihood ratio for bits transmitted by s1(p) can be obtained for at least N−1 slots. Similarly, from Condition #15, in all of the Γ terminals, there is one slot or less having poor reception points for s2 among the N slots in a time period (cycle). Accordingly, the log-likelihood ratio for bits transmitted by s2(p) can be obtained for at least N−1 slots.

Therefore, it is clear that a larger value for N in the N-slot time period (cycle) increases the number of slots in which the log-likelihood ratio can be obtained.

Incidentally, since the influence of scattered wave components is also present in an actual channel model, it is considered that when the number of slots N in the time period (cycle) is fixed, there is a possibility of improved data reception quality if the minimum distance in the complex plane between poor reception points is as large as possible. Accordingly, in the context of Example #7 and Example #8, precoding hopping methods in which α≠1 and which improve on Example #7 and Example #8 are considered. The precoding method that improves on Example #8 is easier to understand and is therefore described first.

Example #9

From Equation 186, the precoding matrices in an N=8 time period (cycle) precoding hopping method that improves on Example #8 are provided in the following equation.

Math 200

$$F[i] = \frac{1}{\sqrt{\alpha^2+1}} \begin{pmatrix} e^{j0} & \alpha \times e^{j0} \\ \alpha \times e^{j\frac{i\pi}{4}} & e^{j\left(\frac{i\pi}{4}+\frac{7\pi}{8}\right)} \end{pmatrix} \quad \text{Equation 190}$$

Here, i=0, 1, . . . , 7. Furthermore, precoding matrices that differ from Equation 190 can be provided as follows (where i=0, 1, . . . , 7, and where λ and θ$_{11}$[i] do not change over time (though change may be allowed)).

Math 201

$$F[i] = \frac{1}{\sqrt{\alpha^2+1}} \begin{pmatrix} e^{j\theta_{11}[i]} & \alpha \times e^{j(\theta_{11}[i]+\lambda)} \\ \alpha \times e^{j\left(\theta_{11}[i]+\frac{i\pi}{4}\right)} & e^{j\left(\theta_{11}[i]+\frac{i\pi}{4}+\lambda+\frac{7\pi}{8}\right)} \end{pmatrix} \quad \text{Equation 191}$$

or

Math 202

$$F[i] = \frac{1}{\sqrt{\alpha^2+1}} \begin{pmatrix} e^{j0} & \alpha \times e^{j0} \\ \alpha \times e^{j\left(-\frac{i\pi}{4}\right)} & e^{j\left(-\frac{i\pi}{4}+\frac{7\pi}{8}\right)} \end{pmatrix} \quad \text{Equation 192}$$

or

Math 203

$$F[i] = \frac{1}{\sqrt{\alpha^2+1}} \begin{pmatrix} e^{j\theta_{11}[i]} & \alpha \times e^{j(\theta_{11}[i]+\lambda)} \\ \alpha \times e^{j\left(\theta_{11}[i]-\frac{i\pi}{4}\right)} & e^{j\left(\theta_{11}[i]-\frac{i\pi}{4}+\lambda+\frac{7\pi}{8}\right)} \end{pmatrix} \quad \text{Equation 193}$$

or

Math 204

$$F[i] = \frac{1}{\sqrt{\alpha^2+1}} \begin{pmatrix} e^{j0} & \alpha \times e^{j0} \\ \alpha \times e^{j\frac{i\pi}{4}} & e^{j\left(\frac{i\pi}{4}-\frac{7\pi}{8}\right)} \end{pmatrix} \quad \text{Equation 194}$$

or

Math 205

$$F[i] = \frac{1}{\sqrt{\alpha^2+1}} \begin{pmatrix} e^{j\theta_{11}[i]} & \alpha \times e^{j(\theta_{11}[i]+\lambda)} \\ \alpha \times e^{j(\theta_{11}[i]+\frac{i\pi}{4})} & e^{j(\theta_{11}[i]+\frac{i\pi}{4}+\lambda-\frac{7\pi}{8})} \end{pmatrix} \quad \text{Equation 195}$$

or

Math 206

$$F[i] = \frac{1}{\sqrt{\alpha^2+1}} \begin{pmatrix} e^{j0} & \alpha \times e^{j0} \\ \alpha \times e^{j(-\frac{i\pi}{4})} & e^{j(-\frac{i\pi}{4}-\frac{7\pi}{8})} \end{pmatrix} \quad \text{Equation 196}$$

or

Math 207

$$F[i] = \frac{1}{\sqrt{\alpha^2+1}} \begin{pmatrix} e^{j\theta_{11}[i]} & \alpha \times e^{j(\theta_{11}[i]+\lambda)} \\ \alpha \times e^{j(\theta_{11}[i]-\frac{i\pi}{4})} & e^{j(\theta_{11}[i]-\frac{i\pi}{4}+\lambda-\frac{7\pi}{8})} \end{pmatrix} \quad \text{Equation 197}$$

Figure 35B:
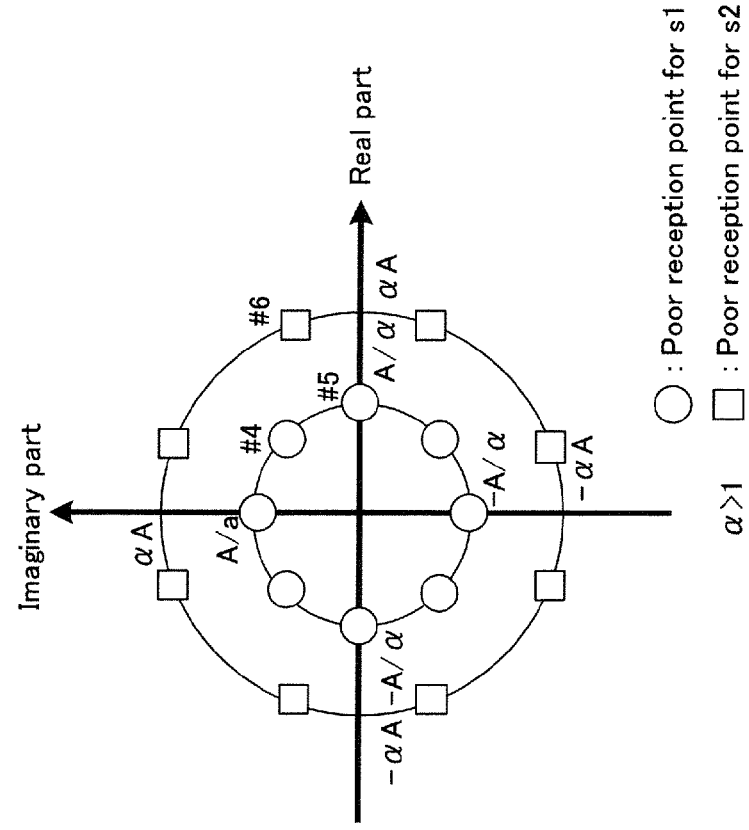
FIGS. 35A and 35B show positions of poor reception points.
Figure 35A:
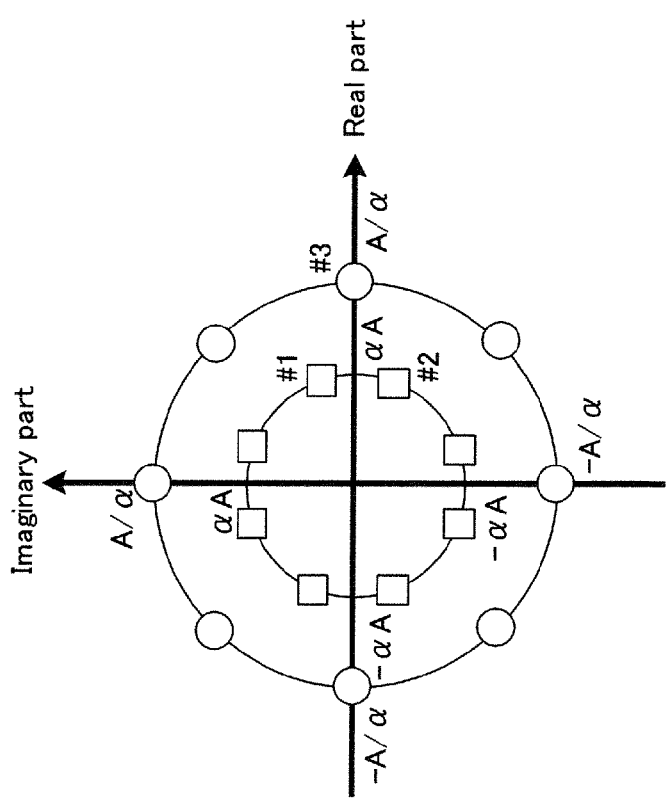

Therefore, the poor reception points for s1 and s2 are represented as in FIG. 35A when $\alpha<1.0$ and as in FIG. 35B when $\alpha>1.0$.

(i) When $\alpha<1.0$

Figure 36:
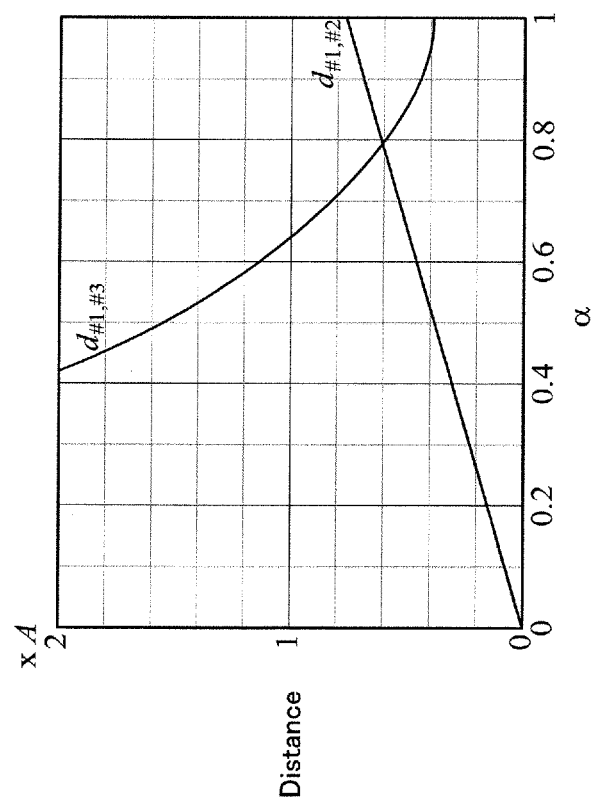
FIG. 36 shows an example of minimum distance characteristics of poor reception points in an imaginary plane.

When $\alpha<1.0$, the minimum distance in the complex plane between poor reception points is represented as min $\{d_{\#1,\#2}, d_{\#1,\#3}\}$ when focusing on the distance $(d_{\#1,\#2})$ between poor reception points #1 and #2 and the distance $(d_{\#1,\#3})$ between poor reception points #1 and #3. In this case, the relationship between $\alpha$ and $d_{\#1,\#2}$ and between $\alpha$ and $d_{\#1,\#3}$ is shown in FIG. 36. The $\alpha$ which makes min $\{d_{\#1,\#2}, d_{\#1,\#3}\}$ the largest is as follows.

Math 208

$$\alpha = \frac{1}{\sqrt{\cos(\frac{\pi}{8})+\sqrt{3}\sin(\frac{\pi}{8})}} \quad \text{Equation 198}$$

$$\approx 0.7938$$

The min $\{d_{\#1,\#2}, d_{\#1,\#3}\}$ in this case is as follows.

Math 209

$$\min\{d_{\#1,\#2}, d_{\#1,\#3}\} = \frac{2A\sin(\frac{\pi}{8})}{\sqrt{\cos(\frac{\pi}{8})+\sqrt{3}\sin(\frac{\pi}{8})}} \quad \text{Equation 199}$$

$$\approx 0.6076A$$

Therefore, the precoding method using the value of $\alpha$ in Equation 198 for Equations 190-197 is effective. Setting the value of $\alpha$ as in Equation 198 is one appropriate method for obtaining excellent data reception quality. Setting $\alpha$ to be a value near Equation 198, however, may similarly allow for excellent data reception quality. Accordingly, the value to which $\alpha$ is set is not limited to Equation 198.

(ii) When $\alpha>1.0$

Figure 37:
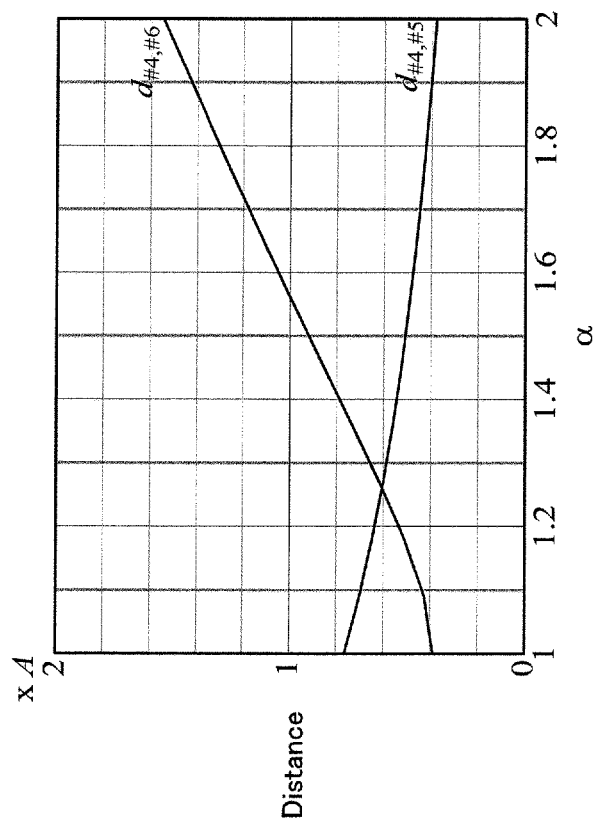
FIG. 37 shows an example of minimum distance characteristics of poor reception points in an imaginary plane.

When $\alpha>1.0$, the minimum distance in the complex plane between poor reception points is represented as min $\{d_{\#4,\#5}, d_{\#4,\#6}\}$ when focusing on the distance $(d_{\#4,\#5})$ between poor reception points #4 and #5 and the distance $(d_{\#4,\#6})$ between poor reception points #4 and #6. In this case, the relationship between $\alpha$ and $d_{\#4,\#5}$ and between $\alpha$ and $d_{\#4,\#6}$ is shown in FIG. 37. The $\alpha$ which makes min $\{d_{\#4,\#5}, d_{\#4,\#6}\}$ the largest is as follows.

Math 210

$$\alpha = \sqrt{\cos(\frac{\pi}{8})+\sqrt{3}\sin(\frac{\pi}{8})} \quad \text{Equation 200}$$

$$\approx 1.2596$$

The min $\{d_{\#4,\#5}, d_{\#4,\#6}\}$ in this case is as follows.

Math 211

$$\min\{d_{\#4,\#5}, d_{\#4,\#6}\} = \frac{2A\sin(\frac{\pi}{8})}{\sqrt{\cos(\frac{\pi}{8})+\sqrt{3}\sin(\frac{\pi}{8})}} \quad \text{Equation 201}$$

$$\approx 0.6076A$$

Therefore, the precoding method using the value of $\alpha$ in Equation 200 for Equations 190-197 is effective. Setting the value of $\alpha$ as in Equation 200 is one appropriate method for obtaining excellent data reception quality. Setting $\alpha$ to be a value near Equation 200, however, may similarly allow for excellent data reception quality. Accordingly, the value to which $\alpha$ is set is not limited to Equation 200.

Example #10

Based on consideration of Example #9, the precoding matrices in an N=16 time period (cycle) precoding hopping method that improves on Example #7 are provided in the following equations (where $\lambda$ and $\theta_{11}[i]$ do not change over time (though change may be allowed)).

For i=0, 1, ..., 7:

Math 212

$$F[i] = \frac{1}{\sqrt{\alpha^2+1}} \begin{pmatrix} e^{j0} & \alpha \times e^{j0} \\ \alpha \times e^{j\frac{i\pi}{4}} & e^{j(\frac{i\pi}{4}+\frac{7\pi}{8})} \end{pmatrix} \quad \text{Equation 202}$$

For i=8, 9, ..., 15:

Math 213

$$F[i] = \frac{1}{\sqrt{\alpha^2+1}} \begin{pmatrix} \alpha \times e^{j\frac{i\pi}{4}} & e^{j(\frac{i\pi}{4}+\frac{7\pi}{8})} \\ e^{j0} & \alpha \times e^{j0} \end{pmatrix} \quad \text{Equation 203}$$

or
For i=0, 1, ..., 7:

Math 214

$$F[i] = \frac{1}{\sqrt{\alpha^2+1}} \begin{pmatrix} e^{j\theta_{11}[i]} & \alpha \times e^{j(\theta_{11}[i]+\lambda)} \\ \alpha \times e^{j(\theta_{11}[i]+\frac{i\pi}{4})} & e^{j(\theta_{11}[i]+\frac{i\pi}{4}+\lambda+\frac{7\pi}{8})} \end{pmatrix} \quad \text{Equation 204}$$

For i=8, 9, ..., 15:

Math 215

$$F[i] = \frac{1}{\sqrt{\alpha^2+1}} \begin{pmatrix} \alpha \times e^{j(\theta_{11}[i]+\frac{i\pi}{4})} & e^{j(\theta_{11}[i]+\frac{i\pi}{4}+\lambda+\frac{7\pi}{8})} \\ e^{j\theta_{11}[i]} & \alpha \times e^{j(\theta_{11}[i]+\lambda)} \end{pmatrix} \quad \text{Equation 205}$$

or
For i=0, 1, ..., 7:

Math 216

$$F[i] = \frac{1}{\sqrt{\alpha^2+1}} \begin{pmatrix} e^{j0} & \alpha \times e^{j0} \\ \alpha \times e^{j(-\frac{i\pi}{4})} & e^{j(-\frac{i\pi}{4}+\frac{7\pi}{8})} \end{pmatrix} \quad \text{Equation 206}$$

For i=8, 9, ..., 15:

Math 217

$$F[i] = \frac{1}{\sqrt{\alpha^2+1}} \begin{pmatrix} \alpha \times e^{j(-\frac{i\pi}{4})} & e^{j(-\frac{i\pi}{4}+\frac{7\pi}{8})} \\ e^{j0} & \alpha \times e^{j0} \end{pmatrix} \quad \text{Equation 207}$$

or
For i=0, 1, ..., 7:

Math 218

$$F[i] = \frac{1}{\sqrt{\alpha^2+1}} \begin{pmatrix} e^{j\theta_{11}[i]} & \alpha \times e^{j(\theta_{11}[i]+\lambda)} \\ \alpha \times e^{j(\theta_{11}[i]-\frac{i\pi}{4})} & e^{j(\theta_{11}[i]-\frac{i\pi}{4}+\lambda+\frac{7\pi}{8})} \end{pmatrix} \quad \text{Equation 208}$$

For i=8, 9, ..., 15:

Math 219

$$F[i] = \frac{1}{\sqrt{\alpha^2+1}} \begin{pmatrix} \alpha \times e^{j(\theta_{11}[i]-\frac{i\pi}{4})} & e^{j(\theta_{11}[i]-\frac{i\pi}{4}+\lambda+\frac{7\pi}{8})} \\ e^{j\theta_{11}[i]} & \alpha \times e^{j(\theta_{11}[i]+\lambda)} \end{pmatrix} \quad \text{Equation 209}$$

or
For i=0, 1, ..., 7:

Math 220

$$F[i] = \frac{1}{\sqrt{\alpha^2+1}} \begin{pmatrix} e^{j0} & \alpha \times e^{j0} \\ \alpha \times e^{j\frac{i\pi}{4}} & e^{j(\frac{i\pi}{4}-\frac{7\pi}{8})} \end{pmatrix} \quad \text{Equation 210}$$

For i=8, 9, ..., 15:

Math 221

$$F[i] = \frac{1}{\sqrt{\alpha^2+1}} \begin{pmatrix} \alpha \times e^{j\frac{i\pi}{4}} & e^{j(\frac{i\pi}{4}-\frac{7\pi}{8})} \\ e^{j0} & \alpha \times e^{j0} \end{pmatrix} \quad \text{Equation 211}$$

or
For i=0, 1, ..., 7:

$$F[i] = \frac{1}{\sqrt{\alpha^2+1}} \begin{pmatrix} e^{j\theta_{11}[i]} & \alpha \times e^{j(\theta_{11}[i]+\lambda)} \\ \alpha \times e^{j(\theta_{11}[i]+\frac{i\pi}{4})} & e^{j(\theta_{11}[i]+\frac{i\pi}{4}+\lambda-\frac{7\pi}{8})} \end{pmatrix} \quad \text{Equation 212}$$

For i=8, 9, ..., 15:

Math 223

$$F[i] = \frac{1}{\sqrt{\alpha^2+1}} \begin{pmatrix} \alpha \times e^{j(\theta_{11}[i]+\frac{i\pi}{4})} & e^{j(\theta_{11}[i]+\frac{i\pi}{4}+\lambda+\frac{7\pi}{8})} \\ e^{j\theta_{11}[i]} & \alpha \times e^{j(\theta_{11}[i]+\lambda)} \end{pmatrix} \quad \text{Equation 213}$$

or
For i=0, 1, ..., 7:

Math 224

$$F[i] = \frac{1}{\sqrt{\alpha^2+1}} \begin{pmatrix} e^{j0} & \alpha \times e^{j0} \\ \alpha \times e^{j(-\frac{i\pi}{4})} & e^{j(-\frac{i\pi}{4}-\frac{7\pi}{8})} \end{pmatrix} \quad \text{Equation 214}$$

For i=8, 9, ..., 15:

$$F[i] = \frac{1}{\sqrt{\alpha^2+1}} \begin{pmatrix} \alpha \times e^{j(-\frac{i\pi}{4})} & e^{j(-\frac{i\pi}{4}-\frac{7\pi}{8})} \\ e^{j0} & \alpha \times e^{j0} \end{pmatrix} \quad \text{Equation 215}$$

or
For i=0, 1, ..., 7:

Math 226

$$F[i] = \frac{1}{\sqrt{\alpha^2+1}} \begin{pmatrix} e^{j\theta_{11}[i]} & \alpha \times e^{j(\theta_{11}[i]+\lambda)} \\ \alpha \times e^{j(\theta_{11}[i]-\frac{i\pi}{4})} & e^{j(\theta_{11}[i]-\frac{i\pi}{4}+\lambda-\frac{7\pi}{8})} \end{pmatrix} \quad \text{Equation 216}$$

For i=8, 9, . . . , 15:

Math 227

$$F[i] = \frac{1}{\sqrt{\alpha^2 + 1}} \begin{pmatrix} \alpha \times e^{j(\theta_{11}[i]-\frac{i\pi}{4})} & e^{j(\theta_{11}[i]-\frac{i\pi}{4}+\lambda-\frac{7\pi}{8})} \\ e^{j\theta_{11}[i]} & \alpha \times e^{j(\theta_{11}[i]+\lambda)} \end{pmatrix} \quad \text{Equation 217}$$

Figure 38:
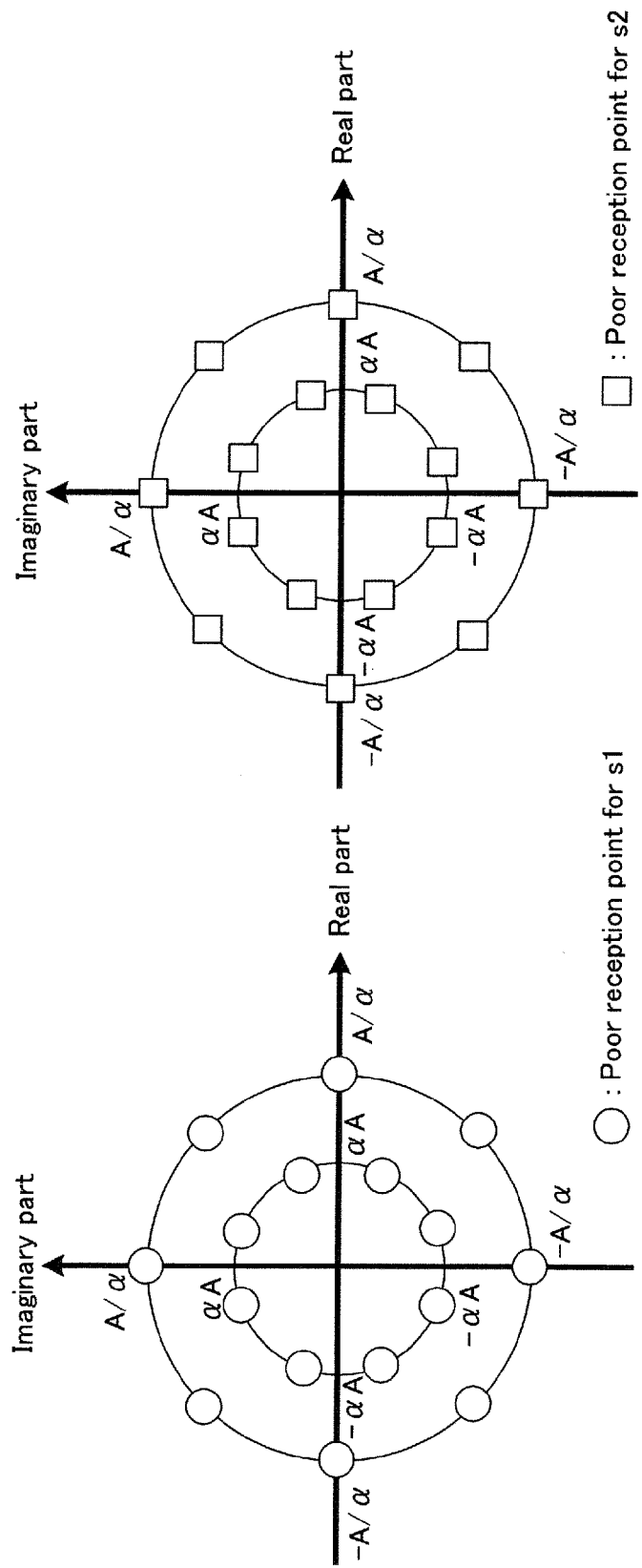
FIGS. 38A and 38B show positions of poor reception points.
Figure 39:
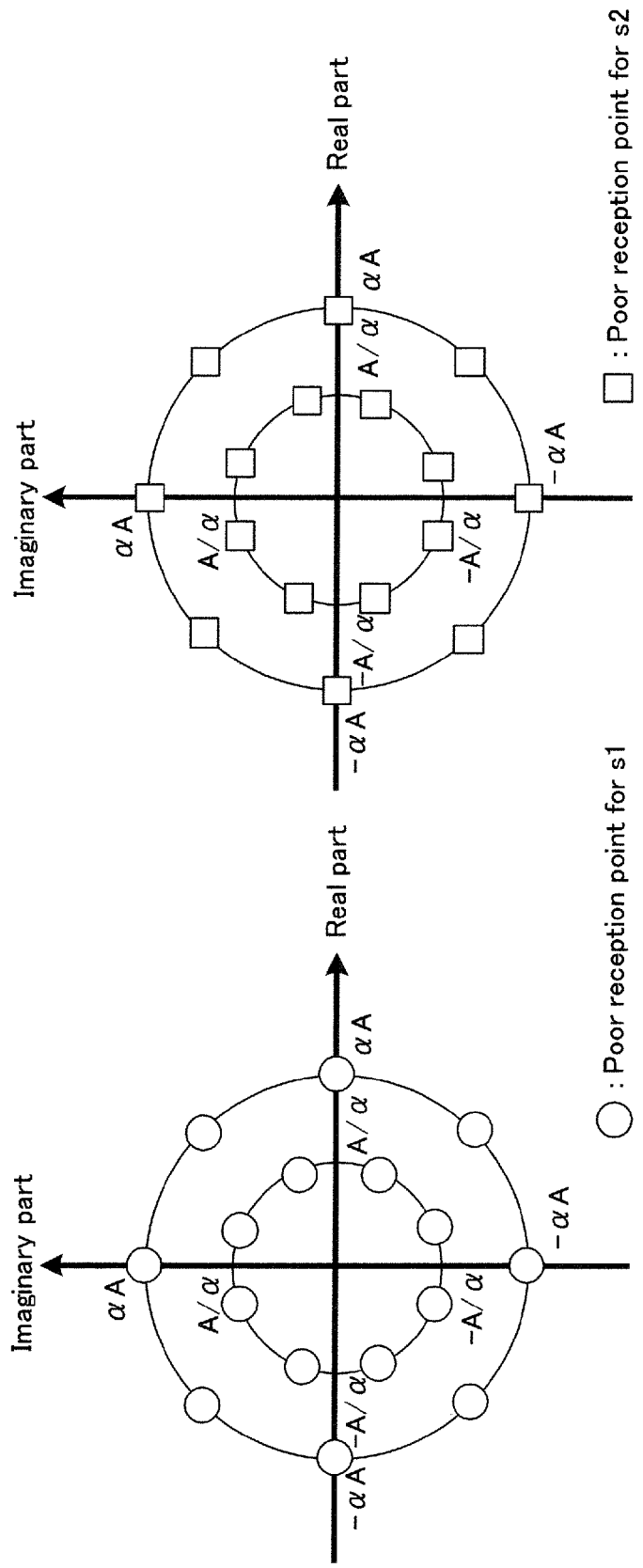
FIGS. 39A and 39B show positions of poor reception points.

The value of α in Equation 198 and in Equation 200 is appropriate for obtaining excellent data reception quality. The poor reception points for s1 are represented as in FIGS. 38A and 38B when α<1.0 and as in FIGS. 39A and 39B when α>1.0.

In the present embodiment, the method of structuring N different precoding matrices for a precoding hopping method with an N-slot time period (cycle) has been described. In this case, as the N different precoding matrices, F[0], F[1], F[2], . . . , F[N−2], F[N−1] are prepared. In the present embodiment, an example of a single carrier transmission method has been described, and therefore the case of arranging symbols in the order F[0], F[1], F[2], . . . , F[N−2], F[N−1] in the time domain (or the frequency domain) has been described. The present invention is not, however, limited in this way, and the N different precoding matrices F[0], F[1], F[2], . . . , F[N−2], F[N−1] generated in the present embodiment may be adapted to a multi-carrier transmission method such as an OFDM transmission method or the like. As in Embodiment 1, as a method of adaption in this case, precoding weights may be changed by arranging symbols in the frequency domain and in the frequency-time domain. Note that a precoding hopping method with an N-slot time period (cycle) has been described, but the same advantageous effects may be obtained by randomly using N different precoding matrices. In other words, the N different precoding matrices do not necessarily need to be used in a regular period (cycle).

Examples #5 through #10 have been shown based on Conditions #10 through #16. However, in order to achieve a precoding matrix hopping method with a longer period (cycle), the period (cycle) for hopping between precoding matrices may be lengthened by, for example, selecting a plurality of examples from Examples #5 through #10 and using the precoding matrices indicated in the selected examples. For example, a precoding matrix hopping method with a longer period (cycle) may be achieved by using the precoding matrices indicated in Example #7 and the precoding matrices indicated in Example #10. In this case, Conditions #10 through #16 are not necessarily observed. (In Equation 158 of Condition #10, Equation 159 of Condition #11, Equation 164 of Condition #13, Equation 175 of Condition #14, and Equation 176 of Condition #15, it becomes important for providing excellent reception quality for the conditions "all x and all y" to be "existing x and existing y".) When viewed from a different perspective, in the precoding matrix hopping method over an N-slot period (cycle) (where N is a large natural number), the probability of providing excellent reception quality increases when the precoding matrices of one of Examples #5 through #10 are included.

Embodiment 7

The present embodiment describes the structure of a reception device for receiving modulated signals transmitted by a transmission method that regularly hops between precoding matrices as described in Embodiments 1-6.

In Embodiment 1, the following method has been described. A transmission device that transmits modulated signals, using a transmission method that regularly hops between precoding matrices, transmits information regarding the precoding matrices. Based on this information, a reception device obtains information on the regular precoding matrix hopping used in the transmitted frames, decodes the precoding, performs detection, obtains the log-likelihood ratio for the transmitted bits, and subsequently performs error correction decoding.

The present embodiment describes the structure of a reception device, and a method of hopping between precoding matrices, that differ from the above structure and method.

Figure 40:
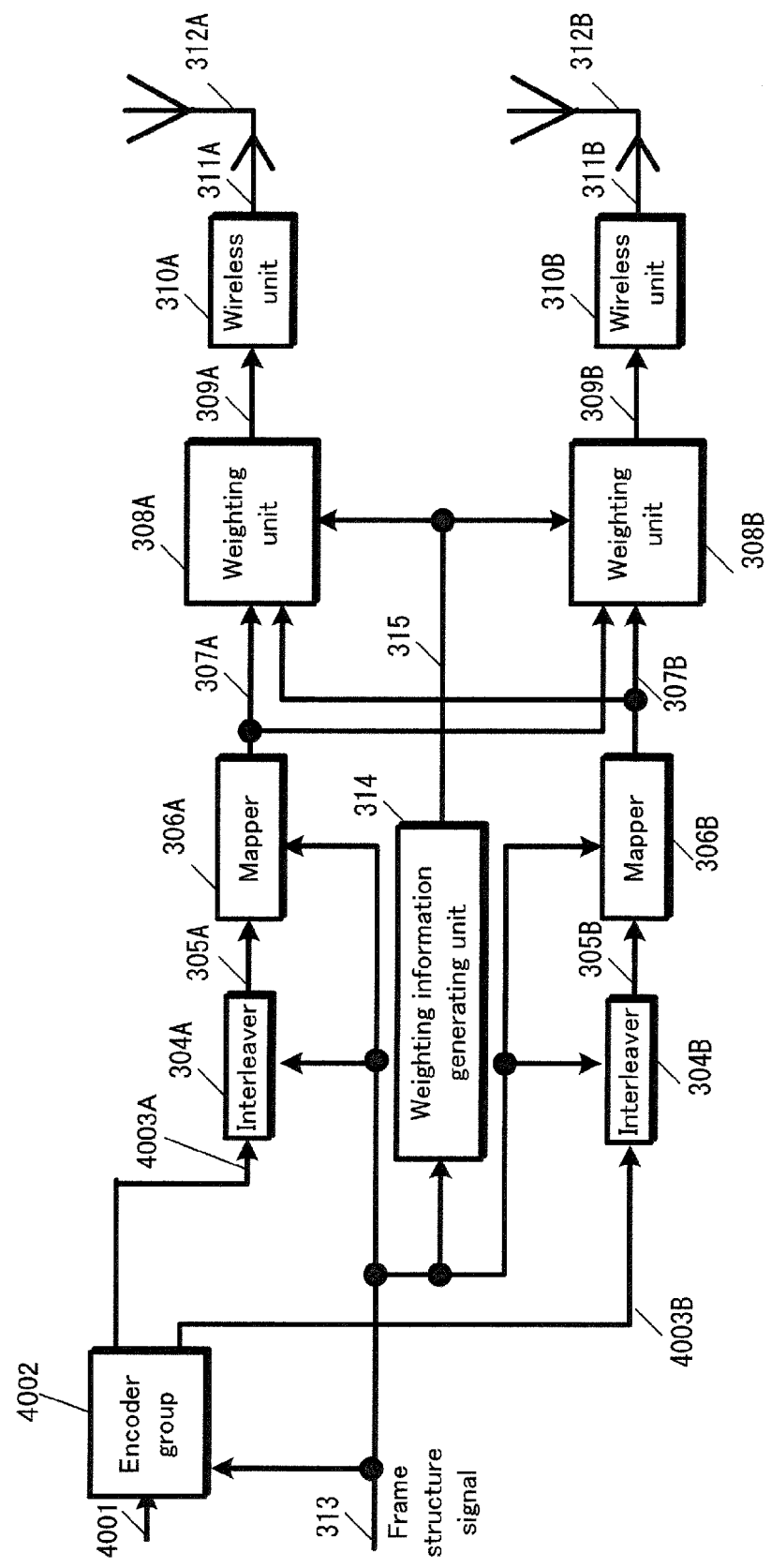
FIG. 40 is an example of the structure of a transmission device in Embodiment 7.

FIG. 40 is an example of the structure of a transmission device in the present embodiment. Elements that operate in a similar way to FIG. 3 bear the same reference signs. An encoder group (4002) receives transmission bits (4001) as input. The encoder group (4002), as described in Embodiment 1, includes a plurality of encoders for error correction coding, and based on the frame structure signal 313, a certain number of encoders operate, such as one encoder, two encoders, or four encoders.

When one encoder operates, the transmission bits (4001) are encoded to yield encoded transmission bits. The encoded transmission bits are allocated into two parts, and the encoder group (4002) outputs allocated bits (4003A) and allocated bits (4003B).

When two encoders operate, the transmission bits (4001) are divided in two (referred to as divided bits A and B). The first encoder receives the divided bits A as input, encodes the divided bits A, and outputs the encoded bits as allocated bits (4003A). The second encoder receives the divided bits B as input, encodes the divided bits B, and outputs the encoded bits as allocated bits (4003B).

When four encoders operate, the transmission bits (4001) are divided in four (referred to as divided bits A, B, C, and D). The first encoder receives the divided bits A as input, encodes the divided bits A, and outputs the encoded bits A. The second encoder receives the divided bits B as input, encodes the divided bits B, and outputs the encoded bits B. The third encoder receives the divided bits C as input, encodes the divided bits C, and outputs the encoded bits C. The fourth encoder receives the divided bits D as input, encodes the divided bits D, and outputs the encoded bits D. The encoded bits A, B, C, and D are divided into allocated bits (4003A) and allocated bits (4003B).

The transmission device supports a transmission method such as, for example, the following Table 1 (Table 1A and Table 1B).

TABLE 1A

| Number of modulated transmission signals (number of transmit antennas) | Modulation method | Number of encoders | Error correction coding method | Transmission information | Precoding matrix hopping method |
|---|---|---|---|---|---|
| 1 | QPSK | 1 | A | 00000000 | — |
|   |       |   | B | 00000001 | — |
|   |       |   | C | 00000010 | — |
|   | 16QAM | 1 | A | 00000011 | — |
|   |       |   | B | 00000100 | — |
|   |       |   | C | 00000101 | — |
|   | 64QAM | 1 | A | 00000110 | — |
|   |       |   | B | 00000111 | — |
|   |       |   | C | 00001000 | — |

TABLE 1A-continued

| Number of modulated transmission signals (number of transmit antennas) | Modulation method | Number of encoders | Error correction coding method | Transmission information | Precoding matrix hopping method |
|---|---|---|---|---|---|
| | 256QAM | 1 | A | 00001001 | — |
| | | | B | 00001010 | — |
| | | | C | 00001011 | — |
| | 1024QAM | 1 | A | 00001100 | — |
| | | | B | 00001101 | — |
| | | | C | 00001110 | — |

TABLE 1B

| Number of modulated transmission signals (number of transmit antennas) | Modulation method | Number of encoders | Error correction coding method | Transmission information | Precoding matrix hopping method |
|---|---|---|---|---|---|
| 2 | #1: QPSK, #2: QPSK | 1 | A | 00001111 | D |
| | | | B | 00010000 | D |
| | | | C | 00010001 | D |
| | | 2 | A | 00010010 | E |
| | | | B | 00010011 | E |
| | | | C | 00010100 | E |
| | #1: QPSK, #2: 16QAM | 1 | A | 00010101 | D |
| | | | B | 00010110 | D |
| | | | C | 00010111 | D |
| | | 2 | A | 00011000 | E |
| | | | B | 00011001 | E |
| | | | C | 00011010 | E |
| | #1: 16QAM, #2: 16QAM | 1 | A | 00011011 | D |
| | | | B | 00011100 | D |
| | | | C | 00011101 | D |
| | | 2 | A | 00011110 | E |
| | | | B | 00011111 | E |
| | | | C | 00100000 | E |
| | #1: 16QAM, #2: 64QAM | 1 | A | 00100001 | D |
| | | | B | 00100010 | D |
| | | | C | 00100011 | D |
| | | 2 | A | 00100100 | E |
| | | | B | 00100101 | E |
| | | | C | 00100110 | E |
| | #1: 64QAM, #2: 64QAM | 1 | A | 00100111 | F |
| | | | B | 00101000 | F |
| | | | C | 00101001 | F |
| | | 2 | A | 00101010 | G |
| | | | B | 00101011 | G |
| | | | C | 00101100 | G |
| | #1: 64QAM, #2: 256QAM | 1 | A | 00101101 | F |
| | | | B | 00101110 | F |
| | | | C | 00101111 | F |
| | | 2 | A | 00110000 | G |
| | | | B | 00110001 | G |
| | | | C | 00110010 | G |
| | #1: 256QAM, #2: 256QAM | 1 | A | 00110011 | F |
| | | | B | 00110100 | F |
| | | | C | 00110101 | F |
| | | 2 | A | 00110110 | G |
| | | | B | 00110111 | G |
| | | | C | 00111000 | G |
| | | 4 | A | 00111001 | H |
| | | | B | 00111010 | H |
| | | | C | 00111011 | H |
| | #1: 256QAM, #2: 1024QAM | 1 | A | 00111100 | F |
| | | | B | 00111101 | F |
| | | | C | 00111110 | F |
| | | 2 | A | 00111111 | G |
| | | | B | 01000000 | G |
| | | | C | 01000001 | G |
| | | 4 | A | 01000010 | H |
| | | | B | 01000011 | H |
| | | | C | 01000100 | H |

TABLE 1B-continued

| Number of modulated transmission signals (number of transmit antennas) | Modulation method | Number of encoders | Error correction coding method | Transmission information | Precoding matrix hopping method |
|---|---|---|---|---|---|
| | #1: 1024QAM, #2: 1024QAM | 1 | A | 01000101 | F |
| | | | B | 01000110 | F |
| | | | C | 01000111 | F |
| | | 2 | A | 01001000 | G |
| | | | B | 01001001 | G |
| | | | C | 01001010 | G |
| | | 4 | A | 01001011 | H |
| | | | B | 01001100 | H |
| | | | C | 01001101 | H |

As shown in Table 1, transmission of a one-stream signal and transmission of a two-stream signal are supported as the number of transmission signals (number of transmit antennas). Furthermore, QPSK, 16QAM, 64QAM, 256QAM, and 1024QAM are supported as the modulation method. In particular, when the number of transmission signals is two, it is possible to set separate modulation methods for stream #1 and stream #2. For example, "#1: 256QAM, #2: 1024QAM" in Table 1 indicates that "the modulation method of stream #1 is 256QAM, and the modulation method of stream #2 is 1024QAM" (other entries in the table are similarly expressed). Three types of error correction coding methods, A, B, and C, are supported. In this case, A, B, and C may all be different coding methods. A, B, and C may also be different coding rates, and A, B, and C may be coding methods with different block sizes.

The pieces of transmission information in Table 1 are allocated to modes that define a "number of transmission signals", "modulation method", "number of encoders", and "error correction coding method". Accordingly, in the case of "number of transmission signals: 2", "modulation method: #1: 1024QAM, #2: 1024QAM", "number of encoders: 4", and "error correction coding method: C", for example, the transmission information is set to 01001101. In the frame, the transmission device transmits the transmission information and the transmission data. When transmitting the transmission data, in particular when the "number of transmission signals" is two, a "precoding matrix hopping method" is used in accordance with Table 1. In Table 1, five types of the "precoding matrix hopping method", D, E, F, G, and H, are prepared. The precoding matrix hopping method is set to one of these five types in accordance with Table 1. The following, for example, are ways of implementing the five different types.

Prepare five different precoding matrices.

Use five different types of periods (cycles), for example a four-slot period (cycle) for D, an eight-slot period (cycle) for E, . . . .

Use both different precoding matrices and different periods (cycles).

Figure 41:
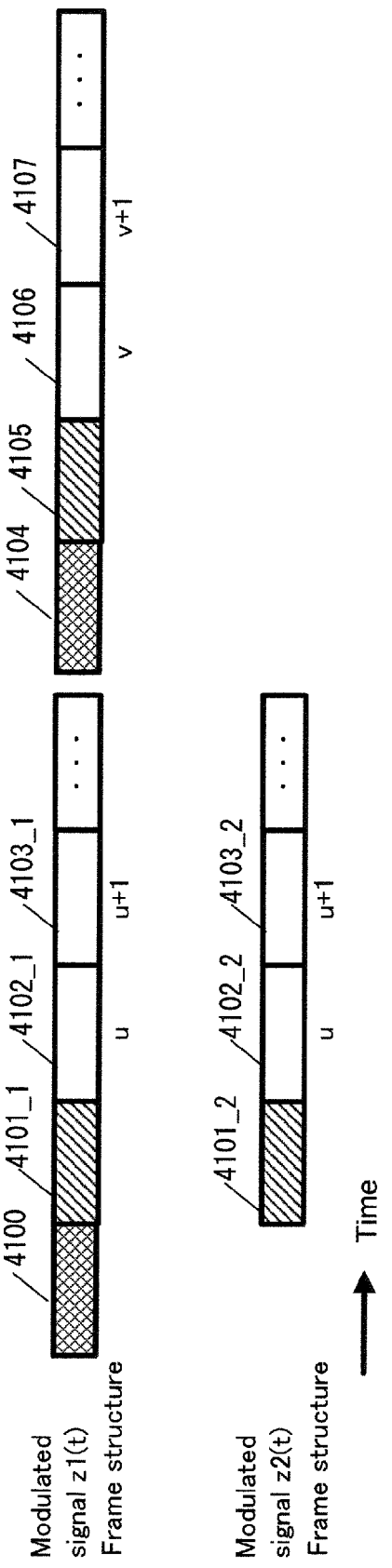
FIG. 41 is an example of the frame structure of a modulated signal transmitted by the transmission device.

FIG. 41 shows an example of a frame structure of a modulated signal transmitted by the transmission device in FIG. 40. The transmission device is assumed to support settings for both a mode to transmit two modulated signals, z1(t) and z2(t), and for a mode to transmit one modulated signal.

In FIG. 41, the symbol (4100) is a symbol for transmitting the "transmission information" shown in Table 1. The symbols (4101_1) and (4101_2) are reference (pilot) symbols for channel estimation. The symbols (4102_1, 4103_1) are data transmission symbols for transmitting the modulated signal z1(t). The symbols (4102_2, 4103_2) are data transmission symbols for transmitting the modulated signal z2(t). The symbol (4102_1) and the symbol (4102_2) are transmitted at the same time along the same (shared/common) frequency, and the symbol (4103_1) and the symbol (4103_2) are transmitted at the same time along the same (shared/common) frequency. The symbols (4102_1, 4103_1) and the symbols (4102_2, 4103_2) are the symbols after precoding matrix calculation using the method of regularly hopping between precoding matrices described in Embodiments 1-4 and Embodiment 6 (therefore, as described in Embodiment 1, the structure of the streams s1(t) and s2(t) is as in FIG. 6).

Furthermore, in FIG. 41, the symbol (4104) is a symbol for transmitting the "transmission information" shown in Table 1. The symbol (4105) is a reference (pilot) symbol for channel estimation. The symbols (4106, 4107) are data transmission symbols for transmitting the modulated signal z1(t). The data transmission symbols for transmitting the modulated signal z1(t) are not precoded, since the number of transmission signals is one.

Accordingly, the transmission device in FIG. 40 generates and transmits modulated signals in accordance with Table 1 and the frame structure in FIG. 41. In FIG. 40, the frame structure signal 313 includes information regarding the "number of transmission signals", "modulation method", "number of encoders", and "error correction coding method" set based on Table 1. The encoder (4002), the mappers 306A, B, and the weighting units 308A, B receive the frame structure signal as an input and operate based on the "number of transmission signals", "modulation method", "number of encoders", and "error correction coding method" that are set based on Table 1. "Transmission information" corresponding to the set "number of transmission signals", "modulation method", "number of encoders", and "error correction coding method" is also transmitted to the reception device.

The structure of the reception device may be represented similarly to FIG. 7 of Embodiment 1. The difference with Embodiment 1 is as follows: since the transmission device and the reception device store the information in Table 1 in advance, the transmission device does not need to transmit information for regularly hopping between precoding matrices, but rather transmits "transmission information" corresponding to the "number of transmission signals", "modulation method", "number of encoders", and "error correction coding method", and the reception device obtains information for regularly hopping between precoding matrices from Table 1 by receiving the "transmission information". Accordingly, by the control information decoding unit 709 obtaining the "transmission information" transmitted by the transmission device in FIG. 40, the reception device in FIG. 7 obtains, from the information corresponding to Table 1, a signal 710 regarding information on the transmission method, as notified by the transmission device, which includes information for regularly hopping between precoding matrices. Therefore, when the number of transmission signals is two, the signal processing unit 711 can perform detection based on a precoding matrix hopping pattern to obtain received log-likelihood ratios.

Note that in the above description, "transmission information" is set with respect to the "number of transmission signals", "modulation method", "number of encoders", and "error correction coding method" as in Table 1, and the precoding matrix hopping method is set with respect to the "transmission information". However, it is not necessary to set the "transmission information" with respect to the "number of transmission signals", "modulation method", "number of encoders", and "error correction coding method". For example, as in Table 2, the "transmission information" may be set with respect to the "number of transmission signals" and "modulation method", and the precoding matrix hopping method may be set with respect to the "transmission information".

TABLE 2

| Number of modulated transmission signals (number of transmit antennas) | Modulation method | Transmission information | Precoding matrix hopping method |
|---|---|---|---|
| 1 | QPSK | 00000 | — |
|   | 16QAM | 00001 | — |
|   | 64QAM | 00010 | — |
|   | 256QAM | 00011 | — |
|   | 1024QAM | 00100 | — |
| 2 | #1: QPSK, #2: QPSK | 10000 | D |
|   | #1: QPSK, #2: 16QAM | 10001 | E |
|   | #1: 16QAM, #2: 16QAM | 10010 | E |
|   | #1: 16QAM, #2: 64QAM | 10011 | E |
|   | #1: 64QAM, #2: 64QAM | 10100 | F |
|   | #1: 64QAM, #2: 256QAM | 10101 | F |
|   | #1: 256QAM, #2: 256QAM | 10110 | G |
|   | #1: 256QAM, #2: 1024QAM | 10111 | G |
|   | #1: 1024QAM, #2: 1024QAM | 11000 | H |

In this context, the "transmission information" and the method of setting the precoding matrix hopping method is not limited to Tables 1 and 2. As long as a rule is determined in advance for switching the precoding matrix hopping method based on transmission parameters, such as the "number of transmission signals", "modulation method", "number of encoders", "error correction coding method", or the like (as long as the transmission device and the reception device share a predetermined rule, or in other words, if the precoding matrix hopping method is switched based on any of the transmission parameters (or on any plurality of transmission parameters)), the transmission device does not need to transmit information regarding the precoding matrix hopping method. The reception device can identify the precoding matrix hopping method used by the transmission device by identifying the information on the transmission parameters and can therefore accurately perform decoding and detection. Note that in Tables 1 and 2, a transmission method that regularly hops between precoding matrices is used when the number of modulated transmission signals is two, but a transmission method that regularly hops between precoding matrices may be used when the number of modulated transmission signals is two or greater.

Accordingly, if the transmission device and reception device share a table regarding transmission patterns that includes information on precoding hopping methods, the transmission device need not transmit information regarding the precoding hopping method, transmitting instead control information that does not include information regarding the precoding hopping method, and the reception device can infer the precoding hopping method by acquiring this control information.

As described above, in the present embodiment, the transmission device does not transmit information directly related to the method of regularly hopping between precoding matrices. Rather, a method has been described wherein the reception device infers information regarding precoding for the "method of regularly hopping between precoding matrices" used by the transmission device. This method yields the advantageous effect of improved transmission efficiency of data as a result of the transmission device not transmitting information directly related to the method of regularly hopping between precoding matrices.

Note that the present embodiment has been described as changing precoding weights in the time domain, but as described in Embodiment 1, the present invention may be similarly embodied when using a multi-carrier transmission method such as OFDM or the like.

In particular, when the precoding hopping method only changes depending on the number of transmission signals, the reception device can learn the precoding hopping method by acquiring information, transmitted by the transmission device, on the number of transmission signals.

In the present description, it is considered that a communications/broadcasting device such as a broadcast station, a base station, an access point, a terminal, a mobile phone, or the like is provided with the transmission device, and that a communications device such as a television, radio, terminal, personal computer, mobile phone, access point, base station, or the like is provided with the reception device. Additionally, it is considered that the transmission device and the reception device in the present description have a communications function and are capable of being connected via some sort of interface to a device for executing applications for a television, radio, personal computer, mobile phone, or the like.

Furthermore, in the present embodiment, symbols other than data symbols, such as pilot symbols (preamble, unique word, postamble, reference symbol, and the like), symbols for control information, and the like may be arranged in the frame in any way. While the terms "pilot symbol" and "symbols for control information" have been used here, any term may be used, since the function itself is what is important.

It suffices for a pilot symbol, for example, to be a known symbol modulated with PSK modulation in the transmission and reception devices (or for the reception device to be able to synchronize in order to know the symbol transmitted by the transmission device). The reception device uses this symbol for frequency synchronization, time synchronization, channel estimation (estimation of Channel State Information (CSI) for each modulated signal), detection of signals, and the like.

A symbol for control information is for transmitting information other than data (of applications or the like) that needs to be transmitted to the communication partner for achieving communication (for example, the modulation method, error correction coding method, coding ratio of the error correction coding method, setting information in the upper layer, and the like).

Note that the present invention is not limited to the above Embodiments 1-5 and may be embodied with a variety of modifications. For example, the above embodiments describe communications devices, but the present invention is not limited to these devices and may be implemented as software for the corresponding communications method.

Furthermore, a precoding hopping method used in a method of transmitting two modulated signals from two antennas has been described, but the present invention is not limited in this way. The present invention may be also embodied as a precoding hopping method for similarly changing precoding weights (matrices) in the context of a method whereby four mapped signals are precoded to generate four modulated signals that are transmitted from four antennas, or more generally, whereby N mapped signals are precoded to generate N modulated signals that are transmitted from N antennas.

In the description, terms such as "precoding" and "precoding weight" are used, but any other terms may be used. What matters in the present invention is the actual signal processing.

Different data may be transmitted in streams $s1(t)$ and $s2(t)$, or the same data may be transmitted.

Each of the transmit antennas of the transmission device and the receive antennas of the reception device shown in the figures may be formed by a plurality of antennas.

Programs for executing the above transmission method may, for example, be stored in advance in Read Only Memory (ROM) and be caused to operate by a Central Processing Unit (CPU).

Furthermore, the programs for executing the above transmission method may be stored in a computer-readable recording medium, the programs stored in the recording medium may be loaded in the Random Access Memory (RAM) of the computer, and the computer may be caused to operate in accordance with the programs.

The components in the above embodiments may be typically assembled as a Large Scale Integration (LSI), a type of integrated circuit. Individual components may respectively be made into discrete chips, or part or all of the components in each embodiment may be made into one chip. While an LSI has been referred to, the terms Integrated Circuit (IC), system LSI, super LSI, or ultra LSI may be used depending on the degree of integration. Furthermore, the method for assembling integrated circuits is not limited to LSI, and a dedicated circuit or a general-purpose processor may be used. A Field Programmable Gate Array (FPGA), which is programmable after the LSI is manufactured, or a reconfigurable processor, which allows reconfiguration of the connections and settings of circuit cells inside the LSI, may be used.

Furthermore, if technology for forming integrated circuits that replaces LSIs emerges, owing to advances in semiconductor technology or to another derivative technology, the integration of functional blocks may naturally be accomplished using such technology. The application of biotechnology or the like is possible.

Embodiment 8

The present embodiment describes an application of the method described in Embodiments 1-4 and Embodiment 6 for regularly hopping between precoding weights.

FIG. 6 relates to the weighting method (precoding method) in the present embodiment. The weighting unit 600 integrates the weighting units 308A and 308B in FIG. 3. As shown in FIG. 6, the stream $s1(t)$ and the stream $s2(t)$ correspond to the baseband signals 307A and 307B in FIG. 3. In other words, the streams $s1(t)$ and $s2(t)$ are the baseband signal in-phase components I and quadrature components Q when mapped according to a modulation scheme such as QPSK, 16QAM, 64QAM, or the like. As indicated by the frame structure of FIG. 6, the stream $s1(t)$ is represented as $s1(u)$ at symbol number u, as $s1(u+1)$ at symbol number u+1, and so forth. Similarly, the stream $s2(t)$ is represented as $s2(u)$ at symbol number u, as $s2(u+1)$ at symbol number u+1, and so forth. The weighting unit 600 receives the baseband signals 307A ($s1(t)$) and 307B ($s2(t)$) and the information 315 regarding weighting information in FIG. 3 as inputs, performs weighting in accordance with the information 315 regarding weighting, and outputs the signals 309A ($z1(t)$) and 309B ($z2(t)$) after weighting in FIG. 3.

At this point, when for example a precoding matrix hopping method with an N=8 period (cycle) as in Example #8 in Embodiment 6 is used, $z1(t)$ and $z2(t)$ are represented as follows.

For symbol number 8i (where i is an integer greater than or equal to zero):

Math 228

$$\begin{pmatrix} z1(8i) \\ z2(8i) \end{pmatrix} = \frac{1}{\sqrt{\alpha^2+1}} \begin{pmatrix} e^{j0} & \alpha \times e^{j0} \\ \alpha \times e^{j\frac{i\pi}{4}} & e^{j\left(\frac{k\pi}{4}+\frac{7\pi}{8}\right)} \end{pmatrix} \begin{pmatrix} s1(8i) \\ s2(8i) \end{pmatrix} \quad \text{Equation 218}$$

Here, j is an imaginary unit, and k=0.
For symbol number 8i+1:

Math 229

$$\begin{pmatrix} z1(8i+1) \\ z2(8i+1) \end{pmatrix} = \frac{1}{\sqrt{\alpha^2+1}} \begin{pmatrix} e^{j0} & \alpha \times e^{j0} \\ \alpha \times e^{j\frac{i\pi}{4}} & e^{j\left(\frac{k\pi}{4}+\frac{7\pi}{8}\right)} \end{pmatrix} \begin{pmatrix} s1(8i+1) \\ s2(8i+2) \end{pmatrix} \quad \text{Equation 219}$$

Here, k=1.
For symbol number 8i+2:

$$\begin{pmatrix} z1(8i+2) \\ z2(8i+2) \end{pmatrix} = \frac{1}{\sqrt{\alpha^2+1}} \begin{pmatrix} e^{j0} & \alpha \times e^{j0} \\ \alpha \times e^{j\frac{i\pi}{4}} & e^{j\left(\frac{k\pi}{4}+\frac{7\pi}{8}\right)} \end{pmatrix} \begin{pmatrix} s1(8i+2) \\ s2(8i+2) \end{pmatrix} \quad \text{Equation 220}$$

Here, k=2.

For symbol number 8i+3:

Math 231

$$\begin{pmatrix} z1(8i+3) \\ z2(8i+3) \end{pmatrix} = \frac{1}{\sqrt{\alpha^2+1}} \begin{pmatrix} e^{j0} & \alpha \times e^{j0} \\ \alpha \times e^{j\frac{i\pi}{4}} & e^{j\left(\frac{k\pi}{4}+\frac{7\pi}{8}\right)} \end{pmatrix} \begin{pmatrix} s1(8i+3) \\ s2(8i+3) \end{pmatrix} \quad \text{Equation 221}$$

Here, k=3.
For symbol number 8i+4:

Math 232

$$\begin{pmatrix} z1(8i+4) \\ z2(8i+4) \end{pmatrix} = \frac{1}{\sqrt{\alpha^2+1}} \begin{pmatrix} e^{j0} & \alpha \times e^{j0} \\ \alpha \times e^{j\frac{i\pi}{4}} & e^{j\left(\frac{k\pi}{4}+\frac{7\pi}{8}\right)} \end{pmatrix} \begin{pmatrix} s1(8i+4) \\ s2(8i+4) \end{pmatrix} \quad \text{Equation 222}$$

Here, k=4.
For symbol number 8i+5:

Math 233

$$\begin{pmatrix} z1(8i+5) \\ z2(8i+5) \end{pmatrix} = \frac{1}{\sqrt{\alpha^2+1}} \begin{pmatrix} e^{j0} & \alpha \times e^{j0} \\ \alpha \times e^{j\frac{i\pi}{4}} & e^{j\left(\frac{k\pi}{4}+\frac{7\pi}{8}\right)} \end{pmatrix} \begin{pmatrix} s1(8i+5) \\ s2(8i+5) \end{pmatrix} \quad \text{Equation 223}$$

Here, k=5.
For symbol number 8i+6:

Math 234

$$\begin{pmatrix} z1(8i+6) \\ z2(8i+6) \end{pmatrix} = \frac{1}{\sqrt{\alpha^2+1}} \begin{pmatrix} e^{j0} & \alpha \times e^{j0} \\ \alpha \times e^{j\frac{i\pi}{4}} & e^{j\left(\frac{k\pi}{4}+\frac{7\pi}{8}\right)} \end{pmatrix} \begin{pmatrix} s1(8i+6) \\ s2(8i+6) \end{pmatrix} \quad \text{Equation 224}$$

Here, k=6.
For symbol number 8i+7:

Math 235

$$\begin{pmatrix} z1(8i+7) \\ z2(8i+7) \end{pmatrix} = \frac{1}{\sqrt{\alpha^2+1}} \begin{pmatrix} e^{j0} & \alpha \times e^{j0} \\ \alpha \times e^{j\frac{i\pi}{4}} & e^{j\left(\frac{k\pi}{4}+\frac{7\pi}{8}\right)} \end{pmatrix} \begin{pmatrix} s1(8i+7) \\ s2(8i+7) \end{pmatrix} \quad \text{Equation 225}$$

Here, k=7.
The symbol numbers shown here can be considered to indicate time. As described in other embodiments, in Equation 225, for example, z1(8i+7) and z2(8i+7) at time 8i+7 are signals at the same time, and the transmission device transmits z1(8i+7) and z2(8i+7) over the same (shared/common) frequency. In other words, letting the signals at time T be s1(T), s2(T), z1(T), and z2(T), then z1(T) and z2(T) are sought from some sort of precoding matrices and from s1(T) and s2(T), and the transmission device transmits z1(T) and z2(T) over the same (shared) frequency (at the same time). Furthermore, in the case of using a multi-carrier transmission method such as OFDM or the like, and letting signals corresponding to s1, s2, z1, and z2 for (sub)carrier L and time T be s1(T, L), s2(T, L), z1(T, L), and z2(T, L), then z1(T, L) and z2(T, L) are sought from some sort of precoding matrices and from s1(T, L) and s2(T, L), and the transmission device transmits z1(T, L) and z2(T, L) over the same (shared/common) frequency (at the same time).

In this case, the appropriate value of α is given by Equation 198 or Equation 200.

The present embodiment describes a precoding hopping method that increases period (cycle) size, based on the above-described precoding matrices of Equation 190.

Letting the period (cycle) of the precoding hopping method be 8M, 8M different precoding matrices are represented as follows.

Math 236

$$F[8 \times k + i] = \frac{1}{\sqrt{\alpha^2+1}} \begin{pmatrix} e^{j0} & \alpha \times e^{j0} \\ \alpha \times e^{j\left(\frac{i\pi}{4}+\frac{k\pi}{4M}\right)} & e^{j\left(\frac{i\pi}{4}+\frac{k\pi}{4M}+\frac{7\pi}{8}\right)} \end{pmatrix} \quad \text{Equation 226}$$

In this case, i=0, 1, 2, 3, 4, 5, 6, 7, and k=0, 1, ..., M−2, M−1.

For example, letting M=2 and α<1, the poor reception points for s1(○) and for s2 (□) at k=0 are represented as in FIG. 42A. Similarly, the poor reception points for s1(○) and for s2 (□) at k=1 are represented as in FIG. 42B. In this way, based on the precoding matrices in Equation 190, the poor reception points are as in FIG. 42A, and by using, as the precoding matrices, the matrices yielded by multiplying each term in the second line on the right-hand side of Equation 190 by $e^{jX}$ (see Equation 226), the poor reception points are rotated with respect to FIG. 42A (see FIG. 42B). (Note that the poor reception points in FIG. 42A and FIG. 42B do not overlap. Even when multiplying by $e^{jX}$, the poor reception points should not overlap, as in this case. Furthermore, the matrices yielded by multiplying each term in the first line on the right-hand side of Equation 190, rather than in the second line on the right-hand side of Equation 190, by $e^{jX}$ may be used as the precoding matrices.) In this case, the precoding matrices F[0]-F[15] are represented as follows.

Math 237

$$F[8 \times k + i] = \frac{1}{\sqrt{\alpha^2+1}} \begin{pmatrix} e^{j0} & \alpha \times e^{j0} \\ \alpha \times e^{j\left(\frac{i\pi}{4}+Xk\right)} & e^{j\left(\frac{i\pi}{4}+Xk+\frac{7\pi}{8}\right)} \end{pmatrix} \quad \text{Equation 227}$$

Here, i=0, 1, 2, 3, 4, 5, 6, 7, and k=0, 1.

In this case, when M=2, precoding matrices F[0]-F[15] are generated (the precoding matrices F[0]-F[15] may be in any order, and the matrices F[0]-F[15] may each be different). Symbol number 16i may be precoded using F[0], symbol number 16i+1 may be precoded using F[1], ..., and symbol number 16i+h may be precoded using F[h], for example (h=0, 1, 2, ..., 14, 15). (In this case, as described in previous embodiments, precoding matrices need not be hopped between regularly.)

Summarizing the above considerations, with reference to Equations 82-85, N-period (cycle) precoding matrices are represented by the following equation.

Math 238

$$F[i] = \frac{1}{\sqrt{\alpha^2+1}} \begin{pmatrix} e^{j\theta_{11}(i)} & \alpha \times e^{j(\theta_{11}(i)+\lambda)} \\ \alpha \times e^{j\theta_{21}(i)} & e^{j(\theta_{21}(i)+\lambda+\delta)} \end{pmatrix} \quad \text{Equation 228}$$

Here, since the period (cycle) has N slots, i=0, 1, 2, ..., N−2, N−1. Furthermore, the N×M period (cycle) precoding matrices based on Equation 228 are represented by the following equation.

Math 239

$$F[N \times k + i] = \frac{1}{\sqrt{\alpha^2+1}} \begin{pmatrix} e^{j\theta_{11}(i)} & \alpha \times e^{j(\theta_{11}(i)+\lambda)} \\ \alpha \times e^{j(\theta_{21}(i)+X_k)} & e^{j(\theta_{21}(i)+X_k+\lambda+\delta)} \end{pmatrix} \quad \text{Equation 229}$$

In this case, i=0, 1, 2, ..., N−2, N−1, and k=0, 1, ..., M−2, M−1.

Precoding matrices F[0]-F[N×M−1] are thus generated (the precoding matrices F[0]-F[N×M−1] may be in any order for the N×M slots in the period (cycle)). Symbol number N×M×i may be precoded using F[0], symbol number N×M×i+1 may be precoded using F[1], ..., and symbol number N×M×i+h may be precoded using F[h], for example (h=0, 1, 2, ..., N×M−2, N×M−1). (In this case, as described in previous embodiments, precoding matrices need not be hopped between regularly.)

Generating the precoding matrices in this way achieves a precoding matrix hopping method with a large period (cycle), allowing for the position of poor reception points to be easily changed, which may lead to improved data reception quality. Note that while the N×M period (cycle) precoding matrices have been set to Equation 229, the N×M period (cycle) precoding matrices may be set to the following equation, as described above.

Math 240

$$F[N \times k + i] = \frac{1}{\sqrt{\alpha^2+1}} \begin{pmatrix} e^{j(\theta_{11}(i)+X_k)} & \alpha \times e^{j(\theta_{11}(i)+X_k+\lambda)} \\ \alpha \times e^{j\theta_{21}(i)} & e^{j(\theta_{21}(i)+\lambda+\delta)} \end{pmatrix} \quad \text{Equation 230}$$

In this case, i=0, 1, 2, ..., N−2, N−1, and k=0, 1, ..., M−2, M−1.

In Equations 229 and 230, when 0 radians≤δ<2π radians, the matrices are a unitary matrix when δ=π radians and are a non-unitary matrix when δ≠π radians. In the present method, use of a non-unitary matrix for π/2 radians≤|δ|<π radians is one characteristic structure (the conditions for δ being similar to other embodiments), and excellent data reception quality is obtained. Use of a unitary matrix is another structure, and as described in detail in Embodiment 10 and Embodiment 16, if N is an odd number in Equations 229 and 230, the probability of obtaining excellent data reception quality increases.

Embodiment 9

The present embodiment describes a method for regularly hopping between precoding matrices using a unitary matrix.

As described in Embodiment 8, in the method of regularly hopping between precoding matrices over a period (cycle) with N slots, the precoding matrices prepared for the N slots with reference to Equations 82-85 are represented as follows.

Math 241

$$F[i] = \frac{1}{\sqrt{\alpha^2+1}} \begin{pmatrix} e^{j\theta_{11}(i)} & \alpha \times e^{j(\theta_{11}(i)+\lambda)} \\ \alpha \times e^{j\theta_{21}(i)} & e^{j(\theta_{21}(i)+\lambda+\delta)} \end{pmatrix} \quad \text{Equation 231}$$

In this case, i=0, 1, 2, ..., N−2, N−1. (Let α>0.) Since a unitary matrix is used in the present embodiment, the precoding matrices in Equation 231 may be represented as follows.

Math 242

$$F[i] = \frac{1}{\sqrt{\alpha^2+1}} \begin{pmatrix} e^{j\theta_{11}(i)} & \alpha \times e^{j(\theta_{11}(i)+\lambda)} \\ \alpha \times e^{j\theta_{21}(i)} & e^{j(\theta_{21}(i)+\lambda+\pi)} \end{pmatrix} \quad \text{Equation 232}$$

In this case, i=0, 1, 2, ..., N−2, N−1. (Let α>0.) From Condition #5 (Math 106) and Condition #6 (Math 107) in Embodiment 3, the following condition is important for achieving excellent data reception quality.

Math 243

Condition #17

$$e^{j(\theta_{11}(x)-\theta_{21}(x))} \neq e^{j(\theta_{11}(y)-\theta_{21}(y))} \text{ for } \forall x, \forall y (x \neq y; x, y = 0, 1, 2, \ldots, N-2, N-1)$$

(x is 0, 1, 2, ..., N−2, N−1; y is 0, 1, 2, ..., N−2, N−1; and x≠y.)

Math 244

$$e^{j(\theta_{11}(x)-\theta_{21}(x)-\pi)} \neq e^{j(\theta_{11}(y)-\theta_{21}(y)-\pi)} \text{ for } \forall x, \forall y (x \neq y; x, y = 0, 1, 2, \ldots, N-2, N-1) \quad \text{Condition \#18}$$

(x is 0, 1, 2, ..., N−2, N−1; y is 0, 1, 2, ..., N−2, N−1; and x≠y.)

Embodiment 6 describes the distance between poor reception points. In order to increase the distance between poor reception points, it is important for the number of slots N to be an odd number three or greater. The following explains this point.

In order to distribute the poor reception points evenly with regards to phase in the complex plane, as described in Embodiment 6, Condition #19 and Condition #20 are provided.

Math 245

$$\frac{e^{j(\theta_{11}(x+1)-\theta_{21}(x+1))}}{e^{j(\theta_{11}(x)-\theta_{21}(x))}} = e^{j\left(\frac{2\pi}{N}\right)} \text{ for} \quad \text{Condition \#19}$$

$$\forall x(x = 0, 1, 2, \ldots, N-2)$$

Math 246

$$\frac{e^{j(\theta_{11}(x+1)-\theta_{21}(x+1))}}{e^{j(\theta_{11}(x)-\theta_{21}(x))}} = e^{j\left(-\frac{2\pi}{N}\right)} \text{ for} \quad \text{Condition \#20}$$

$$\forall x(x = 0, 1, 2, \ldots, N-2)$$

In other words, Condition #19 means that the difference in phase is 2π/N radians. On the other hand, Condition #20 means that the difference in phase is −2π/N radians.

Figure 44A:
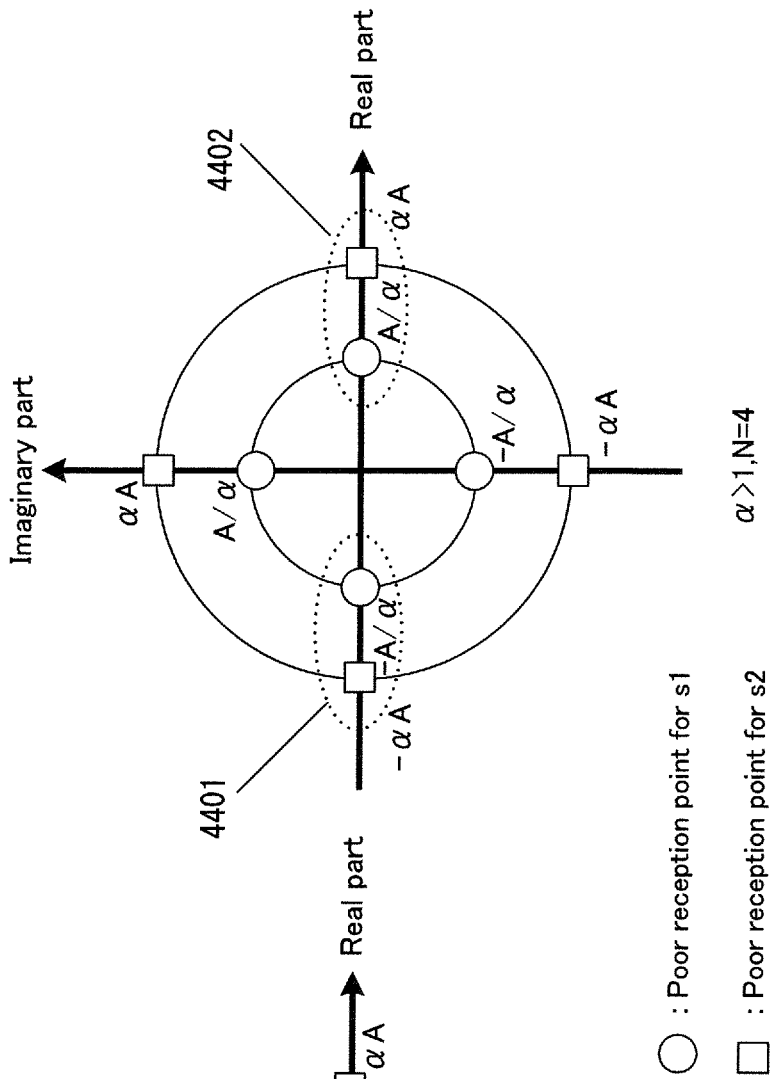
FIGS. 44A and 44B show positions of poor reception points.
Figure 44B:
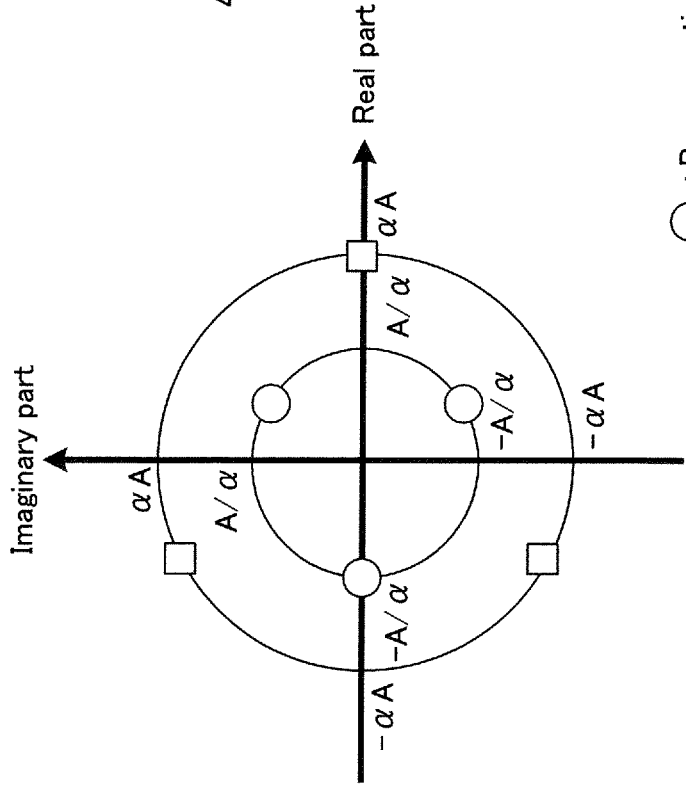

Letting $\theta_{11}(0)-\theta_{21}(0)=0$ radians, and letting $\alpha<1$, the distribution of poor reception points for s1 and for s2 in the complex plane for an N=3 period (cycle) is shown in FIG. 43A, and the distribution of poor reception points for s1 and for s2 in the complex plane for an N=4 period (cycle) is shown in FIG. 43B. Letting $\theta_{11}(0)-\theta_{21}(0)=0$ radians, and letting $\alpha>1$, the distribution of poor reception points for s1 and for s2 in the complex plane for an N=3 period (cycle) is shown in FIG. 44A, and the distribution of poor reception points for s1 and for s2 in the complex plane for an N=4 period (cycle) is shown in FIG. 44B.

In this case, when considering the phase between a line segment from the origin to a poor reception point and a half line along the real axis defined by real≥0 (see FIG. 43A), then for either $\alpha>1$ or $\alpha<1$, when N=4, the case always occurs wherein the phase for the poor reception points for s1 and the phase for the poor reception points for s2 are the same value. (See 4301, 4302 in FIG. 43B, and 4401, 4402 in FIG. 44B.) In this case, in the complex plane, the distance between poor reception points becomes small. On the other hand, when N=3, the phase for the poor reception points for s1 and the phase for the poor reception points for s2 are never the same value.

Based on the above, considering how the case always occurs wherein the phase for the poor reception points for s1 and the phase for the poor reception points for s2 are the same value when the number of slots N in the period (cycle) is an even number, setting the number of slots N in the period (cycle) to an odd number increases the probability of a greater distance between poor reception points in the complex plane as compared to when the number of slots N in the period (cycle) is an even number. However, when the number of slots N in the period (cycle) is small, for example when N≤16, the minimum distance between poor reception points in the complex plane can be guaranteed to be a certain length, since the number of poor reception points is small. Accordingly, when N≤16, even if N is an even number, cases do exist where data reception quality can be guaranteed.

Therefore, in the method for regularly hopping between precoding matrices based on Equation 232, when the number of slots N in the period (cycle) is set to an odd number, the probability of improving data reception quality is high. Precoding matrices F[0]-F[N−1] are generated based on Equation 232 (the precoding matrices F[0]-F[N−1] may be in any order for the N slots in the period (cycle)). Symbol number Ni may be precoded using F[0], symbol number Ni+1 may be precoded using F[1], . . . , and symbol number N×i+h may be precoded using F[h], for example (h=0, 1, 2, . . . , N−2, N−1). (In this case, as described in previous embodiments, precoding matrices need not be hopped between regularly.) Furthermore, when the modulation method for both s1 and s2 is 16QAM, if α is set as follows, Math 247

$$\alpha = \frac{\sqrt{2}+4}{\sqrt{2}+2} \qquad \text{Equation 233}$$

the advantageous effect of increasing the minimum distance between 16×16=256 signal points in the IQ plane for a specific LOS environment may be achieved.

In the present embodiment, the method of structuring N different precoding matrices for a precoding hopping method with an N-slot time period (cycle) has been described. In this case, as the N different precoding matrices, F[0], F[1], F[2], . . . , F[N−2], F[N−1] are prepared. In the present embodiment, an example of a single carrier transmission method has been described, and therefore the case of arranging symbols in the order F[0], F[1], F[2], . . . , F[N−2], F[N−1] in the time domain (or the frequency domain) has been described. The present invention is not, however, limited in this way, and the N different precoding matrices F[0], F[1], F[2], . . . , F[N−2], F[N−1] generated in the present embodiment may be adapted to a multi-carrier transmission method such as an OFDM transmission method or the like. As in Embodiment 1, as a method of adaption in this case, precoding weights may be changed by arranging symbols in the frequency domain and in the frequency-time domain. Note that a precoding hopping method with an N-slot time period (cycle) has been described, but the same advantageous effects may be obtained by randomly using N different precoding matrices. In other words, the N different precoding matrices do not necessarily need to be used in a regular period (cycle).

Furthermore, in the precoding matrix hopping method over an H-slot period (cycle) (H being a natural number larger than the number of slots N in the period (cycle) of the above method of regularly hopping between precoding matrices), when the N different precoding matrices of the present embodiment are included, the probability of excellent reception quality increases. In this case, Condition #17 and Condition #18 can be replaced by the following conditions. (The number of slots in the period (cycle) is considered to be N.)

Math 248

Condition #17'

$$e^{j(\theta_{11}(x)-\theta_{21}(x))} \neq e^{j(\theta_{11}(y)-\theta_{21}(y))} \text{ for } \exists x, \exists y (x \neq y; x,y=0,1,2,\ldots,N-2,N-1)$$

(x is 0, 1, 2, . . . , N−2, N−1; y is 0, 1, 2, . . . , N−2, N−1; and x≠y.)

Math 249

$$e^{j(\theta_{11}(x)-\theta_{21}(x)-\pi)} \neq e^{j(\theta_{11}(y)-\theta_{21}(y)-\pi)} \text{ for } \exists x, \exists y (x \neq y; x,y=0,1,2,\ldots,N-2,N-1) \qquad \text{Condition #18'}$$

(x is 0, 1, 2, . . . , N−2, N−1; y is 0, 1, 2, . . . , N−2, N−1; and x≠y.)

Embodiment 10

The present embodiment describes a method for regularly hopping between precoding matrices using a unitary matrix that differs from the example in Embodiment 9.

In the method of regularly hopping between precoding matrices over a period (cycle) with 2N slots, the precoding matrices prepared for the 2N slots are represented as follows.

Math 250

$$\text{for } i = 0, 1, 2, \ldots, N-2, N-1: \qquad \text{Equation 234}$$

$$F[i] = \frac{1}{\sqrt{\alpha^2+1}} \begin{pmatrix} e^{j\theta_{11}(i)} & \alpha \times e^{j(\theta_{11}(i)+\lambda)} \\ \alpha \times e^{j\theta_{21}(i)} & e^{j(\theta_{21}(i)+\lambda+\pi)} \end{pmatrix}$$

Let α be a fixed value (not depending on i), where α>0.

Math 251 for $i = N, N+1, N+2, \ldots, 2N-2, 2N-1$: Equation 235

$$F[i] = \frac{1}{\sqrt{\alpha^2+1}} \begin{pmatrix} \alpha \times e^{j\theta_{11}(i)} & e^{j(\theta_{11}(i)+\lambda)} \\ e^{j\theta_{21}(i)} & \alpha \times e^{j(\theta_{21}(i)+\lambda+\pi)} \end{pmatrix}$$

Let $\alpha$ be a fixed value (not depending on i), where $\alpha > 0$. (Let the $\alpha$ in Equation 234 and the $\alpha$ in Equation 235 be the same value.)

From Condition #5 (Math 106) and Condition #6 (Math 107) in Embodiment 3, the following conditions are important in Equation 234 for achieving excellent data reception quality.

Math 252

Condition #21

$e^{j(\theta_{11}(x)-\theta_{21}(x))} \neq e^{j(\theta_{11}(y)-\theta_{21}(y))}$ for $\forall x, \forall y(x \neq y; x, y = 0, 1, 2, \ldots, N-2, N-1)$ (x is 0, 1, 2, ..., N−2, N−1; y is 0, 1, 2, ..., N−2, N−1; and x≠y.)

Math 253

$e^{j(\theta_{11}(x)-\theta_{21}(x)-\pi)} \neq e^{j(\theta_{11}(y)-\theta_{21}(y)-\pi)}$ for $\forall x, \forall y(x \neq y; x, y = 0, 1, 2, \ldots, N-2, N-1)$ Condition #22

(x is 0, 1, 2, ..., N−2, N−1; y is 0, 1, 2, ..., N−2, N−1; and x≠y.)

Addition of the following condition is considered.

Math 254

Condition #23

$\theta_{11}(x) = \theta_{11}(x+N)$ for $\forall x(x=0,1,2,\ldots,N-2,N-1)$ and $\theta_{21}(y) = \theta_{21}(y+N)$ for $\forall y(y=0,1,2,\ldots,N-2,N-1)$ Next, in order to distribute the poor reception points evenly with regards to phase in the complex plane, as described in Embodiment 6, Condition #24 and Condition #25 are provided.

Math 255

$$\frac{e^{j(\theta_{11}(x+1)-\theta_{21}(x+1))}}{e^{j(\theta_{11}(x)-\theta_{21}(x))}} = e^{j\left(\frac{2\pi}{N}\right)}$$ Condition #24 for $\forall x(x = 0, 1, 2, \ldots, N-2)$

Math 256

$$\frac{e^{j(\theta_{11}(x+1)-\theta_{21}(x+1))}}{e^{j(\theta_{11}(x)-\theta_{21}(x))}} = e^{j\left(-\frac{2\pi}{N}\right)}$$ Condition #25 for $\forall x(x = 0, 1, 2, \ldots, N-2)$

In other words, Condition #24 means that the difference in phase is $2\pi/N$ radians. On the other hand, Condition #25 means that the difference in phase is $-2\pi/N$ radians.

Figure 45B:
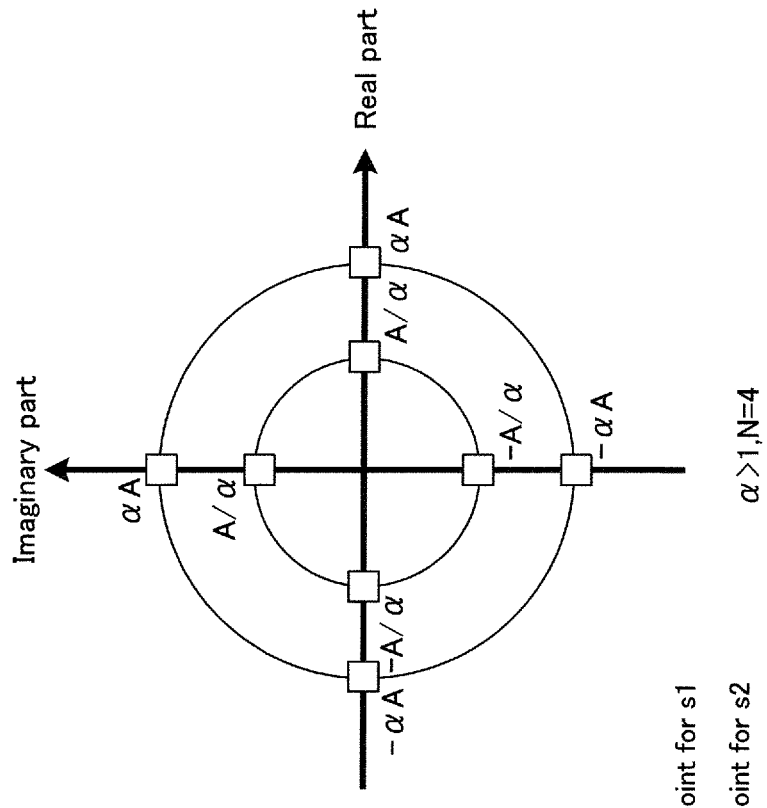
FIGS. 45A and 45B show positions of poor reception points.
Figure 45A:
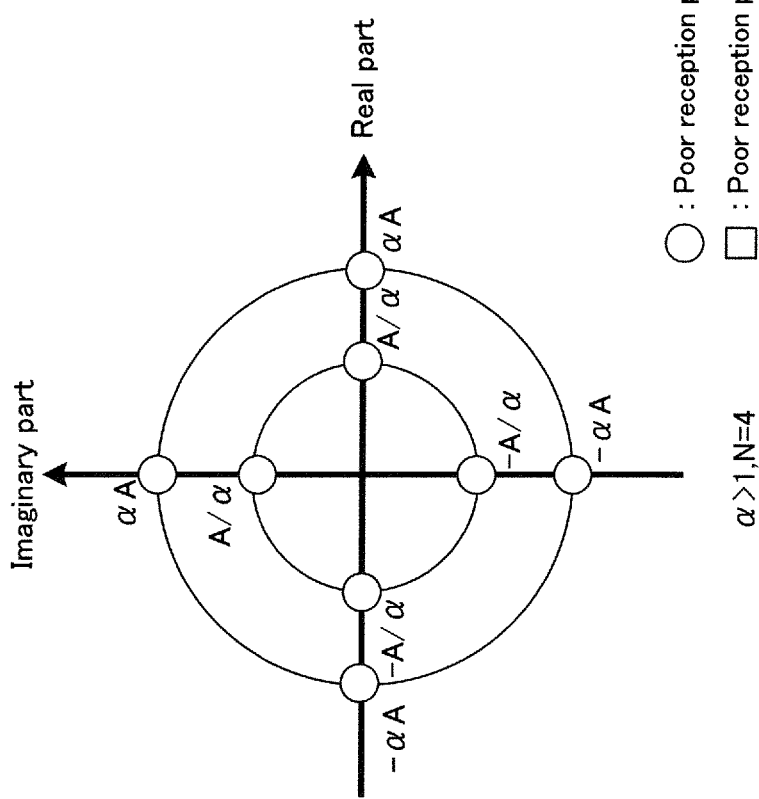

Letting $\theta_{11}(0) - \theta_{21}(0) = 0$ radians, and letting $\alpha > 1$, the distribution of poor reception points for s1 and for s2 in the complex plane when N=4 is shown in FIGS. 45A and 45B. As is clear from FIGS. 45A and 45B, in the complex plane, the minimum distance between poor reception points for s1 is kept large, and similarly, the minimum distance between poor reception points for s2 is also kept large. Similar conditions are created when $\alpha < 1$. Furthermore, making the same considerations as in Embodiment 9, the probability of a greater distance between poor reception points in the complex plane increases when N is an odd number as compared to when N is an even number. However, when N is small, for example when N≤16, the minimum distance between poor reception points in the complex plane can be guaranteed to be a certain length, since the number of poor reception points is small. Accordingly, when N≤16, even if N is an even number, cases do exist where data reception quality can be guaranteed.

Therefore, in the method for regularly hopping between precoding matrices based on Equations 234 and 235, when N is set to an odd number, the probability of improving data reception quality is high. Precoding matrices F[0]-F[2N−1] are generated based on Equations 234 and 235 (the precoding matrices F[0]-F[2N−1] may be arranged in any order for the 2N slots in the period (cycle)). Symbol number 2Ni may be precoded using F[0], symbol number 2Ni+1 may be precoded using F[1], ..., and symbol number 2N×i+h may be precoded using F[h], for example (h=0, 1, 2, ..., 2N−2, 2N−1). (In this case, as described in previous embodiments, precoding matrices need not be hopped between regularly.) Furthermore, when the modulation method for both s1 and s2 is 16QAM, if $\alpha$ is set as in Equation 233, the advantageous effect of increasing the minimum distance between 16×16=256 signal points in the IQ plane for a specific LOS environment may be achieved.

The following conditions are possible as conditions differing from Condition #23:

Math 257

$e^{j(\theta_{11}(x)-\theta_{21}(x))} \neq e^{j(\theta_{11}(y)-\theta_{21}(y))}$ for $\forall x, \forall y(x \neq y; x, y = N, N+1, N+2, \ldots, 2N-2, 2N-1)$ Condition #26

(where x is N, N+1, N+2, ..., 2N−2, 2N−1; y is N, N+1, N+2, ..., 2N−2, 2N−1; and x≠y.)

Math 258

Condition #27

$e^{j(\theta_{11}(x)-\theta_{21}(x)-\pi)} \neq e^{j(\theta_{11}(y)-\theta_{21}(y)-\pi)}$ for $\forall x, \forall y(x \neq y; x, y = N, N+1, N+2, \ldots, 2N-2, 2N-1)$ (where x is N, N+1, N+2, ..., 2N−2, 2N−1; y is N, N+1, N+2, ..., 2N−2, 2N−1; and x≠y.)

In this case, by satisfying Condition #21, Condition #22, Condition #26, and Condition #27, the distance in the complex plane between poor reception points for s1 is increased, as is the distance between poor reception points for s2, thereby achieving excellent data reception quality.

In the present embodiment, the method of structuring 2N different precoding matrices for a precoding hopping method with a 2N-slot time period (cycle) has been described. In this case, as the 2N different precoding matrices, F[0], F[1], F[2], ..., F[2N−2], F[2N−1] are prepared. In the present embodiment, an example of a single carrier transmission method has been described, and therefore the case of arranging symbols in the order F[0], F[1], F[2], ..., F[2N−2], F[2N−1] in the time domain (or the frequency domain) has been described. The present invention is not, however, limited in this way, and the 2N different precoding matrices F[0], F[1], F[2], ..., F[2N−2], F[2N−1] generated in the present embodiment may be adapted to a multi-carrier transmission method such as an OFDM transmission method or the like. As in Embodiment 1, as a method of adaption in this case, precoding weights may be changed by arranging symbols in the frequency domain and in the frequency-time domain. Note that a precoding hopping method with a 2N-slot time period (cycle) has been described, but the same advantageous effects may be obtained by randomly using 2N different precoding matrices. In other words, the 2N different precoding matrices do not necessarily need to be used in a regular period (cycle).

Furthermore, in the precoding matrix hopping method over an H-slot period (cycle) (H being a natural number larger than the number of slots 2N in the period (cycle) of the above method of regularly hopping between precoding matrices), when the 2N different precoding matrices of the present embodiment are included, the probability of excellent reception quality increases.

Embodiment 11

The present embodiment describes a method for regularly hopping between precoding matrices using a non-unitary matrix.

In the method of regularly hopping between precoding matrices over a period (cycle) with 2N slots, the precoding matrices prepared for the 2N slots are represented as follows.

Math 259

$$\text{for } i = 0, 1, 2, \ldots, N-2, N-1: \quad \text{Equation 236}$$

$$F[i] = \frac{1}{\sqrt{\alpha^2+1}} \begin{pmatrix} e^{j\theta_{11}(i)} & \alpha \times e^{j(\theta_{11}(i)+\lambda)} \\ \alpha \times e^{j\theta_{21}(i)} & e^{j(\theta_{21}(i)+\lambda+\delta)} \end{pmatrix}$$

Let $\alpha$ be a fixed value (not depending on i), where $\alpha>0$. Furthermore, let $\delta \neq \eta$ radians.

Math 260

$$\text{for } i = N, N+1, N+2, \ldots, 2N-2, 2N-1: \quad \text{Equation 237}$$

$$F[i] = \frac{1}{\sqrt{\alpha^2+1}} \begin{pmatrix} \alpha \times e^{j(\theta_{11}(i)+\lambda)} & e^{j\theta_{11}(i)} \\ e^{j(\theta_{21}(i)+\lambda+\delta)} & \alpha \times e^{j\theta_{21}(i)} \end{pmatrix}$$

Let $\alpha$ be a fixed value (not depending on i), where $\alpha>0$. (Let the $\alpha$ in Equation 236 and the $\alpha$ in Equation 237 be the same value.)

From Condition #5 (Math 106) and Condition #6 (Math 107) in Embodiment 3, the following conditions are important in Equation 236 for achieving excellent data reception quality.

Math 261

$$e^{j(\theta_{11}(x)-\theta_{21}(x))} \neq e^{j(\theta_{11}(y)-\theta_{21}(y))} \text{ for } \forall x, \forall y(x \neq y; x, y=N, N+1, N+2, \ldots, N-2, N-1) \quad \text{Condition #28}$$

(x is 0, 1, 2, ..., N−2, N−1; y is 0, 1, 2, ..., N−2, N−1; and x≠y.)

Math 262

$$e^{j(\theta_{11}(x)-\theta_{21}(x)-\delta)} \neq e^{j(\theta_{11}(y)-\theta_{21}(y)-\delta)} \text{ for } \forall x, \forall y(x \neq y; x, y=0,1,2,\ldots,N-2,N-1) \quad \text{Condition #29}$$

(x is 0, 1, 2, ..., N−2, N−1; y is 0, 1, 2, ..., N−2, N−1; and x≠y.)

Addition of the following condition is considered.

Math 263

Condition #30

$$\theta_{11}(x) = \theta_{11}(x+N) \text{ for } \forall x(x=0,1,2,\ldots,N-2,N-1)$$

and $$\theta_{21}(y) = \theta_{21}(y+N) \text{ for } \forall y(y=0,1,2,\ldots,N-2,N-1)$$

Note that instead of Equation 237, the precoding matrices in the following Equation may be provided.

Math 264

$$\text{for } i = N, N+1, N+2, \ldots, 2N-2, 2N-1: \quad \text{Equation 238}$$

$$F[i] = \frac{1}{\sqrt{\alpha^2+1}} \begin{pmatrix} \alpha \times e^{j\theta_{11}(i)} & e^{j(\theta_{11}(i)+\lambda)} \\ e^{j\theta_{21}(i)} & \alpha \times e^{j(\theta_{21}(i)+\lambda+\delta)} \end{pmatrix}$$

Let $\alpha$ be a fixed value (not depending on i), where $\alpha>0$. (Let the $\alpha$ in Equation 236 and the $\alpha$ in Equation 238 be the same value.)

As an example, in order to distribute the poor reception points evenly with regards to phase in the complex plane, as described in Embodiment 6, Condition #31 and Condition #32 are provided.

Math 265

$$\frac{e^{j(\theta_{11}(x+1)-\theta_{21}(x+1))}}{e^{j(\theta_{11}(x)-\theta_{21}(x))}} = e^{j\left(\frac{2\pi}{N}\right)} \quad \text{Condition #31}$$

for $\forall x(x = 0, 1, 2, \ldots, N-2)$

Math 266

$$\frac{e^{j(\theta_{11}(x+1)-\theta_{21}(x+1))}}{e^{j(\theta_{11}(x)-\theta_{21}(x))}} = e^{j\left(-\frac{2\pi}{N}\right)} \quad \text{Condition #32}$$

for $\forall x(x = 0, 1, 2, \ldots, N-2)$

In other words, Condition #31 means that the difference in phase is $2\pi/N$ radians. On the other hand, Condition #32 means that the difference in phase is $-2\pi/N$ radians.

Figure 46A:
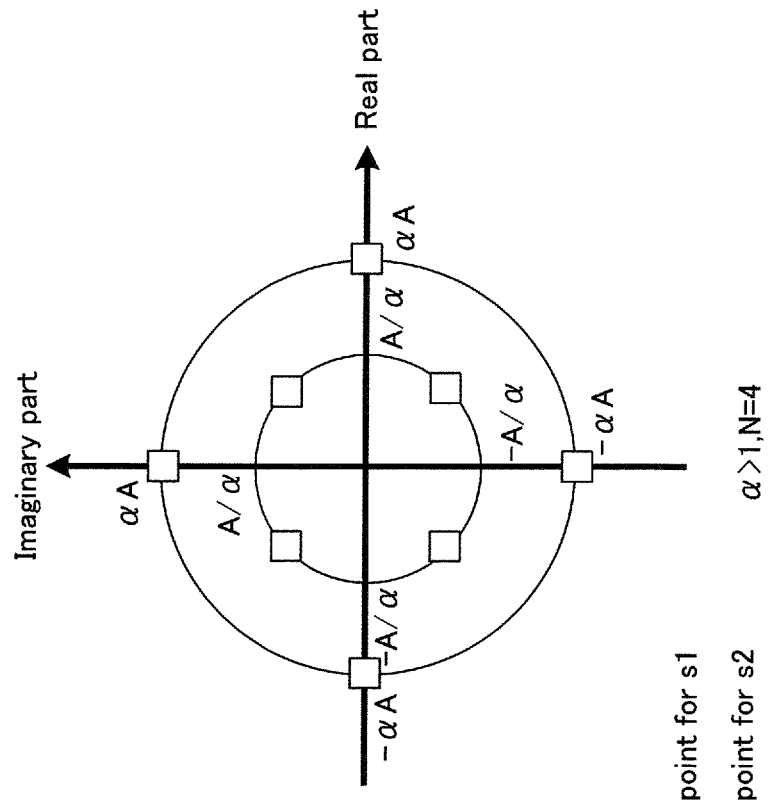
FIGS. 46A and 46B show positions of poor reception points.
Figure 46B:
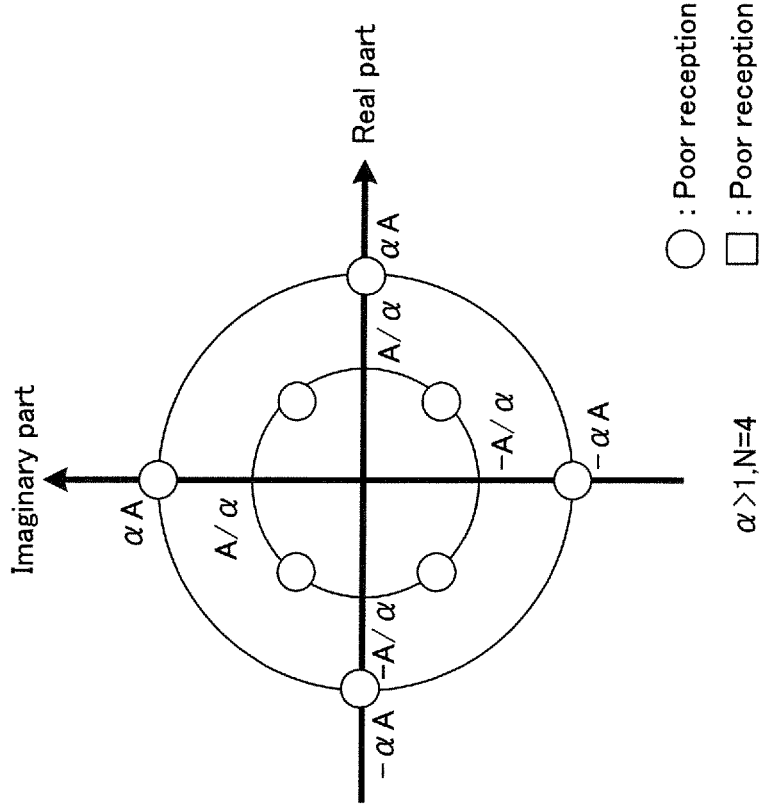

Letting $\theta_{11}(0)-\theta_{21}(0)=0$ radians, letting $\alpha>1$, and letting $\delta=(3\pi)/4$ radians, the distribution of poor reception points for s1 and for s2 in the complex plane when N=4 is shown in FIGS. 46A and 46B. With these settings, the period (cycle) for hopping between precoding matrices is increased, and the minimum distance between poor reception points for s1, as well as the minimum distance between poor reception points for s2, in the complex plane is kept large, thereby achieving excellent reception quality. An example in which $\alpha>1$, $\delta=(3\pi)/4$ radians, and N=4 has been described, but the present invention is not limited in this way. Similar advantageous effects may be obtained for $\pi/2$ radians $\leq |\delta| < \pi$ radians, $\alpha>0$, and $\alpha \neq 1$.

The following conditions are possible as conditions differing from Condition #30:

Math 267

$$e^{j(\theta_{11}(x)-\theta_{21}(x))} \neq e^{j(\theta_{11}(y)-\theta_{21}(y))} \text{ for } \forall x, \forall y(x \neq y; x, y = N, N+1, N+2, \ldots, 2N-2, 2N-1)$$

Condition #33

(where x is N, N+1, N+2, ..., 2N−2, 2N−1; y is N, N+1, N+2, ..., 2N−2, 2N−1; and x≠y.)

Math 268

Condition #34

$$e^{j(\theta_{11}(x)-\theta_{21}(x)-\pi)} \neq e^{j(\theta_{11}(y)-\theta_{21}(y)-\pi)} \text{ for } \forall x, \forall y(x \neq y; x, y = N, N+1, N+2, \ldots, 2N-2, 2N-1)$$

(where x is N, N+1, N+2, ..., 2N−2, 2N−1; y is N, N+1, N+2, ..., 2N−2, 2N−1; and x≠y.)

In this case, by satisfying Condition #28, Condition #29, Condition #33, and Condition #34, the distance in the complex plane between poor reception points for s1 is increased, as is the distance between poor reception points for s2, thereby achieving excellent data reception quality.

In the present embodiment, the method of structuring 2N different precoding matrices for a precoding hopping method with a 2N-slot time period (cycle) has been described. In this case, as the 2N different precoding matrices, F[0], F[1], F[2], ..., F[2N−2], F[2N−1] are prepared. In the present embodiment, an example of a single carrier transmission method has been described, and therefore the case of arranging symbols in the order F[0], F[1], F[2], ..., F[2N−2], F[2N−1] in the time domain (or the frequency domain) has been described. The present invention is not, however, limited in this way, and the 2N different precoding matrices F[0], F[1], F[2], ..., F[2N−2], F[2N−1] generated in the present embodiment may be adapted to a multi-carrier transmission method such as an OFDM transmission method or the like. As in Embodiment 1, as a method of adaption in this case, precoding weights may be changed by arranging symbols in the frequency domain and in the frequency-time domain. Note that a precoding hopping method with a 2N-slot time period (cycle) has been described, but the same advantageous effects may be obtained by randomly using 2N different precoding matrices. In other words, the 2N different precoding matrices do not necessarily need to be used in a regular period (cycle).

Furthermore, in the precoding matrix hopping method over an H-slot period (cycle) (H being a natural number larger than the number of slots 2N in the period (cycle) of the above method of regularly hopping between precoding matrices), when the 2N different precoding matrices of the present embodiment are included, the probability of excellent reception quality increases.

Embodiment 12

The present embodiment describes a method for regularly hopping between precoding matrices using a non-unitary matrix.

In the method of regularly hopping between precoding matrices over a period (cycle) with N slots, the precoding matrices prepared for the N slots are represented as follows.

Math 269

$$F[i] = \frac{1}{\sqrt{\alpha^2+1}} \begin{pmatrix} e^{j\theta_{11}(i)} & \alpha \times e^{j(\theta_{11}(i)+\lambda)} \\ \alpha \times e^{j\theta_{21}(i)} & e^{j(\theta_{21}(i)+\lambda+\delta)} \end{pmatrix}$$

Equation 239

Let α be a fixed value (not depending on i), where α>0. Furthermore, let δ≠π radians (a fixed value not depending on i), and i=0, 1, 2, ..., N−2, N−1.

From Condition #5 (Math 106) and Condition #6 (Math 107) in Embodiment 3, the following conditions are important in Equation 239 for achieving excellent data reception quality.

Math 270

$$e^{j(\theta_{11}(x)-\theta_{21}(x))} \neq e^{j(\theta_{11}(y)-\theta_{21}(y))} \text{ for } \forall x, \forall y(x \neq y; x, y = N, N+1, N+2, \ldots, N-2, N-1)$$

Condition #35

(x is 0, 1, 2, ..., N−2, N−1; y is 0, 1, 2, ..., N−2, N−1; and x≠y.)

Math 271

$$e^{j(\theta_{11}(x)-\theta_{21}(x)-\delta)} \neq e^{j(\theta_{11}(y)-\theta_{21}(y)-\delta)} \text{ for } \forall x, \forall y(x \neq y; x, y = 0, 1, 2, \ldots, N-2, N-1)$$

Condition #36

(x is 0, 1, 2, ..., N−2, N−1; y is 0, 1, 2, ..., N−2, N−1; and x≠y.)

As an example, in order to distribute the poor reception points evenly with regards to phase in the complex plane, as described in Embodiment 6, Condition #37 and Condition #38 are provided.

Math 272

$$\frac{e^{j(\theta_{11}(x+1)-\theta_{21}(x+1))}}{e^{j(\theta_{11}(x)-\theta_{21}(x))}} = e^{j\left(\frac{2\pi}{N}\right)}$$

Condition #37 for $\forall x(x = 0, 1, 2, \ldots, N-2)$

Math 273

$$\frac{e^{j(\theta_{11}(x+1)-\theta_{21}(x+1))}}{e^{j(\theta_{11}(x)-\theta_{21}(x))}} = e^{j\left(-\frac{2\pi}{N}\right)}$$

Condition #38 for $\forall x(x = 0, 1, 2, \ldots, N-2)$

In other words, Condition #37 means that the difference in phase is 2π/N radians. On the other hand, Condition #38 means that the difference in phase is −2π/N radians.

In this case, if π/2 radians≤|δ|<π radians, α>0, and α≠1, the distance in the complex plane between poor reception points for s1 is increased, as is the distance between poor reception points for s2, thereby achieving excellent data reception quality. Note that Condition #37 and Condition #38 are not always necessary.

In the present embodiment, the method of structuring N different precoding matrices for a precoding hopping method with an N-slot time period (cycle) has been described. In this case, as the N different precoding matrices, F[0], F[1], F[2], ..., F[N−2], F[N−1] are prepared. In the present embodiment, an example of a single carrier transmission method has been described, and therefore the case of arranging symbols in the order F[0], F[1], F[2], ..., F[N−2], F[N−1] in the time domain (or the frequency domain) has been described. The present invention is not, however, limited in this way, and the N different precoding matrices F[0], F[1], F[2], ..., F[N−2], F[N−1] generated in the present embodiment may be adapted to a multi-carrier transmission method such as an OFDM transmission method or the like. As in Embodiment 1, as a method of adaption in this case, precoding weights may be changed by arranging symbols in the frequency domain and in the frequency-time domain. Note that a precoding hopping method with an N-slot time period (cycle) has been described, but the same advantageous effects may be obtained by randomly using N different precoding matrices. In other words, the N different precoding matrices do not necessarily need to be used in a regular period (cycle).

Furthermore, in the precoding matrix hopping method over an H-slot period (cycle) (H being a natural number larger than the number of slots N in the period (cycle) of the above method of regularly hopping between precoding matrices), when the N different precoding matrices of the present embodiment are included, the probability of excellent reception quality increases. In this case, Condition #35 and Condition #36 can be replaced by the following conditions. (The number of slots in the period (cycle) is considered to be N.)

Math 274

Condition #35'

$$e^{j(\theta_{11}(x)-\theta_{21}(x))} \neq e^{j(\theta_{11}(y)-\theta_{21}(y))} \text{ for } \exists x, \exists y (x \neq y; x,y=0,1,2,\ldots,N-2,N-1)$$

(x is 0, 1, 2, ..., N−2, N−1; y is 0, 1, 2, ..., N−2, N−1; and x≠y.)

Math 275

$$e^{j(\theta_{11}(x)-\theta_{21}(x)-\delta)} \neq e^{j(\theta_{11}(y)-\theta_{21}(y)-\delta)} \text{ for } \exists x, \exists y (x \neq y; x,y=0,1,2,\ldots,N-2,N-1) \quad \text{Condition \#36'}$$

(x is 0, 1, 2, ..., N−2, N−1; y is 0, 1, 2, ..., N−2, N−1; and x≠y.)

Embodiment 13

The present embodiment describes a different example than Embodiment 8.

In the method of regularly hopping between precoding matrices over a period (cycle) with 2N slots, the precoding matrices prepared for the 2N slots are represented as follows.

Math 276

$$\text{for } i = 0, 1, 2, \ldots, N-2, N-1: \quad \text{Equation 240}$$

$$F[i] = \frac{1}{\sqrt{\alpha^2+1}} \begin{pmatrix} e^{j\theta_{11}(i)} & \alpha \times e^{j(\theta_{11}(i)+\lambda)} \\ \alpha \times e^{j\theta_{21}(i)} & e^{j(\theta_{21}(i)+\lambda+\delta)} \end{pmatrix}$$

Let α be a fixed value (not depending on i), where α>0. Furthermore, let δ≠π radians.

Math 277

$$\text{for } i = N, N+1, N+2, \ldots, 2N-2, 2N-1: \quad \text{Equation 241}$$

$$F[i] = \frac{1}{\sqrt{\alpha^2+1}} \begin{pmatrix} \alpha \times e^{j(\theta_{11}(i)+\lambda)} & e^{j\theta_{11}(i)} \\ e^{j(\theta_{21}(i)+\lambda+\delta)} & \alpha \times e^{j\theta_{21}(i)} \end{pmatrix}$$

Let α be a fixed value (not depending on i), where α>0. (Let the α in Equation 240 and the α in Equation 241 be the same value.)

Furthermore, the 2×N×M period (cycle) precoding matrices based on Equations 240 and 241 are represented by the following equations.

Math 278

$$\text{for } i = 0, 1, 2, \ldots, N-2, N-1: \quad \text{Equation 242}$$

$$F[2 \times N \times k + i] =$$

$$\frac{1}{\sqrt{\alpha^2+1}} \begin{pmatrix} e^{j\theta_{11}(i)} & \alpha \times e^{j(\theta_{11}(i)+\lambda)} \\ \alpha \times e^{j(\theta_{21}(i)+X_k)} & e^{j(\theta_{21}(i)+X_k+\lambda+\delta)} \end{pmatrix}$$

In this case, k=0, 1, ..., M−2, M−1.

Math 279

$$\text{for } i = N, N+1, N+2, \ldots, 2N-2, 2N-1: \quad \text{Equation 243}$$

$$F[2 \times N \times k + i] =$$

$$\frac{1}{\sqrt{\alpha^2+1}} \begin{pmatrix} \alpha \times e^{j(\theta_{11}(i)+\lambda)} & e^{j\theta_{11}(i)} \\ e^{j(\theta_{21}(i)+\lambda+\delta+Y_k)} & \alpha \times e^{j(\theta_{21}(i)+Y_k)} \end{pmatrix}$$

In this case, k=0, 1, ..., M−2, M−1. Furthermore, Xk=Yk may be true, or Xk≠Yk may be true.

Precoding matrices F[0]-F[2×N×M−1] are thus generated (the precoding matrices F[0]-F[2×N×M−1] may be in any order for the 2×N×M slots in the period (cycle)). Symbol number 2×N×M×i may be precoded using F[0], symbol number 2×N×M×i+1 may be precoded using F[1], ..., and symbol number 2×N×M×i+h may be precoded using F[h], for example (h=0, 1, 2, ..., 2×N×M−2, 2×N×M−1). (In this case, as described in previous embodiments, precoding matrices need not be hopped between regularly.)

Generating the precoding matrices in this way achieves a precoding matrix hopping method with a large period (cycle), allowing for the position of poor reception points to be easily changed, which may lead to improved data reception quality.

The 2×N×M period (cycle) precoding matrices in Equation 242 may be changed to the following equation.

Math 280

$$\text{for } i = 0, 1, 2, \ldots, N-2, N-1: \quad \text{Equation 244}$$

$$F[2 \times N \times k + i] =$$

$$\frac{1}{\sqrt{\alpha^2+1}} \begin{pmatrix} e^{j(\theta_{11}(i)+X_k)} & \alpha \times e^{j(\theta_{11}(i)+X_k+\lambda)} \\ \alpha \times e^{j\theta_{21}(i)} & e^{j(\theta_{21}(i)+\lambda+\delta)} \end{pmatrix}$$

In this case, k=0, 1, ..., M−2, M−1.

The 2×N×M period (cycle) precoding matrices in Equation 243 may also be changed to any of Equations 245-247.

$$\text{for } i = N, N+1, N+2, \ldots, 2N-2, 2N-1: \quad \text{Equation 245}$$

$$F[2 \times N \times k + i] = \frac{1}{\sqrt{\alpha^2+1}} \begin{pmatrix} \alpha \times e^{j(\theta_{11}(i)+\lambda+Y_k)} & e^{j(\theta_{11}(i)+Y_k)} \\ e^{j(\theta_{21}(i)+\lambda+\delta)} & \alpha \times e^{j\theta_{21}(i)} \end{pmatrix}$$

In this case, k=0, 1, ..., M−2, M−1.

Math 282

$$\text{for } i = N, N+1, N+2, \ldots, 2N-2, 2N-1: \quad \text{Equation 246}$$

-continued $$F[2\times N\times k+i] = \frac{1}{\sqrt{\alpha^2+1}}\begin{pmatrix} \alpha\times e^{j\theta_{11}(i)} & e^{j(\theta_{11}(i)+\lambda)} \\ e^{j\theta_{21}(i+Y_k)} & \alpha\times e^{j(\theta_{21}(i)+\lambda-\delta+Y_k)} \end{pmatrix}$$

In this case, k=0, 1, ..., M−2, M−1.

Math 283 for i = N, N + 1, N + 2, ..., 2N − 2, 2N − 1:     Equation 247

$$F[2\times N\times k+i] = \frac{1}{\sqrt{\alpha^2+1}}\begin{pmatrix} \alpha\times e^{j\theta_{11}(i+Y_k)} & e^{j(\theta_{11}(i)+\lambda+Y_k)} \\ e^{j\theta_{21}(i)} & \alpha\times e^{j(\theta_{21}(i)+\lambda-\delta)} \end{pmatrix}$$

In this case, k=0, 1, M−2, M−1.
Focusing on poor reception points, if Equations 242 through 247 satisfy the following conditions, Math 284

Condition #39

$e^{j(\theta_{11}(x)-\theta_{21}(x))} \neq e^{j(\theta_{11}(y)-\theta_{21}(y))}$ for $\forall x, \forall y(x\neq y; x,y=0,1,2,\ldots,N-2,N-1)$ (x is 0, 1, 2, ..., N−2, N−1; y is 0, 1, 2, ..., N−2, N−1; and x≠y.)

Math 285

$e^{j(\theta_{11}(x)-\theta_{21}(x)-\delta)} \neq e^{j(\theta_{11}(y)-\theta_{21}(y)-\delta)}$ for $\forall x, \forall y(x\neq y; x, y=0,1,2,\ldots,N-2,N-1)$     Condition #40

(x is 0, 1, 2, ..., N−2, N−1; y is 0, 1, 2, ..., N−2, N−1; and x≠y.)

Math 286

Condition #41

$\theta_{11}(x)=\theta_{11}(x+N)$ for $\forall x(x=0,1,2,\ldots,N-2,N-1)$ and $\theta_{21}(y)=\theta_{21}(y+N)$ for $\forall y(y=0,1,2,\ldots,N-2,N-1)$ then excellent data reception quality is achieved. Note that in Embodiment 8, Condition #39 and Condition #40 should be satisfied.

Focusing on Xk and Yk, if Equations 242 through 247 satisfy the following conditions, Math 287

Condition #42

$X_a \neq X_b + 2\times s\times \pi$ for $\forall a, \forall b(a\neq b; a,b=0,1,2,\ldots,M-2,M-1)$ (a is 0, 1, 2, ..., M−2, M−1; b is 0, 1, 2, ..., M−2, M−1; and a≠b.)
(Here, s is an integer.)

Math 288

Condition #43

$Y_a \neq Y_b + 2\times u\times \pi$ for $\forall a, \forall b(a\neq b; a,b=0,1,2,\ldots,M-2,M-1)$ (a is 0, 1, 2, ..., M−2, M−1; b is 0, 1, 2, ..., M−2, M−1; and a≠b.)
(Here, u is an integer.)

then excellent data reception quality is achieved. Note that in Embodiment 8, Condition #42 should be satisfied.

In Equations 242 and 247, when 0 radians≤δ<2π radians, the matrices are a unitary matrix when δ=π radians and are a non-unitary matrix when δ≠π radians. In the present method, use of a non-unitary matrix for π/2 radians≤|δ|<π radians is one characteristic structure, and excellent data reception quality is obtained. Use of a unitary matrix is another structure, and as described in detail in Embodiment 10 and Embodiment 16, if N is an odd number in Equations 242 through 247, the probability of obtaining excellent data reception quality increases.

Embodiment 14

The present embodiment describes an example of differentiating between usage of a unitary matrix and a non-unitary matrix as the precoding matrix in the method for regularly hopping between precoding matrices.

The following describes an example that uses a two-by-two precoding matrix (letting each element be a complex number), i.e. the case when two modulated signals (s1(t) and s2(t)) that are based on a modulation method are precoded, and the two precoded signals are transmitted by two antennas.

When transmitting data using a method of regularly hopping between precoding matrices, the mappers 306A and 306B in the transmission device in FIG. 3 and FIG. 13 switch the modulation method in accordance with the frame structure signal 313. The relationship between the modulation level (the number of signal points for the modulation method in the IQ plane) of the modulation method and the precoding matrices is described.

The advantage of the method of regularly hopping between precoding matrices is that, as described in Embodiment 6, excellent data reception quality is achieved in an LOS environment. In particular, when the reception device performs ML calculation or applies APP (or Max-log APP) based on ML calculation, the advantageous effect is considerable. Incidentally, ML calculation greatly impacts circuit scale (calculation scale) in accordance with the modulation level of the modulation method. For example, when two precoded signals are transmitted from two antennas, and the same modulation method is used for two modulated signals (signals based on the modulation method before precoding), the number of candidate signal points in the IQ plane (received signal points 1101 in FIG. 11) is 4×4=16 when the modulation method is QPSK, 16×16=256 when the modulation method is 16QAM, 64×64=4096 when the modulation method is 64QAM, 256×256=65,536 when the modulation method is 256QAM, and 1024×1024=1,048,576 when the modulation method is 256QAM. In order to keep the calculation scale of the reception device down to a certain circuit size, when the modulation method is QPSK, 16QAM, or 64QAM, ML calculation ((Max-log) APP based on ML calculation) is used, and when the modulation method is 256QAM or 1024QAM, linear operation such as MMSE or ZF is used in the reception device. (In some cases, ML calculation may be used for 256QAM.)

When such a reception device is assumed, consideration of the Signal-to-Noise power Ratio (SNR) after separation of multiple signals indicates that a unitary matrix is appropriate as the precoding matrix when the reception device performs linear operation such as MMSE or ZF, whereas either a unitary matrix or a non-unitary matrix may be used when the reception device performs ML calculation. Taking any of the above embodiments into consideration, when two precoded signals are transmitted from two antennas, the same modulation method is used for two modulated signals (signals based on the modulation method before precoding), a non-unitary matrix is used as the precoding matrix in the method for regularly hopping between precoding matrices, the modulation level of the modulation method is equal to or less than 64 (or equal to or less than 256), and a unitary matrix is used when the modulation level is greater than 64 (or greater than 256), then for all of the modulation methods supported by the transmission system, there is an increased probability of achieving the advantageous effect whereby excellent data reception quality is achieved for any of the modulation methods while reducing the circuit scale of the reception device.

When the modulation level of the modulation method is equal to or less than 64 (or equal to or less than 256) as well, in some cases use of a unitary matrix may be preferable. Based on this consideration, when a plurality of modulation methods are supported in which the modulation level is equal to or less than 64 (or equal to or less than 256), it is important that in some cases, in some of the plurality of supported modulation methods where the modulation level is equal to or less than 64, a non-unitary matrix is used as the precoding matrix in the method for regularly hopping between precoding matrices.

The case of transmitting two precoded signals from two antennas has been described above as an example, but the present invention is not limited in this way. In the case when N precoded signals are transmitted from N antennas, and the same modulation method is used for N modulated signals (signals based on the modulation method before precoding), a threshold $\beta_N$ may be established for the modulation level of the modulation method. When a plurality of modulation methods for which the modulation level is equal to or less than $\beta_N$ are supported, in some of the plurality of supported modulation methods where the modulation level is equal to or less than $\beta_N$, a non-unitary matrix is used as the precoding matrices in the method for regularly hopping between precoding matrices, whereas for modulation methods for which the modulation level is greater than $\beta_N$, a unitary matrix is used. In this way, for all of the modulation methods supported by the transmission system, there is an increased probability of achieving the advantageous effect whereby excellent data reception quality is achieved for any of the modulation methods while reducing the circuit scale of the reception device. (When the modulation level of the modulation method is equal to or less than $\beta_N$, a non-unitary matrix may always be used as the precoding matrix in the method for regularly hopping between precoding matrices.)

In the above description, the same modulation method has been described as being used in the modulation method for simultaneously transmitting N modulated signals. The following, however, describes the case in which two or more modulation methods are used for simultaneously transmitting N modulated signals.

As an example, the case in which two precoded signals are transmitted by two antennas is described. The two modulated signals (signals based on the modulation method before precoding) are either modulated with the same modulation method, or when modulated with different modulation methods, are modulated with a modulation method having a modulation level of $2^{a1}$ or a modulation level of $2^{a2}$. In this case, when the reception device uses ML calculation ((Max-log) APP based on ML calculation), the number of candidate signal points in the IQ plane (received signal points 1101 in FIG. 11) is $2^{a1} \times 2^{a2} = 2^{a1+a2}$. As described above, in order to achieve excellent data reception quality while reducing the circuit scale of the reception device, a threshold $2^\beta$ may be provided for $2^{a1+a2}$, and when $2^{a1+a2} \leq 2^\beta$, a non-unitary matrix may be used as the precoding matrix in the method for regularly hopping between precoding matrices, whereas a unitary matrix may be used when $2^{a1+a2} > 2^\beta$.

Furthermore, when $2^{a1+a2} \leq 2^\beta$, in some cases use of a unitary matrix may be preferable. Based on this consideration, when a plurality of combinations of modulation methods are supported for which $2^{a1+a2} \leq 2^\beta$, it is important that in some of the supported combinations of modulation methods for which $2^{a1+a2} \leq 2^\beta$, a non-unitary matrix is used as the precoding matrix in the method for regularly hopping between precoding matrices.

As an example, the case in which two precoded signals are transmitted by two antennas has been described, but the present invention is not limited in this way. For example, N modulated signals (signals based on the modulation method before precoding) may be either modulated with the same modulation method or, when modulated with different modulation methods, the modulation level of the modulation method for the $i^{th}$ modulated signal may be $2^{ai}$ (where i=1, 2, ..., N−1, N).

In this case, when the reception device uses ML calculation ((Max-log) APP based on ML calculation), the number of candidate signal points in the IQ plane (received signal points 1101 in FIG. 11) is $2^{a1} \times 2^{a2} \times \ldots \times 2^{ai} \times \ldots \times 2^{aN} = 2^{a1+a2+\ldots+ai+\ldots+aN}$. As described above, in order to achieve excellent data reception quality while reducing the circuit scale of the reception device, a threshold $2^\beta$ may be provided for $2^{a1+a2+\ldots+ai+\ldots+aN}$.

Math 289

$$2^{a1+a2+\ldots+ai+\ldots+aN} = 2^Y \leq 2^\beta \quad \text{Condition \#44}$$

where $$Y = \sum_{i=1}^{N} a_i$$

When a plurality of combinations of a modulation methods satisfying Condition #44 are supported, in some of the supported combinations of modulation methods satisfying Condition #44, a non-unitary matrix are used as the precoding matrix in the method for regularly hopping between precoding matrices.

Math 290

$$2^{a1+a2+\ldots+ai+\ldots+aN} = 2^Y > 2^\beta \quad \text{Condition \#45}$$

where $$Y = \sum_{i=1}^{N} a_i$$

By using a unitary matrix in all of the combinations of modulation methods satisfying Condition #45, then for all of the modulation methods supported by the transmission system, there is an increased probability of achieving the advantageous effect whereby excellent data reception quality is achieved while reducing the circuit scale of the reception device for any of the combinations of modulation methods. (A non-unitary matrix may be used as the precoding matrix in the method for regularly hopping between precoding matrices in all of the supported combinations of modulation methods satisfying Condition #44.)

Embodiment 15

The present embodiment describes an example of a system that adopts a method for regularly hopping between precoding matrices using a multi-carrier transmission method such as OFDM.

FIGS. 47A and 47B show an example according to the present embodiment of frame structure in the time and frequency domains for a signal transmitted by a broadcast station (base station) in a system that adopts a method for regularly hopping between precoding matrices using a multi-carrier transmission method such as OFDM. (The frame structure is set to extend from time $1 to time $T.) FIG. 47A shows the frame structure in the time and frequency domains for the stream s1 described in Embodiment 1, and FIG. 47B shows the frame structure in the time and frequency domains for the stream s2 described in Embodiment 1. Symbols at the same time and the same (sub)carrier in stream s1 and stream s2 are transmitted by a plurality of antennas at the same time and the same frequency.

In FIGS. 47A and 47B, the (sub)carriers used when using OFDM are divided as follows: a carrier group #A composed of (sub)carrier a–(sub)carrier a+Na, a carrier group #B composed of (sub)carrier b–(sub)carrier b+Nb, a carrier group #C composed of (sub)carrier c–(sub)carrier c+Nc, a carrier group #D composed of (sub)carrier d–(sub)carrier d+Nd, . . . . In each subcarrier group, a plurality of transmission methods are assumed to be supported. By supporting a plurality of transmission methods, it is possible to effectively capitalize on the advantages of the transmission methods. For example, in FIGS. 47A and 47B, a spatial multiplexing MIMO system, or a MIMO system with a fixed precoding matrix is used for carrier group #A, a MIMO system that regularly hops between precoding matrices is used for carrier group #B, only stream s1 is transmitted in carrier group #C, and space-time block coding is used to transmit carrier group #D.

FIGS. 48A and 48B show an example according to the present embodiment of frame structure in the time and frequency domains for a signal transmitted by a broadcast station (base station) in a system that adopts a method for regularly hopping between precoding matrices using a multi-carrier transmission method such as OFDM. FIGS. 48A and 48B show a frame structure at a different time than FIGS. 47A and 47B, from time $X to time $X+T'. In FIGS. 48A and 48B, as in FIGS. 47A and 47B, the (sub)carriers used when using OFDM are divided as follows: a carrier group #A composed of (sub)carrier a–(sub)carrier a+Na, a carrier group #B composed of (sub)carrier b–(sub)carrier b+Nb, a carrier group #C composed of (sub)carrier c–(sub)carrier c+Nc, a carrier group #D composed of (sub)carrier d–(sub)carrier d+Nd, . . . . The difference between FIGS. 47A and 47B and FIGS. 48A and 48B is that in some carrier groups, the transmission method used in FIGS. 47A and 47B differs from the transmission method used in FIGS. 48A and 48B. In FIGS. 48A and 48B, space-time block coding is used to transmit carrier group #A, a MIMO system that regularly hops between precoding matrices is used for carrier group #B, a MIMO system that regularly hops between precoding matrices is used for carrier group #C, and only stream s1 is transmitted in carrier group #D.

Next, the supported transmission methods are described.

FIG. 49 shows a signal processing method when using a spatial multiplexing MIMO system or a MIMO system with a fixed precoding matrix. FIG. 49 bears the same numbers as in FIG. 6.

A weighting unit 600, which is a baseband signal in accordance with a certain modulation method, receives as inputs a stream s1($t$) (307A), a stream s2($t$) (307B), and information 315 regarding the weighting method, and outputs a modulated signal z1($t$) (309A) after weighting and a modulated signal z2($t$) (309B) after weighting. Here, when the information 315 regarding the weighting method indicates a spatial multiplexing MIMO system, the signal processing in method #1 of FIG. 49 is performed. Specifically, the following processing is performed.

Math 291

$$\begin{pmatrix} z1(t) \\ z2(t) \end{pmatrix} = \begin{pmatrix} e^{j0} & 0 \\ 0 & e^{j0} \end{pmatrix} \begin{pmatrix} s1(t) \\ s2(t) \end{pmatrix} \quad \text{Equation 250}$$

$$= \begin{pmatrix} 1 & 0 \\ 0 & 1 \end{pmatrix} \begin{pmatrix} s1(t) \\ s2(t) \end{pmatrix} = \begin{pmatrix} s1(t) \\ s2(t) \end{pmatrix}$$

When a method for transmitting one modulated signal is supported, from the standpoint of transmission power, Equation 250 may be represented as Equation 251.

Math 292

$$\begin{pmatrix} z1(t) \\ z2(t) \end{pmatrix} = \frac{1}{\sqrt{2}} \begin{pmatrix} e^{j0} & 0 \\ 0 & e^{j0} \end{pmatrix} \begin{pmatrix} s1(t) \\ s2(t) \end{pmatrix} \quad \text{Equation 251}$$

$$= \frac{1}{\sqrt{2}} \begin{pmatrix} 1 & 0 \\ 0 & 1 \end{pmatrix} \begin{pmatrix} s1(t) \\ s2(t) \end{pmatrix} = \begin{pmatrix} \frac{1}{\sqrt{2}} s1(t) \\ \frac{1}{\sqrt{2}} s2(t) \end{pmatrix}$$

When the information 315 regarding the weighting method indicates a MIMO system in which precoding matrices are regularly hopped between, signal processing in method #2, for example, of FIG. 49 is performed. Specifically, the following processing is performed.

Math 293

$$\begin{pmatrix} z1(t) \\ z2(t) \end{pmatrix} = \frac{1}{\sqrt{\alpha^2+1}} \begin{pmatrix} e^{j\theta_{11}} & \alpha \times e^{j(\theta_{11}+\lambda)} \\ \alpha \times e^{j\theta_{21}} & e^{j(\theta_{21}+\lambda+\delta)} \end{pmatrix} \begin{pmatrix} s1(t) \\ s2(t) \end{pmatrix} \quad \text{Equation 252}$$

Here, $\theta_{11}$, $\theta_{12}$, $\lambda$, and $\delta$ are fixed values.

Figure 50:
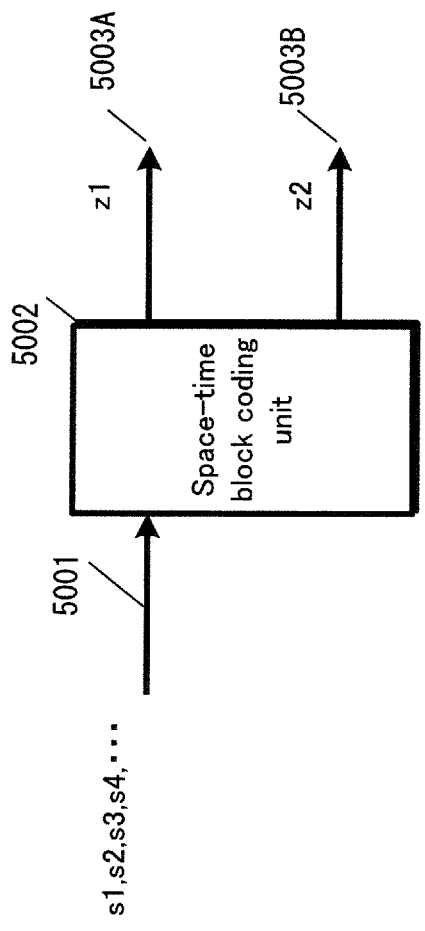
FIG. 50 shows the structure of modulated signals when using space-time block coding.

FIG. 50 shows the structure of modulated signals when using space-time block coding. A space-time block coding unit (5002) in FIG. 50 receives, as input, a baseband signal based on a certain modulation signal. For example, the space-time block coding unit (5002) receives symbol s1, symbol s2, . . . as inputs. As shown in FIG. 50, space-time block coding is performed, z1(5003A) becomes "s1 as symbol #0", "–s2* as symbol #0", "s3 as symbol #2", "–s4* as symbol #3" . . . , and z2(5003B) becomes "s2 as symbol #0", "s1* as symbol #1", "s4 as symbol #2", "s3* as symbol #3" . . . . In this case, symbol #X in z1 and symbol #X in z2 are transmitted from the antennas at the same time, over the same frequency.

Figure 51:
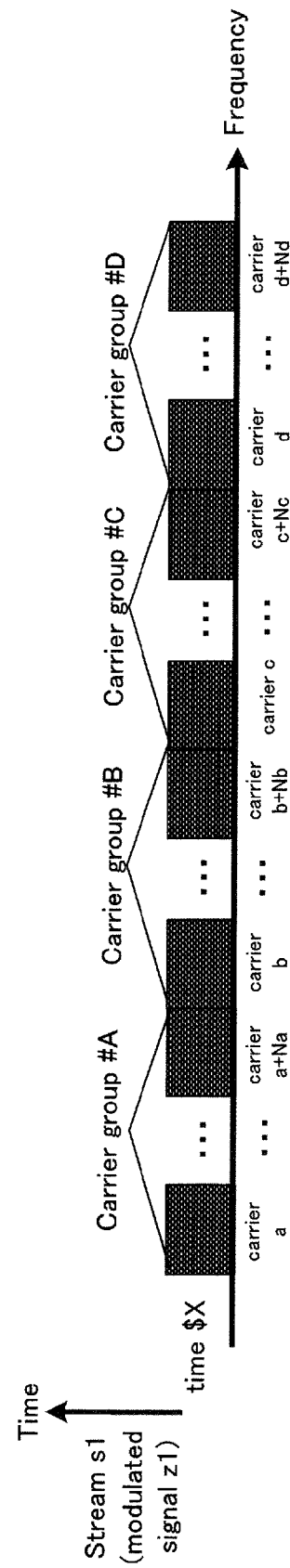
FIG. 51 is a detailed example of a frame structure in the time and frequency domains.

In FIGS. 47A, 47B, 48A, and 48B, only symbols transmitting data are shown. In practice, however, it is necessary to transmit information such as the transmission method, modulation method, error correction method, and the like. For example, as in FIG. 51, these pieces of information can be transmitted to a communication partner by regular transmission with only one modulated signal z1. It is also necessary to transmit symbols for estimation of channel fluctuation, i.e. for the reception device to estimate channel fluctuation (for example, a pilot symbol, reference symbol, preamble, a Phase Shift Keying (PSK) symbol known at the transmission and reception sides, and the like). In FIGS. 47A, 47B, 48A, and 48B, these symbols are omitted. In practice, however, symbols for estimating channel fluctuation are included in the frame structure in the time and frequency domains. Accordingly, each carrier group is not composed only of symbols for transmitting data. (The same is true for Embodiment 1 as well.)

Figure 52:
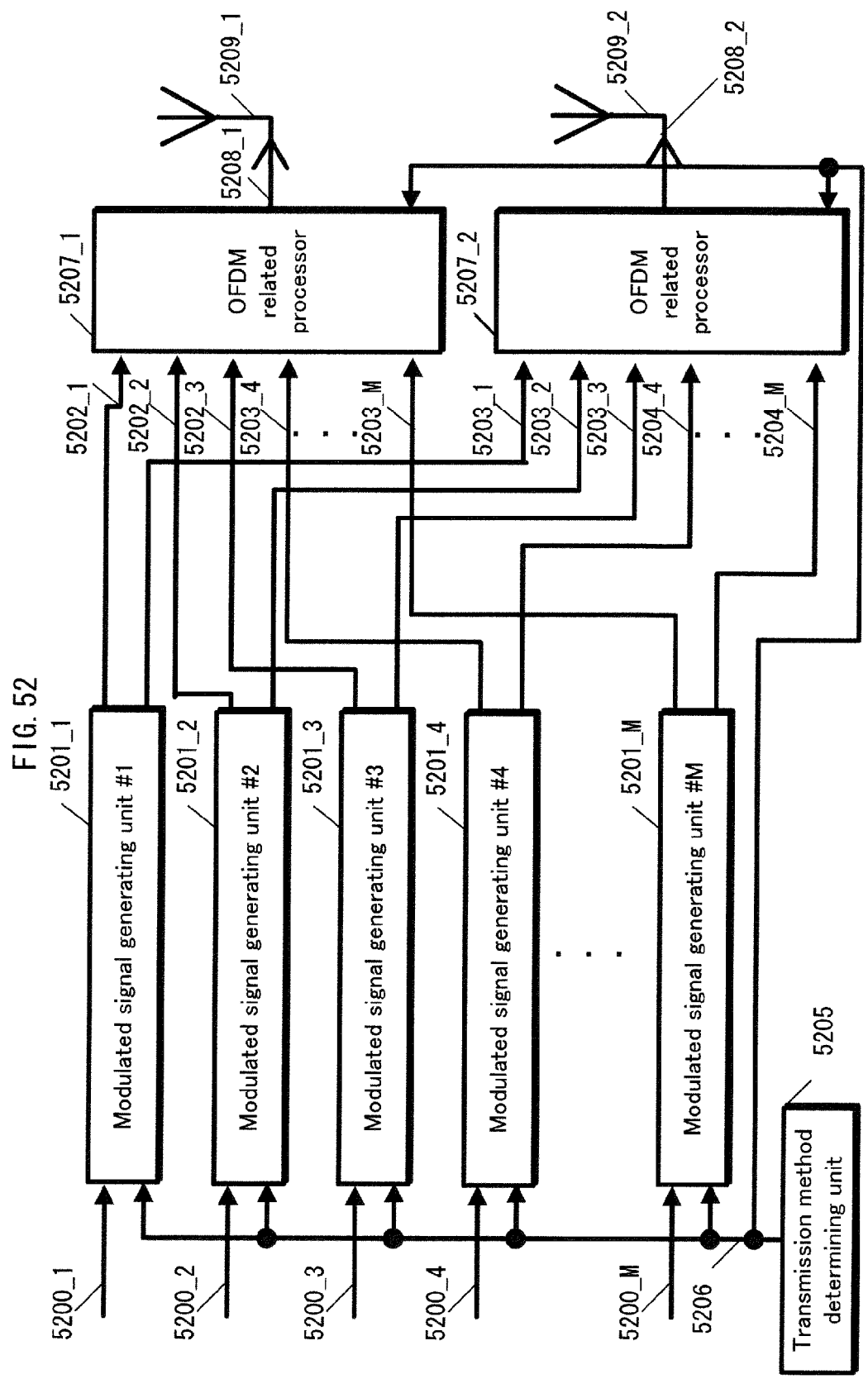
FIG. 52 is an example of the structure of a transmission device.

FIG. 52 is an example of the structure of a transmission device in a broadcast station (base station) according to the present embodiment. A transmission method determining unit (5205) determines the number of carriers, modulation method, error correction method, coding ratio for error correction coding, transmission method, and the like for each carrier group and outputs a control signal (5206).

A modulated signal generating unit #1 (5201_1) receives, as input, information (5200_1) and the control signal (5206) and, based on the information on the transmission method in the control signal (5206), outputs a modulated signal z1 (5202_1) and a modulated signal z2 (5203_1) in the carrier group #A of FIGS. 47A, 47B, 48A, and 48B.

Similarly, a modulated signal generating unit #2 (5201_2) receives, as input, information (5200_2) and the control signal (5206) and, based on the information on the transmission method in the control signal (5206), outputs a modulated signal z1 (5202_2) and a modulated signal z2 (5203_2) in the carrier group #B of FIGS. 47A, 47B, 48A, and 48B.

Similarly, a modulated signal generating unit #3 (5201_3) receives, as input, information (5200_3) and the control signal (5206) and, based on the information on the transmission method in the control signal (5206), outputs a modulated signal z1 (5202_3) and a modulated signal z2 (5203_3) in the carrier group #C of FIGS. 47A, 47B, 48A, and 48B.

Similarly, a modulated signal generating unit #4 (5201_4) receives, as input, information (5200_4) and the control signal (5206) and, based on the information on the transmission method in the control signal (5206), outputs a modulated signal z1 (5202_4) and a modulated signal z2 (5203_4) in the carrier group #D of FIGS. 47A, 47B, 48A, and 48B.

While not shown in the figures, the same is true for modulated signal generating unit #5 through modulated signal generating unit #M−1.

Similarly, a modulated signal generating unit #M (5201_M) receives, as input, information (5200_M) and the control signal (5206) and, based on the information on the transmission method in the control signal (5206), outputs a modulated signal z1 (5202_M) and a modulated signal z2 (5203_M) in a certain carrier group.

An OFDM related processor (5207_1) receives, as inputs, the modulated signal z1 (5202_1) in carrier group #A, the modulated signal z1 (5202_2) in carrier group #B, the modulated signal z1 (5202_3) in carrier group #C, the modulated signal z1 (5202_4) in carrier group #D, . . . , the modulated signal z1 (5202_M) in a certain carrier group #M, and the control signal (5206), performs processing such as reordering, inverse Fourier transform, frequency conversion, amplification, and the like, and outputs a transmission signal (5208_1). The transmission signal (5208_1) is output as a radio wave from an antenna (5209_1).

Similarly, an OFDM related processor (5207_2) receives, as inputs, the modulated signal z1 (5203_1) in carrier group #A, the modulated signal z1 (5203_2) in carrier group #B, the modulated signal z1 (5203_3) in carrier group #C, the modulated signal z1 (5203_4) in carrier group #D, . . . , the modulated signal z1 (5203_M) in a certain carrier group #M, and the control signal (5206), performs processing such as reordering, inverse Fourier transform, frequency conversion, amplification, and the like, and outputs a transmission signal (5208_2). The transmission signal (5208_2) is output as a radio wave from an antenna (5209_2).

Figure 53:
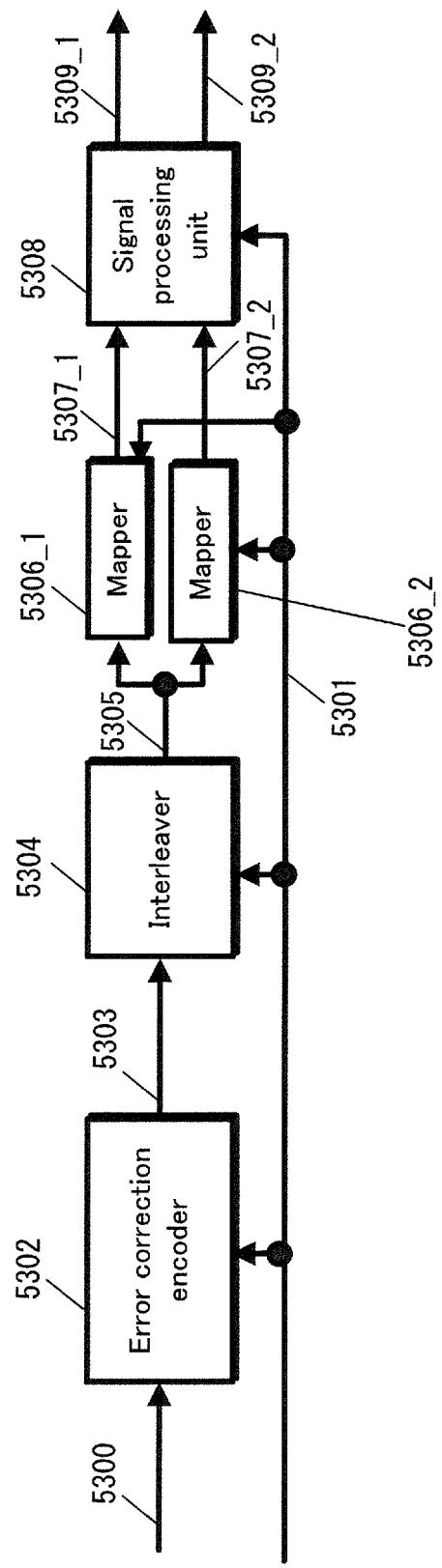
FIG. 53 is an example of a structure of the modulated signal generating units #1-#M in FIG. 52.

FIG. 53 shows an example of a structure of the modulated signal generating units #1 #M in FIG. 52. An error correction encoder (5302) receives, as inputs, information (5300) and a control signal (5301) and, in accordance with the control signal (5301), sets the error correction coding method and the coding ratio for error correction coding, performs error correction coding, and outputs data (5303) after error correction coding. (In accordance with the setting of the error correction coding method and the coding ratio for error correction coding, when using LDPC coding, turbo coding, or convolutional coding, for example, depending on the coding ratio, puncturing may be performed to achieve the coding ratio.) An interleaver (5304) receives, as input, error correction coded data (5303) and the control signal (5301) and, in accordance with information on the interleaving method included in the control signal (5301), reorders the error correction coded data (5303) and outputs interleaved data (5305).

A mapper (5306_1) receives, as input, the interleaved data (5305) and the control signal (5301) and, in accordance with the information on the modulation method included in the control signal (5301), performs mapping and outputs a baseband signal (5307_1).

Similarly, a mapper (5306_2) receives, as input, the interleaved data (5305) and the control signal (5301) and, in accordance with the information on the modulation method included in the control signal (5301), performs mapping and outputs a baseband signal (5307_2).

A signal processing unit (5308) receives, as input, the baseband signal (5307_1), the baseband signal (5307_2), and the control signal (5301) and, based on information on the transmission method (for example, in this embodiment, a spatial multiplexing MIMO system, a MIMO method using a fixed precoding matrix, a MIMO method for regularly hopping between precoding matrices, space-time block coding, or a transmission method for transmitting only stream s1) included in the control signal (5301), performs signal processing. The signal processing unit (5308) outputs a processed signal z1 (5309_1) and a processed signal z2 (5309_2). Note that when the transmission method for transmitting only stream s1 is selected, the signal processing unit (5308) does not output the processed signal z2 (5309_2). Furthermore, in FIG. 53, one error correction encoder is shown, but the present invention is not limited in this way. For example, as shown in FIG. 3, a plurality of encoders may be provided.

Figure 54:
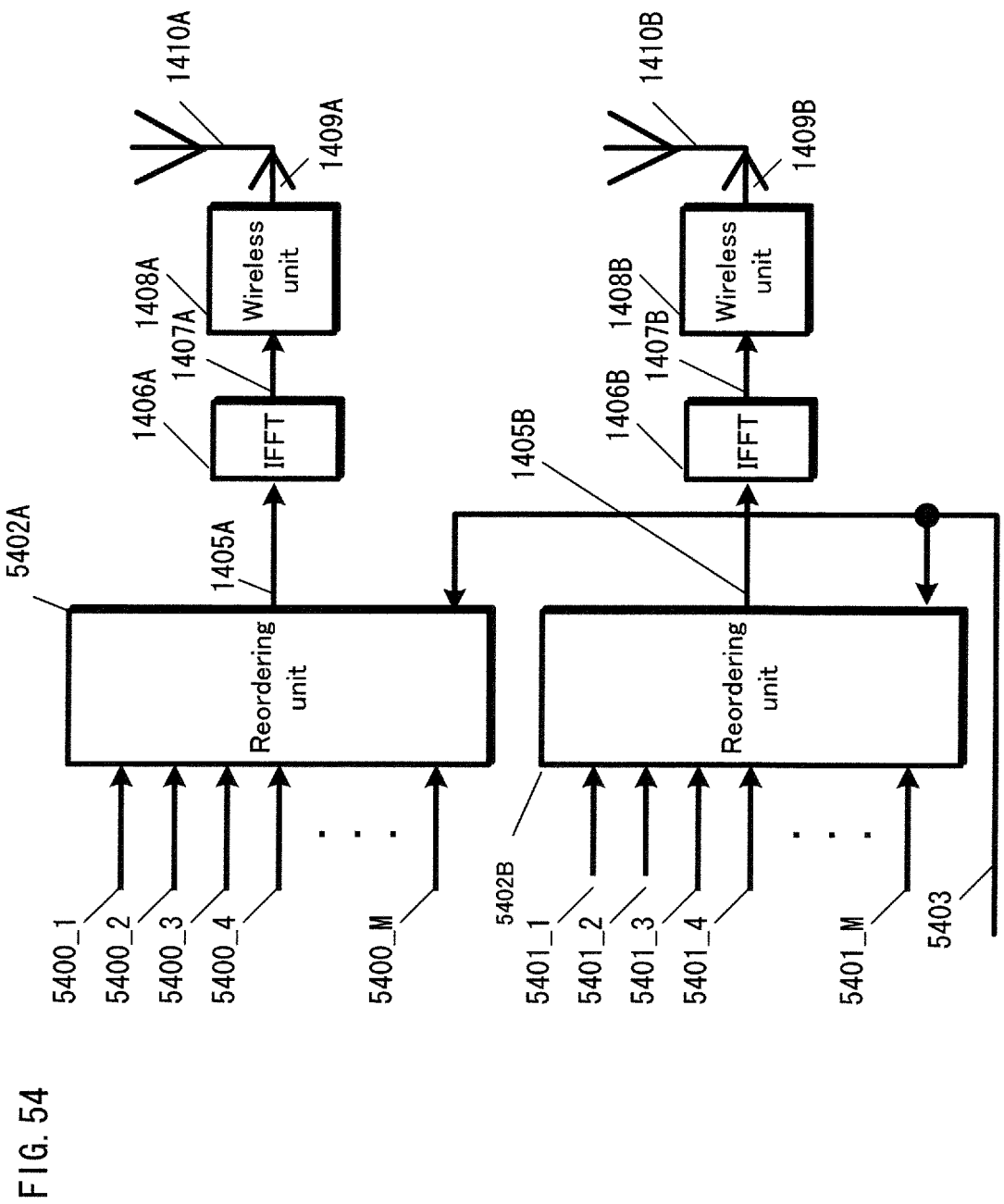
FIG. 54 shows the structure of the OFDM related processors (5207_1 and 5207_2) in FIG. 52.

FIG. 54 shows an example of the structure of the OFDM related processors (5207_1 and 5207_2) in FIG. 52. Elements that operate in a similar way to FIG. 14 bear the same reference signs. A reordering unit (5402A) receives, as input, the modulated signal z1 (5400_1) in carrier group #A, the modulated signal z1 (5400_2) in carrier group #B, the modulated signal z1 (5400_3) in carrier group #C, the modulated signal z1 (5400_4) in carrier group #D, . . . , the modulated signal z1 (5400_M) in a certain carrier group, and a control signal (5403), performs reordering, and output reordered signals 1405A and 1405B. Note that in FIGS. 47A, 47B, 48A, 48B, and 51, an example of allocation of the carrier groups is described as being formed by groups of subcarriers, but the present invention is not limited in this way. Carrier groups may be formed by discrete subcarriers at each time interval. Furthermore, in FIGS. 47A, 47B, 48A, 48B, and 51, an example has been described in which the number of carriers in each carrier group does not change over time, but the present invention is not limited in this way. This point will be described separately below.

FIGS. 55A and 55B show an example of frame structure in the time and frequency domains for a method of setting the transmission method for each carrier group, as in FIGS. 47A, 47B, 48A, 48B, and 51. In FIGS. 55A and 55B, control information symbols are labeled 5500, individual control information symbols are labeled 5501, data symbols are labeled 5502, and pilot symbols are labeled 5503. Furthermore, FIG. 55A shows the frame structure in the time and frequency domains for stream s1, and FIG. 55B shows the frame structure in the time and frequency domains for stream s2.

The control information symbols are for transmitting control information shared by the carrier group and are composed of symbols for the transmission and reception devices to perform frequency and time synchronization, information regarding the allocation of (sub)carriers, and the like. The control information symbols are set to be transmitted from only stream s1 at time $1.

The individual control information symbols are for transmitting control information on individual subcarrier groups and are composed of information on the transmission method, modulation method, error correction coding method, coding ratio for error correction coding, block size of error correction codes, and the like for the data symbols, information on the insertion method of pilot symbols, information on the transmission power of pilot symbols, and the like. The individual control information symbols are set to be transmitted from only stream s1 at time $1.

The data symbols are for transmitting data (information), and as described with reference to FIGS. 47A through 50, are symbols of one of the following transmission methods, for example: a spatial multiplexing MIMO system, a MIMO method using a fixed precoding matrix, a MIMO method for regularly hopping between precoding matrices, space-time block coding, or a transmission method for transmitting only stream s1. Note that in carrier group #A, carrier group #B, carrier group #C, and carrier group #D, data symbols are shown in stream s2, but when the transmission method for transmitting only stream s1 is used, in some cases there are no data symbols in stream s2.

The pilot symbols are for the reception device to perform channel estimation, i.e. to estimate fluctuation corresponding to $h_{11}(t)$, $h_{12}(t)$, $h_{21}(t)$, and $h_{22}(t)$ in Equation 36. (In this embodiment, since a multi-carrier transmission method such as an OFDM method is used, the pilot symbols are for estimating fluctuation corresponding to $h_{11}(t)$, $h_{12}(t)$, $h_{21}(t)$, and $h_{22}(t)$ in each subcarrier.) Accordingly, the PSK transmission method, for example, is used for the pilot symbols, which are structured to form a pattern known by the transmission and reception devices. Furthermore, the reception device may use the pilot symbols for estimation of frequency offset, estimation of phase distortion, and time synchronization.

Figure 56:
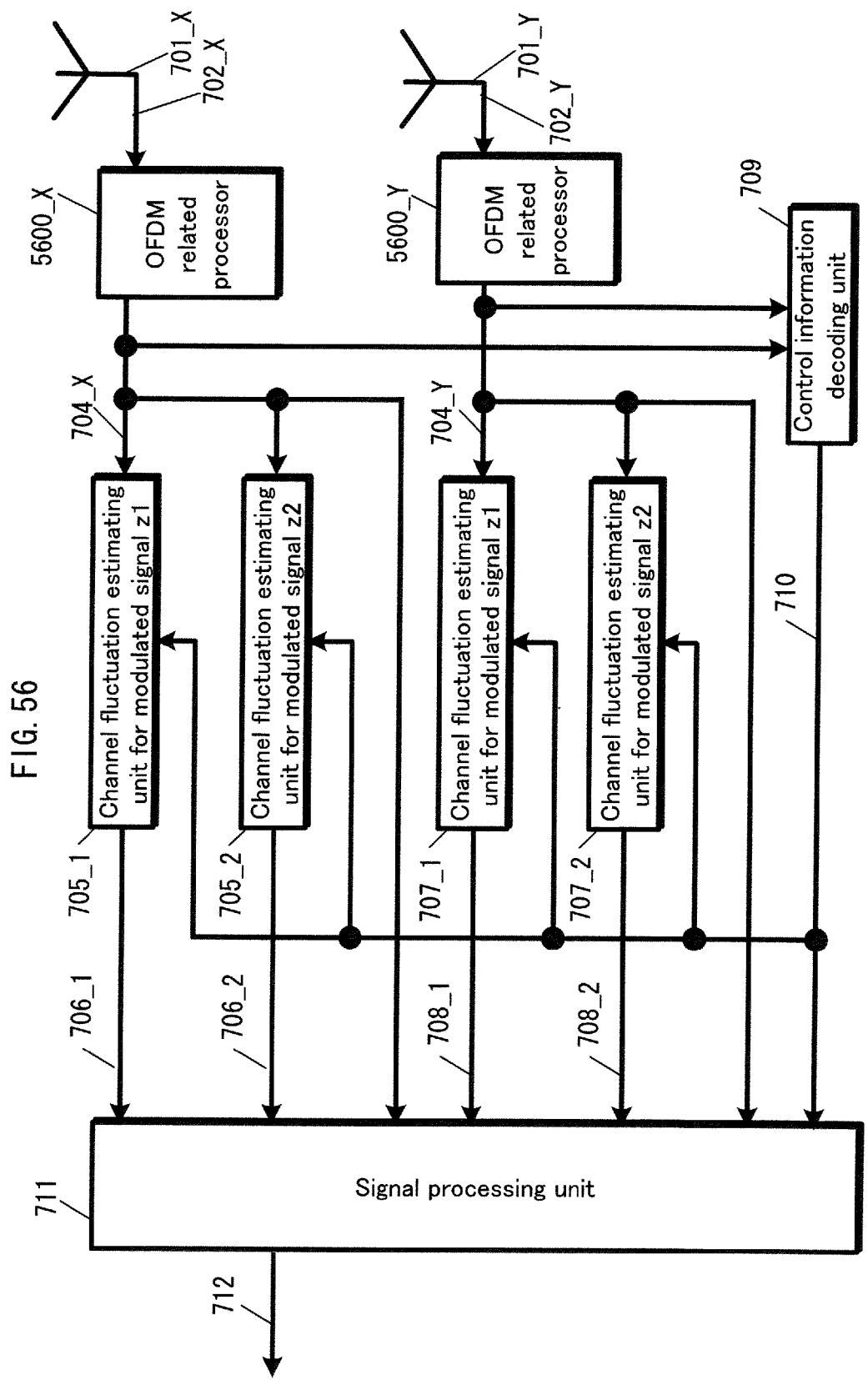
FIG. 56 is an example of the structure of a reception device.

FIG. 56 shows an example of the structure of a reception device for receiving modulated signals transmitted by the transmission device in FIG. 52. Elements that operate in a similar way to FIG. 7 bear the same reference signs.

In FIG. 56, an OFDM related processor (5600_X) receives, as input, a received signal 702_X, performs predetermined processing, and outputs a processed signal 704_X. Similarly, an OFDM related processor (5600_Y) receives, as input, a received signal 702_Y, performs predetermined processing, and outputs a processed signal 704_Y.

The control information decoding unit 709 in FIG. 56 receives, as input, the processed signals 704_X and 704_Y, extracts the control information symbols and individual control information symbols in FIGS. 55A and 55B to obtain the control information transmitted by these symbols, and outputs a control signal 710 that includes the obtained information.

The channel fluctuation estimating unit 705_1 for the modulated signal z1 receives, as inputs, the processed signal 704_X and the control signal 710, performs channel estimation in the carrier group required by the reception device (the desired carrier group), and outputs a channel estimation signal 706_1.

Similarly, the channel fluctuation estimating unit 705_2 for the modulated signal z2 receives, as inputs, the processed signal 704_X and the control signal 710, performs channel estimation in the carrier group required by the reception device (the desired carrier group), and outputs a channel estimation signal 706_2.

Similarly, the channel fluctuation estimating unit 705_1 for the modulated signal z1 receives, as inputs, the processed signal 704_Y and the control signal 710, performs channel estimation in the carrier group required by the reception device (the desired carrier group), and outputs a channel estimation signal 708_1.

Similarly, the channel fluctuation estimating unit 705_2 for the modulated signal z2 receives, as inputs, the processed signal 704_Y and the control signal 710, performs channel estimation in the carrier group required by the reception device (the desired carrier group), and outputs a channel estimation signal 708_2.

The signal processing unit 711 receives, as inputs, the signals 706_1, 706_2, 708_1, 708_2, 704_X, 704_Y, and the control signal 710. Based on the information included in the control signal 710 on the transmission method, modulation method, error correction coding method, coding ratio for error correction coding, block size of error correction codes, and the like for the data symbols transmitted in the desired carrier group, the signal processing unit 711 demodulates and decodes the data symbols and outputs received data 712.

Figure 57:
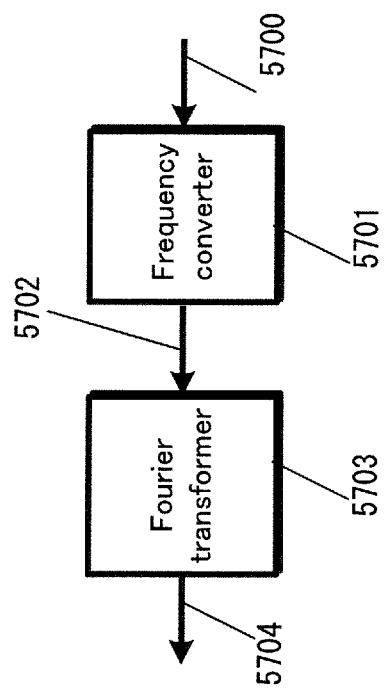
FIG. 57 shows the structure of the OFDM related processors (5600_X and 5600_Y) in FIG. 56.

FIG. 57 shows the structure of the OFDM related processors (5600_X, 5600_Y) in FIG. 56. A frequency converter (5701) receives, as input, a received signal (5700), performs frequency conversion, and outputs a frequency converted signal (5702).

A Fourier transformer (5703) receives, as input, the frequency converted signal (5702), performs a Fourier transform, and outputs a Fourier transformed signal (5704).

As described above, when using a multi-carrier transmission method such as an OFDM method, carriers are divided into a plurality of carrier groups, and the transmission method is set for each carrier group, thereby allowing for the reception quality and transmission speed to be set for each carrier group, which yields the advantageous effect of construction of a flexible system. In this case, as described in other embodiments, allowing for choice of a method of regularly hopping between precoding matrices offers the advantages of obtaining high reception quality, as well as high transmission speed, in an LOS environment. While in the present embodiment, the transmission methods to which a carrier group can be set are "a spatial multiplexing MIMO system, a MIMO method using a fixed precoding matrix, a MIMO method for regularly hopping between precoding matrices, space-time block coding, or a transmission method for transmitting only stream s1", but the transmission methods are not limited in this way. Furthermore, the space-time coding is not limited to the method described with reference to FIG. 50, nor is the MIMO method using a fixed precoding matrix limited to method #2 in FIG. 49, as any structure with a fixed precoding matrix is acceptable. In the present embodiment, the case of two antennas in the transmission device has been described, but when the number of antennas is larger than two as well, the same advantageous effects may be achieved by allowing for selection of a transmission method for each carrier group from among "a spatial multiplexing MIMO system, a MIMO method using a fixed precoding matrix, a MIMO method for regularly hopping between precoding matrices, space-time block coding, or a transmission method for transmitting only stream s1".

Figure 58:
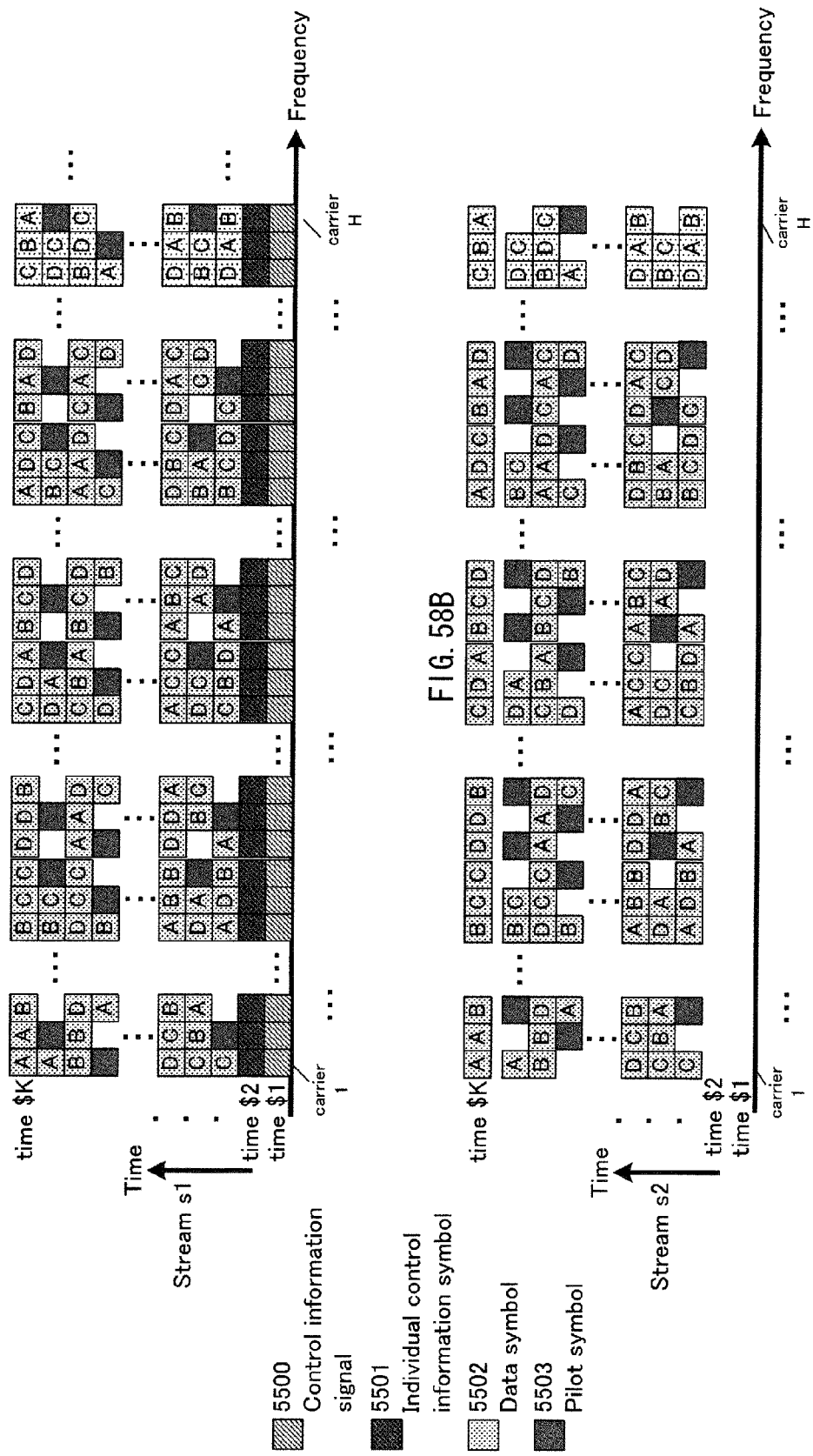
FIGS. 58A and 58B are detailed examples of a frame structure in the time and frequency domains.

FIGS. 58A and 58B show a method of allocation into carrier groups that differs from FIGS. 47A, 47B, 48A, 48B, and 51. In FIGS. 47A, 47B, 48A, 48B, 51, 55A, and 55B, carrier groups have described as being formed by groups of subcarriers. In FIGS. 58A and 58B, on the other hand, the carriers in a carrier group are arranged discretely. FIGS. 58A and 58B show an example of frame structure in the time and frequency domains that differs from FIGS. 47A, 47B, 48A, 48B, 51, 55A, and 55B. FIGS. 58A and 58B show the frame structure for carriers 1 through H, times $1 through $K. Elements that are similar to FIGS. 55A and 55B bear the same reference signs. Among the data symbols in FIGS. 58A and 58B, the "A" symbols are symbols in carrier group A, the "B" symbols are symbols in carrier group B, the "C" symbols are symbols in carrier group C, and the "D" symbols are symbols in carrier group D. The carrier groups can thus be similarly implemented by discrete arrangement along (sub)carriers, and the same carrier need not always be used in the time domain. This type of arrangement yields the advantageous effect of obtaining time and frequency diversity gain.

In FIGS. 47A, 47B, 48A, 48B, 51, 58A, and 58B, the control information symbols and the individual control information symbols are allocated to the same time in each carrier group, but these symbols may be allocated to different times. Furthermore, the number of (sub)carriers used by a carrier group may change over time.

Embodiment 16

Like Embodiment 10, the present embodiment describes a method for regularly hopping between precoding matrices using a unitary matrix when N is an odd number.

In the method of regularly hopping between precoding matrices over a period (cycle) with 2N slots, the precoding matrices prepared for the 2N slots are represented as follows.

Math 294 for $i = 0, 1, 2, \ldots, N-2, N-1$:  Equation 253

$$F[i] = \frac{1}{\sqrt{\alpha^2+1}} \begin{pmatrix} e^{j\theta_{11}(i)} & \alpha \times e^{j(\theta_{11}(i)+\lambda)} \\ \alpha \times e^{j\theta_{21}(i)} & e^{j(\theta_{21}(i)+\lambda+\pi)} \end{pmatrix}$$

Let $\alpha$ be a fixed value (not depending on i), where $\alpha > 0$.

Math 295 for $i = N, N+1, N+2, \ldots, 2N-2, 2N-1$:  Equation 254

$$F[i] = \frac{1}{\sqrt{\alpha^2+1}} \begin{pmatrix} \alpha \times e^{j\theta_{11}(i)} & e^{j(\theta_{11}(i)+\lambda)} \\ e^{j\theta_{21}(i)} & \alpha \times e^{j(\theta_{21}(i)+\lambda+\pi)} \end{pmatrix}$$

Let $\alpha$ be a fixed value (not depending on i), where $\alpha > 0$. (Let the $\alpha$ in Equation 253 and the $\alpha$ in Equation 254 be the same value.)

From Condition #5 (Math 106) and Condition #6 (Math 107) in Embodiment 3, the following conditions are important in Equation 253 for achieving excellent data reception quality.

Math 296

Condition #46

$e^{j(\theta_{11}(x)-\theta_{21}(x))} \neq e^{j(\theta_{11}(y)-\theta_{21}(y))}$ for $\forall x, \forall y (x \neq y; x, y = 0, 1, 2, \ldots, N-2, N-1)$ (x is 0, 1, 2, ..., N−2, N−1; y is 0, 1, 2, ..., N−2, N−1; and x≠y.)

Math 297

$e^{j(\theta_{11}(x)-\theta_{21}(x)-\pi)} \neq e^{j(\theta_{11}(y)-\theta_{21}(y)-\pi)}$ for $\forall x, \forall y (x \neq y; x, y = 0, 1, 2, \ldots, N-2, N-1)$  Condition #47

(x is 0, 1, 2, ..., N−2, N−1; y is 0, 1, 2, ..., N−2, N−1; and x≠y.)

Addition of the following condition is considered.

Math 298

Condition #48

$\theta_{11}(x) = \theta_{11}(x+N)$ for $\forall x (x=0,1,2,\ldots,N-2,N-1)$ and $\theta_{21}(y) = \theta_{21}(y+N)$ for $\forall y (y=0,1,2,\ldots,N-2,N-1)$ Next, in order to distribute the poor reception points evenly with regards to phase in the complex plane, as described in Embodiment 6, Condition #49 and Condition #50 are provided.

Math 299

$$\frac{e^{j(\theta_{11}(x+1)-\theta_{21}(x+1))}}{e^{j(\theta_{11}(x)-\theta_{21}(x))}} = e^{j\left(\frac{2\pi}{N}\right)}$$  Condition #49 for $\forall x (x = 0, 1, 2, \ldots, N-2)$

Math 300

$$\frac{e^{j(\theta_{11}(x+1)-\theta_{21}(x+1))}}{e^{j(\theta_{11}(x)-\theta_{21}(x))}} = e^{j\left(-\frac{2\pi}{N}\right)}$$  Condition #50 for $\forall x (x = 0, 1, 2, \ldots, N-2)$

In other words, Condition #49 means that the difference in phase is $2\pi/N$ radians. On the other hand, Condition #50 means that the difference in phase is $-2\pi/N$ radians.

Figure 60B:
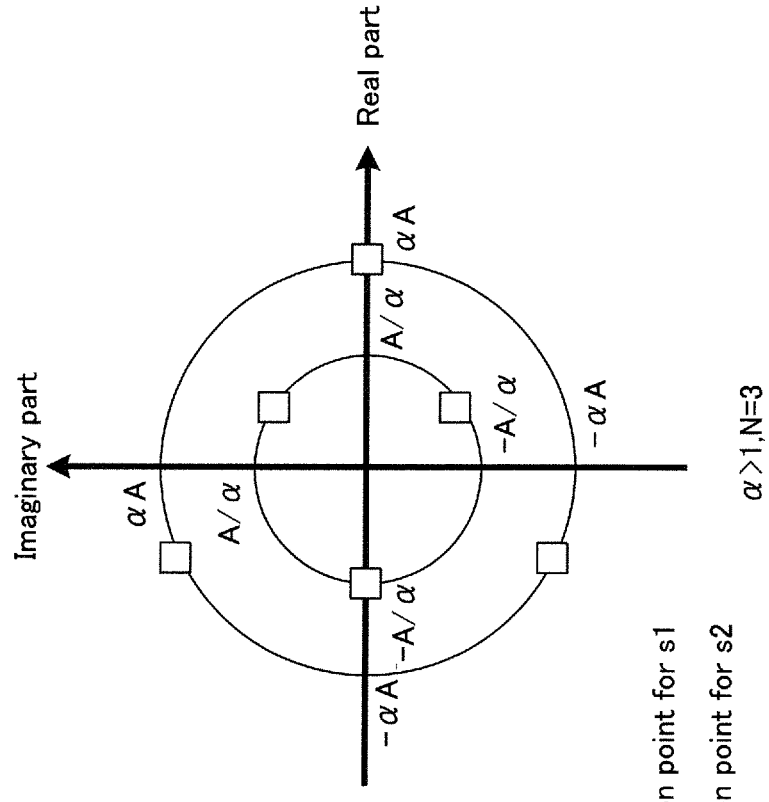
FIGS. 60A and 60B show positions of poor reception points.
Figure 60A:
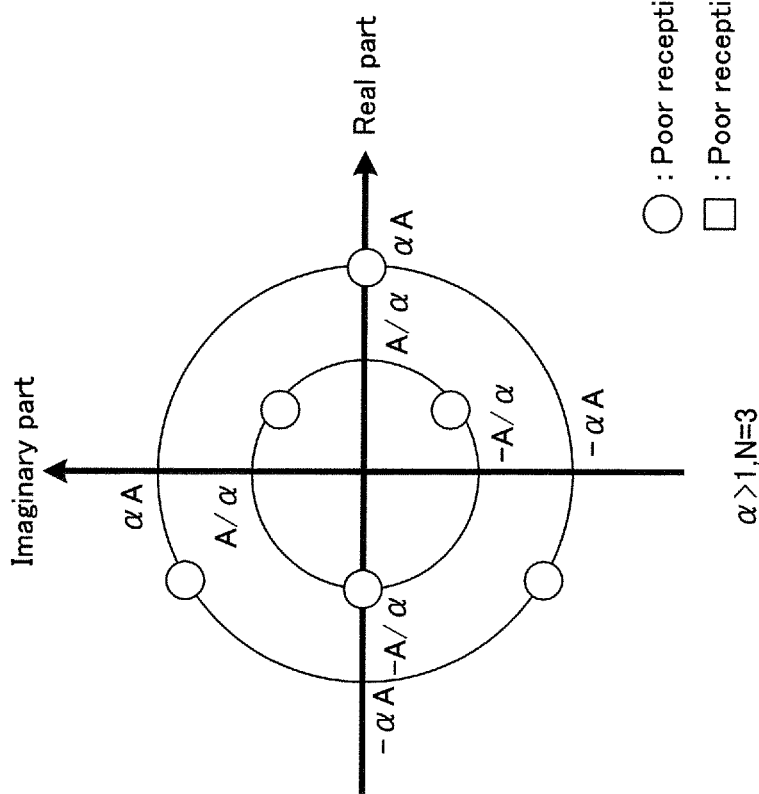

Letting $\theta_{11}(0)-\theta_{21}(0)=0$ radians, and letting $\alpha>1$, the distribution of poor reception points for s1 and for s2 in the complex plane for N=3 is shown in FIGS. 60A and 60B. As is clear from FIGS. 60A and 60B, in the complex plane, the minimum distance between poor reception points for s1 is kept large, and similarly, the minimum distance between poor reception points for s2 is also kept large. Similar conditions are created when α<1. Furthermore, upon comparison with FIGS. 45A and 45B in Embodiment 10, making the same considerations as in Embodiment 9, the probability of a greater distance between poor reception points in the complex plane increases when N is an odd number as compared to when N is an even number. However, when N is small, for example when N≤16, the minimum distance between poor reception points in the complex plane can be guaranteed to be a certain length, since the number of poor reception points is small. Accordingly, when N≤16, even if N is an even number, cases do exist where data reception quality can be guaranteed.

Therefore, in the method for regularly hopping between precoding matrices based on Equations 253 and 254, when N is set to an odd number, the probability of improving data reception quality is high. Precoding matrices F[0]-F[2N−1] are generated based on Equations 253 and 254 (the precoding matrices F[0]-F[2N−1] may be in any order for the 2N slots in the period (cycle)). Symbol number 2Ni may be precoded using F[0], symbol number 2Ni+1 may be precoded using F[1], . . . , and symbol number 2N×i+h may be precoded using F[h], for example (h=0, 1, 2, . . . , 2N−2, 2N−1). (In this case, as described in previous embodiments, precoding matrices need not be hopped between regularly.) Furthermore, when the modulation method for both s1 and s2 is 16QAM, if α is set as in Equation 233, the advantageous effect of increasing the minimum distance between 16×16=256 signal points in the IQ plane for a specific LOS environment may be achieved.

The following conditions are possible as conditions differing from Condition #48:

Math 301

$$e^{j(\theta_{11}(x)-\theta_{21}(x))} \neq e^{j(\theta_{11}(y)-\theta_{21}(y))} \text{ for } \forall x, \forall y (x \neq y; x, y=N, N+1, N+2, \ldots, 2N-2, 2N-1)$$

Condition #51

(where x is N, N+1, N+2, . . . , 2N−2, 2N−1; y is N, N+1, N+2, . . . , 2N−2, 2N−1; and x≠y.)

Math 302

Condition #52

$$e^{j(\theta_{11}(x)-\theta_{21}(x)-\pi)} \neq e^{j(\theta_{11}(y)-\theta_{21}(y)-\pi)} \text{ for } \forall x, \forall y (x \neq y; x, y=N, N+1, N+2, \ldots, 2N-2, 2N-1)$$

(where x is N, N+1, N+2, . . . , 2N−2, 2N−1; y is N, N+1, N+2, . . . , 2N−2, 2N−1; and x≠y.)

In this case, by satisfying Condition #46, Condition #47, Condition #51, and Condition #52, the distance in the complex plane between poor reception points for s1 is increased, as is the distance between poor reception points for s2, thereby achieving excellent data reception quality.

In the present embodiment, the method of structuring 2N different precoding matrices for a precoding hopping method with a 2N-slot time period (cycle) has been described. In this case, as the 2N different precoding matrices, F[0], F[1], F[2], . . . , F[2N−2], F[2N−1] are prepared. In the present embodiment, an example of a single carrier transmission method has been described, and therefore the case of arranging symbols in the order F[0], F[1], F[2], . . . , F[2N−2], F[2N−1] in the time domain (or the frequency domain) has been described. The present invention is not, however, limited in this way, and the 2N different precoding matrices F[0], F[1], F[2], . . . , F[2N−2], F[2N−1] generated in the present embodiment may be adapted to a multi-carrier transmission method such as an OFDM transmission method or the like. As in Embodiment 1, as a method of adaption in this case, precoding weights may be changed by arranging symbols in the frequency domain and in the frequency-time domain. Note that a precoding hopping method with a 2N-slot time period (cycle) has been described, but the same advantageous effects may be obtained by randomly using 2N different precoding matrices. In other words, the 2N different precoding matrices do not necessarily need to be used in a regular period (cycle).

Furthermore, in the precoding matrix hopping method over an H-slot period (cycle) (H being a natural number larger than the number of slots 2N in the period (cycle) of the above method of regularly hopping between precoding matrices), when the 2N different precoding matrices of the present embodiment are included, the probability of excellent reception quality increases.

Embodiment A1

In the present Embodiment, data is transmitted hierarchically, and a transmission method adopting the method of regularly switching between precoding matrices described in Embodiments 1-16 is described in detail.

Figure 61:
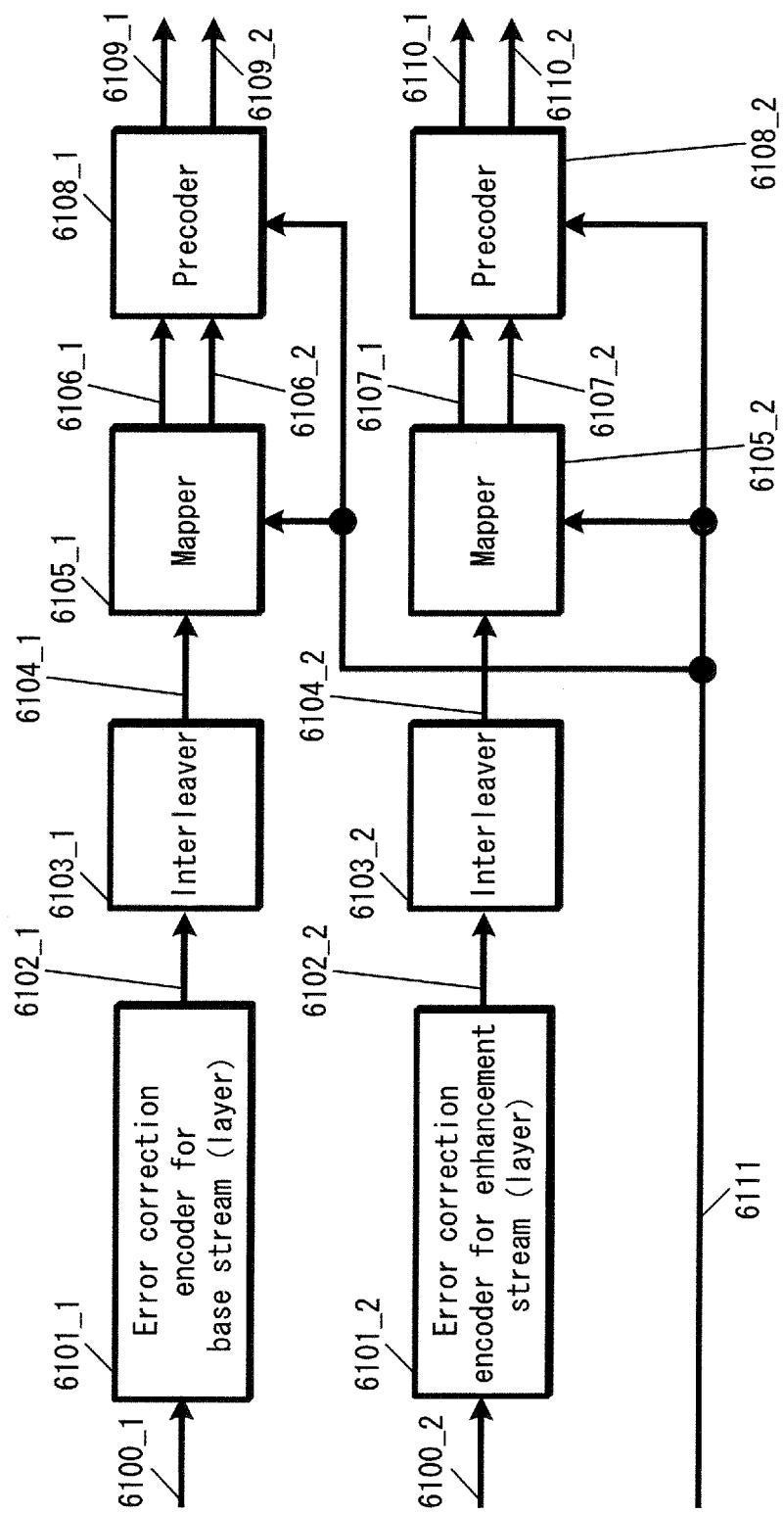
FIG. 61 is an example of the structure of a transmission device when adopting hierarchical transmission.
Figure 62:
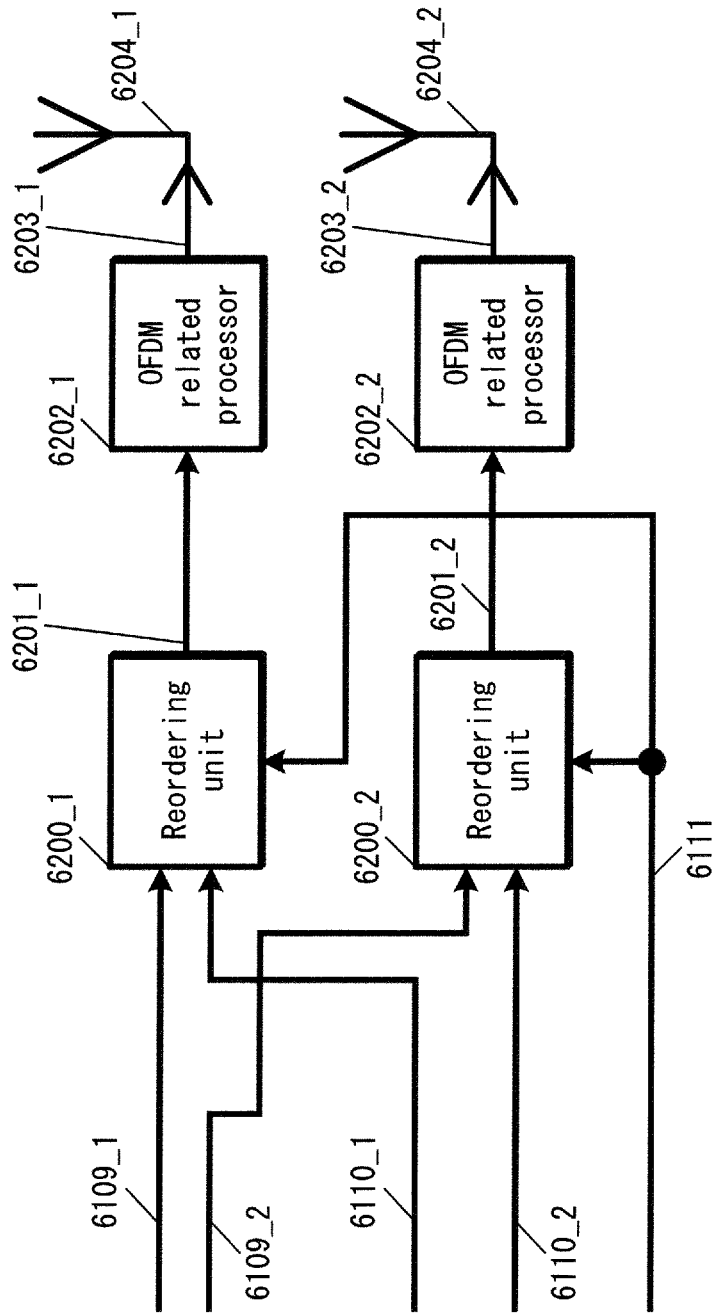
FIG. 62 is an example of the structure of a transmission device when adopting hierarchical transmission.

FIGS. 61 and 62 are an example, according to the present embodiment, of the structure of a transmission device in a broadcast station. An error correction encoder (6101_1) for a base stream (base layer) receives information (6100_1) of the base stream (base layer) as input, performs error correction coding, and outputs encoded information (6102_1) of the base stream (base layer).

An error correction encoder (6101_2) for an enhancement stream (enhancement layer) receives information (6100_2) of the enhancement stream (enhancement layer) as input, performs error correction coding, and outputs encoded information (6102_2) of the enhancement stream (enhancement layer).

An interleaver (6103_1) receives the encoded information (6102_1) of the base stream (base layer) as input, applies interleaving, and outputs interleaved, encoded data (6104_1).

Similarly, an interleaver (6103_2) receives the encoded information (6102_2) on the enhancement stream (enhancement layer) as input, applies interleaving, and outputs interleaved, encoded data (6104_2).

A mapper (6105_1) receives the interleaved, encoded data (6104_1) and an information signal regarding the transmission method (6111) as input, performs modulation in accordance with a predetermined modulation method based on the transmission method indicated by the information signal regarding the transmission method (6111), and outputs a baseband signal (6106_1) (corresponding to $s_1(t)$ (307A) in FIG. 3) and a baseband signal (6106_2) (corresponding to $s_2(t)$ (307B) in FIG. 3). The information (6111) regarding the transmission method is, for example, information such as the transmission system for hierarchical transmission (the modulation method, the transmission method, and information on precoding matrices used when adopting a transmission method that regularly switches between precoding matrices), the error correction coding method (type of coding, coding rate), and the like.

Similarly, a mapper (6105_2) receives the interleaved, encoded data (6104_2) and the information signal regarding the transmission method (6111) as input, performs modulation in accordance with a predetermined modulation method based on the transmission method indicated by the information signal regarding the transmission method (6111), and outputs a baseband signal (6107_1) (corresponding to $s_1(t)$ (307A) in FIG. 3) and a baseband signal (6107_2) (corresponding to $s_2(t)$ (307B) in FIG. 3).

A precoder (6108_1) receives the baseband signal (6106_1) (corresponding to s₁(t) (307A) in FIG. 3), the baseband signal (6106_2) (corresponding to s₂(t) (307B) in FIG. 3), and the information signal regarding the transmission method (6111) as input, performs precoding based on the method of regularly switching between precoding matrices as indicated by the information signal regarding the transmission method (6111), and outputs a precoded baseband signal (6109_1) (corresponding to z₁(t) (309A) in FIG. 3) and a precoded baseband signal (6109_2) (corresponding to z₂(t) (309B) in FIG. 3).

Similarly, a precoder (6108_2) receives the baseband signal (6107_1) (corresponding to s₁(t) (307A) in FIG. 3), the baseband signal (6107_2) (corresponding to s₂(t) (307B) in FIG. 3), and the information signal regarding the transmission method (6111) as input, performs precoding based on the method of regularly switching between precoding matrices as indicated by the information signal regarding the transmission method (6111), and outputs a precoded baseband signal (6110_1) (corresponding to z₁(t) (309A) in FIG. 3) and a precoded baseband signal (6110_2) (corresponding to z₂(t) (309B) in FIG. 3).

In FIG. 62, a reordering unit (6200_1) receives the precoded baseband signal (6109_1) and the precoded baseband signal (6110_1) as input, performs reordering, and outputs a reordered, precoded baseband signal (6201_1).

Similarly, a reordering unit (6200_2) receives the precoded baseband signal (6109_2) and the precoded baseband signal (6110_2) as input, performs reordering, and outputs a reordered, precoded baseband signal (6201_2).

An OFDM related processor (6202_1) receives the reordered, precoded baseband signal (6201_1), applies the signal processing described in Embodiment 1, and outputs a transmission signal (6203_1). The transmission signal (6203_1) is output from an antenna (6204_1).

Similarly, an OFDM related processor (6202_2) receives the reordered, precoded baseband signal (6201_2), applies the signal processing described in Embodiment 1, and outputs a transmission signal (6203_2). The transmission signal (6203_2) is output from an antenna (6204_2).

Figure 63:
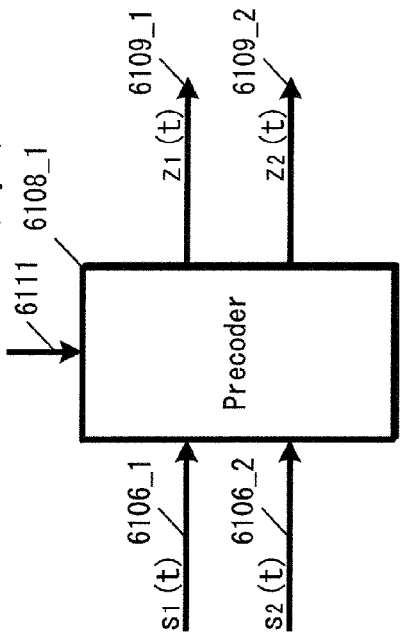
FIG. 63 is an example of precoding of a base stream.

FIG. 63 illustrates operations of the precoder (6108_1) in FIG. 61. The precoder (6108_1) regularly switches between precoding matrices, and the structure and operations of the precoder (6108_1) are similar to the structure and operations described in FIGS. 3, 6, 22, and the like. Since FIG. 61 illustrates the precoder (6108_1), FIG. 63 shows operations for weighting of the base stream (base layer). As shown in FIG. 63, when the precoder 6108_1 performs weighting, i.e. when the precoder 6108_1 generates a precoded baseband signal by performing precoding, z₁(t) and z₂(t) are generated as a result of precoding that regularly switches between pre-coding matrices. The precoding of the base stream (base layer) is set to an eight-slot period (cycle) over which the precoding matrix is switched. The precoding matrices for weighting are represented as F[0], F[1], F[2], F[3], F[4], F[5], F[6], and F[7]. The symbols in the precoded signals z₁(t) and z₂(t) are represented as 6301 and 6302. In FIG. 63, a symbol is represented as "B #X F[Y]", which refers to the X$^{th}$ symbol in the base stream (base layer) being precoded with the F[Y] precoding matrix (where Y is any integer from 0 to 7).

Figure 64:
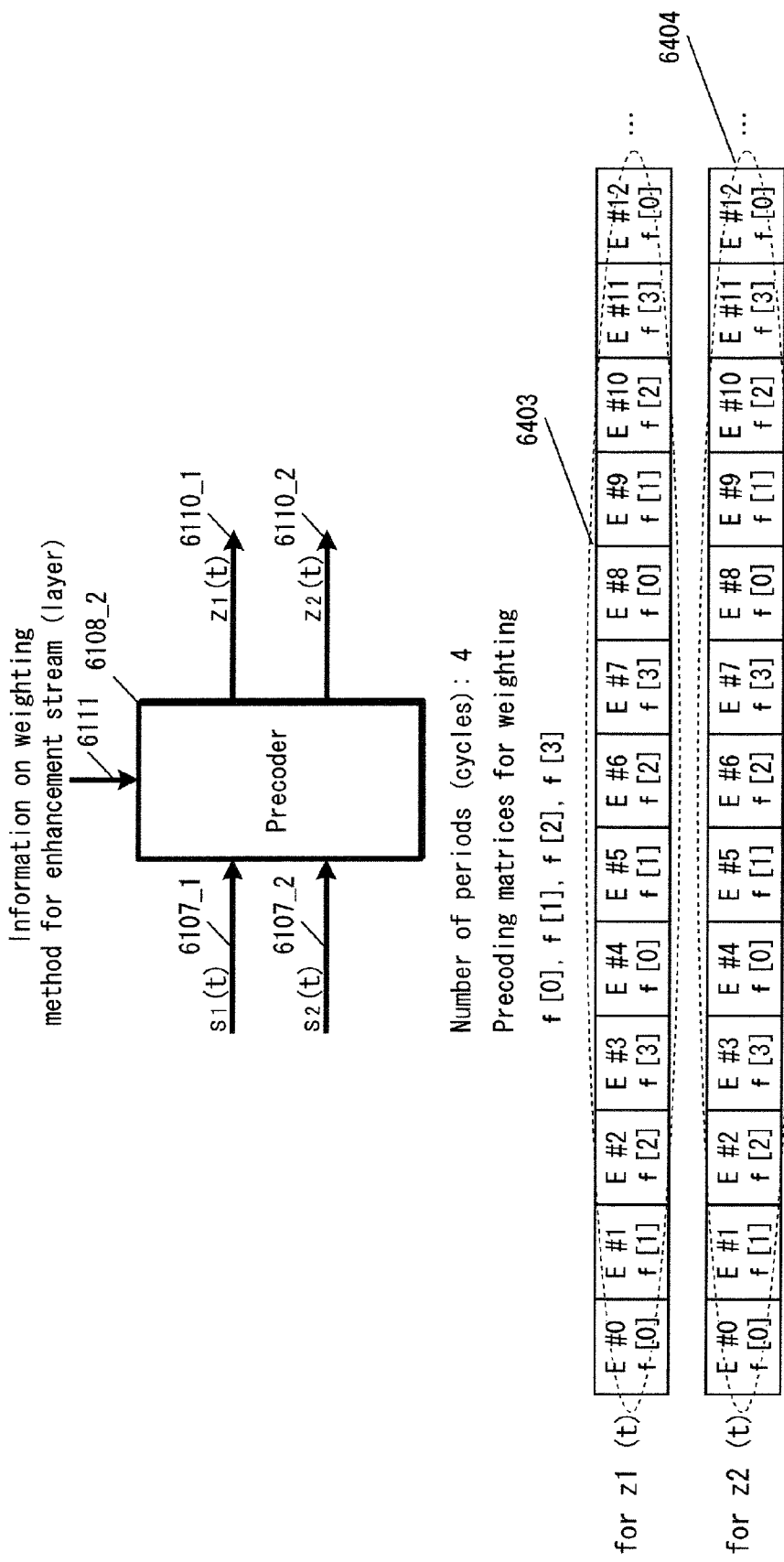
FIG. 64 is an example of precoding of an enhancement stream.

FIG. 64 illustrates operations of the precoder (6108_2) in FIG. 61. The precoder (6108_2) regularly switches between precoding matrices, and the structure and operations of the precoder (6108_2) are similar to the structure and operations described in FIGS. 3, 6, 22, and the like. Since FIG. 61 illustrates the precoder (6108_2), FIG. 64 shows operations for weighting of the enhancement stream (enhancement layer). As shown in FIG. 64, when the precoder 6108_2 performs weighting, i.e. when the precoder 6108_2 generates a precoded baseband signal by performing precoding, z₁(t) and z₂(t) are generated as a result of precoding that regularly switches between precoding matrices. The precoding of the enhancement stream (enhancement layer) is set to a four-slot period (cycle) over which the precoding matrix is switched. The precoding matrices for weighting are represented as f[0], f[1], f[2], and f[3]. The symbols in the precoded signals z₁(t) and z₂(t) are represented as 6403 and 6404. In FIG. 64, a symbol is represented as "E #X f[Y]", which refers to the X$^{th}$ symbol in the enhancement stream (enhancement layer) being precoded with the f[Y] precoding matrix (where Y is any integer from 0 to 4).

Figure 65A:
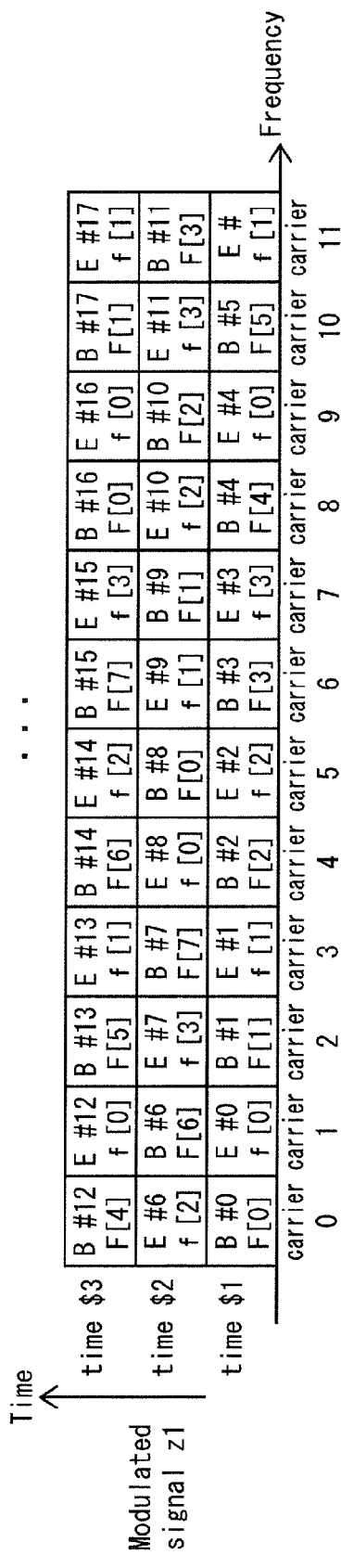
FIGS. 65A and 65B are examples of arrangements of symbols in modulated signals when adopting hierarchical transmission.
Figure 65B:
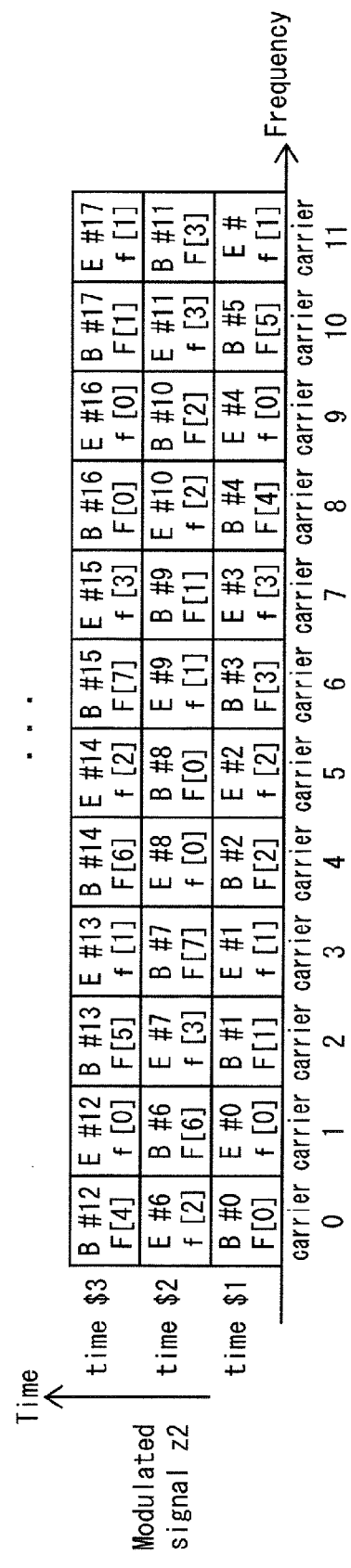

FIGS. 65A and 65B show the method of reordering symbols in the reordering unit (6200_1) and the reordering unit (6200_2) in FIG. 62. The reordering unit (6200_1) and the reordering unit (6200_2) arrange symbols shown in FIGS. 63 and 64 in the frequency and time domain as shown in FIGS. 65A and 65B. During transmission, symbols in the same (sub)carrier and at the same time are transmitted at the same frequency and at the same time from different antennas. Note that the arrangement of symbols in the frequency and the time domains as shown in FIGS. 65A and 65B is only an example. Symbols may be arranged based on the method described in Embodiment 1.

When the base stream (base layer) and the enhancement stream (enhancement layer) are transmitted, it is necessary for the reception quality of data in the base stream (base layer) to be made higher than the reception quality of data in the enhancement stream (enhancement layer), due to the nature of the streams (layers). Therefore, as in the present embodiment, when using a method of regularly switching between precoding matrices, the modulation method when transmitting the base stream (base layer) is set to differ from the modulation method when transmitting the enhancement stream (enhancement layer). For example, it is possible to use one of modes #1-#5 as in Table 3.

TABLE 3

| Mode | Modulation method for base stream (layer) | Modulation method for enhancement stream (layer) |
|---|---|---|
| Mode #1 | QPSK | 16QAM |
| Mode #2 | QPSK | 64QAM |
| Mode #3 | QPSK | 256QAM |
| Mode #4 | 16QAM | 64QAM |
| Mode #5 | 16QAM | 256QAM |

By correspondingly setting the method of regularly switching between precoding matrices used when transmitting the base stream (base layer) to differ from the method of regularly switching between precoding matrices used when transmitting the enhancement stream (enhancement layer), it is possible for the reception quality of data in the reception device to improve, or to simplify the structure of the transmission device and the reception device. As an example, as shown in FIGS. 63 and 64, when using a method of modulating by modulation level (the number of signal points in the IQ plane), it may be better for methods of regularly switching between precoding matrices to differ. Therefore, a method for setting the periods (cycles) in the method of regularly switching between precoding matrices used when transmitting the base stream (base layer) to differ from the periods (cycles) in the method of regularly switching between precoding matrices used when transmitting the enhancement stream (enhancement layer) is effective, since this method for setting improves reception quality of data in the reception device or simplifies the structure of the transmission device and the reception device. Alternatively, the method of structuring the precoding matrices in the method of regularly switching between precoding matrices used when transmitting the base stream (base layer) may be made to differ from the method of regularly switching between precoding matrices used when transmitting the enhancement stream (enhancement layer). Accordingly, the method of switching between precoding matrices is set as shown in Table 4 for each of the modes that can be set for the modulation methods of the streams (layers) in Table 3. (In Table 4, A, B, C, and D indicate different methods of switching between precoding matrices.)

TABLE 4

| | Base stream (layer) | | Extension stream (layer) | |
|---|---|---|---|---|
| Mode | modulation method | method of switching between precoding matrices | modulation method | method of switching between precoding matrices |
| Mode #1 | QPSK | A | 16QAM | B |
| Mode #2 | QPSK | A | 64QAM | C |
| Mode #3 | QPSK | A | 256QAM | D |
| Mode #4 | 16QAM | B | 64QAM | C |
| Mode #5 | 16QAM | B | 256QAM | D |

Accordingly, in the transmission device for the broadcast station in FIGS. 61 and 62, when the modulation method is switched in the mappers (6105_1 and 6105_2), the precoding method is switched in the precoders (6108_1 and 6108_2). Note that Table 4 is no more than an example. The method of switching between precoding matrices may be the same even if the modulation method differs. For example, the method of switching between precoding matrices may be the same for 64QAM and for 256QAM. The important point is that there be at least two methods of switching between precoding matrices when a plurality of modulation methods are supported. This point is not limited to use of hierarchical transmission; by establishing the above relationship between the modulation method and the method of switching between precoding matrices even when not using hierarchical transmission, it is possible for the reception quality of data in the reception device to improve, or to simplify the structure of the transmission device and the reception device.

It is possible for a system not only to support hierarchical transmission exclusively, but also to support transmission that is not hierarchical. In this case, when transmission is not hierarchical, in FIGS. 61 and 62, operations of the functional units related to the enhancement stream (enhancement layer) are stopped, and only the base stream (base layer) is transmitted. Table 5 corresponds to Table 4 and shows, for this case, correspondence between the settable mode, modulation method, and method of switching between precoding matrices.

TABLE 5

| | Base stream (layer) | | Extension stream (layer) | |
|---|---|---|---|---|
| Mode | modulation method | method of switching between precoding matrices | modulation method | method of switching between precoding matrices |
| Mode #1 | QPSK | A | 16QAM | B |
| Mode #2 | QPSK | A | 64QAM | C |
| Mode #3 | QPSK | A | 256QAM | D |
| Mode #4 | 16QAM | B | 64QAM | C |
| Mode #5 | 16QAM | B | 256QAM | D |
| Mode #6 | QPSK | A | | |
| Mode #7 | 16QAM | B | | |
| Mode #8 | 64QAM | C | | |
| Mode #9 | 256QAM | D | | |
| Mode #10 | 1024QAM | E | | |

In Table 5, modes #1-#5 are the modes used for hierarchical transmission, and modes #6-#10 are the modes when transmission is not hierarchical. In this case, the method of switching between precoding matrices is set appropriately for each mode.

Next, operations of the reception device when supporting hierarchical transmission are described. The structure of the reception device in the present Embodiment may be the structure in FIG. 7 described in Embodiment 1. In this case, the structure of the signal processing unit 711 of FIG. 7 is shown in FIG. 66.

Figure 66:
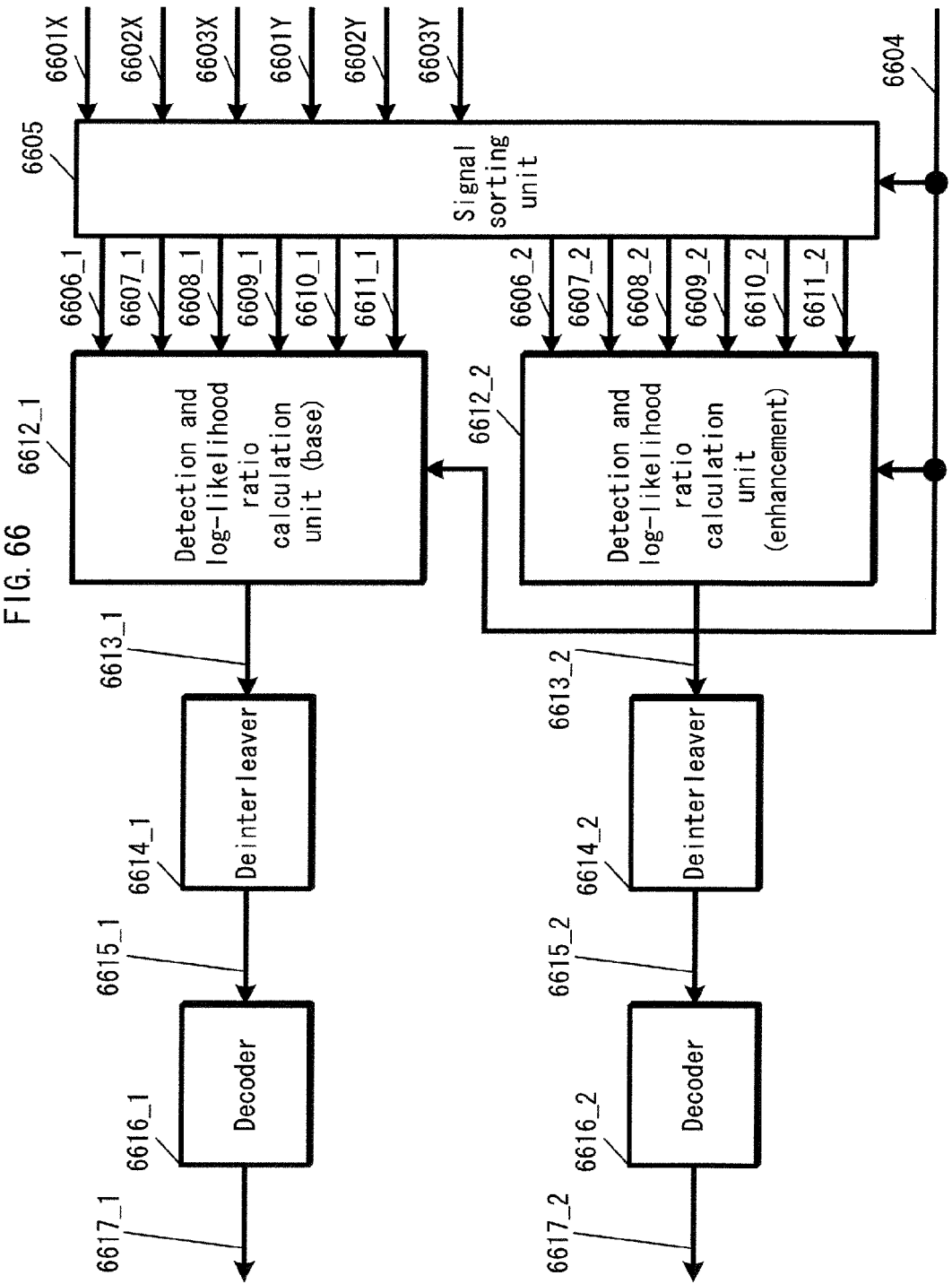
FIG. 66 is an example of the structure of a signal processing unit in a transmission device when adopting hierarchical transmission.

In FIG. 66, 6601X is a channel estimation signal corresponding to the channel estimation signal 706_1 in FIG. 7. 6602X is a channel estimation signal corresponding to the channel estimation signal 706_2 in FIG. 7. 6603X is a baseband signal corresponding to the baseband signal 704_X in FIG. 7. 6604 is a signal regarding information on the transmission method indicated by the transmission device and corresponds to the signal 710 regarding information on the transmission method indicated by the transmission device.

6601Y is a channel estimation signal corresponding to the channel estimation signal 708_1 in FIG. 7. 6602Y is a channel estimation signal corresponding to the channel estimation signal 708_2 in FIG. 7. 6603Y is a baseband signal corresponding to the baseband signal 704_Y in FIG. 7.

A signal sorting unit (6605) receives the channel estimation signals (6601X, 6602X, 6601Y, 6602Y), the baseband signals (6603X, 6603Y), and the signal regarding information on the transmission method indicated by the transmission device (6604) as input, and based on the signal regarding information on the transmission method indicated by the transmission device (6604), sorts the input into signals related to the base stream (base layer) and information of the enhancement stream (enhancement layer), outputting channel estimation signals for the base stream (6606_1, 6607_1, 6609_1, and 6610_1), baseband signals for the base stream (6608_1, 6611_1), channel estimation signals for the enhancement stream (6606_2, 6607_2, 6609_2, and 6610_2), and baseband signals for the enhancement stream (6608_2, 6611_2).

A detection and log-likelihood ratio calculation unit (6612_1) is a processing unit for the base stream (base layer) that receives the channel estimation signals for the base stream (6606_1, 6607_1, 6609_1, and 6610_1), baseband signals for the base stream (6608_1, 6611_1), and the signal regarding information on the transmission method indicated by the transmission device (6604) as input, estimates the modulation method and the method of switching between precoding matrices used for the base stream (base layer) from the signal regarding information on the transmission method indicated by the transmission device (6604), and based on the modulation method and the method of switching, decodes the precoding, calculates the log-likelihood ratio for each bit, and outputs a log-likelihood ratio signal (6613_1). Note that the detection and log-likelihood ratio calculation unit (6612_1) performs detection and decoding of precoding and outputs a log-likelihood ratio signal even for modes #6-#10 for which no enhancement stream (enhancement layer) exists in Table 5.

A detection and log-likelihood ratio calculation unit (6612_2) is a processing unit for the enhancement stream (enhancement layer) that receives the channel estimation signals for the enhancement stream (6606_2, 6607_2, 6609_2, and 6610_2), baseband signals for the enhancement stream (6608_2, 6611_2), and the signal regarding information on the transmission method indicated by the transmission device (6604) as input, estimates the modulation method and the method of switching between precoding matrices used for the enhancement stream (enhancement layer) from the signal regarding information on the transmission method indicated by the transmission device (6604), and based on the modulation method and the method of switching, decodes the precoding, calculates the log-likelihood ratio for each bit, and outputs a log-likelihood ratio signal (6613_2). Note that operations are stopped for modes #6-#10 for which no enhancement stream (enhancement layer) exists in Table 5.

In the transmission device described with reference to FIGS. 61 and 62, only the method of hierarchical transmission has been described, but in practice, in addition to information on the method for hierarchical transmission, it is also necessary to transmit, to the reception device, information regarding the transmission method for hierarchical transmission (the modulation method, the transmission method, and information on precoding matrices used when adopting a transmission method that regularly switches between precoding matrices), the error correction coding method (type of coding, coding rate), and the like. Furthermore, in the reception device, pilot symbols, reference symbols, and preambles for channel estimation (estimation of fluctuations in the channel), frequency synchronization, frequency offset estimation, and signal detection have a frame structure existing in a separately transmitted signal. Note that this is true not only for Embodiment A1, but also for Embodiment A2 and subsequent embodiments.

A deinterleaver (6614_1) receives the log-likelihood ratio signal (6613_1) as input, reorders the signal, and outputs a deinterleaved log-likelihood ratio signal (6615_1).

Similarly, a deinterleaver (6614_2) receives the log-likelihood ratio signal (6613_2) as input, reorders the signal, and outputs a deinterleaved log-likelihood ratio signal (6615_2).

A decoder (6616_1) receives the deinterleaved log-likelihood ratio signal (6615_1) as input, performs error correction decoding, and outputs received information (6617_1).

Similarly, a decoder (6616_2) receives the deinterleaved log-likelihood ratio signal (6615_2) as input, performs error correction decoding, and outputs received information (6617_2).

When a transmission mode exists, as in Table 5, the following methods are possible.

As described in Embodiment 1, the transmission device transmits information regarding the precoding matrices used in the method of switching between precoding matrices. The detection and log-likelihood ratio calculation units (6612_1 and 6612_2) obtain this information and decode the precoding.

As described in Embodiment 7, the transmission and reception devices share the information in Table 5 beforehand, and the transmission device transmits information on the mode. Based on Table 5, the reception device estimates the precoding matrices used in the method of switching between precoding matrices and decodes the precoding.

As described above, in the case of hierarchical transmission, using the above methods of switching between precoding matrices achieves the effect of improving reception quality of data.

The present embodiment has described examples of four-slot and eight-slot periods (cycles) in the method of regularly switching between precoding matrices, but the periods (cycles) are not limited in this way. Accordingly, for a precoding hopping method with an N-slot period (cycle), N different precoding matrices are necessary. In this case, F[0], F[1], F[2], . . . , F[N−2], F[N−1] are prepared as the N different precoding matrices. In the present embodiment, these have been described as being arranged in the frequency domain in the order of F[0], F[1], F[2], . . . , F[N−2], F[N−1], but arrangement is not limited in this way. With N different precoding matrices F[0], F[1], F[2], . . . , F[N−2], F[N−1] generated in the present Embodiment, precoding weights may be changed by arranging symbols in the time domain or in the frequency/time domains as in Embodiment 1. Note that a precoding hopping method with an N-slot period (cycle) has been described, but the same advantageous effects may be obtained by randomly using N different precoding matrices. In other words, the N different precoding matrices do not necessarily need to be used in a regular period (cycle).

In Table 5, as an example of when transmission is not hierarchical, it has been described that for some modes, a hierarchical transmission method is not used in the method of regularly switching between precoding matrices, but modes are not limited in this way. As described in Embodiment 15, a spatial multiplexing MIMO system, a MIMO system in which precoding matrices are fixed, a space-time block coding method, and a one-stream-only transmission mode may exist separately from the hierarchical transmission method described in the present embodiment, and the transmission device (broadcast station, base station) may select the transmission method from among these modes. In this case, in the spatial multiplexing MIMO system, the MIMO system in which precoding matrices are fixed, the space-time block coding method, and the one-stream-only transmission mode, both transmission that is hierarchical and transmission that is not hierarchical may be supported. Modes that use other transmission methods may also exist. The present embodiment may also be adapted to Embodiment 15 so that the hierarchical transmission method that uses the method of regularly switching between precoding matrices, as described in the present Embodiment, is used in any of the (sub)carriers in Embodiment 15.

Embodiment A2

In Embodiment A1, a method of achieving hierarchical transmission with methods of regularly switching between precoding matrices has been described. In the present embodiment, a different way of achieving hierarchical transmission is described.

Figure 67:
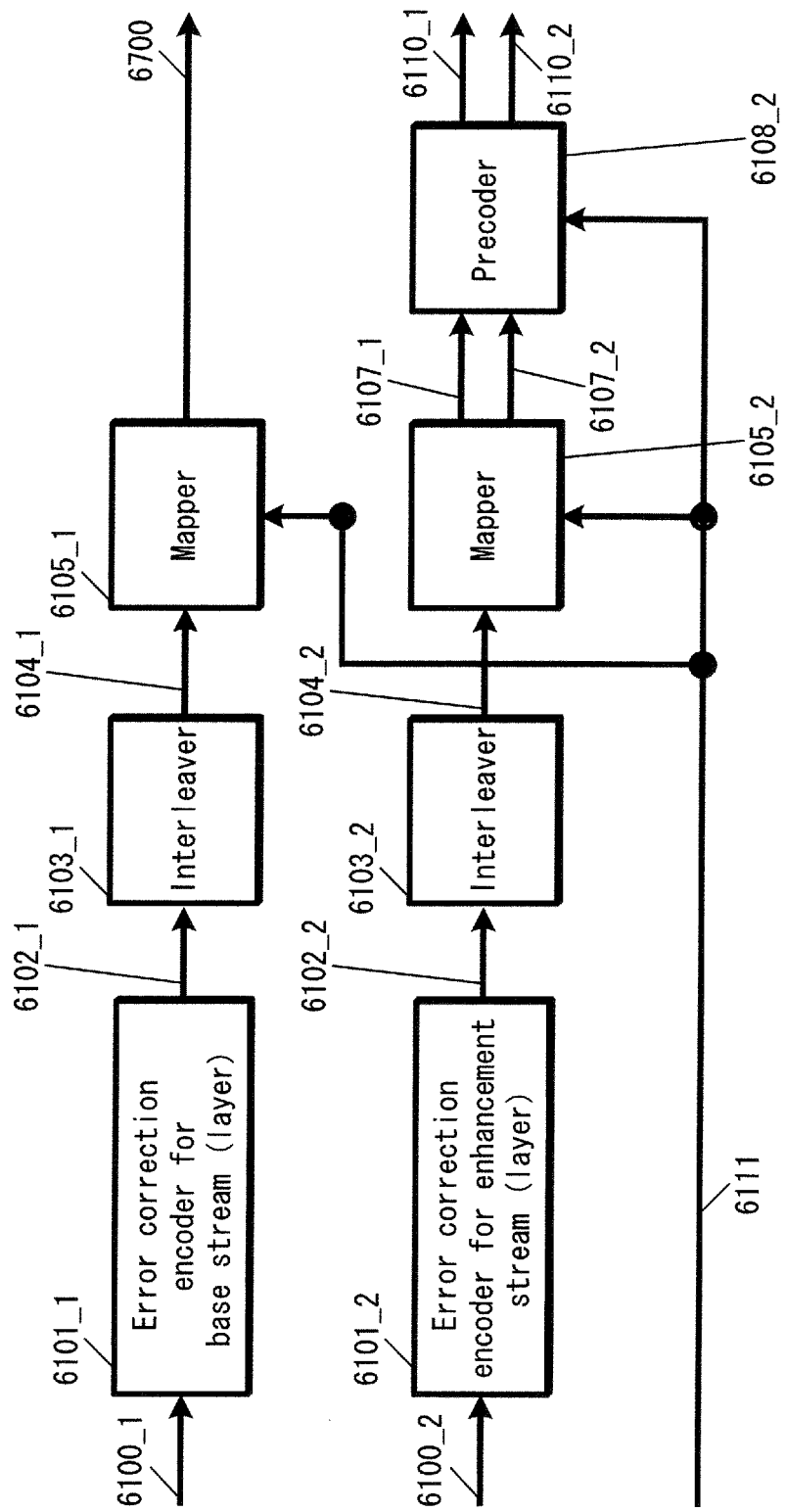
FIG. 67 is an example of the structure of a transmission device when adopting hierarchical transmission.
Figure 68:
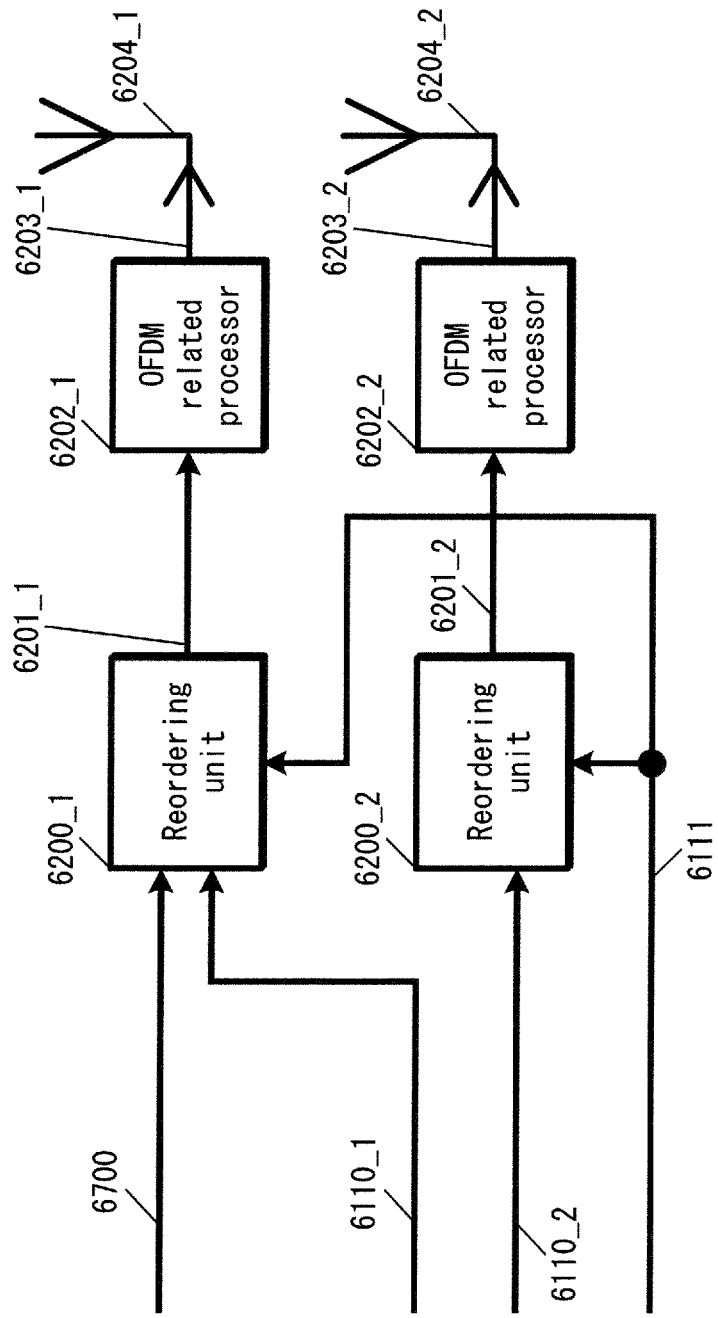
FIG. 68 is an example of the structure of a transmission device when adopting hierarchical transmission.

FIGS. 67 and 68 show the structure of a transmission device when performing the hierarchical transmission of the present embodiment. Constituent elements that are the same as in FIGS. 61 and 62 are labeled with the same reference signs. The difference between FIG. 67 and FIG. 61 is that the precoder (6108_1) is not provided. The present embodiment differs from Embodiment A1 in that the base stream (layer) is not precoded.

In FIG. 67, the mapper (6105_1) receives the interleaved, encoded data (6104_1) and the information signal regarding the transmission method (6111) as input, performs mapping according to a predetermined modulation method based on the information signal regarding the transmission method (6111), and outputs a baseband signal (6700).

In FIG. 68, the reordering unit (6200_1) receives the baseband signal (6700), the precoded baseband signal (6110_1), and the information signal regarding the transmission method (6111) as input, performs reordering based on the information signal regarding the transmission method (6111), and outputs the reordered baseband signal (6201_1).

The reordering unit (6200_2) receives the precoded baseband signal (6110_2) and the information signal regarding the transmission method (6111) as input, performs reordering based on the information signal regarding the transmission method (6111), and outputs the reordered baseband signal (6201_2).

Figure 69:
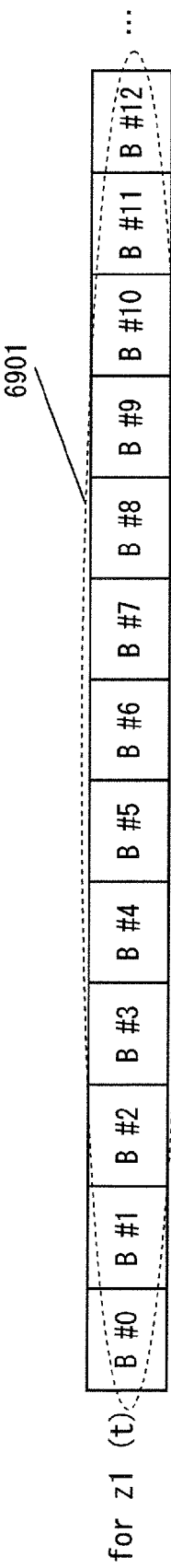
FIG. 69 is an example of a structure of symbols in a baseband signal.

FIG. 69 shows an example of symbol structure in the baseband signal of FIG. 67. The symbol group is labeled 6901. In the symbol group (6901), symbols are represented as "B #X", which refers to the "$X^{th}$ symbol in the base stream (base layer)". Note that the structure of symbols in the enhancement stream (enhancement layer) is as shown in FIG. 64.

FIGS. 70A and 70B show the method of reordering in the reordering unit (6200_1) and the reordering unit (6200_2) in FIG. 68. Symbols shown in FIGS. 64 and 69 are arranged in the frequency and time domain as shown in FIGS. 70A and 70B. In FIGS. 70A and 70B, a "-" indicates that no symbol exists. During transmission, symbols in the same (sub)carrier and at the same time are transmitted at the same frequency and at the same time from different antennas. Note that the arrangement of symbols in the frequency and the time domains as shown in FIGS. 70A and 70B is only an example. Symbols may be arranged based on the method described in Embodiment 1.

When the base stream (base layer) and the enhancement stream (enhancement layer) are transmitted, it is necessary for the reception quality of data in the base stream (base layer) to be made higher than the reception quality of data in the enhancement stream (enhancement layer), due to the nature of the streams (layers). Therefore, as in the present embodiment, when transmitting the base stream, the reception quality of data is guaranteed by transmitting using only the modulated signal $z_1$ (i.e. without transmitting the modulated signal $z_2$). Conversely, when transmitting the enhancement stream, hierarchical transmission is implemented by using a method of regularly switching between precoding matrices, since improvement of transmission speed is prioritized. For example, it is possible to use one of modes #1-#9 as in Table 6.

TABLE 6

| Mode | Modulation method for base stream (layer) | Modulation method for enhancement stream (layer) |
| --- | --- | --- |
| Mode #1 | QPSK | 16QAM |
| Mode #2 | QPSK | 64QAM |
| Mode #3 | QPSK | 256QAM |
| Mode #4 | 16QAM | 16QAM |
| Mode #5 | 16QAM | 64QAM |
| Mode #6 | 16QAM | 256QAM |
| Mode #7 | 64QAM | 64QAM |
| Mode #8 | 64QAM | 256QAM |
| Mode #9 | 256QAM | 256QAM |

The characteristic feature of Table 6 is that the modulation method for the base stream (base layer) and the modulation method for the enhancement stream (enhancement layer) may be set the same. This is because even if the modulation method is the same, the transmission quality that can be guaranteed for the base stream (base layer) and the transmission quality that can be guaranteed for the enhancement stream (enhancement layer) differ, since different transmission methods are used for the two streams (layers).

The structure of a transmission device according to the present embodiment is shown in FIGS. 7 and 66. The difference from the operations in Embodiment A1 is that the detection and log-likelihood ratio calculation unit (6612_1) in FIG. 66 does not decode precoding.

In the enhancement stream (enhancement layer), a method of regularly switching between precoding matrices is used. As long as information regarding the precoding method used by the transmission device is transmitted, the reception device can identify the precoding method used by acquiring this information. If the transmission and reception devices share the information in Table 6, another method is for the reception device to identify the precoding method used for the enhancement stream (enhancement layer) by acquiring mode information transmitted by the transmission device. Accordingly, the reception device in FIG. 66 can acquire the log-likelihood ratio for each bit by having the detection and log-likelihood ratio calculation unit change the signal processing method. Note that settable modes have been described with reference to Table 6, but modes are not limited in this way. The present embodiment may be similarly achieved using the modes for transmission methods described in Embodiment 8 or modes for transmission methods described in subsequent embodiments.

As described above, in the case of hierarchical transmission, using the above methods of switching between precoding matrices achieves the effect of improving reception quality of data in the reception device.

The periods (cycles) of switching between precoding matrices in the method of regularly switching between precoding matrices are not limited as above in the present embodiment. For a precoding hopping method with an N-slot period (cycle), N different precoding matrices are necessary. In this case, F[0], F[1], F[2], . . . , F[N−2], F[N−1] are prepared as the N different precoding matrices. In the present embodiment, these have been described as being arranged in the frequency domain in the order of F[0], F[1], F[2], . . . , F[N−2], F[N−1], but arrangement is not limited in this way. With N different precoding matrices F[0], F[1], F[2], . . . , F[N−2], F[N−1] generated in the present Embodiment, precoding weights may be changed by arranging symbols in the time domain or in the frequency/time domains as in Embodiment 1. Note that a precoding hopping method with an N-slot period (cycle) has been described, but the same advantageous effects may be obtained by randomly using N different precoding matrices. In other words, the N different precoding matrices do not necessarily need to be used in a regular period (cycle).

Furthermore, Table 6 has been described as listing modes for methods of hierarchical transmission in the present embodiment, but modes are not limited in this way. As described in Embodiment 15, a spatial multiplexing MIMO system, a MIMO system in which precoding matrices are fixed, a space-time block coding method, a one-stream-only transmission mode, and modes for methods of regularly switching between precoding matrices may exist separately from the hierarchical transmission method described in the present embodiment, and the transmission device (broadcast station, base station) may select the transmission method from among these modes. In this case, in the spatial multiplexing MIMO system, the MIMO system in which precoding matrices are fixed, the space-time block coding method, the one-stream-only transmission mode, and the modes for methods of regularly switching between precoding matrices, both transmission that is hierarchical and transmission that is not hierarchical may be supported. Modes that use other transmission methods may also exist. The present embodiment may also be adapted to Embodiment 15 so that the hierarchical transmission method described in the present Embodiment is used in any of the (sub)carriers in Embodiment 15.

Embodiment A3

The present embodiment describes hierarchical transmission that differs from Embodiments A1 and A2.

Figure 71:
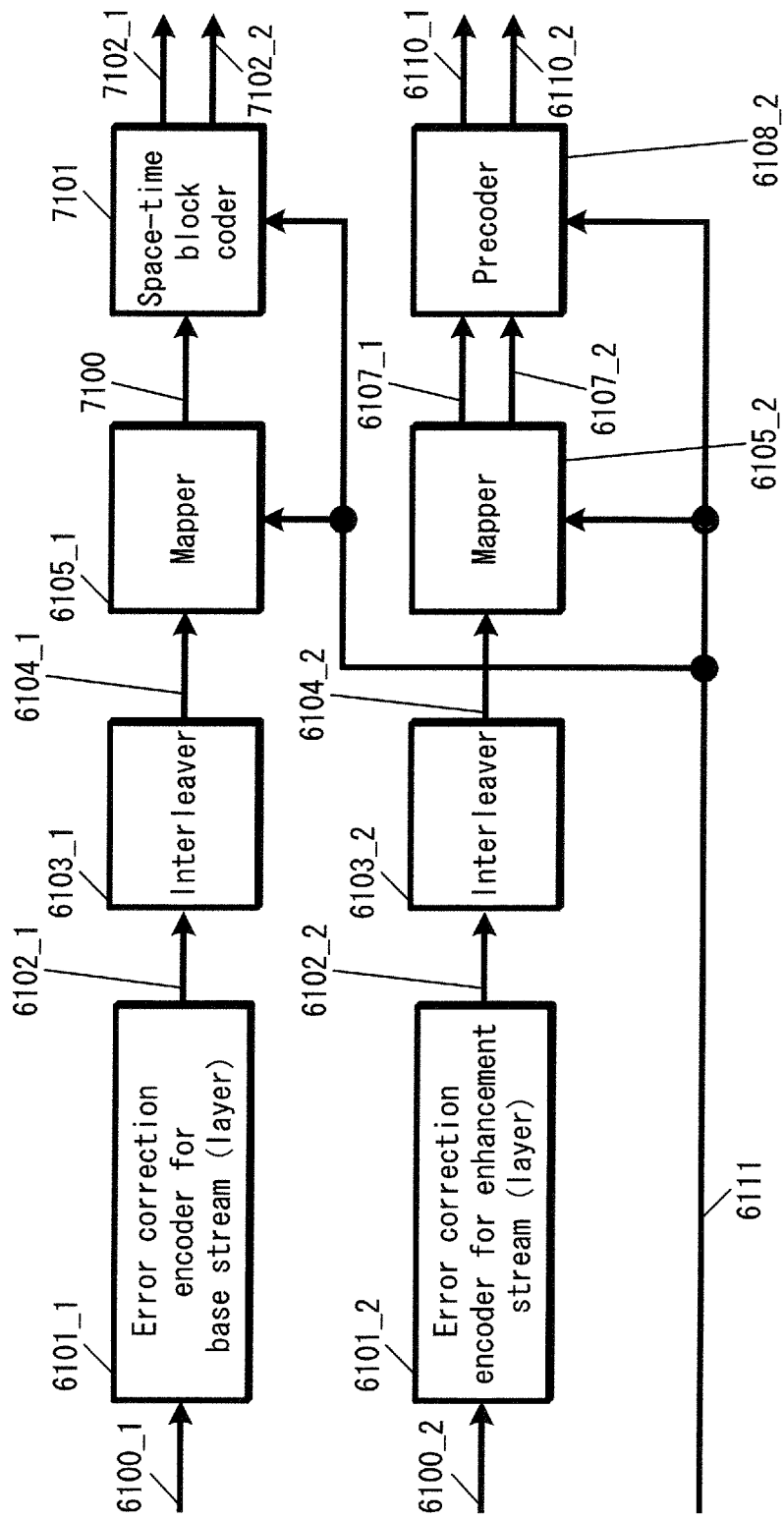
FIG. 71 is an example of the structure of a transmission device when adopting hierarchical transmission.
Figure 72:
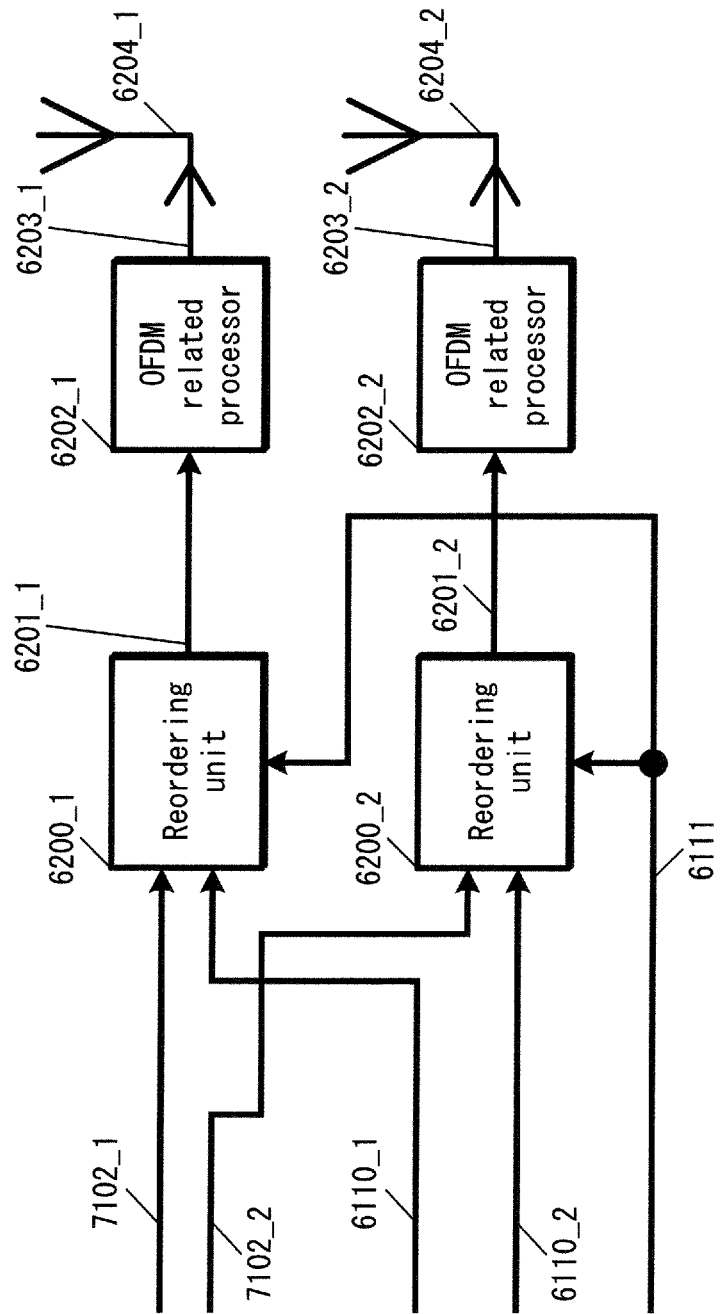
FIG. 72 is an example of the structure of a transmission device when adopting hierarchical transmission.

FIGS. 71 and 72 show the structure of a transmission device when performing the hierarchical transmission of the present embodiment. Constituent elements that are the same as in FIGS. 61 and 62 are labeled with the same reference signs. The difference between FIGS. 71 and 61 is that a space-time block coder 7101 is provided. The present embodiment differs from Embodiment A2 in that space-time block coding is performed on the base stream (layer).

The space-time block coder (7101) (which in some cases may be a frequency-space block coder) in FIG. 71 receives a mapped baseband signal (7100) and the information signal regarding the transmission method (6111) as input, performs space-time block coding based on the information signal regarding the transmission method (6111), and outputs a space-time block coded baseband signal (7102_1) (represented as $z_1(t)$) and a space-time block coded baseband signal (7102_2) (represented as $z_2(t)$).

While referred to here as space-time block coding, symbols that are space-time block coded are not limited to being arranged in order in the time domain. Space-time block coded symbols may be arranged in order in the frequency domain. Furthermore, blocks may be formed with a plurality of symbols in the time domain and a plurality of symbols in the frequency domain, and the blocks may be arranged appropriately (i.e. arranged using both the time and the frequency axes).

In FIG. 72, the reordering unit (6200_1) receives the space-time block coded baseband signal (7102_1), the precoded baseband signal (6110_1), and the information signal regarding the transmission method (6111) as input, performs reordering based on the information signal regarding the transmission method (6111), and outputs the reordered baseband signal (6201_1).

Similarly, the reordering unit (6200_2) receives the precoded baseband signal (7102_2), the precoded baseband signal (6110_2), and the information signal regarding the transmission method (6111) as input, performs reordering based on the information signal regarding the transmission method (6111), and outputs the reordered baseband signal (6201_2).

FIG. 73 is an example of a structure of symbols in space-time block coded baseband signals (7102_1, 7102_2) output by the space-time block coder (7101) in FIG. 71. The symbol group (7301) corresponds to the space-time block coded baseband signal (7102_1) (represented as $z_1(t)$), and the symbol group (7302) corresponds to the space-time block coded baseband signal (7102_2) (represented as $z_2(t)$).

The mapper (6105_1) in FIG. 71 represents signals as s1, s2, s3, s4, s5, s6, s7, s8, s9, s10, s11, s12, . . . in the order in which signals are output. The space-time block coder (7101) in FIG. 71 then performs space-time block coding on s1 and s2, yielding s1, s2, s1*, and −s2* (*: complex conjugate), which are output as in FIG. 73. Similarly, space-time block coding is performed on the sets (s3, s4), (s5, s6), (s7, s8), (s9, s10), (s11, s12), . . . , and symbols are arranged as in FIG. 73. Note that space-time block coding is not limited to the coding described in the present embodiment; the present embodiment may be similarly achieved using different space-time block coding.

Figure 74A:
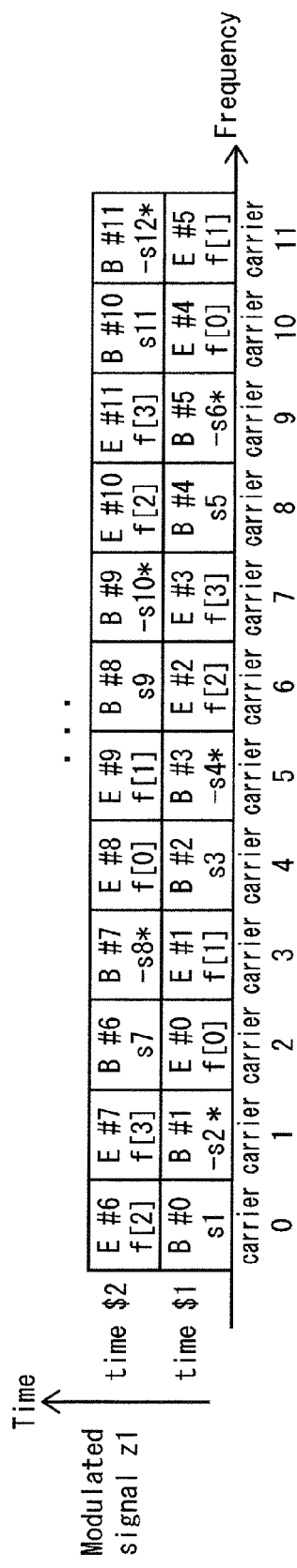
FIGS. 74A and 74B are examples of arrangements of symbols in modulated signals when adopting hierarchical transmission.
Figure 74B:
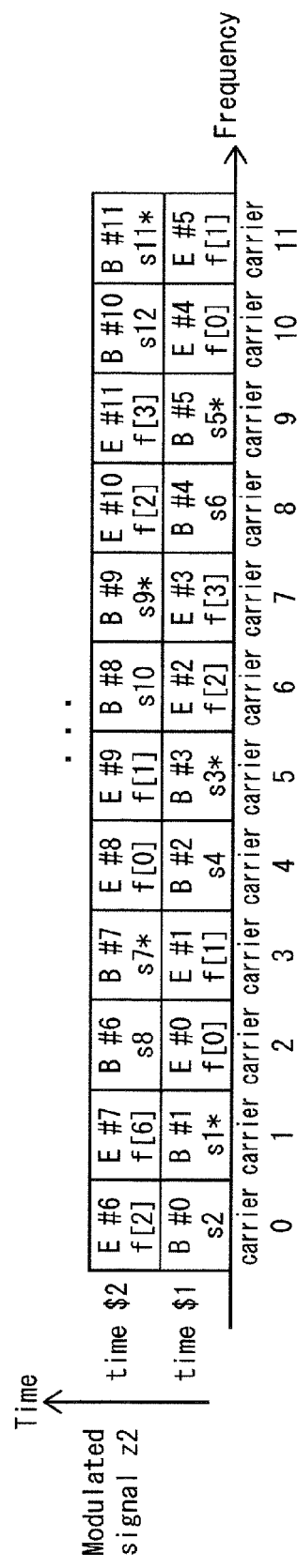

FIGS. 74A and 74B show an example of the method of reordering in the reordering unit (6200_1) and the reordering unit (6200_2) in FIG. 72. FIG. 74A is an example of arranging symbols in the modulated signal $z_1$ in the time domain and the frequency domain. FIG. 74B is an example of arranging symbols in the modulated signal $z_2$ in the time domain and the frequency domain. During transmission, symbols in the same (sub)carrier and at the same time are transmitted at the same frequency and at the same time from different antennas. The characteristic feature of FIGS. 74A and 74B is that space-time block coded symbols are arranged in the frequency domain in order.

Figure 75A:
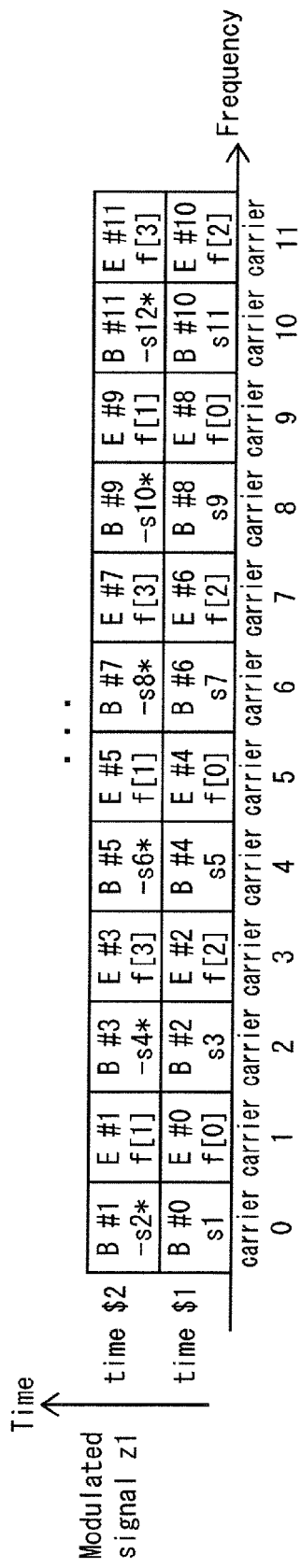
FIGS. 75A and 75B are examples of arrangements of symbols in modulated signals when adopting hierarchical transmission.
Figure 75B:
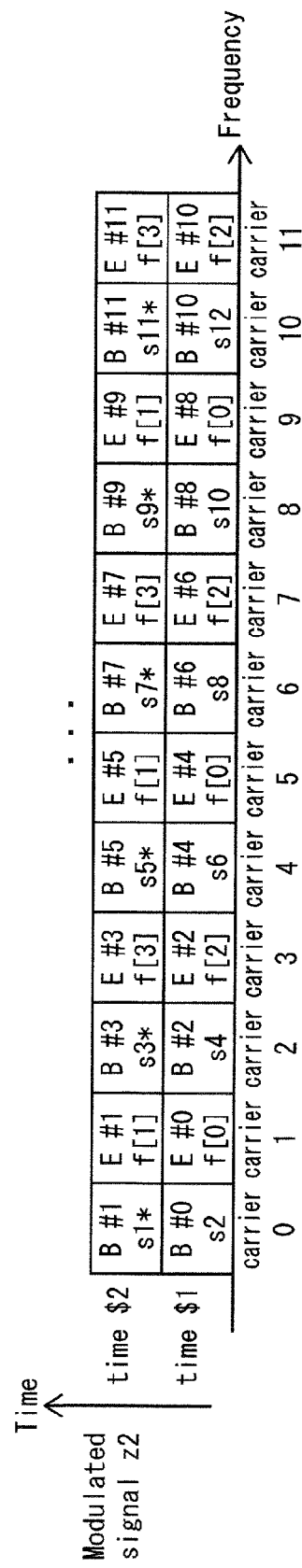

FIGS. 75A and 75B show an example of the method of reordering in the reordering unit (6200_1) and the reordering unit (6200_2) in FIG. 72. FIG. 75A is an example of arranging symbols in the modulated signal $z_1$ in the time domain and the frequency domain. FIG. 75B is an example of arranging symbols in the modulated signal $z_2$ in the time domain and the frequency domain. During transmission, symbols in the same (sub)carrier and at the same time are transmitted at the same frequency and at the same time from different antennas. The characteristic feature of FIGS. 75A and 75B is that space-time block coded symbols are arranged in the time domain in order.

Space-time block coded symbols can thus be ordered in the frequency domain or in the time domain.

When the base stream (base layer) and the enhancement stream (enhancement layer) are transmitted, it is necessary for the reception quality of data in the base stream (base layer) to be made higher than the reception quality of data in the enhancement stream (enhancement layer), due to the nature of the streams (layers). Therefore, as in the present embodiment, when transmitting the base stream, the reception quality of data is guaranteed by using space-time block coding to achieve diversity gain. Conversely, when transmitting the enhancement stream, hierarchical transmission is implemented by using a method of regularly switching between precoding matrices, since improvement of transmission speed is prioritized. For example, it is possible to use one of modes #1-#9 as in Table 7.

TABLE 7

| Mode | Modulation method for base stream (layer) | Modulation method for enhancement stream (layer) |
|---|---|---|
| Mode #1 | QPSK | 16QAM |
| Mode #2 | QPSK | 64QAM |

TABLE 7-continued

| Mode | Modulation method for base stream (layer) | Modulation method for enhancement stream (layer) |
| --- | --- | --- |
| Mode #3 | QPSK | 256QAM |
| Mode #4 | 16QAM | 16QAM |
| Mode #5 | 16QAM | 64QAM |
| Mode #6 | 16QAM | 256QAM |
| Mode #7 | 64QAM | 64QAM |
| Mode #8 | 64QAM | 256QAM |
| Mode #9 | 256QAM | 256QAM |

The characteristic feature of Table 7 is that the modulation method for the base stream (base layer) and the modulation method for the enhancement stream (enhancement layer) may be set the same. This is because even if the modulation method is the same, the transmission quality that can be guaranteed for the base stream (base layer) and the transmission quality that can be guaranteed for the enhancement stream (enhancement layer) differ, since different transmission methods are used for the two streams (layers).

Note that modes #1-#9 in Table 7 are modes for hierarchical transmission, but modes that are not for hierarchical transmission may also be supported. In the present embodiment, a single mode for space-time block coding and a single mode for regularly switching between precoding matrices may exist as modes that are not for hierarchical transmission, and when supporting the modes for hierarchical transmission in Table 7, the transmission device and the reception device of the present embodiment may easily set the mode to the single mode for space-time block coding or the single mode for regularly switching between precoding matrices.

Furthermore, in the enhancement stream (enhancement layer), a method of regularly switching between precoding matrices is used. As long as information regarding the precoding method used by the transmission device is transmitted, the reception device can identify the precoding method used by acquiring this information. If the transmission and reception devices share the information in Table 7, another method is for the reception device to identify the precoding method used for the enhancement stream (enhancement layer) by acquiring mode information transmitted by the transmission device. Accordingly, the reception device in FIG. 66 can acquire the log-likelihood ratio for each bit by having the detection and log-likelihood ratio calculation unit change the signal processing method. Note that settable modes have been described with reference to Table 7, but modes are not limited in this way. The present embodiment may be similarly achieved using the modes for transmission methods described in Embodiment 8 or modes for transmission methods described in subsequent embodiments.

As described above, in the case of hierarchical transmission, using the above methods of switching between precoding matrices achieves the effect of improving reception quality of data in the reception device.

The periods (cycles) of switching between precoding matrices in the method of regularly switching between precoding matrices are not limited as above in the present embodiment. For a precoding hopping method with an N-slot period (cycle), N different precoding matrices are necessary. In this case, F[0], F[1], F[2], . . . , F[N−2], F[N−1] are prepared as the N different precoding matrices. In the present embodiment, these have been described as being arranged in the frequency domain in the order of F[0], F[1], F[2], . . . , F[N−2], F[N−1], but arrangement is not limited in this way. With N different precoding matrices F[0], F[1], F[2], . . . , F[N−2], F[N−1] generated in the present Embodiment, precoding weights may be changed by arranging symbols in the time domain or in the frequency/time domains as in Embodiment 1. Note that a precoding hopping method with an N-slot period (cycle) has been described, but the same advantageous effects may be obtained by randomly using N different precoding matrices. In other words, the N different precoding matrices do not necessarily need to be used in a regular period (cycle).

Furthermore, Table 7 has been described as listing modes for methods of hierarchical transmission in the present embodiment, but modes are not limited in this way. As described in Embodiment 15, a spatial multiplexing MIMO system, a MIMO system in which precoding matrices are fixed, a space-time block coding method, a one-stream-only transmission mode, and modes for methods of regularly switching between precoding matrices may exist separately from the hierarchical transmission method described in the present embodiment, and the transmission device (broadcast station, base station) may select the transmission method from among these modes. In this case, in the spatial multiplexing MIMO system, the MIMO system in which precoding matrices are fixed, the space-time block coding method, the one-stream-only transmission mode, and the modes for methods of regularly switching between precoding matrices, both transmission that is hierarchical and transmission that is not hierarchical may be supported. Modes that use other transmission methods may also exist. The present embodiment may also be adapted to Embodiment 15 so that the hierarchical transmission method described in the present Embodiment is used in any of the (sub)carriers in Embodiment 15.

Embodiment A4

The present embodiment describes, in detail, a method of regularly switching between precoding matrices when using block coding as shown in Non-Patent Literature 12 through Non-Patent Literature 15, such as a Quasi-Cyclic Low-Density Parity-Check (QC-LDPC) code (or an LDPC code other than a QC-LDPC code), a concatenated code consisting of an LDPC code and a Bose-Chaudhuri-Hocquenghem (BCH) code, or the like. This embodiment describes an example of transmitting two streams, s1 and s2. However, for the case of coding using block codes, when control information and the like is not necessary, the number of bits in an encoded block matches the number of bits composing the block code (the control information or the like listed below may, however, be included therein). For the case of coding using block codes, when control information or the like (such as a cyclic redundancy check (CRC), transmission parameters, or the like) is necessary, the number of bits in an encoded block is the sum of the number of bits composing the block code and the number of bits in the control information or the like.

Figure 76:
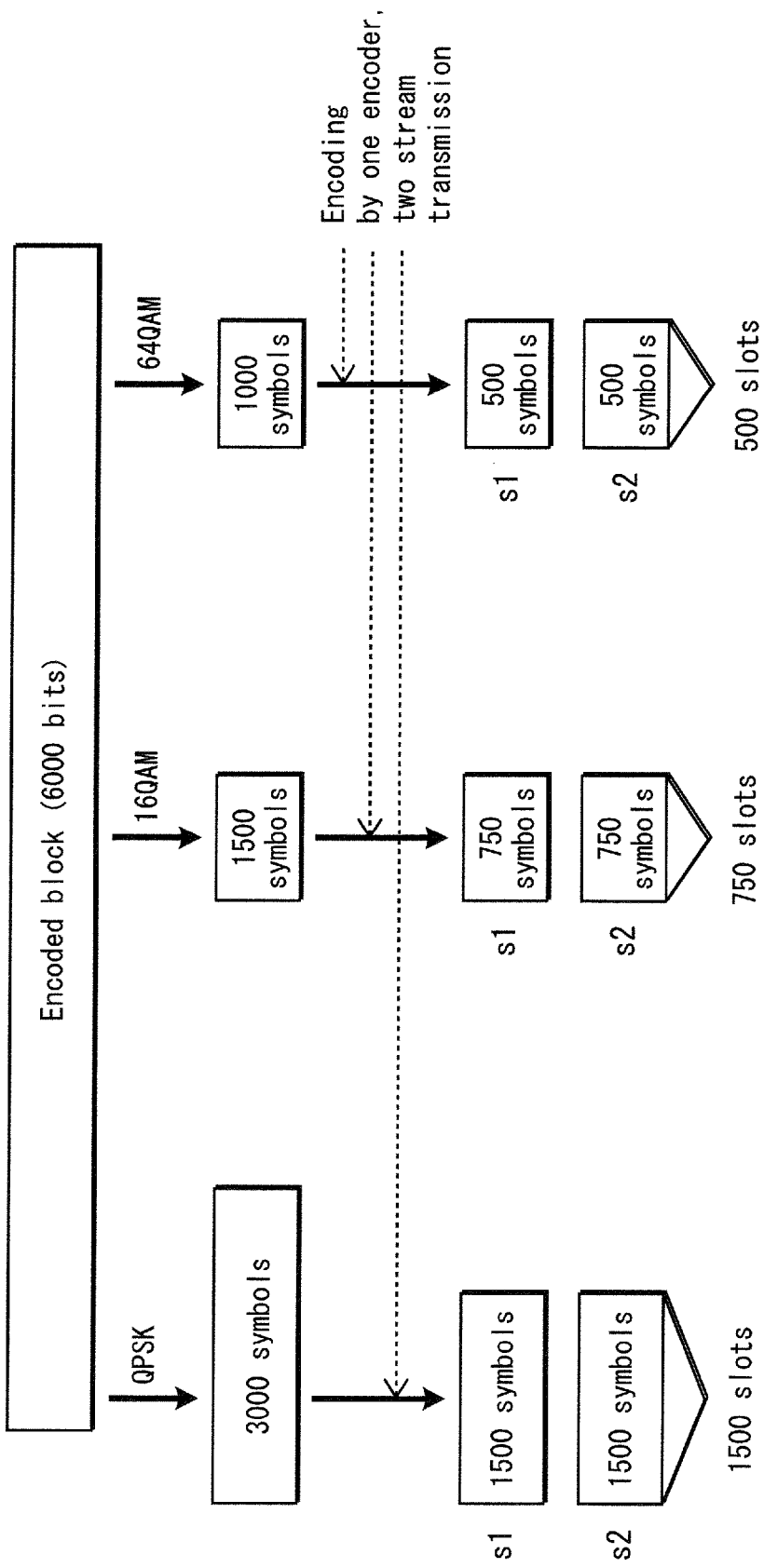
FIG. 76 is an example of a modification of the number of symbols and of slots necessary for one encoded block when using block coding.

FIG. 76 shows a modification of the number of symbols and of slots necessary for one encoded block when using block coding. FIG. 76 "shows a modification of the number of symbols and of slots necessary for one encoded block when using block coding" for the case when, for example as shown in the transmission device in FIG. 4, two streams, s1 and s2, are transmitted, and the transmission device has one encoder. (In this case, the transmission method may be either single carrier transmission, or multicarrier transmission such as OFDM.) As shown in FIG. 76, the number of bits constituting one block that has been encoded via block coding is set to 6,000. In order to transmit these 6,000 bits, 3,000 symbols are required when the modulation method is QPSK, 1,500 when the modulation method is 16QAM, and 1,000 when the modulation method is 64QAM.

Since the transmission device in FIG. 4 simultaneously transmits two streams, 1,500 of the 3,000 symbols when the modulation method is QPSK are allocated to s1, and 1,500 to s2. Therefore, 1,500 slots (the term "slot" is used here) are required to transmit the 1,500 symbols transmitted in s1 and the 1,500 symbols transmitted in s2.

By similar reasoning, when the modulation method is 16QAM, 750 slots are necessary to transmit all of the bits constituting one encoded block, and when the modulation method is 64QAM, 500 slots are necessary to transmit all of the bits constituting one block.

The following describes the relationship between the slots defined above and the precoding matrices in the method of regularly switching between precoding matrices.

Here, the number of precoding matrices prepared for the method of regularly switching between precoding matrices is set to five. In other words, five different precoding matrices are prepared for the weighting unit in the transmission device in FIG. 4. These five different precoding matrices are represented as F[0], F[1], F[2], F[3], and F[4].

When the modulation method is QPSK, among the 1,500 slots described above for transmitting the 6,000 bits constituting one encoded block, it is necessary for 300 slots to use the precoding matrix F[0], 300 slots to use the precoding matrix F[1], 300 slots to use the precoding matrix F[2], 300 slots to use the precoding matrix F[3], and 300 slots to use the precoding matrix F[4]. This is because if use of the precoding matrices is biased, the reception quality of data is greatly influenced by the precoding matrix that was used a greater number of times.

When the modulation method is 16QAM, among the 750 slots described above for transmitting the 6,000 bits constituting one encoded block, it is necessary for 150 slots to use the precoding matrix F[0], 150 slots to use the precoding matrix F[1], 150 slots to use the precoding matrix F[2], 150 slots to use the precoding matrix F[3], and 150 slots to use the precoding matrix F[4].

When the modulation method is 64QAM, among the 500 slots described above for transmitting the 6,000 bits constituting one encoded block, it is necessary for 100 slots to use the precoding matrix F[0], 100 slots to use the precoding matrix F[1], 100 slots to use the precoding matrix F[2], 100 slots to use the precoding matrix F[3], and 100 slots to use the precoding matrix F[4].

As described above, in the method of regularly switching between precoding matrices, if there are N different precoding matrices (represented as F[0], F[1], F[2], . . . , F[N−2], and F[N−1]), when transmitting all of the bits constituting one encoded block, condition #53 should be satisfied, wherein $K_0$ is the number of slots using the precoding matrix F[0], $K_1$ is the number of slots using the precoding matrix F[1], $K_i$ is the number of slots using the precoding matrix F[i] (i=0, 1, 2, . . . , N−1), and $K_{N-1}$ is the number of slots using the precoding matrix F[N−1].

Condition #53

$K_0 = K_1 = \ldots = K_i = \ldots = K_{N-1}$, i.e. $K_a = K_b$ (for $\forall a, \forall b$, where a, b, =0, 1, 2, . . . , N−1, and a≠b).

If the communications system supports a plurality of modulation methods, and the modulation method that is used is selected from among the supported modulation methods, then a modulation method for which Condition #53 is satisfied should be selected.

When a plurality of modulation methods are supported, it is typical for the number of bits that can be transmitted in one symbol to vary from modulation method to modulation method (although it is also possible for the number of bits to be the same), and therefore some modulation methods may not be capable of satisfying Condition #53. In such a case, instead of Condition #53, the following condition should be satisfied.

Condition #54

The difference between $K_a$ and $K_b$ is 0 or 1, i.e. $|K_a - K_b|$ is 0 or 1 (for $\forall a, \forall b$, where a, b, =0, 1, 2, . . . , N−1, and a≠b).

Figure 77:
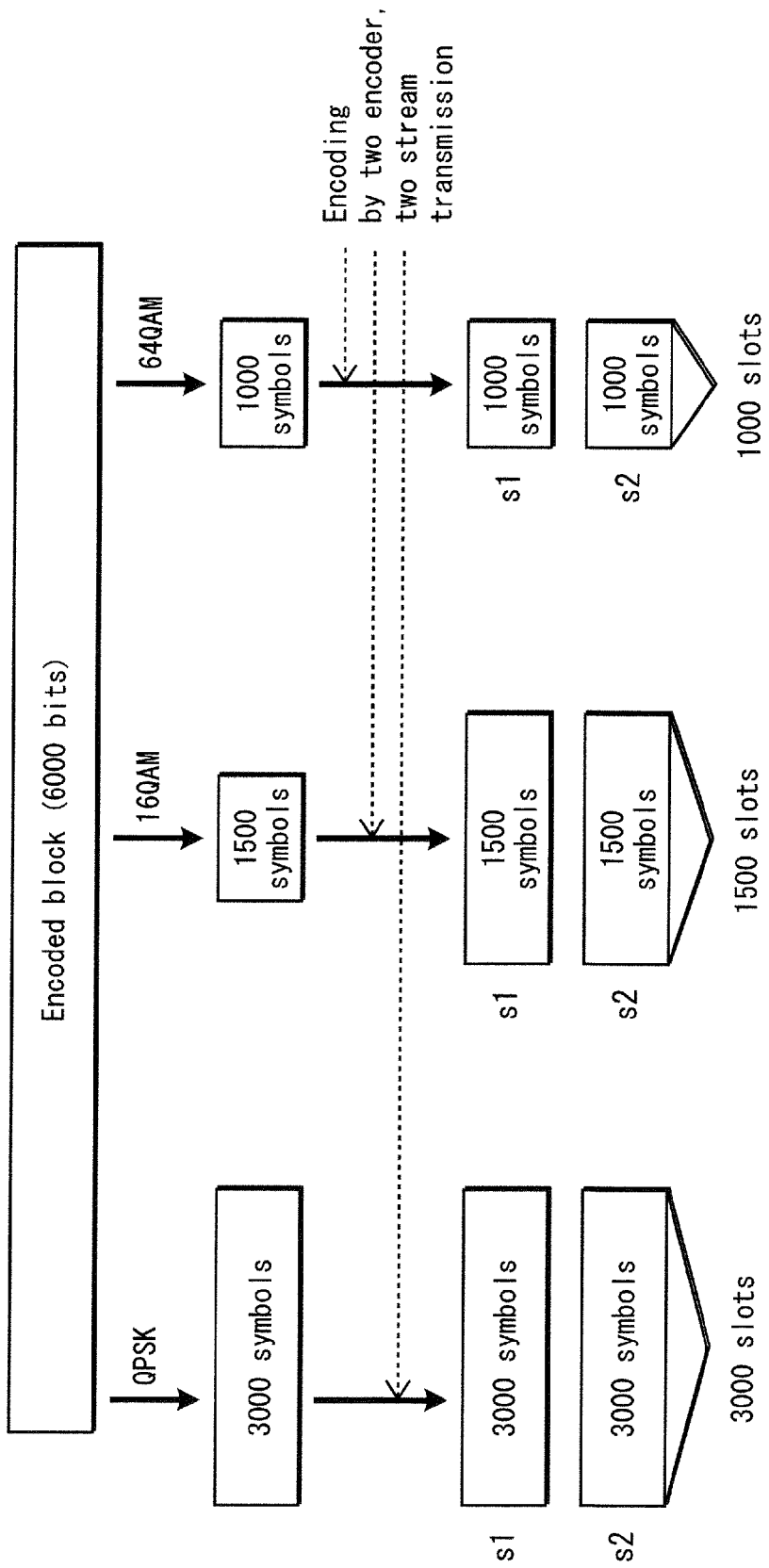
FIG. 77 is an example of a modification of the number of symbols and of slots necessary for two encoded blocks when using block coding.

FIG. 77 shows a modification of the number of symbols and of slots necessary for one encoded block when using block coding. FIG. 77 "shows a modification of the number of symbols and of slots necessary for one encoded block when using block coding" for the case when, for example as shown in the transmission device in FIG. 3 and in FIG. 13, two streams are transmitted, i.e. s1 and s2, and the transmission device has two encoders. (In this case, the transmission method may be either single carrier transmission, or multi-carrier transmission such as OFDM.)

As shown in FIG. 77, the number of bits constituting one block that has been encoded via block coding is set to 6,000. In order to transmit these 6,000 bits, 3,000 symbols are required when the modulation method is QPSK, 1,500 when the modulation method is 16QAM, and 1,000 when the modulation method is 64QAM.

The transmission device in FIG. 3 or in FIG. 13 transmits two streams simultaneously, and since two encoders are provided, different encoded blocks are transmitted in the two streams. Accordingly, when the modulation method is QPSK, two encoded blocks are transmitted in s1 and s2 within the same interval. For example, a first encoded block is transmitted in s1, and a second encoded block is transmitted in s2, and therefore, 3,000 slots are required to transmit the first and second encoded blocks.

By similar reasoning, when the modulation method is 16QAM, 1,500 slots are necessary to transmit all of the bits constituting two encoded blocks, and when the modulation method is 64QAM, 1,000 slots are necessary to transmit all of the bits constituting two blocks.

The following describes the relationship between the slots defined above and the precoding matrices in the method of regularly switching between precoding matrices. Here, the number of precoding matrices prepared for the method of regularly switching between precoding matrices is set to five. In other words, five different precoding matrices are prepared for the weighting unit in the transmission device in FIG. 3 or in FIG. 13. These five different precoding matrices are represented as F[0], F[1], F[2], F[3], and F[4].

When the modulation method is QPSK, among the 3,000 slots described above for transmitting the 6,000×2 bits constituting two encoded blocks, it is necessary for 600 slots to use the precoding matrix F[0], 600 slots to use the precoding matrix F[1], 600 slots to use the precoding matrix F[2], 600 slots to use the precoding matrix F[3], and 600 slots to use the precoding matrix F[4]. This is because if use of the precoding matrices is biased, the reception quality of data is greatly influenced by the precoding matrix that was used a greater number of times.

To transmit the first encoded block, it is necessary for the slot using the precoding matrix F[0] to occur 600 times, the slot using the precoding matrix F[1] to occur 600 times, the slot using the precoding matrix F[2] to occur 600 times, the slot using the precoding matrix F[3] to occur 600 times, and the slot using the precoding matrix F[4] to occur 600 times. To transmit the second encoded block, the slot using the precoding matrix F[0] should occur 600 times, the slot using the precoding matrix F[1] should occur 600 times, the slot using the precoding matrix F[2] should occur 600 times, the slot using the precoding matrix F[3] should occur 600 times, and the slot using the precoding matrix F[4] should occur 600 times.

Similarly, when the modulation method is 16QAM, among the 1,500 slots described above for transmitting the 6,000×2 bits constituting two encoded blocks, it is necessary for 300 slots to use the precoding matrix F[0], 300 slots to use the precoding matrix F[1], 300 slots to use the precoding matrix F[2], 300 slots to use the precoding matrix F[3], and 300 slots to use the precoding matrix F[4].

To transmit the first encoded block, it is necessary for the slot using the precoding matrix F[0] to occur 300 times, the slot using the precoding matrix F[1] to occur 300 times, the slot using the precoding matrix F[2] to occur 300 times, the slot using the precoding matrix F[3] to occur 300 times, and the slot using the precoding matrix F[4] to occur 300 times. To transmit the second encoded block, the slot using the precoding matrix F[0] should occur 300 times, the slot using the precoding matrix F[1] should occur 300 times, the slot using the precoding matrix F[2] should occur 300 times, the slot using the precoding matrix F[3] should occur 300 times, and the slot using the precoding matrix F[4] should occur 300 times.

Similarly, when the modulation method is 64QAM, among the 1,000 slots described above for transmitting the 6,000×2 bits constituting two encoded blocks, it is necessary for 200 slots to use the precoding matrix F[0], 200 slots to use the precoding matrix F[1], 200 slots to use the precoding matrix F[2], 200 slots to use the precoding matrix F[3], and 200 slots to use the precoding matrix F[4].

To transmit the first encoded block, it is necessary for the slot using the precoding matrix F[0] to occur 200 times, the slot using the precoding matrix F[1] to occur 200 times, the slot using the precoding matrix F[2] to occur 200 times, the slot using the precoding matrix F[3] to occur 200 times, and the slot using the precoding matrix F[4] to occur 200 times. To transmit the second encoded block, the slot using the precoding matrix F[0] should occur 200 times, the slot using the precoding matrix F[1] should occur 200 times, the slot using the precoding matrix F[2] should occur 200 times, the slot using the precoding matrix F[3] should occur 200 times, and the slot using the precoding matrix F[4] should occur 200 times.

As described above, in the method of regularly switching between precoding matrices, if there are N different precoding matrices (represented as F[0], F[1], F[2], . . . , F[N−2], and F[N−1]), when transmitting all of the bits constituting two encoded blocks, Condition #55 should be satisfied, wherein $K_0$ is the number of slots using the precoding matrix F[0], $K_1$ is the number of slots using the precoding matrix F[1], $K_i$ is the number of slots using the precoding matrix F[i] (i=0, 1, 2, . . . , N−1), and $K_{N-1}$ is the number of slots using the precoding matrix F[N−1].

Condition #55

$K_0 = K_1 = \ldots = K_i = \ldots = K_{N-1}$, i.e. $K_a = K_b$ (for $\forall a$, $\forall b$, where a, b, =0, 1, 2, . . . , N−1, and a≠b).

When transmitting all of the bits constituting the first encoded block, Condition #56 should be satisfied, wherein $K_{0,1}$ is the number of times the precoding matrix F[0] is used, $K_{1,1}$ is the number of times the precoding matrix F[1] is used, $K_{i,1}$ is the number of times the precoding matrix F[i] is used (i=0, 1, 2, . . . , N−1), and $K_{N-1,1}$ is the number of times the precoding matrix F[N−1] is used.

Condition #56

$K_0 = K_{1,1} = \ldots = K_{i,1} = \ldots = K_{N-1,1}$, i.e. $K_{a,1} = K_{b,1}$ (for $\forall a$, $\forall b$, where a, b, =0, 1, 2, . . . , N−1, and a≠b).

When transmitting all of the bits constituting the second encoded block, Condition #57 should be satisfied, wherein $K_{0,2}$ is the number of times the precoding matrix F[0] is used, $K_{1,2}$ is the number of times the precoding matrix F[1] is used, $K_{i,2}$ is the number of times the precoding matrix F[i] is used (i=0, 1, 2, . . . , N−1), and $K_{N-1,2}$ is the number of times the precoding matrix F[N−1] is used.

Condition #57

$K_{0,2} = K_{1,2} = \ldots = K_{i,2} = \ldots = K_{N-1,2}$, i.e. $K_{a,2} = K_{b,2}$ (for $\forall a$, $\forall b$, where a, b, =0, 1, 2, . . . , N−1, and a≠b).

If the communications system supports a plurality of modulation methods, and the modulation method that is used is selected from among the supported modulation methods, and the selected modulation method preferably satisfies Conditions #55, #56, and #57.

When a plurality of modulation methods are supported, it is typical for the number of bits that can be transmitted in one symbol to vary from modulation method to modulation method (although it is also possible for the number of bits to be the same), and therefore some modulation methods may not be capable of satisfying Conditions #55, #56, and #57. In such a case, instead of Conditions #55, #56, and #57, the following conditions should be satisfied.

Condition #58

The difference between $K_a$ and $K_b$ is 0 or 1, i.e. $|K_a - K_b|$ is 0 or 1 (for $\forall a$, $\forall b$, where a, b, =0, 1, 2, . . . , N−1, and a≠b).

Condition #59

The difference between $K_{a,1}$ and $K_{b,1}$ is 0 or 1, i.e. $|K_{a,1} - K_{b,1}|$ is 0 or 1 (for $\forall a$, $\forall b$, where a, b, =0, 1, 2, . . . , N−1, and a≠b).

Condition #60

The difference between $K_{a,2}$ and $K_{b,2}$ is 0 or 1, i.e. $|K_{a,2} - K_{b,2}|$ is 0 or 1 (for $\forall a$, $\forall b$, where a, b, =0, 1, 2, . . . , N−1, and a≠b).

Associating encoded blocks with precoding matrices in this way eliminates bias in the precoding matrices that are used for transmitting encoded blocks, thereby achieving the advantageous effect of improving reception quality of data by the reception device.

It is of course preferable to eliminate bias between precoding matrices that are used; it is also preferable, when N precoding matrices are stored in the transmission device, to perform precoding using all N precoding matrices, and to perform precoding using the N precoding matrices uniformly. In this context, "uniformly" refers to the difference between the maximum number of times one of the precoding matrices is used and the minimum number of times one of the precoding matrices is used being at most one, as described above.

Furthermore, while it is preferable to use all N precoding matrices, as long as reception quality at the reception point at each location is as even as possible, precoding may be performed without using all N of the stored precoding matrices, but rather switching regularly between precoding matrices after removing a certain number of precoding matrices. When removing precoding matrices, however, it is necessary to do so evenly in order to guarantee reception quality at the reception point at each location. Removing precoding matrices evenly means that if, for example, eight precoding matrices F[0], F[1], F[2], F[3], F[4], F[5], F[6], F[7], and F[8] are prepared, the precoding matrices F[0], F[2], F[4], and F[6] are used, or if sixteen precoding matrices F[0], F[1], F[2], . . . , F[14], and F[15] are prepared, the precoding matrices F[0], F[4], F[8], and F[12] are used. If sixteen precoding matrices F[0], F[1], F[2], . . . , F[14], and F[15] are prepared, precoding matrices can also be considered to be removed evenly if precoding matrices F[0], F[2], F[4], F[6], F[8], F[10], F[12], and F[14] are used.

In the present embodiment, in the method of regularly switching between precoding matrices, N different precoding matrices are necessary for a precoding hopping method with an N-slot period (cycle). In this case, F[0], F[1], F[2], . . . , F[N−2], F[N−1] are prepared as the N different precoding matrices. These precoding matrices may be arranged in the frequency domain in the order of F[0], F[1], F[2], . . . , F[N−2], F[N−1], but arrangement is not limited in this way. With N different precoding matrices F[0], F[1], F[2], . . . , F[N−2], F[N−1] generated in the present Embodiment, precoding weights may be changed by arranging symbols in the time domain or in the frequency/time domains as in Embodiment 1. Note that a precoding hopping method with an N-slot period (cycle) has been described, but the same advantageous effects may be obtained by randomly using N different precoding matrices. In other words, the N different precoding matrices do not necessarily need to be used in a regular period (cycle).

Furthermore, as described in Embodiment 15, a spatial multiplexing MIMO system, a MIMO system in which precoding matrices are fixed, a space-time block coding method, a one-stream-only transmission mode, and modes for methods of regularly switching between precoding matrices may exist, and the transmission device (broadcast station, base station) may select the transmission method from among these modes. In this case, in the spatial multiplexing MIMO system, the MIMO system in which precoding matrices are fixed, the space-time block coding method, the one-stream-only transmission mode, and the modes for methods of regularly switching between precoding matrices, it is preferable to implement the present embodiment in the (sub)carriers for which a method of regularly switching between precoding matrices is selected.

Embodiment B1

The following describes a structural example of an application of the transmission methods and reception methods shown in the above embodiments and a system using the application.

Figure 78:
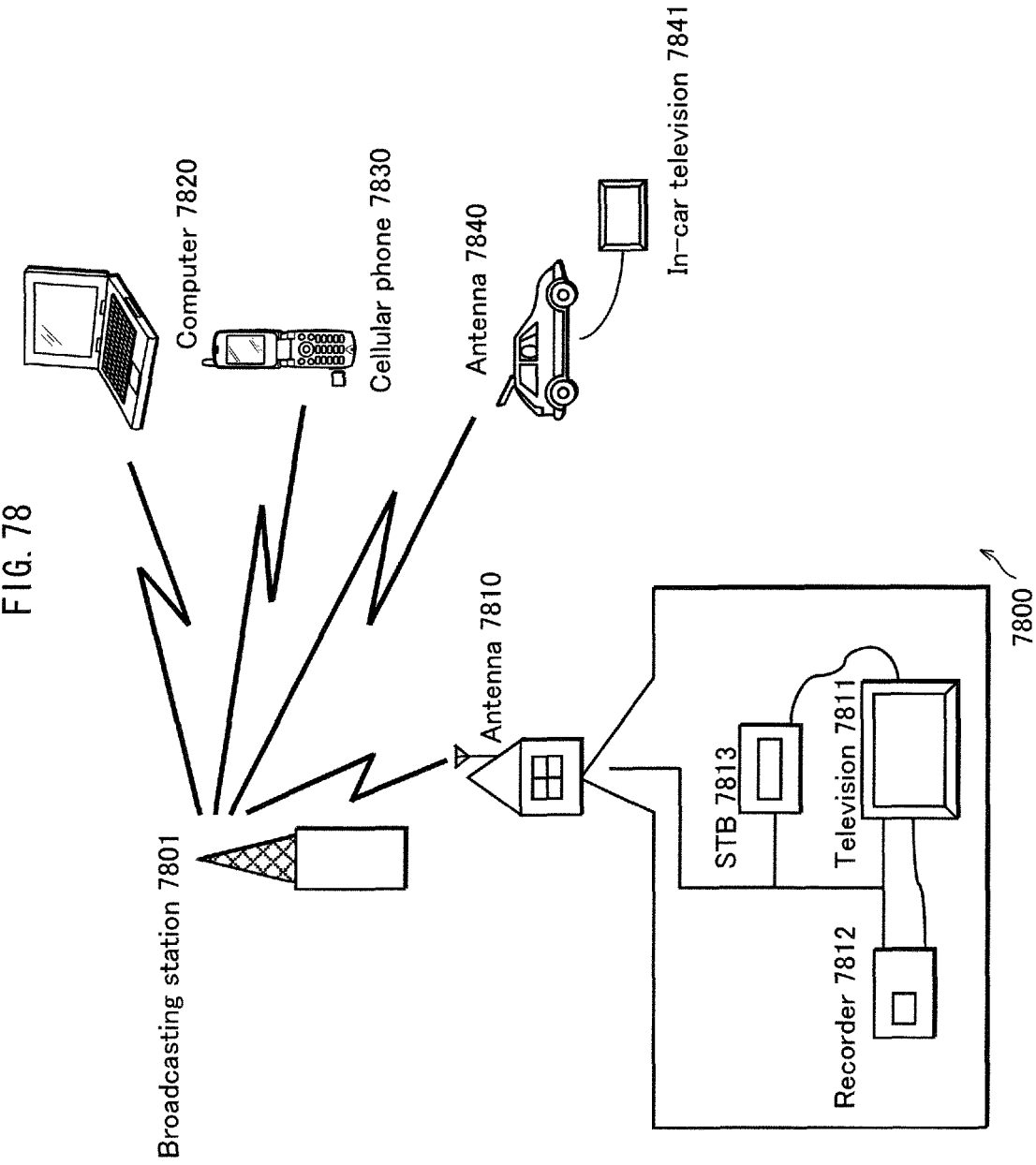
FIG. 78 shows the overall structure of a digital broadcasting system.

FIG. 78 shows an example of the structure of a system that includes devices implanting the transmission methods and reception methods described in the above embodiments. The transmission method and reception method described in the above embodiments are implemented in a digital broadcasting system 7800, as shown in FIG. 78, that includes a broadcasting station 7801 and a variety of reception devices such as a television 7811, a DVD recorder 7812, a Set Top Box (STB) 7813, a computer 7820, an in-car television 7841, and a mobile phone 7830. Specifically, the broadcasting station 7801 transmits multiplexed data, in which video data, audio data, and the like are multiplexed, using the transmission methods in the above embodiments over a predetermined broadcasting band.

An antenna (for example, antennas 7810 and 7840) internal to each reception device, or provided externally and connected to the reception device, receives the signal transmitted from the broadcasting station 7801. Each reception device obtains the multiplexed data by using the reception methods in the above embodiments to demodulate the signal received by the antenna. In this way, the digital broadcasting system 7800 obtains the advantageous effects of the present invention described in the above embodiments.

The video data included in the multiplexed data has been coded with a moving picture coding method compliant with a standard such as Moving Picture Experts Group (MPEG)2, MPEG4-Advanced Video Coding (AVC), VC-1, or the like. The audio data included in the multiplexed data has been encoded with an audio coding method compliant with a standard such as Dolby Audio Coding (AC)-3, Dolby Digital Plus, Meridian Lossless Packing (MLP), Digital Theater Systems (DTS), DTS-HD, Pulse Coding Modulation (PCM), or the like.

Figure 79:
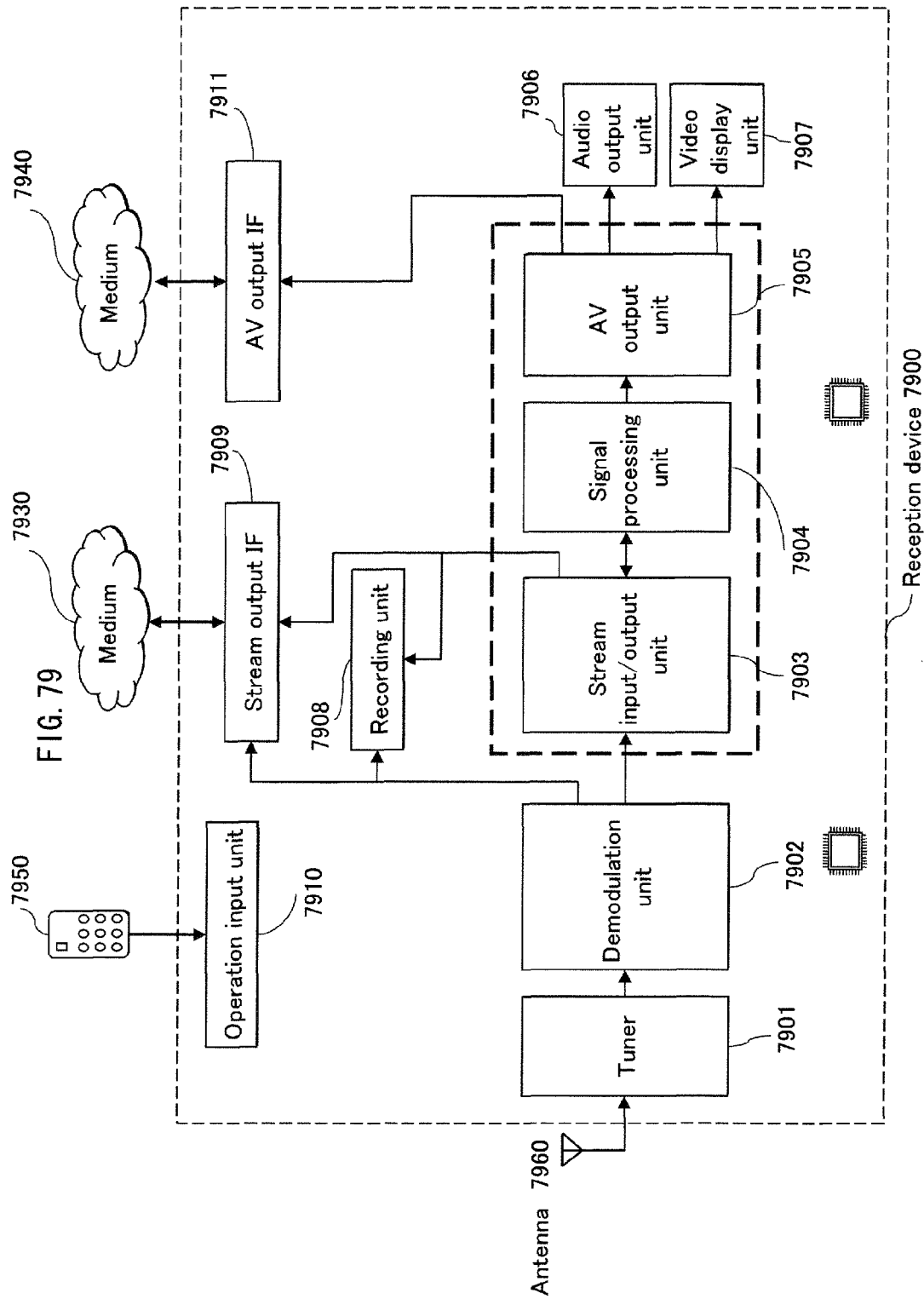
FIG. 79 is a block diagram showing an example of the structure of a reception device.

FIG. 79 is a schematic view illustrating an exemplary structure of a reception device 7900 for carrying out the reception methods described in the above embodiments. As shown in FIG. 79, one example of the structure of the reception device 7900 is to configure the modem unit as one LSI (or a chip set) and to configure the coding unit as a separate LSI (or chip set). The reception device 7900 shown in FIG. 79 corresponds to a component that is included, for example, in the television 7811, the DVD recorder 7812, the STB 7813, the computer 7820, the in-car television 7841, the mobile phone 7830, or the like illustrated in FIG. 78. The reception device 7900 includes a tuner 7901, for transforming a high-frequency signal received by an antenna 7960 into a baseband signal, and a demodulation unit 7902, for demodulating multiplexed data from the baseband signal obtained by frequency conversion. The reception methods described in the above embodiments are implemented in the demodulation unit 7902, thus obtaining the advantageous effects of the present invention described in the above embodiments.

The reception device 7900 includes a stream input/output unit 7903, a signal processing unit 7904, an audio output unit 7906, and a video display unit 7907. The stream input/output unit 7903 demultiplexes video and audio data from multiplexed data obtained by the demodulation unit 7902. The signal processing unit 7904 decodes the demultiplexed video data into a video signal using an appropriate moving picture decoding method and decodes the demultiplexed audio data into an audio signal using an appropriate audio decoding method. The audio output unit 7906, such as a speaker, produces audio output according to the decoded audio signal. The video display unit 7907, such as a display monitor, produces video output according to the decoded video signal.

For example, the user may operate the remote control 7950 to select a channel (of a TV program or audio broadcast), so that information indicative of the selected channel is transmitted to an operation input unit 7910. In response, the reception device 7900 demodulates, from among signals received with the antenna 7960, a signal carried on the selected channel and applies error correction decoding, so that reception data is extracted. At this time, the receiving device 7900 receives control symbols included in a signal corresponding to the selected channel and containing information indicating the transmission method (the transmission method, modulation method, error correction method, and the like in the above embodiments) of the signal (exactly as described in Embodiments A1-A4, and as shown in FIGS. 5 and 41). With this information, the reception device 7900 is enabled to make appropriate settings for the receiving operations, demodulation method, method of error correction decoding, and the like to duly receive data included in data symbols transmitted from a broadcasting station (base station). Although the above description is directed to an example in which the user selects a channel using the remote control 7950, the same description applies to an example in which the user selects a channel using a selection key provided on the reception device 7900.

With the above structure, the user can view a broadcast program that the reception device 7900 receives by the reception methods described in the above embodiments.

The reception device 7900 according to this embodiment may additionally include a recording unit (drive) 7908 for recording various data onto a recording medium, such as a magnetic disk, optical disc, or a non-volatile semiconductor memory. Examples of data to be recorded by the recording unit 7908 include data contained in multiplexed data that is obtained as a result of demodulation and error correction by the demodulation unit 7902, data equivalent to such data (for example, data obtained by compressing the data), and data obtained by processing the moving pictures and/or audio. (Note here that there may be a case where no error correction decoding is applied to a signal obtained as a result of demodulation by the demodulation unit 7902 and where the reception device 7900 conducts further signal processing after error correction decoding. The same holds in the following description where similar wording appears.) Note that the term "optical disc" used herein refers to a recording medium, such as Digital Versatile Disc (DVD) or BD (Blu-ray Disc), that is readable and writable with the use of a laser beam. Further, the term "magnetic disk" used herein refers to a recording medium, such as a floppy disk (FD, registered trademark) or hard disk, that is writable by magnetizing a magnetic substance with magnetic flux. Still further, the term "non-volatile semiconductor memory" refers to a recording medium, such as flash memory or ferroelectric random access memory, composed of semiconductor element(s). Specific examples of non-volatile semiconductor memory include an SD card using flash memory and a flash Solid State Drive (SSD). It should be naturally appreciated that the specific types of recording media mentioned herein are merely examples, and any other types of recording mediums may be usable.

With the above structure, the user can record a broadcast program that the reception device 7900 receives with any of the reception methods described in the above embodiments, and time-shift viewing of the recorded broadcast program is possible anytime after the broadcast.

In the above description of the reception device 7900, the recording unit 7908 records multiplexed data obtained as a result of demodulation and error correction by the demodulation unit 7902. However, the recording unit 7908 may record part of data extracted from the data contained in the multiplexed data. For example, the multiplexed data obtained as a result of demodulation and error correction by the demodulation unit 7902 may contain contents of data broadcast service, in addition to video data and audio data. In this case, new multiplexed data may be generated by multiplexing the video data and audio data, without the contents of broadcast service, extracted from the multiplexed data demodulated by the demodulation unit 7902, and the recording unit 7908 may record the newly generated multiplexed data. Alternatively, new multiplexed data may be generated by multiplexing either of the video data and audio data contained in the multiplexed data obtained as a result of demodulation and error correction decoding by the demodulation unit 7902, and the recording unit 7908 may record the newly generated multiplexed data. The recording unit 7908 may also record the contents of data broadcast service included, as described above, in the multiplexed data.

The reception device 7900 described in this embodiment may be included in a television, a recorder (such as DVD recorder, Blu-ray recorder, HDD recorder, SD card recorder, or the like), or a mobile telephone. In such a case, the multiplexed data obtained as a result of demodulation and error correction decoding by the demodulation unit 7902 may contain data for correcting errors (bugs) in software used to operate the television or recorder or in software used to prevent disclosure of personal or confidential information. If such data is contained, the data is installed on the television or recorder to correct the software errors. Further, if data for correcting errors (bugs) in software installed in the reception device 7900 is contained, such data is used to correct errors that the reception device 7900 may have. This arrangement ensures more stable operation of the TV, recorder, or mobile phone in which the reception device 7900 is implemented.

Note that it may be the stream input/output unit 7903 that handles extraction of data from the whole data contained in multiplexed data obtained as a result of demodulation and error correction decoding by the demodulation unit 7902 and multiplexing of the extracted data. More specifically, under instructions given from a control unit not illustrated in the figures, such as a CPU, the stream input/output unit 7903 demultiplexes video data, audio data, contents of data broadcast service etc. from the multiplexed data demodulated by the demodulation unit 7902, extracts specific pieces of data from the demultiplexed data, and multiplexes the extracted data pieces to generate new multiplexed data. The data pieces to be extracted from demultiplexed data may be determined by the user or determined in advance for the respective types of recording mediums.

With the above structure, the reception device 7900 is enabled to extract and record only data necessary to view a recorded broadcast program, which is effective to reduce the size of data to be recorded.

In the above description, the recording unit 7908 records multiplexed data obtained as a result of demodulation and error correction decoding by the demodulation unit 7902. Alternatively, however, the recording unit 7908 may record new multiplexed data generated by multiplexing video data newly yielded by encoding the original video data contained in the multiplexed data obtained as a result of demodulation and error correction decoding by the demodulation unit 7902. Here, the moving picture coding method to be employed may be different from that used to encode the original video data, so that the data size or bit rate of the new video data is smaller than the original video data. Here, the moving picture coding method used to generate new video data may be of a different standard from that used to generate the original video data. Alternatively, the same moving picture coding method may be used but with different parameters. Similarly, the recording unit 7908 may record new multiplexed data generated by multiplexing audio data newly obtained by encoding the original audio data contained in the multiplexed data obtained as a result of demodulation and error correction decoding by the demodulation unit 7902. Here, the audio coding method to be employed may be different from that used to encode the original audio data, such that the data size or bit rate of the new audio data is smaller than the original audio data.

The process of converting the original video or audio data contained in the multiplexed data obtained as a result of demodulation and error correction decoding by the demodulation unit 7902 into the video or audio data of a different data size or bit rate is performed, for example, by the stream input/output unit 7903 and the signal processing unit 7904. More specifically, under instructions given from the control unit such as the CPU, the stream input/output unit 7903 demultiplexes video data, audio data, contents of data broadcast service etc. from the multiplexed data obtained as a result of demodulation and error correction decoding by the demodulation unit 7902. Under instructions given from the control unit, the signal processing unit 7904 converts the demultiplexed video data and audio data respectively using a motion picture coding method and an audio coding method each different from the method that was used in the conversion applied to obtain the video and audio data. Under instructions given from the control unit, the stream input/output unit 7903 multiplexes the newly converted video data and audio data to generate new multiplexed data. Note that the signal processing unit 7904 may conduct the conversion of either or both of the video or audio data according to instructions given from the control unit. In addition, the sizes of video data and audio data to be obtained by encoding may be specified by a user or determined in advance for the types of recording mediums.

With the above arrangement, the reception device 7900 is enabled to record video and audio data after converting the data to a size recordable on the recording medium or to a size or bit rate that matches the read or write rate of the recording unit 7908. This arrangement enables the recoding unit to duly record a program, even if the size recordable on the recording medium is smaller than the data size of the multiplexed data obtained as a result of demodulation and error correction decoding by the demodulation unit 7902, or if the rate at which the recording unit records or reads is lower than the bit rate of the multiplexed data. Consequently, time-shift viewing of the recorded program by the user is possible anytime after the broadcast.

Furthermore, the reception device 7900 additionally includes a stream output interface (IF) 7909 for transmitting multiplexed data demodulated by the demodulation unit 7902 to an external device via a transport medium 7930. In one example, the stream output IF 7909 may be a radio communication device that transmits multiplexed data via a wireless medium (equivalent to the transport medium 7930) to an external device by modulating the multiplexed data with in accordance with a wireless communication method compliant with a wireless communication standard such as Wi-Fi (registered trademark, a set of standards including IEEE 802.11a, IEEE 802.11b, IEEE 802.11g, and IEEE 802.11n), WiGiG, Wireless HD, Bluetooth, ZigBee, or the like. The stream output IF 7909 may also be a wired communication device that transmits multiplexed data via a transmission line (equivalent to the transport medium 7930) physically connected to the stream output IF 7909 to an external device, modulating the multiplexed data using a communication method compliant with wired communication standards, such as Ethernet, Universal Serial Bus (USB), Power Line Communication (PLC), or High-Definition Multimedia Interface (HDMI).

With the above structure, the user can use, on an external device, multiplexed data received by the reception device 7900 using the reception method described according to the above embodiments. The usage of multiplexed data by the user mentioned herein includes use of the multiplexed data for real-time viewing on an external device, recording of the multiplexed data by a recording unit included in an external device, and transmission of the multiplexed data from an external device to a yet another external device.

In the above description of the reception device 7900, the stream output IF 7909 outputs multiplexed data obtained as a result of demodulation and error correction decoding by the demodulation unit 7902. However, the reception device 7900 may output data extracted from data contained in the multiplexed data, rather than the whole data contained in the multiplexed data. For example, the multiplexed data obtained as a result of demodulation and error correction decoding by the demodulation unit 7902 may contain contents of data broadcast service, in addition to video data and audio data. In this case, the stream output IF 7909 may output multiplexed data newly generated by multiplexing video and audio data extracted from the multiplexed data obtained as a result of demodulation and error correction decoding by the demodulation unit 7902. In another example, the stream output IF 7909 may output multiplexed data newly generated by multiplexing either of the video data and audio data contained in the multiplexed data obtained as a result of demodulation and error correction decoding by the demodulation unit 7902.

Note that it may be the stream input/output unit 7903 that handles extraction of data from the whole data contained in multiplexed data obtained as a result of demodulation and error correction decoding by the demodulation unit 7902 and multiplexing of the extracted data. More specifically, under instructions given from a control unit not illustrated in the figures, such as a Central Processing Unit (CPU), the stream input/output unit 7903 demultiplexes video data, audio data, contents of data broadcast service etc. from the multiplexed data demodulated by the demodulation unit 7902, extracts specific pieces of data from the demultiplexed data, and multiplexes the extracted data pieces to generate new multiplexed data. The data pieces to be extracted from demultiplexed data may be determined by the user or determined in advance for the respective types of the stream output IF 7909.

With the above structure, the reception device 7900 is enabled to extract and output only data necessary for an external device, which is effective to reduce the bandwidth used to output the multiplexed data.

In the above description, the stream output IF 7909 outputs multiplexed data obtained as a result of demodulation and error correction decoding by the demodulation unit 7902. Alternatively, however, the stream output IF 7909 may output new multiplexed data generated by multiplexing video data newly yielded by encoding the original video data contained in the multiplexed data obtained as a result of demodulation and error correction decoding by the demodulation unit 7902. The new video data is encoded with a moving picture coding method different from that used to encode the original video data, so that the data size or bit rate of the new video data is smaller than the original video data. Here, the moving picture coding method used to generate new video data may be of a different standard from that used to generate the original video data. Alternatively, the same moving picture coding method may be used but with different parameters. Similarly, the stream output IF 7909 may output new multiplexed data generated by multiplexing audio data newly obtained by encoding the original audio data contained in the multiplexed data obtained as a result of demodulation and error correction decoding by the demodulation unit 7902. The new audio data is encoded with an audio coding method different from that used to encode the original audio data, such that the data size or bit rate of the new audio data is smaller than the original audio data.

The process of converting the original video or audio data contained in the multiplexed data obtained as a result of demodulation and error correction decoding by the demodulation unit 7902 into the video or audio data of a different data size of bit rate is performed, for example, by the stream input/output unit 7903 and the signal processing unit 7904. More specifically, under instructions given from the control unit, the stream input/output unit 7903 demultiplexes video data, audio data, contents of data broadcast service etc. from the multiplexed data obtained as a result of demodulation and error correction decoding by the demodulation unit 7902. Under instructions given from the control unit, the signal processing unit 7904 converts the demultiplexed video data and audio data respectively using a motion picture coding method and an audio coding method each different from the method that was used in the conversion applied to obtain the video and audio data. Under instructions given from the control unit, the stream input/output unit 7903 multiplexes the newly converted video data and audio data to generate new multiplexed data. Note that the signal processing unit 7904 may perform the conversion of either or both of the video or audio data according to instructions given from the control unit. In addition, the sizes of video data and audio data to be obtained by conversion may be specified by the user or determined in advance for the types of the stream output IF 7909.

With the above structure, the reception device 7900 is enabled to output video and audio data after converting the data to a bit rate that matches the transfer rate between the reception device 7900 and an external device. This arrangement ensures that even if multiplexed data obtained as a result of demodulation and error correction decoding by the demodulation unit 7902 is higher in bit rate than the data transfer rate to an external device, the stream output IF duly outputs new multiplexed data at an appropriate bit rate to the external device. Consequently, the user can use the new multiplexed data on another communication device.

Furthermore, the reception device 7900 also includes an audio and visual output interface (hereinafter, AV output IF) 7911 that outputs video and audio signals decoded by the signal processing unit 7904 to an external device via an external transport medium. In one example, the AV output IF 7911 may be a wireless communication device that transmits modulated video and audio signals via a wireless medium to an external device, using a wireless communication method compliant with wireless communication standards, such as Wi-Fi (registered trademark), which is a set of standards including IEEE 802.11a, IEEE 802.11b, IEEE 802.11g, and IEEE 802.11n, WiGiG, Wireless HD, Bluetooth, ZigBee, or the like. In another example, the stream output IF 7909 may be a wired communication device that transmits modulated video and audio signals via a transmission line physically connected to the stream output IF 7909 to an external device, using a communication method compliant with wired communication standards, such as Ethernet, USB, PLC, HDMI, or the like. In yet another example, the stream output IF 7909 may be a terminal for connecting a cable to output the video and audio signals in analog form.

With the above structure, the user is allowed to use, on an external device, the video and audio signals decoded by the signal processing unit 7904.

Furthermore, the reception device 7900 additionally includes an operation input unit 7910 for receiving a user operation. According to control signals indicative of user operations input to the operation input unit 7910, the reception device 7900 performs various operations, such as switching the power ON or OFF, switching the reception channel, switching the display of subtitle text ON or OFF, switching the display of subtitle text to another language, changing the volume of audio output of the audio output unit 7906, and changing the settings of channels that can be received.

Additionally, the reception device 7900 may have a function of displaying the antenna level indicating the quality of the signal being received by the reception device 7900. Note that the antenna level is an indicator of the reception quality calculated based on, for example, the Received Signal Strength Indication, Received Signal Strength Indicator (RSSI), received field strength, Carrier-to-noise power ratio (C/N), Bit Error Rate (BER), packet error rate, frame error rate, and channel state information of the signal received on the reception device 7900. In other words, the antenna level is a signal indicating the level and quality of the received signal.

In this case, the demodulation unit 7902 also includes a reception quality measuring unit for measuring the received signal characteristics, such as RSSI, received field strength, C/N, BER, packet error rate, frame error rate, and channel state information. In response to a user operation, the reception device 7900 displays the antenna level (i.e., signal indicating the level and quality of the received signal) on the video display unit 7907 in a manner identifiable by the user. The antenna level (i.e., signal indicating the level and quality of the received signal) may be numerically displayed using a number that represents RSSI, received field strength, C/N, BER, packet error rate, frame error rate, channel state information or the like. Alternatively, the antenna level may be displayed using an image representing RSSI, received field strength, C/N, BER, packet error rate, frame error rate, channel state information or the like. Furthermore, the reception device 7900 may display a plurality of antenna levels (signals indicating the level and quality of the received signal) calculated for each of the plurality of streams s1, s2, . . . received and separated using the reception methods shown in the above embodiments, or one antenna level (signal indicating the level and quality of the received signal) calculated from the plurality of streams s1, s2, . . . . When video data and audio data composing a program are transmitted hierarchically, the reception device 7900 may also display the signal level (signal indicating the level and quality of the received signal) for each hierarchical level.

With the above structure, users are able to grasp the antenna level (signal indicating the level and quality of the received signal) numerically or visually during reception with the reception methods shown in the above embodiments.

Although the reception device 7900 is described above as having the audio output unit 7906, video display unit 7907, recording unit 7908, stream output IF 7909, and AV output IF 7911, it is not necessary for the reception device 7900 to have all of these units. As long as the reception device 7900 is provided with at least one of the units described above, the user is enabled to use multiplexed data obtained as a result of demodulation and error correction decoding by the demodulation unit 7902. The reception device 7900 may therefore include any combination of the above-described units depending on its intended use.

Multiplexed Data

The following is a detailed description of an exemplary structure of multiplexed data. The data structure typically used in broadcasting is an MPEG2 transport stream (TS), so therefore the following description is given by way of an example related to MPEG2-TS. It should be naturally appreciated, however, that the data structure of multiplexed data transmitted by the transmission and reception methods described in the above embodiments is not limited to MPEG2-TS and the advantageous effects of the above embodiments are achieved even if any other data structure is employed.

Figure 80:
FIG. 80 shows the structure of multiplexed data.

FIG. 80 is a view illustrating an exemplary multiplexed data structure. As illustrated in FIG. 80, multiplexed data is obtained by multiplexing one or more elementary streams, which are elements constituting a broadcast program (program or an event which is part of a program) currently provided through respective services. Examples of elementary streams include a video stream, audio stream, presentation graphics (PG) stream, and interactive graphics (IG) stream. In the case where a broadcast program carried by multiplexed data is a movie, the video streams represent main video and sub video of the movie, the audio streams represent main audio of the movie and sub audio to be mixed with the main audio, and the PG stream represents subtitles of the movie.

The term "main video" used herein refers to video images normally presented on a screen, whereas "sub video" refers to video images (for example, images of text explaining the outline of the movie) to be presented in a small window inserted within the video images. The IG stream represents an interactive display constituted by presenting GUI components on a screen.

Each stream contained in multiplexed data is identified by an identifier called PID uniquely assigned to the stream. For example, the video stream carrying main video images of a movie is assigned with "0x1011", each audio stream is assigned with a different one of "0x1100" to "0x111F", each PG stream is assigned with a different one of "0x1200" to "0x121F", each IG stream is assigned with a different one of "0x1400" to "0x141F", each video stream carrying sub video images of the movie is assigned with a different one of "0x1B00" to "0x1B1F", each audio stream of sub-audio to be mixed with the main audio is assigned with a different one of "0x1A00" to "0x1A1F".

Figure 81:
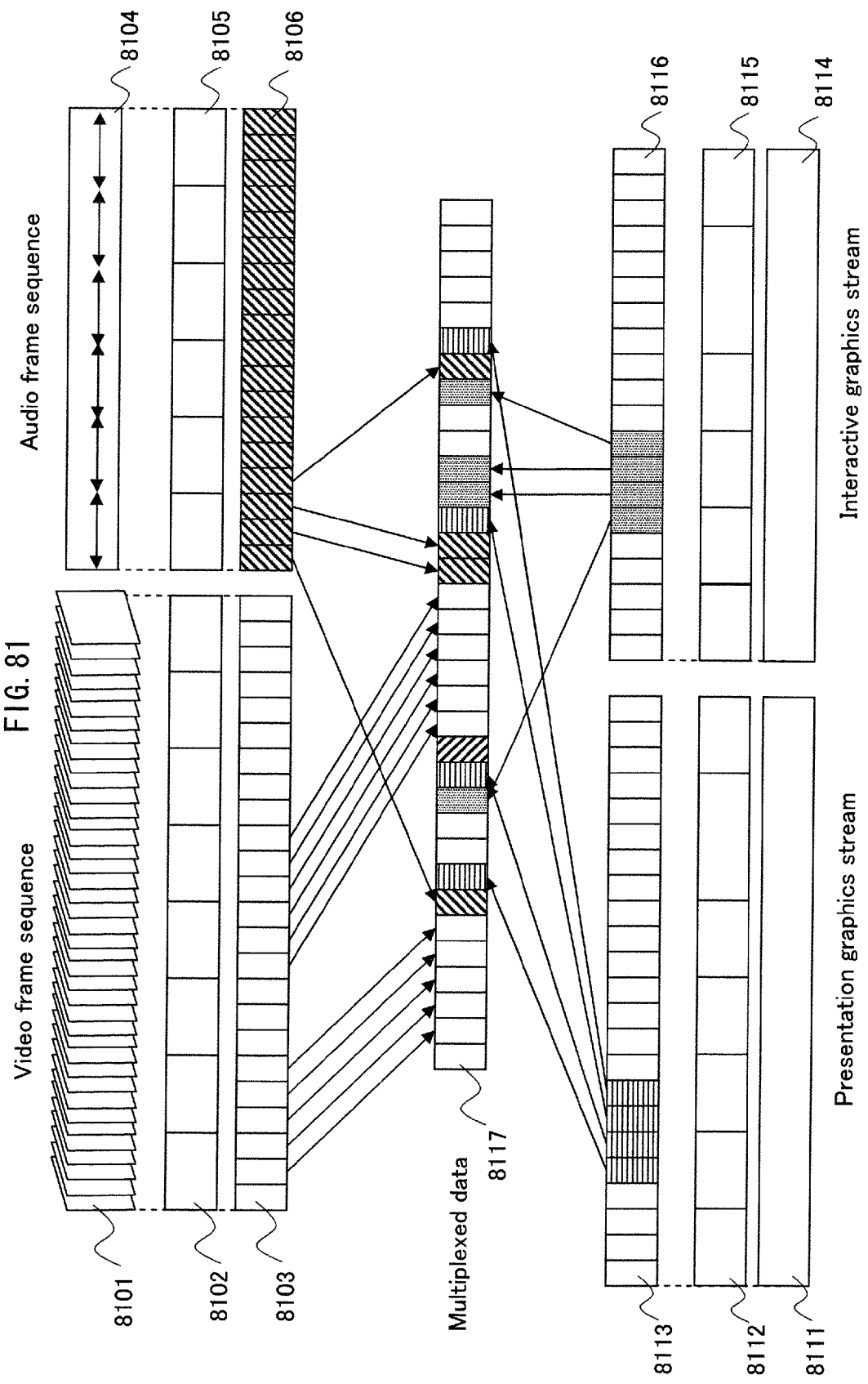
FIG. 81 schematically shows how each stream is multiplexed in the multiplexed data.

FIG. 81 is a schematic view illustrating an example of how the respective streams are multiplexed into multiplexed data. First, a video stream 8101 composed of a plurality of video frames is converted into a PES packet sequence 8102 and then into a TS packet sequence 8103, whereas an audio stream 8104 composed of a plurality of audio frames is converted into a PES packet sequence 8105 and then into a TS packet sequence 8106. Similarly, the PG stream 8111 is first converted into a PES packet sequence 8112 and then into a TS packet sequence 8113, whereas the IG stream 8114 is converted into a PES packet sequence 8115 and then into a TS packet sequence 8116. The multiplexed data 8117 is obtained by multiplexing the TS packet sequences (8103, 8106, 8113 and 8116) into one stream.

Figure 82:
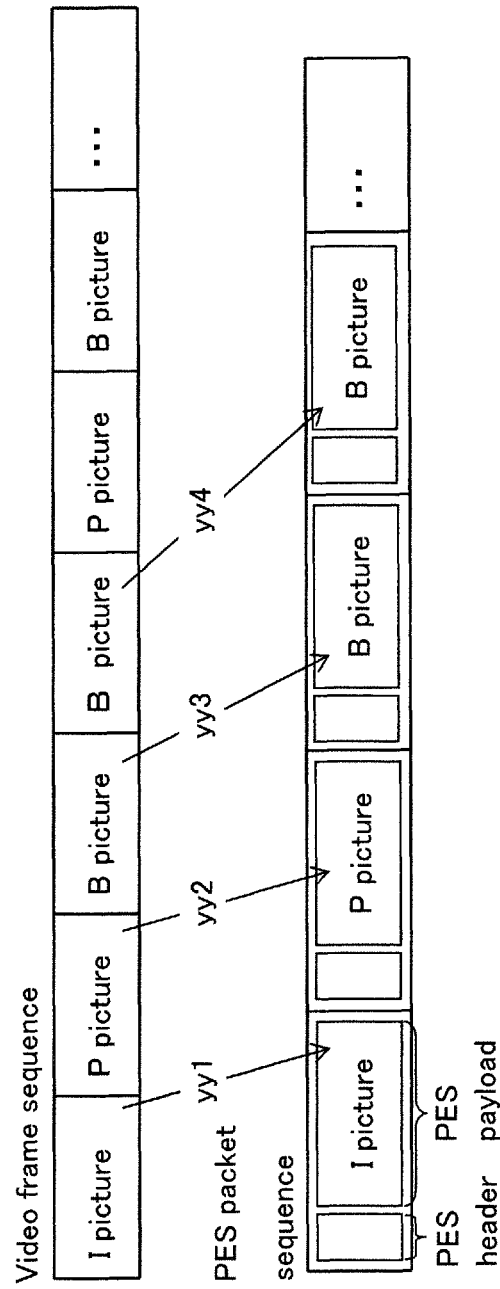
FIG. 82 shows in detail how a video stream is stored in a sequence of PES packets.

FIG. 82 illustrates the details of how a video stream is divided into a sequence of PES packets. In FIG. 82, the first tier shows a sequence of video frames included in a video stream. The second tier shows a sequence of PES packets. As indicated by arrows yy1, yy2, yy3, and yy4 shown in FIG. 82, a plurality of video presentation units, namely I pictures, B pictures, and P pictures, of a video stream are separately stored into the payloads of PES packets on a picture-by-picture basis. Each PES packet has a PES header and the PES header stores a Presentation Time-Stamp (PTS) and Decoding Time-Stamp (DTS) indicating the display time and decoding time of a corresponding picture.

Figure 83:
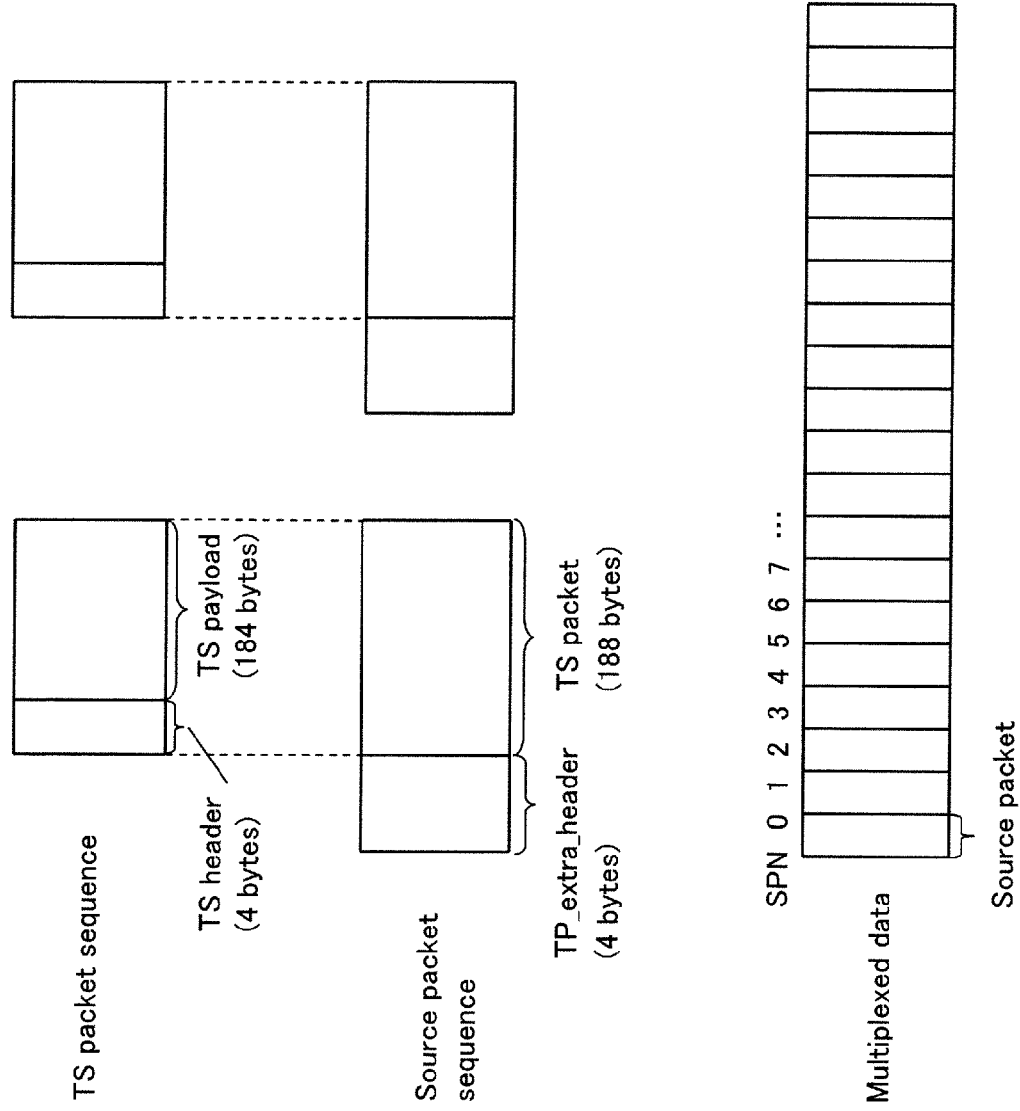
FIG. 83 shows the structure of a TS packet and a source packet in multiplexed data.

FIG. 83 illustrates the format of a TS packet to be eventually written as multiplexed data. The TS packet is a fixed length packet of 188 bytes and has a 4-byte TS header containing such information as PID identifying the stream and a 184-byte TS payload carrying actual data. The PES packets described above are divided to be stored into the TS payloads of TS packets. In the case of BD-ROM, each TS packet is attached with a TP_Extra_Header of 4 bytes to build a 192-byte source packet, which is to be written as multiplexed data. The TP_Extra_Header contains such information as an Arrival_Time_Stamp (ATS). The ATS indicates a time for starring transfer of the TS packet to the PID filter of a decoder. As shown on the lowest tier in FIG. 83, multiplexed data includes a sequence of source packets each bearing a source packet number (SPN), which is a number incrementing sequentially from the start of the multiplexed data.

In addition to the TS packets storing streams such as video, audio, and PG streams, multiplexed data also includes TS packets storing a Program Association Table (PAT), a Program Map Table (PMT), and a Program Clock Reference (PCR). The PAT in multiplexed data indicates the PID of a PMT used in the multiplexed data, and the PID of the PAT is "0". The PMT includes PIDs identifying the respective streams, such as video, audio and subtitles, contained in multiplexed data and attribute information (frame rate, aspect ratio, and the like) of the streams identified by the respective PIDs. In addition, the PMT includes various types of descriptors relating to the multiplexed data. One of such descriptors may be copy control information indicating whether or not copying of the multiplexed data is permitted. The PCR includes information for synchronizing the Arrival Time Clock (ATC), which is the time axis of ATS, with the System Time Clock (STC), which is the time axis of PTS and DTS. More specifically, the PCR packet includes information indicating an STC time corresponding to the ATS at which the PCR packet is to be transferred.

Figure 84:
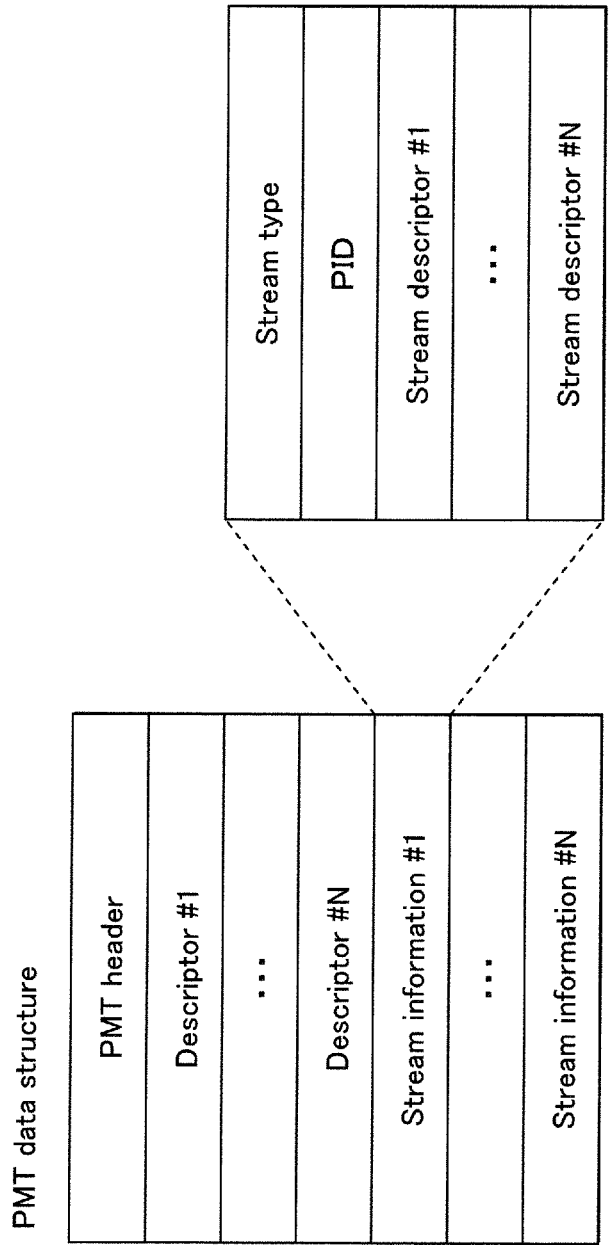
FIG. 84 shows the data structure of a PMT.

FIG. 84 is a view illustrating the data structure of the PMT in detail. The PMT starts with a PMT header indicating the length of data contained in the PMT. Following the PMT header, descriptors relating to the multiplexed data are disposed. One example of a descriptor included in the PMT is copy control information described above. Following the descriptors, pieces of stream information relating to the respective streams included in the multiplexed data are arranged. Each piece of stream information is composed of stream descriptors indicating a stream type identifying a compression codec employed for a corresponding stream, a PID of the stream, and attribute information (frame rate, aspect ratio, and the like) of the stream. The PMT includes as many stream descriptors as the number of streams included in the multiplexed data.

When recorded onto a recoding medium, for example, the multiplexed data is recorded along with a multiplexed data information file.

Figure 85:
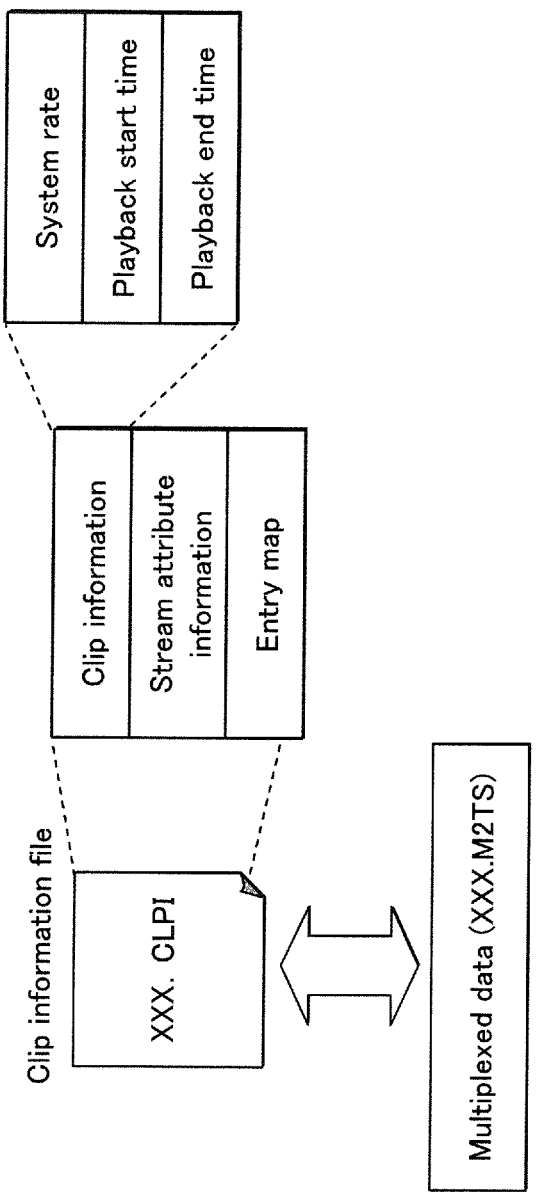
FIG. 85 shows the internal structure of multiplexed data information.

FIG. 85 is a view illustrating the structure of the multiplexed data information file. As illustrated in FIG. 85, the multiplexed data information file is management information of corresponding multiplexed data and is composed of multiplexed data information, stream attribute information, and an entry map. Note that multiplexed data information files and multiplexed data are in a one-to-one relationship.

As illustrated in FIG. 85, the multiplexed data information is composed of a system rate, playback start time, and playback end time. The system rate indicates the maximum transfer rate of the multiplexed data to the PID filter of a system target decoder, which is described later. The multiplexed data includes ATSs at intervals set so as not to exceed the system rate. The playback start time is set to the time specified by the PTS of the first video frame in the multiplexed data, whereas the playback end time is set to the time calculated by adding the playback period of one frame to the PTS of the last video frame in the multiplexed data.

Figure 86:
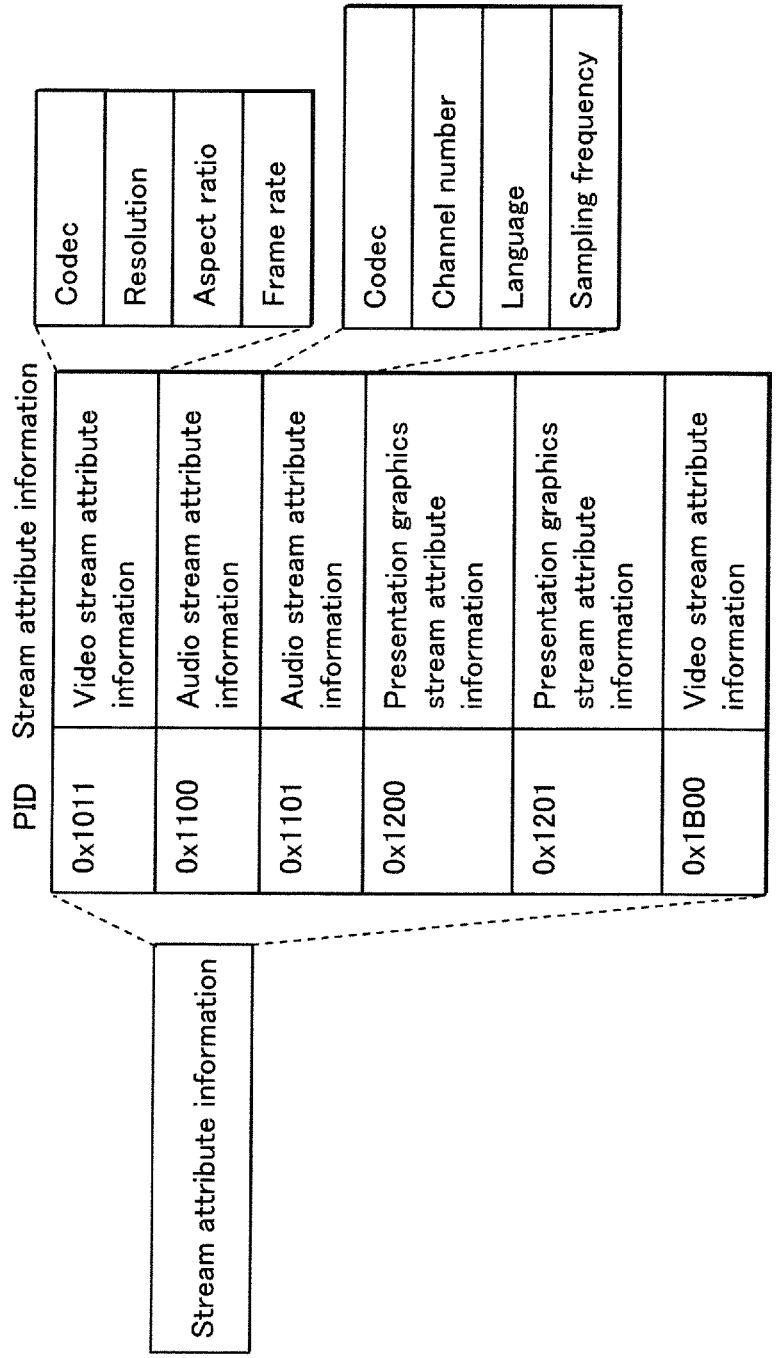
FIG. 86 shows the internal structure of stream attribute information.

FIG. 86 illustrates the structure of stream attribute information contained in multiplexed data information file. As illustrated in FIG. 86, the stream attribute information includes pieces of attribute information of the respective streams included in multiplexed data, and each piece of attribute information is registered with a corresponding PID. That is, different pieces of attribute information are provided for different streams, namely a video stream, an audio stream, a PG stream and an IG stream. The video stream attribute information indicates the compression codec employed to compress the video stream, the resolutions of individual pictures constituting the video stream, the aspect ratio, the frame rate, and so on. The audio stream attribute information indicates the compression codec employed to compress the audio stream, the number of channels included in the audio stream, the language of the audio stream, the sampling frequency, and so on. These pieces of information are used to initialize a decoder before playback by a player.

In the present embodiment, from among the pieces of information included in the multiplexed data, the stream type included in the PMT is used. In the case where the multiplexed data is recorded on a recording medium, the video stream attribute information included in the multiplexed data information file is used. More specifically, the moving picture coding method and device described in any of the above embodiments may be modified to additionally include a step or unit of setting a specific piece of information in the stream type included in the PMT or in the video stream attribute information. The specific piece of information is for indicating that the video data is generated by the moving picture coding method and device described in the embodiment. With the above structure, video data generated by the moving picture coding method and device described in any of the above embodiments is distinguishable from video data compliant with other standards.

Figure 87:
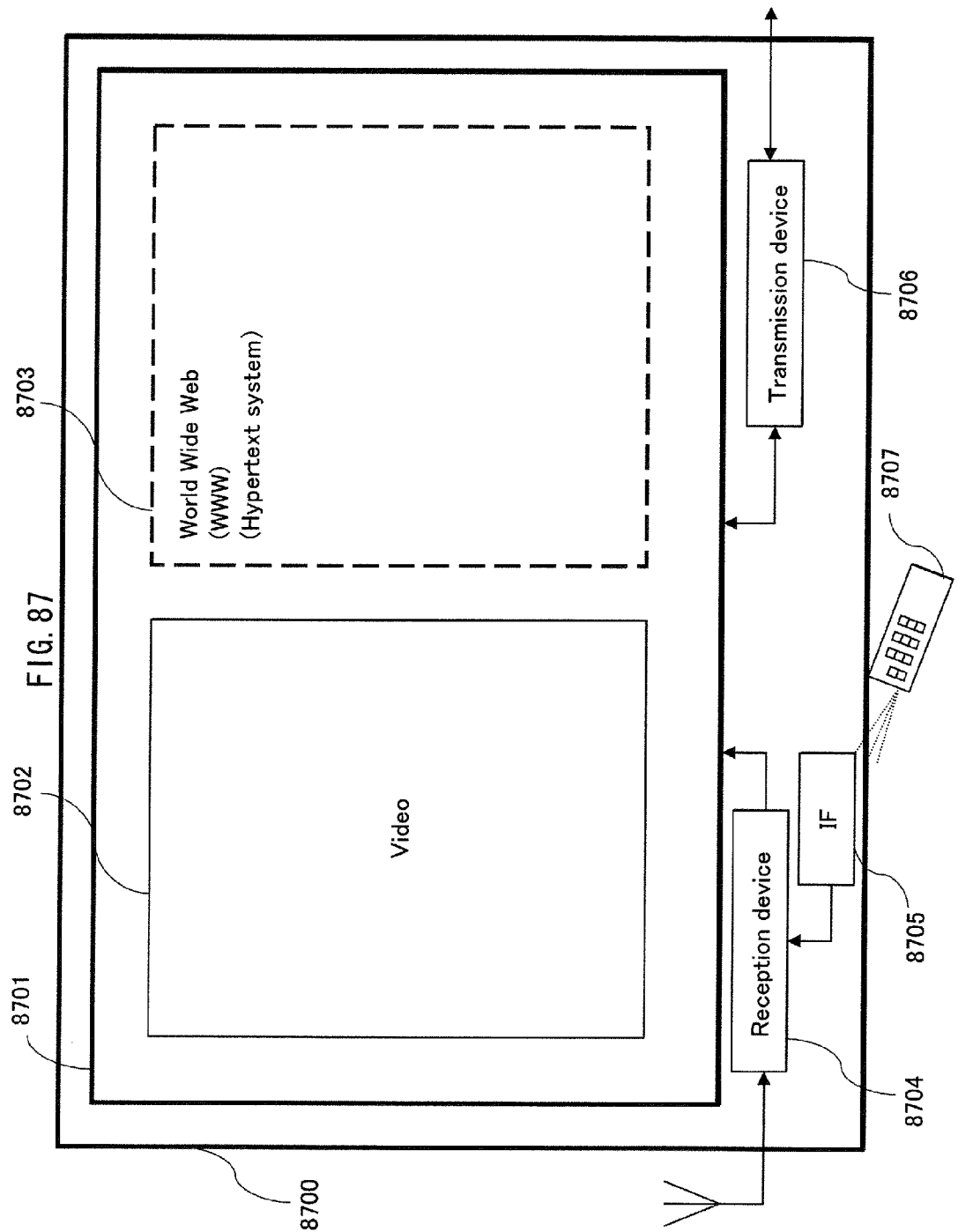
FIG. 87 is a structural diagram of a video display/audio output device.

FIG. 87 illustrates an exemplary structure of a video and audio output device 8700 that includes a reception device 8704 for receiving a modulated signal carrying video and audio data or data for data broadcasting from a broadcasting station (base station). Note that the structure of the reception device 8704 corresponds to the reception device 7900 illustrated in FIG. 79. The video and audio output device 8700 is installed with an Operating System (OS), for example, and also with a communication unit 8706 (a device for a wireless Local Area Network (LAN) or Ethernet, for example) for establishing an Internet connection. With this structure, hypertext (World Wide Web (WWW)) 8703 provided over the Internet can be displayed on a display area 8701 simultaneously with images 8702 reproduced on the display area 8701 from the video and audio data or data provided by data broadcasting. By operating a remote control (which may be a mobile phone or keyboard) 8707, the user can make a selection on the images 8702 reproduced from data provided by data broadcasting or the hypertext 8703 provided over the Internet to change the operation of the video and audio output device 8700. For example, by operating the remote control to make a selection on the hypertext 8703 provided over the Internet, the user can change the WWW site currently displayed to another site. Alternatively, by operating the remote control 8707 to make a selection on the images 8702 reproduced from the video or audio data or data provided by the data broadcasting, the user can transmit information indicating a selected channel (such as a selected broadcast program or audio broadcasting). In response, an interface (IF) 8705 acquires information transmitted from the remote control, so that the reception device 8704 operates to obtain reception data by demodulation and error correction of a signal carried on the selected channel. At this time, the reception device 8704 receives control symbols included in a signal corresponding to the selected channel and containing information indicating the transmission method of the signal (exactly as described in Embodiments A1-A4, and as shown in FIGS. 5 and 41). With this information, the reception device 8704 is enabled to make appropriate settings for the receiving operations, demodulation method, method of error correction decoding, and the like to duly receive data included in data symbols transmitted from a broadcasting station (base station). Although the above description is directed to an example in which the user selects a channel using the remote control 8707, the same description applies to an example in which the user selects a channel using a selection key provided on the video and audio output device 8700.

In addition, the video and audio output device 8700 may be operated via the Internet. For example, a terminal connected to the Internet may be used to make settings on the video and audio output device 8700 for pre-programmed recording (storing). (The video and audio output device 8700 therefore would have the recording unit 8308 as illustrated in FIG. 83.) In this case, before starting the pre-programmed recording, the video and audio output device 8700 selects the channel, so that the receiving device 8704 operates to obtain reception data by demodulation and error correction decoding of a signal carried on the selected channel. At this time, the reception device 8704 receives control symbols included in a signal corresponding to the selected channel and containing information indicating the transmission method (the transmission method, modulation method, error correction method, and the like in the above embodiments) of the signal (exactly as described in Embodiments A1-A4, and as shown in FIGS. 5 and 41). With this information, the reception device 8704 is enabled to make appropriate settings for the receiving operations, demodulation method, method of error correction decoding, and the like to duly receive data included in data symbols transmitted from a broadcasting station (base station).

Supplementary Explanation

In the present description, it is considered that a communications/broadcasting device such as a broadcast station, a base station, an access point, a terminal, a mobile phone, or the like is provided with the transmission device, and that a communications device such as a television, radio, terminal, personal computer, mobile phone, access point, base station, or the like is provided with the reception device. Additionally, it is considered that the transmission device and the reception device in the present description have a communications function and are capable of being connected via some sort of interface (such as a USB) to a device for executing applications for a television, radio, personal computer, mobile phone, or the like.

Furthermore, in the present embodiment, symbols other than data symbols, such as pilot symbols (preamble, unique word, postamble, reference symbol, and the like), symbols for control information, and the like may be arranged in the frame in any way. While the terms "pilot symbol" and "symbols for control information" have been used here, any term may be used, since the function itself is what is important.

It suffices for a pilot symbol, for example, to be a known symbol modulated with PSK modulation in the transmission and reception devices (or for the reception device to be able to synchronize in order to know the symbol transmitted by the transmission device). The reception device uses this symbol for frequency synchronization, time synchronization, channel estimation (estimation of Channel State Information (CSI) for each modulated signal), detection of signals, and the like.

A symbol for control information is for transmitting information other than data (of applications or the like) that needs to be transmitted to the communication partner for achieving communication (for example, the modulation method, error correction coding method, coding ratio of the error correction coding method, setting information in the upper layer, and the like).

Note that the present invention is not limited to the above embodiments and may be embodied with a variety of modifications. For example, the above embodiments describe communications devices, but the present invention is not limited to these devices and may be implemented as software for the corresponding communications method.

Furthermore, a precoding switching method used in a method of transmitting two modulated signals from two antennas has been described, but the present invention is not limited in this way. The present invention may be also embodied as a precoding switching method for similarly changing precoding weights (matrices) in the context of a method whereby four mapped signals are precoded to generate four modulated signals that are transmitted from four antennas, or more generally, whereby N mapped signals are precoded to generate N modulated signals that are transmitted from N antennas.

In the present description, the terms "precoding", "precoding matrix", "precoding weight matrix" and the like are used, but any term may be used (such as "codebook", for example) since the signal processing itself is what is important in the present invention.

Furthermore, in the present description, the reception device has been described as using ML calculation, APP, Max-log APP, ZF, MMSE, or the like, which yields soft decision results (log-likelihood, log-likelihood ratio) or hard decision results ("0" or "1") for each bit of data transmitted by the transmission device. This process may be referred to as detection, demodulation, estimation, or separation.

Different data may be transmitted in streams $s1(t)$ and $s2(t)$, or the same data may be transmitted.

Assume that precoded baseband signals $z1(i)$, $z2(i)$ (where i represents the order in terms of time or frequency (carrier)) are generated by precoding baseband signals $s1(i)$ and $s2(i)$ for two streams while regularly hopping between precoding matrices. Let the in-phase component I and the quadrature component Q of the precoded baseband signal $z1(i)$ be $I_1(i)$ and $Q_1(i)$ respectively, and let the in-phase component I and the quadrature component Q of the precoded baseband signal $z2(i)$ be $I_2(i)$ and $Q_2(i)$ respectively. In this case, the baseband components may be switched, and modulated signals corresponding to the switched baseband signal $r1(i)$ and the switched baseband signal $r2(i)$ may be transmitted from different antennas at the same time and over the same frequency by transmitting a modulated signal corresponding to the switched baseband signal $r1(i)$ from transmit antenna 1 and a modulated signal corresponding to the switched baseband signal $r2(i)$ from transmit antenna 2 at the same time and over the same frequency. Baseband components may be switched as follows.

Let the in-phase component and the quadrature component of the switched baseband signal $r1(i)$ be $I_1(i)$ and $Q_2(i)$ respectively, and the in-phase component and the quadrature component of the switched baseband signal $r2(i)$ be $I_2(i)$ and $Q_1(i)$ respectively.

Let the in-phase component and the quadrature component of the switched baseband signal $r1(i)$ be $I_1(i)$ and $I_2(i)$ respectively, and the in-phase component and the quadrature component of the switched baseband signal $r2(i)$ be $Q_1(i)$ and $Q_2(i)$ respectively.

Let the in-phase component and the quadrature component of the switched baseband signal $r1(i)$ be $I_2(i)$ and $I_1(i)$ respectively, and the in-phase component and the quadrature component of the switched baseband signal $r2(i)$ be $Q_1(i)$ and $Q_2(i)$ respectively.

Let the in-phase component and the quadrature component of the switched baseband signal $r1(i)$ be $I_1(i)$ and $I_2(i)$ respectively, and the in-phase component and the quadrature component of the switched baseband signal $r2(i)$ be $Q_2(i)$ and $Q_1(i)$ respectively.

Let the in-phase component and the quadrature component of the switched baseband signal $r1(i)$ be $I_2(i)$ and $I_1(i)$ respectively, and the in-phase component and the quadrature component of the switched baseband signal $r2(i)$ be $Q_2(i)$ and $Q_1(i)$ respectively.

Let the in-phase component and the quadrature component of the switched baseband signal $r1(i)$ be $I_1(i)$ and $Q_2(i)$ respectively, and the in-phase component and the quadrature component of the switched baseband signal $r2(i)$ be $Q_1(i)$ and $I_2(i)$ respectively.

Let the in-phase component and the quadrature component of the switched baseband signal $r1(i)$ be $Q_2(i)$ and $I_1(i)$ respectively, and the in-phase component and the quadrature component of the switched baseband signal $r2(i)$ be $I_2(i)$ and $Q_1(i)$ respectively.

Let the in-phase component and the quadrature component of the switched baseband signal $r1(i)$ be $Q_2(i)$ and $I_1(i)$ respectively, and the in-phase component and the quadrature component of the switched baseband signal $r2(i)$ be $Q_1(i)$ and $I_2(i)$ respectively.

Let the in-phase component and the quadrature component of the switched baseband signal $r2(i)$ be $I_1(i)$ and $I_2(i)$ respectively, and the in-phase component and the quadrature component of the switched baseband signal $r1(i)$ be $Q_1(i)$ and $Q_2(i)$ respectively.

Let the in-phase component and the quadrature component of the switched baseband signal $r2(i)$ be $I_2(i)$ and $I_1(i)$ respectively, and the in-phase component and the quadrature component of the switched baseband signal $r1(i)$ be $Q_1(i)$ and $Q_2(i)$ respectively.

Let the in-phase component and the quadrature component of the switched baseband signal $r2(i)$ be $I_1(i)$ and $I_2(i)$ respectively, and the in-phase component and the quadrature component of the switched baseband signal $r1(i)$ be $Q_2(i)$ and $Q_1(i)$ respectively.

Let the in-phase component and the quadrature component of the switched baseband signal $r2(i)$ be $I_2(i)$ and $I_1(i)$ respectively, and the in-phase component and the quadrature component of the switched baseband signal $r1(i)$ be $Q_2(i)$ and $Q_1(i)$ respectively.

Let the in-phase component and the quadrature component of the switched baseband signal $r2(i)$ be $I_1(i)$ and $Q_2(i)$ respectively, and the in-phase component and the quadrature component of the switched baseband signal $r1(i)$ be $I_2(i)$ and $Q_1(i)$ respectively.

Let the in-phase component and the quadrature component of the switched baseband signal $r2(i)$ be $I_1(i)$ and $Q_2(i)$ respectively, and the in-phase component and the quadrature component of the switched baseband signal $r1(i)$ be $Q_1(i)$ and $I_2(i)$ respectively.

Let the in-phase component and the quadrature component of the switched baseband signal $r2(i)$ be $Q_2(i)$ and $I_1(i)$ respectively, and the in-phase component and the quadrature component of the switched baseband signal $r1(i)$ be $I_2(i)$ and $Q_1(i)$ respectively.

Let the in-phase component and the quadrature component of the switched baseband signal $r2(i)$ be $Q_2(i)$ and $I_1(i)$ respectively, and the in-phase component and the quadrature component of the switched baseband signal $r1(i)$ be $Q_1(i)$ and $I_2(i)$ respectively.

In the above description, signals in two streams are precoded, and in-phase components and quadrature components of the precoded signals are switched, but the present invention is not limited in this way. Signals in more than two streams may be precoded, and the in-phase components and quadrature components of the precoded signals may be switched.

Each of the transmit antennas of the transmission device and the receive antennas of the reception device shown in the figures may be formed by a plurality of antennas.

In this description, the symbol "∀" represents the universal quantifier, and the symbol "∃" represents the existential quantifier.

Furthermore, in this description, the units of phase, such as argument, in the complex plane are radians.

When using the complex plane, complex numbers may be shown in polar form by polar coordinates. If a complex number z=a+jb (where a and b are real numbers and j is an imaginary unit) corresponds to a point (a, b) on the complex plane, and this point is represented in polar coordinates as [r, θ], then the following equations hold.

$$a = r \times \cos\theta$$

$$b = r \times \sin\theta$$

Math 303

$$r = \sqrt{a^2 + b^2}$$

r is the absolute value of z (r=|z|), and θ is the argument. Furthermore, z=a+jb is represented as $re^{j\theta}$.

In the description of the present invention, the baseband signal, modulated signal s1, modulated signal s2, modulated signal z1, and modulated signal z2 are complex signals. Complex signals are represented as I+jQ (where j is an imaginary unit), I being the in-phase signal, and Q being the quadrature signal. In this case, I may be zero, or Q may be zero.

The method of allocating different precoding matrices to frames (in the time domain and/or the frequency domain) described in this description (for example, Embodiment 1) may be implemented using other precoding matrices than the different precoding matrices in this description. The method of regularly hopping between precoding matrices may also coexist with or be switched with other transmission methods. In this case as well, the method of regularly hopping between different precoding matrices described in this description may be implemented using different precoding matrices.

Figure 59:
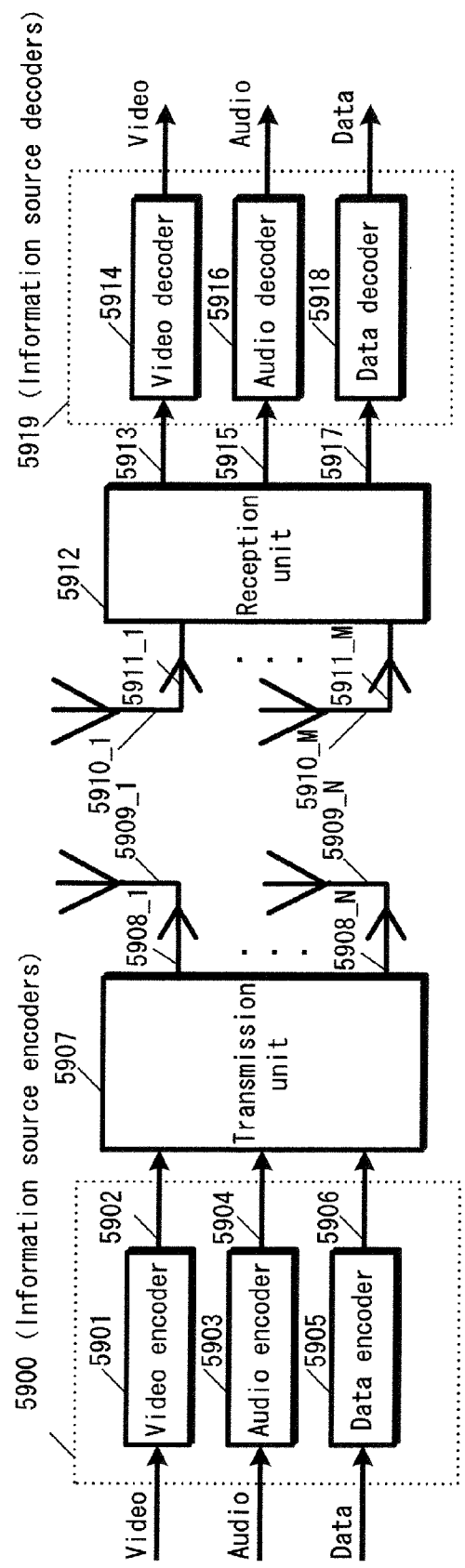
FIG. 59 is an example of a broadcasting system.

FIG. 59 shows an example of a broadcasting system that uses the method of regularly hopping between precoding matrices described in this description. In FIG. 59, a video encoder 5901 receives video images as input, encodes the video images, and outputs encoded video images as data 5902. An audio encoder 5903 receives audio as input, encodes the audio, and outputs encoded audio as data 5904. A data encoder 5905 receives data as input, encodes the data (for example by data compression), and outputs encoded data as data 5906. Together, these encoders are referred to as information source encoders 5900.

A transmission unit 5907 receives, as input, the data 5902 of the encoded video, the data 5904 of the encoded audio, and the data 5906 of the encoded data, sets some or all of these pieces of data as transmission data, and outputs transmission signals 5908_1 through 5908_N after performing processing such as error correction encoding, modulation, and precoding (for example, the signal processing of the transmission device in FIG. 3). The transmission signals 5908_1 through 5908_N are transmitted by antennas 5909_1 through 5909_N as radio waves.

A reception unit 5912 receives, as input, received signals 5911_1 through 5911_M received by antennas 5910_1 through 5910_M, performs processing such as frequency conversion, decoding of precoding, log-likelihood ratio calculation, and error correction decoding (processing by the reception device in FIG. 7, for example), and outputs received data 5913, 5915, and 5917. Information source decoders 5919 receive, as input, the received data 5913, 5915, and 5917. A video decoder 5914 receives, as input, the received data 5913, performs video decoding, and outputs a video signal. Video images are then shown on a television or display monitor. Furthermore, an audio decoder 5916 receives, as input, the received data 5915, performs audio decoding, and outputs an audio signal. Audio is then produced by a speaker. A data decoder 5918 receives, as input, the received data 5917, performs data decoding, and outputs information in the data.

In the above embodiments describing the present invention, the number of encoders in the transmission device when using a multi-carrier transmission method such as OFDM may be any number, as described above. Therefore, as in FIG. 4, for example, it is of course possible for the transmission device to have one encoder and to adapt a method of distributing output to a multi-carrier transmission method such as OFDM. In this case, the wireless units 310A and 310B in FIG. 4 are replaced by the OFDM related processors 1301A and 1301B in FIG. 13. The description of the OFDM related processors is as per Embodiment 1.

While this description refers to a "method of hopping between different precoding matrices", the specific "method of hopping between different precoding matrices" illustrated in this description is only an example. All of the embodiments in this description may be similarly implemented by replacing the "method of hopping between different precoding matrices" with a "method of regularly hopping between precoding matrices using a plurality of different precoding matrices".

Programs for executing the above transmission method may, for example, be stored in advance in Read Only Memory (ROM) and be caused to operate by a Central Processing Unit (CPU).

Furthermore, the programs for executing the above transmission method may be stored in a computer-readable recording medium, the programs stored in the recording medium may be loaded in the Random Access Memory (RAM) of the computer, and the computer may be caused to operate in accordance with the programs.

The components in the above embodiments may be typically assembled as a Large Scale Integration (LSI), a type of integrated circuit. Individual components may respectively be made into discrete chips, or part or all of the components in each embodiment may be made into one chip. While an LSI has been referred to, the terms Integrated Circuit (IC), system LSI, super LSI, or ultra LSI may be used depending on the degree of integration. Furthermore, the method for assembling integrated circuits is not limited to LSI, and a dedicated circuit or a general-purpose processor may be used. A Field Programmable Gate Array (FPGA), which is programmable after the LSI is manufactured, or a reconfigurable processor, which allows reconfiguration of the connections and settings of circuit cells inside the LSI, may be used.

Furthermore, if technology for forming integrated circuits that replaces LSIs emerges, owing to advances in semiconductor technology or to another derivative technology, the integration of functional blocks may naturally be accomplished using such technology. The application of biotechnology or the like is possible.

A precoding method according to an embodiment of the present invention is performed by a transmission device that transmits a first and a second transmission signal from a plurality of different outputs over the same frequency band and at the same time, the first and the second transmission signal being generated from a base modulated signal formed from a base stream and an enhancement modulated signal formed from an enhancement stream of data differing from the base stream, the precoding method comprising the step of: generating a precoded enhancement modulated signal by selecting a precoding matrix from among a plurality of precoding matrices and precoding the enhancement modulated signal using the selected precoding matrix, selection of the precoding matrix being switched regularly, wherein the first and the second transmission signal are generated from a signal in accordance with the base modulated signal and from the precoded enhancement modulated signal.

A signal processing device performing a precoding method according to an embodiment of the present invention is installed in a transmission device that transmits a first and a second transmission signal from a plurality of different outputs over the same frequency band and at the same time, the first and the second transmission signal being generated from a base modulated signal formed from a base stream and an enhancement modulated signal formed from an enhancement stream of data differing from the base stream, wherein a precoded enhancement modulated signal is generated by selecting a precoding matrix from among a plurality of precoding matrices and precoding the enhancement modulated signal using the selected precoding matrix, selection of the precoding matrix being switched regularly, and the first and the second transmission signal are generated from a signal in accordance with the base modulated signal and from the precoded enhancement modulated signal.

A transmission method according to an embodiment of the present invention is for a transmission device that transmits a first and a second transmission signal from a plurality of different outputs over the same frequency band and at the same time, the first and the second transmission signal being generated from a base modulated signal formed from a base stream and an enhancement modulated signal formed from an enhancement stream of data differing from the base stream, the transmission method comprising the steps of: generating a precoded enhancement modulated signal by selecting a precoding matrix from among a plurality of precoding matrices and precoding the enhancement modulated signal using the selected precoding matrix, selection of the precoding matrix being switched regularly; generating the first and the second transmission signal from a signal in accordance with the base modulated signal and from the precoded enhancement modulated signal; transmitting the first transmission signal from one or more first outputs; and transmitting the second transmission signal from one or more second outputs that differ from the one or more first outputs, wherein when precoding an encoded block based on the enhancement modulated signal, letting the number of slots required to transmit the encoded block as the first and the second transmission signal in accordance with a modulation method be M, the number of the plurality precoding matrices that differ from each other be N, an index for identifying each of the plurality of precoding matrices be F (F being from 1 to N), and the number of slots to which a precoding matrix with index F is allocated be C[F] (C[F] being less than M), then each of the plurality of precoding matrices is allocated to the M slots used to transmit the encoded block so that for any a, b (where a, b are from 1 to N and a≠b), the difference between C[a] and C[b] is 0 or 1.

A transmission device according to an embodiment of the present invention transmits a first and a second transmission signal from a plurality of different outputs over the same frequency band and at the same time, the first and the second transmission signal being generated from a base modulated signal formed from a base stream and an enhancement modulated signal formed from an enhancement stream of data differing from the base stream, the transmission device comprising: a weighting unit configured to generate a precoded enhancement modulated signal by selecting a precoding matrix from among a plurality of precoding matrices and precoding the enhancement modulated signal using the selected precoding matrix, selection of the precoding matrix being switched regularly; and a transmission unit configured to generate the first and the second transmission signal from a signal in accordance with the base modulated signal and from the precoded enhancement modulated signal, transmit the first transmission signal from one or more first outputs, and transmit the second transmission signal from one or more second outputs that differ from the one or more first outputs, wherein when precoding an encoded block based on the enhancement modulated signal, letting the number of slots required to transmit the encoded block as the first and the second transmission signal in accordance with a modulation method be M, the number of the plurality precoding matrices that differ from each other be N, an index for identifying each of the plurality of precoding matrices be F (F being from 1 to N), and the number of slots to which a precoding matrix with index F is allocated be C[F] (C[F] being less than M), then the weighting unit allocates each of the plurality of precoding matrices to the M slots used to transmit the encoded block so that for any a, b (where a, b are from 1 to N and a≠b), the difference between C[a] and C[b] is 0 or 1.

A reception method according to an embodiment of the present invention is for a reception device to receive a first and a second transmission signal transmitted by a transmission device from a plurality of different outputs over the same frequency band and at the same time, wherein a base modulated signal is formed from a base stream and an enhancement modulated signal is formed from an enhancement stream of data differing from the base stream, a precoded enhancement modulated signal is generated by selecting a precoding matrix from among a plurality of precoding matrices and precoding the enhancement modulated signal using the selected precoding matrix, selection of the precoding matrix being switched regularly, and the first and the second transmission signal are generated from a signal in accordance with the base modulated signal and from the precoded enhancement modulated signal, the reception method comprising the steps of receiving and demodulating the first and the second transmission signal using a demodulation method in accordance with a modulation method used on the base modulated signal and the enhancement modulated signal and performing error correction decoding to obtain data. In the reception method, when an encoded block based on the enhancement modulated signal is precoded, letting the number of slots required to transmit the encoded block as the first and the second transmission signal in accordance with a modulation method be M, the number of the plurality precoding matrices that differ from each other be N, an index for identifying each of the plurality of precoding matrices be F (F being from 1 to N), and the number of slots to which a precoding matrix with index F is allocated be C[F] (C[F] being less than M), then each of the plurality of precoding matrices is allocated to the M slots used to transmit the encoded block so that for any a, b (where a, b are from 1 to N and a≠b), the difference between C[a] and C[b] is 0 or 1.

A reception device according to an embodiment of the present invention is for receiving a first and a second transmission signal transmitted by a transmission device from a plurality of different outputs over the same frequency band and at the same time, wherein a base modulated signal is formed from a base stream and an enhancement modulated signal is formed from an enhancement stream of data differing from the base stream, a precoded enhancement modulated signal is generated by selecting a precoding matrix from among a plurality of precoding matrices and precoding the enhancement modulated signal using the selected precoding matrix, selection of the precoding matrix being switched regularly, and the first and the second transmission signal are generated from a signal in accordance with the base modulated signal and from the precoded enhancement modulated signal, the reception device receiving and demodulating the first and the second transmission signal using a demodulation method in accordance with a modulation method used on the base modulated signal and the enhancement modulated signal and performing error correction decoding to obtain data. In the reception device, when an encoded block based on the enhancement modulated signal is precoded, letting the number of slots required to transmit the encoded block as the first and the second transmission signal in accordance with a modulation method be M, the number of the plurality precoding matrices that differ from each other be N, an index for identifying each of the plurality of precoding matrices be F (F being from 1 to N), and the number of slots to which a precoding matrix with index F is allocated be C[F] (C[F] being less than M), then each of the plurality of precoding matrices is allocated to the M slots used to transmit the encoded block so that for any a, b (where a, b are from 1 to N and a≠b), the difference between C[a] and C[b] is 0 or 1.

Supplementary Explanation 2

Assume that precoded baseband signals $z_1(i)$, $z_2(i)$ (where i represents the order in terms of time or frequency (carrier)) are generated by precoding baseband signals $s1(i)$ and $s2(i)$ (which are baseband signals mapped with a certain modulation method) for two streams while regularly switching between precoding matrices. Let the in-phase component I and the quadrature component of the precoded baseband signal $z_1(i)$ be $I_1(i)$ and $Q_1(i)$ respectively, and let the in-phase component I and the quadrature component of the precoded baseband signal $z_2(i)$ be $I_2(i)$ and $Q_2(i)$ respectively. In this case, the baseband components may be switched, and modulated signals corresponding to the switched baseband signal $r_1(i)$ and the switched baseband signal $r_2(i)$ may be transmitted from different antennas at the same time and over the same frequency by transmitting a modulated signal corresponding to the switched baseband signal $r_1(i)$ from transmit antenna 1 and a modulated signal corresponding to the switched baseband signal $r_2(i)$ from transmit antenna 2 at the same time and over the same frequency. Baseband components may be switched as follows.

Let the in-phase component and the quadrature component of the switched baseband signal $r_1(i)$ be $I_1(i)$ and $Q_2(i)$ respectively, and the in-phase component and the quadrature component of the switched baseband signal $r_2(i)$ be $I_2(i)$ and $Q_1(i)$ respectively.

Let the in-phase component and the quadrature component of the switched baseband signal $r_1(i)$ be $I_1(i)$ and $I_2(i)$ respectively, and the in-phase component and the quadrature component of the switched baseband signal $r_2(i)$ be $Q_1(i)$ and $Q_2(i)$ respectively.

Let the in-phase component and the quadrature component of the switched baseband signal $r_1(i)$ be $I_2(i)$ and $I_1(i)$ respectively, and the in-phase component and the quadrature component of the switched baseband signal $r_2(i)$ be $Q_1(i)$ and $Q_2(i)$ respectively.

Let the in-phase component and the quadrature component of the switched baseband signal $r_1(i)$ be $I_1(i)$ and $I_2(i)$ respectively, and the in-phase component and the quadrature component of the switched baseband signal $r_2(i)$ be $Q_2(i)$ and $Q_1(i)$ respectively.

Let the in-phase component and the quadrature component of the switched baseband signal $r_1(i)$ be $I_2(i)$ and $I_1(i)$ respectively, and the in-phase component and the quadrature component of the switched baseband signal $r_2(i)$ be $Q_2(i)$ and $Q_1(i)$ respectively.

Let the in-phase component and the quadrature component of the switched baseband signal $r_1(i)$ be $I_1(i)$ and $Q_2(i)$ respectively, and the in-phase component and the quadrature component of the switched baseband signal $r_2(i)$ be $Q_1(i)$ and $I_2(i)$ respectively.

Let the in-phase component and the quadrature component of the switched baseband signal $r_1(i)$ be $Q_2(i)$ and $I_1(i)$ respectively, and the in-phase component and the quadrature component of the switched baseband signal $r_2(i)$ be $I_2(i)$ and $Q_1(i)$ respectively.

Let the in-phase component and the quadrature component of the switched baseband signal $r_1(i)$ be $Q_2(i)$ and $I_1(i)$ respectively, and the in-phase component and the quadrature component of the switched baseband signal $r_2(i)$ be $Q_1(i)$ and $I_2(i)$ respectively.

Let the in-phase component and the quadrature component of the switched baseband signal $r_2(i)$ be $I_1(i)$ and $I_2(i)$ respectively, and the in-phase component and the quadrature component of the switched baseband signal $r_1(i)$ be $Q_1(i)$ and $Q_2(i)$ respectively.

Let the in-phase component and the quadrature component of the switched baseband signal $r_2(i)$ be $I_2(i)$ and $I_1(i)$ respectively, and the in-phase component and the quadrature component of the switched baseband signal $r_1(i)$ be $Q_1(i)$ and $Q_2(i)$ respectively.

Let the in-phase component and the quadrature component of the switched baseband signal $r_2(i)$ be $I_1(i)$ and $I_2(i)$ respectively, and the in-phase component and the quadrature component of the switched baseband signal $r_1(i)$ be $Q_2(i)$ and $Q_1(i)$ respectively.

Let the in-phase component and the quadrature component of the switched baseband signal $r_2(i)$ be $I_2(i)$ and $I_1(i)$ respectively, and the in-phase component and the quadrature component of the switched baseband signal $r_1(i)$ be $Q_2(i)$ and $Q_1(i)$ respectively.

Let the in-phase component and the quadrature component of the switched baseband signal $r_2(i)$ be $I_1(i)$ and $Q_2(i)$ respectively, and the in-phase component and the quadrature component of the switched baseband signal $r_1(i)$ be $I_2(i)$ and $Q_1(i)$ respectively.

Let the in-phase component and the quadrature component of the switched baseband signal $r_2(i)$ be $I_1(i)$ and $Q_2(i)$ respectively, and the in-phase component and the quadrature component of the switched baseband signal $r_1(i)$ be $Q_1(i)$ and $I_2(i)$ respectively.

Let the in-phase component and the quadrature component of the switched baseband signal $r_2(i)$ be $Q_2(i)$ and $I_1(i)$ respectively, and the in-phase component and the quadrature component of the switched baseband signal $r_1(i)$ be $I_2(i)$ and $Q_1(i)$ respectively.

Let the in-phase component and the quadrature component of the switched baseband signal $r_2(i)$ be $Q_2(i)$ and $I_1(i)$ respectively, and the in-phase component and the quadrature component of the switched baseband signal $r_1(i)$ be $Q_1(i)$ and $I_2(i)$ respectively.

In the above description, signals in two streams are precoded, and in-phase components and quadrature components of the precoded signals are switched, but the present invention is not limited in this way. Signals in more than two streams may be precoded, and the in-phase components and quadrature components of the precoded signals may be switched.

In the above example, switching of the baseband signals at the same time (or the same frequency ((sub)carrier)) has been described, but switching is not limited to baseband signals at the same time. The following is an example of another possibility.

Let the in-phase component and the quadrature component of the switched baseband signal $r_1(i)$ be $I_1(i+v)$ and $Q_2(i+w)$ respectively, and the in-phase component and the quadrature component of the switched baseband signal $r_2(i)$ be $I_2(i+w)$ and $Q_1(i+v)$ respectively.

Let the in-phase component and the quadrature component of the switched baseband signal $r_1(i)$ be $I_1(i+v)$ and $I_2(i+w)$ respectively, and the in-phase component and the quadrature component of the switched baseband signal $r_2(i)$ be $Q_1(i+v)$ and $Q_2(i+w)$ respectively.

Let the in-phase component and the quadrature component of the switched baseband signal $r_1(i)$ be $I_2(i+w)$ and $I_1(i+v)$ respectively, and the in-phase component and the quadrature component of the switched baseband signal $r_2(i)$ be $Q_1(i+v)$ and $Q_2(i+w)$ respectively.

Let the in-phase component and the quadrature component of the switched baseband signal $r_1(i)$ be $I_1(i+v)$ and $I_2(i+w)$ respectively, and the in-phase component and the quadrature component of the switched baseband signal $r_2(i)$ be $Q_2(i+w)$ and $Q_1(i+v)$ respectively.

Let the in-phase component and the quadrature component of the switched baseband signal $r_1(i)$ be $I_2(i+w)$ and $I_1(i+v)$ respectively, and the in-phase component and the quadrature component of the switched baseband signal $r_2(i)$ be $Q_2(i+w)$ and $Q_1(i+v)$ respectively.

Let the in-phase component and the quadrature component of the switched baseband signal $r_1(i)$ be $I_1(i+v)$ and $Q_2(i+w)$ respectively, and the in-phase component and the quadrature component of the switched baseband signal $r_2(i)$ be $Q_1(i+v)$ and $I_2(i+w)$ respectively.

Let the in-phase component and the quadrature component of the switched baseband signal $r_1(i)$ be $Q_2(i+w)$ and $I_1(i+v)$ respectively, and the in-phase component and the quadrature component of the switched baseband signal $r_2(i)$ be $I_2(i+w)$ and $Q_1(i+v)$ respectively.

Let the in-phase component and the quadrature component of the switched baseband signal $r_1(i)$ be $Q_2(i+w)$ and $I_1(i+v)$ respectively, and the in-phase component and the quadrature component of the switched baseband signal $r_2(i)$ be $Q_1(i+v)$ and $I_2(i+w)$ respectively.

Let the in-phase component and the quadrature component of the switched baseband signal $r_2(i)$ be $I_1(i+v)$ and $I_2(i+w)$ respectively, and the in-phase component and the quadrature component of the switched baseband signal $r_1(i)$ be $Q_1(i+v)$ and $Q_2(i+w)$ respectively.

Let the in-phase component and the quadrature component of the switched baseband signal $r_2(i)$ be $I_2(i+w)$ and $I_1(i+v)$ respectively, and the in-phase component and the quadrature component of the switched baseband signal $r_1(i)$ be $Q_1(i+v)$ and $Q_2(i+w)$ respectively.

Let the in-phase component and the quadrature component of the switched baseband signal $r_2(i)$ be $I_1(i+v)$ and $I_2(i+w)$ respectively, and the in-phase component and the quadrature component of the switched baseband signal $r_1(i)$ be $Q_2(i+w)$ and $Q_1(i+v)$ respectively.

Let the in-phase component and the quadrature component of the switched baseband signal $r_2(i)$ be $I_2(i+w)$ and $I_1(i+v)$ respectively, and the in-phase component and the quadrature component of the switched baseband signal $r_1(i)$ be $Q_2(i+w)$ and $Q_1(i+v)$ respectively.

Let the in-phase component and the quadrature component of the switched baseband signal $r_2(i)$ be $I_1(i+v)$ and $Q_2(i+w)$ respectively, and the in-phase component and the quadrature component of the switched baseband signal $r_1(i)$ be $Q_1(i+v)$ and $I_2(i+w)$ respectively.

Let the in-phase component and the quadrature component of the switched baseband signal $r_2(i)$ be $Q_2(i+w)$ and $I_1(i+v)$ respectively, and the in-phase component and the quadrature component of the switched baseband signal $r_1(i)$ be $I_2(i+w)$ and $Q_1(i+v)$ respectively.

Let the in-phase component and the quadrature component of the switched baseband signal $r_2(i)$ be $Q_2(i+w)$ and $I_1(i+v)$ respectively, and the in-phase component and the quadrature component of the switched baseband signal $r_1(i)$ be $Q_1(i+v)$ and $I_2(i+w)$ respectively.

Figure 88:
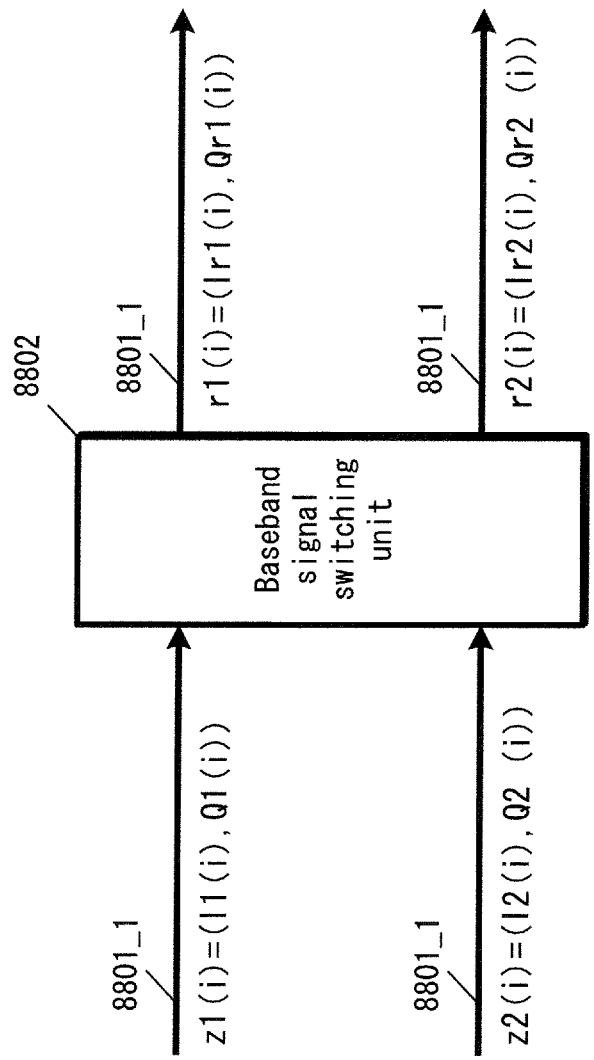
FIG. 88 shows the structure of a baseband signal switching unit.

FIG. 88 shows a baseband signal switching unit 8802 to illustrate the above example. As shown in FIG. 88, in precoded baseband signals $z_1(i)$ 8801_1 and $z_2(i)$ 8801_2, the in-phase component I and the quadrature component of the precoded baseband signal $z_1(i)$ 8801_1 are $I_1(i)$ and $Q_1(i)$, respectively, and the quadrature component of the precoded baseband signal $z_2(i)$ 8801_2 are $I_2(i)$ and $Q_2(i)$, respectively. Letting the in-phase component and the quadrature component of the switched baseband signal $r_1(i)$ 8803_1 be $Ir_1(i)$ and $Qr_1(i)$, respectively, and the in-phase component and the quadrature component of the switched baseband signal $r_2(i)$ 8803_2 be $Ir_2(i)$ and $Qr_2(i)$, respectively, then the in-phase component $Ir_1(i)$ and the quadrature component $Qr_1(i)$ of the switched baseband signal $r_1(i)$ 8803_1 and the in-phase component $Ir_2(i)$ and the quadrature component $Qr_2(i)$ of the switched baseband signal $r_2(i)$ 8803_2 are expressed as one of the values described above. Note that in this example, switching of precoded baseband signals at the same time (or the same frequency ((sub)carrier)) has been described, but as described above, precoded baseband signals at different times (or different frequencies ((sub)carriers)) may be switched.

Furthermore, a modulated signal corresponding to the switched baseband signal $r_1(i)$ 8803_1 and the switched baseband signal $r_2(i)$ 8803_2 may be transmitted from different antennas at the same time and at the same frequency, for example by transmitting a modulated signal corresponding to the switched baseband signal $r_1(i)$ 8803_1 from antenna 1 and a modulated signal corresponding to the switched baseband signal $r_2(i)$ 8803_2 from antenna 2 at the same time and at the same frequency.

The symbol arrangement method described in Embodiments A1 through A4 and in Embodiment 1 may be similarly implemented as a precoding method for regularly switching between precoding matrices using a plurality of different precoding matrices, the precoding method differing from the "method for switching between different precoding matrices" in the present description. The same holds true for other embodiments as well. The following is a supplementary explanation regarding a plurality of different precoding matrices.

Let N precoding matrices be represented as F[0], F[1], F[2], . . . , F[N−3], F[N−2], F[N−1] for a precoding method for regularly switching between precoding matrices. In this case, the "plurality of different precoding matrices" referred to above are assumed to satisfy the following two conditions (condition *1 and condition *2).

Math 304

$$F[x] \neq F[y] \text{ for } \forall x, \forall y (x,y=0,1,2,\ldots,N-3,N-2,N-1; x \neq y) \quad \text{Condition *1}$$

It follows from Condition *1 that "(letting x be an integer from 0 to N−1, y be an integer from 0 to N−1, and x≠y) for all x and all y, F[x]≠F[y]".

Math 305

$$F[x] = k \times F[y] \quad \text{Condition *2}$$

Letting x be an integer from 0 to N−1, y be an integer from 0 to N−1, and x≠y, for all x and all y, no real or complex number k satisfying the above equation exists.

The following is a supplementary explanation using a 2×2 matrix as an example. Let 2×2 matrices R, S be represented as follows.

$$R = \begin{pmatrix} a & b \\ c & d \end{pmatrix} \quad \text{Math 306}$$

$$S = \begin{pmatrix} e & f \\ g & h \end{pmatrix} \quad \text{Math 307}$$

Let $a=Ae^{j\delta 11}$, $b=Be^{j\delta 12}$, $c=Ce^{j\delta 21}$, and $d=De^{j\delta 22}$, and $e=Ee^{j\gamma 11}$, $f=Fe^{j\gamma 12}$, $g=Ge^{j\gamma 21}$, and $h=He^{j\gamma 22}$. A, B, C, D, E, F, G, and H are real numbers 0 or greater, and $\delta 11$, $\delta 12$, $\delta 21$, $\delta 21$, $\gamma 11$, $\gamma 12$, $\gamma 21$, and $\gamma 21$ are expressed in radians. In this case, R≠S means that at least one of the following holds: (1) a≠e, (2) b≠f, (3) c≠g, and (4) d≠h.

A precoding matrix may be the matrix R wherein one of a, b, c, and d is zero. In other words, the precoding matrix may be such that (1) a is zero, and b, c, and d are not zero; (2) b is zero, and a, c, and d are not zero; (3) c is zero, and a, b, and d are not zero; or (4) d is zero, and a, b, and c are not zero.

In the system example in the description of the present invention, a communications system using a MIMO method was described, wherein two modulated signals are transmitted from two antennas and are received by two antennas. The present invention may, however, of course also be adopted in a communications system using a Multiple Input Single Output (MISO) method. In the case of a MISO method, adoption of a precoding method for regularly switching between a plurality of precoding matrices in the transmission device is the same as described above. On the other hand, the reception device is not provided with the antenna 701_Y, the wireless unit 703_Y, the channel fluctuation estimating unit 707_1 for the modulated signal z1, or the channel fluctuation estimating unit 707_2 for the modulated signal z2. In this case as well, however, the processing detailed in the present description may be performed to estimate data transmitted by the transmission device. Note that it is widely known that a plurality of signals transmitted at the same frequency and the same time can be received by one antenna and decoded (for one antenna reception, it suffices to perform calculation such as ML calculation (Max-log APP or the like)). In the present invention, it suffices for the signal processing unit 711 in FIG. 7 to perform demodulation (detection) taking into consideration the precoding method for regularly switching that is used at the transmitting end.

INDUSTRIAL APPLICABILITY

The present invention is widely applicable to wireless systems that transmit different modulated signals from a plurality of antennas, such as an OFDM-MIMO system. Furthermore, in a wired communication system with a plurality of transmission locations (such as a Power Line Communication (PLC) system, optical communication system, or Digital Subscriber Line (DSL) system), the present invention may be adapted to MIMO, in which case a plurality of transmission locations are used to transmit a plurality of modulated signals as described by the present invention. A modulated signal may also be transmitted from a plurality of transmission locations.

REFERENCE SIGNS LIST 302A, 302B encoder
304A, 304B interleaver
306A, 306B mapper
314 weighting information generating unit
308A, 308B weighting unit
310A, 310B wireless unit
312A, 312B antenna
402 encoder
404 distribution unit
504#1, 504#2 transmit antenna
505#1, 505#2 receive antenna
600 weighting unit
703_X wireless unit
701_X antenna
705_1 channel fluctuation estimating unit
705_2 channel fluctuation estimating unit
707_1 channel fluctuation estimating unit
707_2 channel fluctuation estimating unit
709 control information decoding unit
711 signal processing unit
803 INNER MIMO detector
805A, 805B log-likelihood calculating unit
807A, 807B deinterleaver
809A, 809B log-likelihood ratio calculating unit
811A, 811B soft-in/soft-out decoder
813A, 813B interleaver
815 storage unit
819 weighting coefficient generating unit
901 soft-in/soft-out decoder
903 distribution unit
1301A, 1301B OFDM related processor
1402A, 1402A serial/parallel converter
1404A, 1404B reordering unit
1406A, 1406B inverse Fast Fourier transformer
1408A, 1408B wireless unit
2200 precoding weight generating unit
2300 reordering unit
4002 encoder group

The invention claimed is:

1. A phase weight altering method comprising the steps of:
encoding a first plurality of bits to a first encoded block and a second encoded block by using a predetermined error correction block encoding method;
mapping the first encoded block to a first baseband signal s1 with M symbols and the second encoded block to a second baseband signal s2 with M symbols, M being an integer that is at least two;
selecting a matrix F[i] from among N matrices while switching between the N matrices, the N matrices defining phase weight altering performed on the plurality of baseband signals, i being an integer variable from 0 to (K−1), K being an integer that is at least two and less than N, and N being an integer that is at least three; and
generating a first phase weight altered signal z1 and a second phase weight altered signal z2 by phase weight altering, in accordance with the selected matrix F[i], the first baseband signal s1 and the second baseband signal s2 to be transmitted over the same frequency bandwidth at the same time, wherein the first phase weight altered signal z1 and the second phase weight altered signal z2 satisfying the equation $(z1, z2)^T = F[i](s1, s2)^T$, $(z1, z2)^T$ being a transposed vector of (z1, z2), and $(s1, s2)^T$ being a transposed vector of (s1, s2).

2. The phase weight altering method of claim 1, wherein the first phase weight altered signal z1 is transmitted from a first antenna with a first frequency bandwidth at a first time, the second phase weight altered signal z2 is transmitted from a second antenna with the first frequency bandwidth at the first time.

3. A phase weight altering apparatus comprising:

an error correction coder that encodes a first plurality of bits to a first encoded block and a second encoded block by using a predetermined error correction block encoding method;

a mapper that maps the first encoded block to a first baseband signal s1 with M symbols and the second encoded block to a second baseband signal s2 with M symbols, M being an integer that is at least two;

a weighting information generator that selects a matrix F[i] from among N matrices while switching between the N matrices, the N matrices defining phase weight altering performed on the plurality of baseband signals, i being an integer variable from 0 to (K−1), K being an integer that is at least two and less than N, and N being an integer that is at least three; and a weighting calculator that generates a first phase weight altered signal z1 and a second phase weight altered signal z2 by phase weight altering, in accordance with the selected matrix F[i], the first baseband signal s1 and the second baseband signal s2 to be transmitted over the same frequency bandwidth at the same time, wherein the first phase weight altered signal z1 and the second phase weight altered signal z2 satisfy the equation $(z1, z2)^T = F[i](s1, s2)^T$, $(z1, z2)^T$ being a transposed vector of (z1, z2), and $(s1, s2)^T$ being a transposed vector of (s1, s2).

4. The phase weight altering apparatus of claim 3, further comprising, the first phase weight altered signal z1 from a first antenna with a first frequency bandwidth at a first time, and the second phase weight altered signal z2 from a second antenna with the first frequency bandwidth at the first time.

\* \* \* \* \*